US012783674B1

(12) United States Patent
Martin

(10) Patent No.: US 12,783,674 B1
(45) Date of Patent: Nov. 3, 2026

(54) METHODS AND SYSTEMS FOR STRUCTURED COMPATIBILITY CERTIFICATION AND EXECUTION CONTROL IN ONE OR MORE EXTERNAL SYSTEMS

(71) Applicant: Next Shift Consulting LLC, Sun Prairie, WI (US)

(72) Inventor: Rudolph A. Martin, Sun Prairie, WI (US)

(73) Assignee: Next Shift Consulting LLC, Sun Prairie, WI (US)

( * ) Notice: Subject to any disclaimer, the term of this patent is extended or adjusted under 35 U.S.C. 154(b) by 0 days.

(21) Appl. No.: 19/575,615

(22) Filed: Mar. 23, 2026

(51) Int. Cl.
*G06F 21/57* (2013.01)
*G06F 21/50* (2013.01)
(Continued)

(52) U.S. Cl.
CPC .............. *G06F 21/57* (2013.01); *G06F 21/50* (2013.01); *G06F 21/51* (2013.01); *G06F 21/71* (2013.01);
(Continued)

(58) Field of Classification Search
CPC .......... G06F 21/57; G06F 21/51; G06F 21/52; G06F 21/577; G06F 21/64; G06F 21/70; G06F 21/71; G06F 21/72; G06F 21/75; G06F 21/76; G06F 21/12; H04L 63/12; H04W 12/06; H04W 12/069
See application file for complete search history.

(56) References Cited

U.S. PATENT DOCUMENTS

| | | | | |
|---|---|---|---|---|
| 7,720,662 B1 * | 5/2010 | Aldrich | G06F 11/3692 717/124 |
| 2015/0178183 A1 * | 6/2015 | Tripp | G06F 11/3684 717/123 |

(Continued)

OTHER PUBLICATIONS

Behrouz A., et al., Titans: Learning to Memorize at Test Time, Google Research, Dec. 31, 2024, <https://doi.org/10.48550/arXiv.2501.00663>.
Behrouz A., et al., Nested Learning: The Illusion of Deep Learning Architectures, Google Research, Nov. 2025, <https://doi.org/10.48550/arXiv.2512.24695>.
Hinton, G., et al., Distilling the Knowledge in a Neural Network, Google Research, Mar. 9, 2015, <https://doi.org/10.48550/arXiv.1503.02531>.

(Continued)

*Primary Examiner* — Shaqueal D Wade-Wright

(57) ABSTRACT

A computer-implemented system generating a structured compatibility certificate prior to invoking a downstream solver within external systems. The structured compatibility certificate is produced by projecting a representation-solver compatibility functional into three mutually exclusive components-relevance, superfluous, and noise-constrained by a normalization invariant. A quality metric derived from semantic decomposition and a compatibility score quantifying geometric alignment between the representation and the downstream solver in a shared latent space converge through conjunction to produce typed execution control that neither signal alone provides. The structured compatibility certificate is configured as enforcement data that a plurality of independent consumer roles-authorization, interpretation, and confirmation—each read differently to independently determine execution actions including routing, substitution, throttling, or rejection across digital, accelerator-based, neuromorphic, and distributed computing environments.

20 Claims, 38 Drawing Sheets

(51) Int. Cl.

| | |
|---|---|
| ***G06F 21/51*** | (2013.01) |
| ***G06F 21/71*** | (2013.01) |
| ***G06F 21/75*** | (2013.01) |
| ***H04W 12/069*** | (2021.01) |
| *G06F 21/12* | (2013.01) |
| *G06F 21/64* | (2013.01) |
| *G06F 21/76* | (2013.01) |

(52) U.S. Cl.

CPC .......... *G06F 21/75* (2013.01); *H04W 12/069* (2021.01); *G06F 21/12* (2013.01); *G06F 21/64* (2013.01); *G06F 21/76* (2013.01); *G06F 2221/033* (2013.01)

(56) References Cited

U.S. PATENT DOCUMENTS

| | | | | |
|---|---|---|---|---|
| 2020/0193323 | A1* | 6/2020 | Alesiani | B25J 9/1661 |
| 2023/0079773 | A1* | 3/2023 | Fritz | G06F 21/577<br>726/22 |
| 2026/0147639 | A1* | 5/2026 | Crabtree | G06F 9/5083 |

OTHER PUBLICATIONS

Platt J., Probabilistic Outputs for Support Vector Machines and Comparisons to Regularized Likelihood Methods, Adv. Large Margin Classif., Jun. 23, 2000, vol. 10.

Shannon C., A Mathematical Theory of Communication, the Bell System Techical Journal, 1948, 379-423 and 623-656, vol. 27.

Sandia National Laboratories. "CrossSim: Accuracy Simulation of Analog In-Memory Computing." GitHub repository, https://github.com/sandialabs/cross-sim.

* cited by examiner

800

802 804 806

| Problem | Traditional Approach | Compatibility-Governed Approach |
|---|---|---|
| LLM hallucination | Post-hoc fact checking | Measure context quality $\alpha$ before generation |
| RAG retrieval noise | Rerank and hope | Decompose into R/S/N, filter by $\alpha$ threshold |
| Context window bloat | Truncate arbitrarily | Remove S (superfluous), keeping R (relevant) |
| Model routing decisions | Static rules or latency-based | Route by quality $\alpha \rightarrow$ tier mapping |
| Temperature tuning | Manual experimentation | Derive $\tau = f(\alpha)$ from context quality |
| Multi-source conflicts | Pick "best" source | Detect CLASH collapse, trigger decomposition |
| Distribution shift | Retrain periodically | Monitor $\omega$ drift, detect RELIABILITY collapse |
| Adversarial inputs | Blocklists, classifiers | Detect O_POISONING via novelty + low $\omega$ |
| Uncertainty estimation | MC Dropout (slow) | Two-stage: O(1) heuristic + O(N) confirmation |
| Drift detection | Periodic retraining | GRADUAL_DRIFT + CONFIRMED_DRIFT signals |

Fig. 8

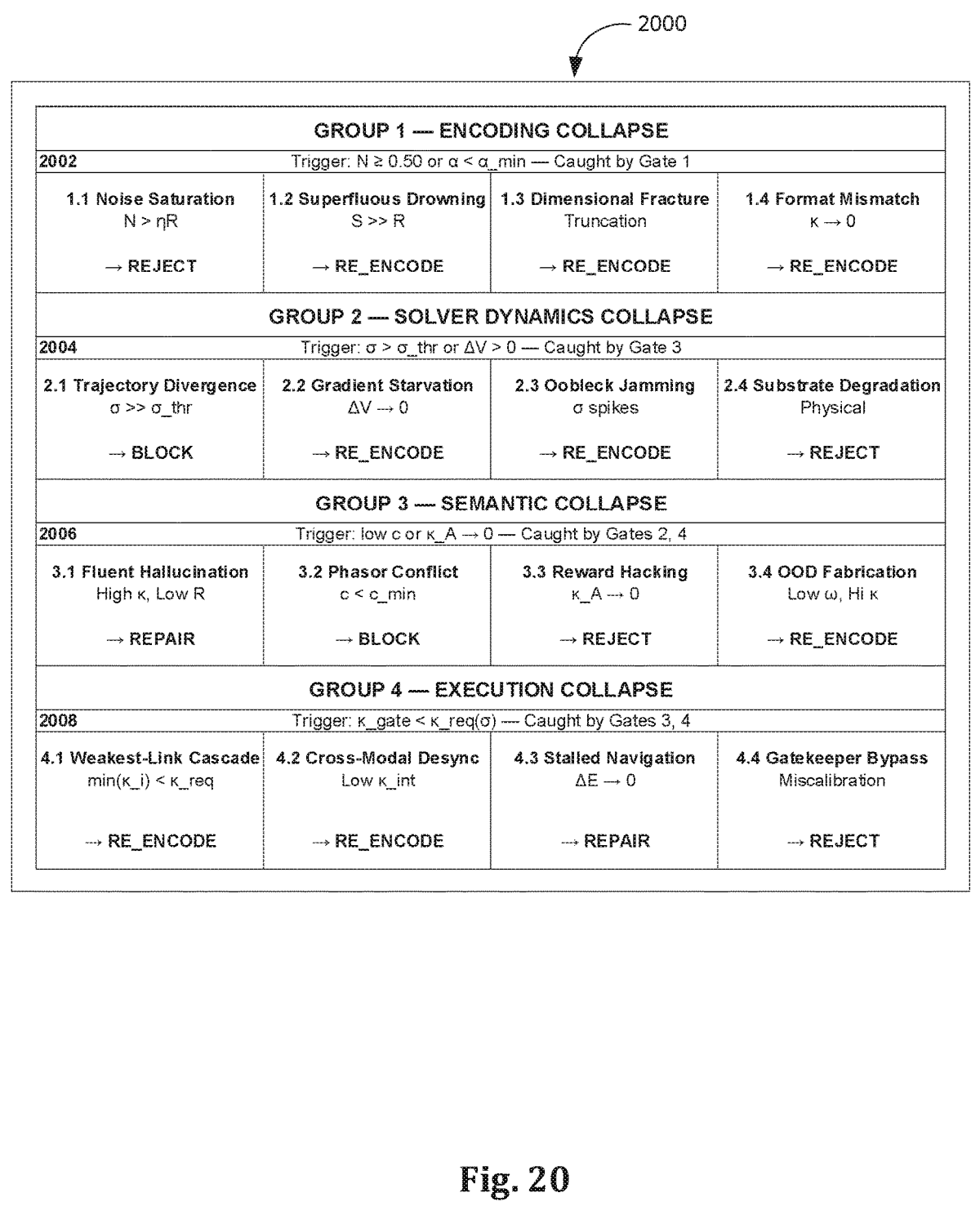

2000

GROUP 1 — ENCODING COLLAPSE

2002 Trigger: $N \geq 0.50$ or $\alpha < \alpha\_min$ — Caught by Gate 1

| 1.1 Noise Saturation | 1.2 Superfluous Drowning | 1.3 Dimensional Fracture | 1.4 Format Mismatch |
|---|---|---|---|
| $N > \eta R$ | $S >> R$ | Truncation | $\kappa \to 0$ |
| → REJECT | → RE_ENCODE | → RE_ENCODE | → RE_ENCODE |

GROUP 2 — SOLVER DYNAMICS COLLAPSE

2004 Trigger: $\sigma > \sigma\_thr$ or $\Delta V > 0$ — Caught by Gate 3

| 2.1 Trajectory Divergence | 2.2 Gradient Starvation | 2.3 Oobleck Jamming | 2.4 Substrate Degradation |
|---|---|---|---|
| $\sigma >> \sigma\_thr$ | $\Delta V \to 0$ | $\sigma$ spikes | Physical |
| → BLOCK | → RE_ENCODE | → RE_ENCODE | → REJECT |

GROUP 3 — SEMANTIC COLLAPSE

2006 Trigger: low c or $\kappa\_A \to 0$ — Caught by Gates 2, 4

| 3.1 Fluent Hallucination | 3.2 Phasor Conflict | 3.3 Reward Hacking | 3.4 OOD Fabrication |
|---|---|---|---|
| High $\kappa$, Low R | $c < c\_min$ | $\kappa\_A \to 0$ | Low $\omega$, Hi $\kappa$ |
| → REPAIR | → BLOCK | → REJECT | → RE_ENCODE |

GROUP 4 — EXECUTION COLLAPSE

2008 Trigger: $\kappa\_gate < \kappa\_req(\sigma)$ — Caught by Gates 3, 4

| 4.1 Weakest-Link Cascade | 4.2 Cross-Modal Desync | 4.3 Stalled Navigation | 4.4 Gatekeeper Bypass |
|---|---|---|---|
| $\min(\kappa\_i) < \kappa\_req$ | Low $\kappa\_int$ | $\Delta E \to 0$ | Miscalibration |
| → RE_ENCODE | → RE_ENCODE | → REPAIR | → REJECT |

Fig. 20

— — — — Loop 1 = 314: Morph Repair (non-execute path) —— · —— Loop 2 = 328: Agent Handoff (execute path, passes through 330)

Fixed embeddings; deterministic ϕ; no gradient descent / RL / RLHF at runtime — all adaptation via morph operators only

METHODS AND SYSTEMS FOR STRUCTURED COMPATIBILITY CERTIFICATION AND EXECUTION CONTROL IN ONE OR MORE EXTERNAL SYSTEMS

FIELD OF DISCLOSURE

The present disclosure relates generally to data processing and computational control architectures. More specifically, the present disclosure relates to systems and methods for structured compatibility certification and execution control in one or more external systems, including computing representation-solver compatibility functionals, generating structured compatibility certificates comprising semantically-distinct components, and using such certificates to govern execution decisions across one or more computational substrates-including digital processors, neuromorphic circuits, analog computing arrays, accelerator-based systems, distributed services, edge computing systems, and multi-agent environments-thereby improving the functional reliability, coordinated operation, resource efficiency, and operational safety of the one or more external systems.

BACKGROUND

Modern computing systems depend on contextual information as a first-class input to automated reasoning, analytics, coordination, and control. That context arrives through embeddings, feature vectors, symbolic encodings, structured records, sensor feeds, retrieved documents, and user interactions-all consumed by downstream solvers, models, controllers, and execution services that transform contextual inputs into predictions, decisions, and actions. The performance, safety, and reliability of those systems are closely tied to how well a given representation suits the specific downstream process that operates on it.

In such environments, overall system performance and safety depend not only on the intrinsic validity of contextual data, but also on how well a given representation is structurally aligned with the solver or execution process that consumes it. A representation may be statistically valid or semantically meaningful, yet still be poorly suited for a given model, control loop, or accelerator. When structural misalignment occurs, downstream systems may exhibit brittle behavior, degraded outputs, inefficient resource utilization, or unsafe execution despite nominal data validity.

In practice, contextual representations vary along dimensions that bear directly on their compatibility with specific downstream solvers. Some representations carry features that are well-aligned with the operational structure of a target solver, while others contain superfluous structure that increases computational cost without advancing solver objectives. Still others contain destabilizing variance, distributional drift, or adversarial characteristics that undermine solver reliability. Because compatibility is solver-relative, the same representation may be adequate for one downstream process and structurally incompatible with another. When such misalignment goes undetected prior to execution, downstream components may produce incorrect predictions, unsafe control actions, misrouted workflows, or cascading failures across distributed systems.

The problem intensifies in multi-consumer and multi-agent architectures, where representations traverse chains of services, tools, and heterogeneous computational substrates. Many deployments lack any shared, interpretable way for individual components to express whether a representation is suited to their particular objectives. Without that shared signal, contextual data gets over-propagated, inconsistently filtered, or executed under unsuitable conditions-raising integration complexity and undermining coordinated behavior across the system.

Uncontrolled propagation also introduces privacy and security concerns. Contextual representations may embed sensitive, proprietary, regulated, or personally identifiable information. When such representations are forwarded across loosely governed pipelines without evaluating structural necessity or compatibility, they reach components that cannot effectively use the information-increasing operational risk, regulatory exposure, and attack surface within distributed architectures.

Many systems detect compatibility failures only after execution has occurred, when degraded outputs or downstream error signals surface the problem. Post-execution detection delays corrective action, obscures root causes, and raises operational risk-particularly in real-time or safety-critical deployments where the cost of acting on incompatible input can be immediate and irreversible.

The timing problem becomes more acute in multi-agent pipelines, where each agent receives the output of a preceding agent as its input representation. In these settings, a receiving agent may be authorized to execute on the basis of a compatibility assessment that was performed against initialization state or a static task description—not against the actual intermediate content the preceding agent produced. When real intermediate content diverges from that initialization state, the agent operates on incompatible input without any detection, and errors cascade through subsequent stages. Current approaches also lack a way to re-derive compatibility assessments after each agent produces output and re-evaluate gate conditions against the updated representation, leaving the pipeline unable to interleave compatibility verification with actual execution.

Many multi-agent coordination frameworks compound this problem by relying on runtime policy optimization, test-time reinforcement learning, or multi-agent reinforcement learning to assign tasks and route representations. These approaches introduce non-determinism, training instability, and opacity into the coordination layer. In safety-critical or regulated environments, routing decisions that depend on learned policies shifting during live operation are unacceptable. What is needed are coordination mechanisms that produce routing and delegation decisions deterministically from fixed structural alignment measures-reproducible by inspection, not by re-running a policy network.

Threshold-based gating presents its own problems. Systems that apply gates independently or in an unordered fashion create an opportunity for a representation to bypass a critical safety gate simply because a less restrictive gate approved it earlier. And when a gate rejects a representation, most systems lack a principled repair mechanism that modifies exactly one aspect of the representation or solver configuration per rejection—a property needed to ensure repair loops terminate rather than oscillate. Without ordered, single-perturbation repair, retry cycles can grow unbounded or produce inconsistent results.

The problem extends to hardware execution substrates. Analog computing elements, memristor crossbar arrays, and neuromorphic accelerators exhibit physical non-idealities-conductance drift, thermal fluctuations, and read noise—that degrade computational fidelity over time. Health monitoring for these substrates typically relies on external diagnostic hardware or periodic offline calibration, neither of which provides continuous detection of substrate degradation from the data distribution itself. Without that, a gating circuit cannot condition execution on substrate health before a task runs. Downstream consumers and auditors also currently have no way to verify that a compatibility assessment was derived from a valid physical substrate state without accessing substrate parameters or internal derivation logic, which prevents independent attestation of certificate integrity across trust boundaries.

Regulated industries increasingly require that autonomous decision-making systems explain their execution choices-why a particular request was approved, deferred, or rejected. A compatibility framework that can log its assessments without affecting execution behavior would satisfy that requirement: operators could review threshold sensitivity, reconstruct audit trails, and demonstrate regulatory compliance without touching live operations. No existing approach provides this combination, nor does any current system support cryptographic binding of a compatibility certificate to the original input and the invariant constraints under which it was generated-meaning third parties cannot verify certificate integrity without the system owner exposing proprietary model internals.

Existing approaches to the problems described above each address a narrow aspect of the compatibility challenge while leaving other aspects unresolved. Post-hoc calibration methods, such as Platt scaling, adjust confidence scores after inference has completed rather than evaluating structural compatibility before execution, and therefore cannot prevent computational resources from being consumed on incompatible input. Knowledge distillation frameworks treat the temperature parameter as a manually-set hyperparameter disconnected from any measurement of representation-solver compatibility, precluding closed-loop adaptation of downstream behavior to context quality. Neural memory architectures that use gradient-based surprise metrics require model prediction error and runtime weight updates, meaning they operate during or after inference rather than before it, and depend on an implicit ground-truth signal that is unavailable in many deployment settings. Single-scalar confidence thresholding produces binary in-distribution or out-of-distribution decisions that cannot distinguish among qualitatively different failure modes—for example, a hallucination-risk condition in which quality appears high but geometric alignment is poor is indistinguishable from healthy operation under any single-scalar framework. Hardware simulation frameworks for analog crossbar arrays characterize how computation is corrupted by substrate non-idealities but do not produce a standardized, substrate-agnostic signal that downstream components can interpret and act upon independently. No existing approach combines pre-execution evaluation, structured decomposition into semantically-distinct components, typed failure mode classification, and deterministic enforcement into a single architecture.

The deficiencies described above are not merely engineering oversights; they reflect the structure of five independent intellectual traditions that each formalized one dimension of the representation-solver compatibility problem while leaving the others unformalized. The absence of a unified framework is explained by the structural independence of the three axes-signal purity, geometric compatibility, and dynamical stability-which means that progress within any one tradition does not constrain or advance the others. Each tradition's contribution and limitation is summarized below to clarify why the combination of all three axes into a single enforceable pre-execution architecture has not previously been achieved.

The statistical tradition—from Fisher's sufficiency through Fano's inequality-formalized the distinction between signal and noise and established information-theoretic bounds on recoverability of a transmitted signal given observed noise, but never asked whether a purified signal was geometrically compatible with any particular downstream solver. Signal purity alone does not determine whether a solver can exploit the signal it receives. The computational learning theory tradition—from Valiant's PAC framework through the neural scaling laws of Kaplan et al. and Hoffmann et al.—formalized the relationship between solver capacity and generalization but treated the representation as a fixed, exogenous input. These results ask how much capacity the solver needs; they do not ask what fraction of that capacity a given encoding actually unlocks. The dynamical-systems tradition—from Lyapunov stability theory through Khalil's nonlinear-systems framework—formalized when a dynamical system remains in a safe operating region under perturbation, but had no notion of representational purity or solver compatibility to stabilize. Stability analysis can detect oscillation or divergence but cannot determine whether the stable state corresponds to correct inference or to a stable but incorrect output. Each tradition solved its own problem completely yet left the others unformalized: signal-purity analysis could certify encoding quality without knowing whether the solver could exploit it; capacity analysis could bound solver performance without measuring whether the encoding utilized the available capacity; stability analysis could enforce safe operating regions without specifying what representational quantity was being stabilized.

The representation-learning tradition—crystallized by Bengio, Courville, and Vincent's influential review—articulated the thesis that representation quality determines learning success and catalogued *desiderata* for good representations including smoothness, sparsity, and temporal coherence, but did not provide any certification mechanism to enforce encoding quality before execution. The field's response to encoding failure (hallucination, distributional shift, reward hacking) has remained post-hoc: detect the symptom, patch the model, retrain. The neuromorphic computing tradition—from Chua's postulation of the memristor through contemporary in-memory computing architectures—demonstrated that milliwatt-scale systems can match or exceed per-task performance of datacenter-scale deployments when the encoding-solver interface is well-matched, providing physical evidence that system performance is governed by the representation-solver interface rather than by raw computational capacity alone. Even within the conventional GPU ecosystem, this structural observation has gained recognition: NVIDIA Research has argued that small language models, not large ones, are the future of agentic AI, contending that capability rather than parameter count is the binding constraint. However, the proposed LLM-to-SLM conversion algorithm relies on ad hoc task clustering and fine-tuning without any formal criterion for determining when a smaller model's encoding-solver interface is admissible. The industry's pivot from training-scale to inference-efficiency reflects a growing recognition that raw capacity alone cannot compensate for encoding incompatibility when the compute budget is physically constrained, but no existing framework provides a formal certification mechanism to support that pivot.

The structural independence of the three axes explains why decades of progress within each tradition did not produce a unified certification framework: no tradition's axis constrains either of the others. A system may exhibit high signal purity and low geometric compatibility—the information is present in the encoding but structured in a form the solver cannot exploit, analogous to a library whose books are written in a language the reader cannot parse. A system may exhibit high compatibility and high dynamical instability—the encoding is geometrically well-matched but places the solver near a stability boundary where small perturbations cause oscillation rather than convergence. A system may exhibit low instability and low compatibility—the solver produces stable, predictable, coherent output that is deeply wrong because the encoding is architecturally incompatible with the problem it is supposed to solve. No single-score framework, no two-axis framework, and no prior approach combining any two of the three traditions can distinguish these operationally distinct failure states before execution. This structural gap—the absence of a pre-execution architecture that enforces all three axes jointly-motivates the need identified in the following paragraph.

Therefore, there is a need for improved methods and systems for structured compatibility certification and execution control in one or more external systems that may overcome one or more of the preceding problems.

SUMMARY OF DISCLOSURE

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

The present disclosure provides computer-implemented methods and systems for structured compatibility certification and execution control in one or more external systems. In some embodiments, contextual input data is received, using a communication device, the contextual input data comprising at least one representation of at least one contextual input. At least one downstream solver, model, or execution process configured to operate on the representation is identified. A processing device computes a representation-solver compatibility functional that quantifies structural alignment between characteristics of the representation and operational characteristics of the downstream solver, model, or execution process. Unlike approaches that infer contextual adequacy from downstream performance signals, the compatibility functional evaluates structural usability of a representation relative to a specific downstream solver prior to execution. In some embodiments, evaluation of the certificate occurs through a sequence of execution-control gates that determine whether execution proceeds, is blocked, or triggers structural repair.

The compatibility functional is projected into a machine-readable structured compatibility certificate comprising three mutually exclusive, semantically-distinct components constrained by a normalization invariant enforcing that a sum of the three components equals a fixed aggregate value: a relevance component (R) representing alignment between features of the representation and operational structure of the downstream solver; a superfluous component (S_sup) representing structured information not contributing to solver alignment; and a noise component (N) representing destabilizing or unstructured variance. Because the three components are defined relative to a specific solver, the same contextual representation may yield different decompositions when evaluated against different downstream solvers, models, or execution processes.

At least one derived compatibility metric is computed based on relationships among the three components. The structured compatibility certificate is evaluated prior to invocation or execution of the downstream solver, model, or execution process, and an execution control action is determined and caused to be implemented based at least in part on the structured compatibility certificate. The execution control action conditions solver invocation, instruction issuance, resource allocation, routing, substitution, throttling, parameter configuration, deferral, or execution rejection within the one or more external systems.

In some embodiments, the structured compatibility certificate further comprises signals produced by two architecturally distinct signal paths. A first signal path (semantic decomposition) projects the compatibility functional into the three components and derives a quality metric from the decomposition. A second signal path (compatibility assessment) independently computes a compatibility score quantifying geometric alignment between the representation and the downstream solver based on at least one of: normalized similarity between embeddings of the representation and embeddings of the downstream solver in a shared latent space, structural alignment measures, solver descriptor compatibility, or difficulty proxies associated with the representation-solver pair. The quality metric is derived from decomposition of the representation and the compatibility score is derived from geometric alignment between the representation and the downstream solver in a shared latent space, the two signals having architecturally distinct provenance.

The two architecturally distinct signal paths converge through conjunction to produce typed execution control that neither signal path alone provides. The conjunction enables distinguishing a hallucination-risk condition in which the quality metric indicates high quality and the compatibility score indicates low structural alignment from a targeted-corruption condition in which the quality metric indicates low quality and the compatibility score indicates high structural alignment. The quality metric alone cannot distinguish hallucination from healthy operation, and the compatibility score alone cannot distinguish targeted poisoning from systemic drift. The conjunction is therefore a minimal sufficient condition for typed execution control.

In some embodiments, the structured compatibility certificate is evaluated by a plurality of independent consumer roles from a single shared certificate. An authorization role reads a conjunction of a quality metric derived from the three components and a compatibility score independently computed for the downstream solver to determine execution decisions. An interpretation role reads relationships among the three components to classify operational states into typed collapse domains providing diagnostic labels without requiring centralized command logic. A confirmation role reads stability metrics derived from temporal trajectory analysis to validate that system dynamics remain within an admissible operating region. Each consumer role independently determines execution actions according to its own domain requirements, safety policies, and operational constraints.

In some embodiments, the structured compatibility certificate is classified into one of a plurality of typed collapse domains based on comparative relationships among the three components. Each typed collapse domain corresponds to a predefined enforcement policy. At least a subset of the typed collapse domains is determined by component ordering and relative magnitudes, enabling automated classification of distinct failure modes without requiring exhaustive threshold tuning for each failure mode. Each typed collapse domain maps to a distinct remediation action including at least re-encoding, routing to an alternative solver, requesting verification, or rejection, thereby enabling differentiated remediation tailored to the specific form of contextual degradation rather than uniform rejection or acceptance.

In some embodiments, projecting the compatibility functional comprises projecting the representation through a plurality of learned weight matrices to determine component magnitudes via differentiable simplex projection operators that enforce the normalization invariant at each computation of the three components. A reliability coefficient is computed from latent variance associated with the projection, wherein the reliability coefficient monotonically increases as the latent variance decreases and monotonically decreases as the latent variance increases, thereby enabling detection of out-of-distribution inputs without requiring labeled validation data.

In some embodiments, the structured compatibility certificate is architecturally configured as enforcement data rather than as a command. Downstream consumers independently interpret the certificate and determine execution actions according to their own domain requirements without centralized orchestration. Furthermore, the method is operable in an observational mode wherein structured compatibility certificates are generated and logged without altering execution behavior of the downstream solver, model, or execution process, enabling audit trail construction, threshold sensitivity testing, and regulatory compliance documentation without operational risk.

In some embodiments, the structured compatibility certificate is cryptographically bound to the contextual input and to an invariant specification defining domain constraints, quality thresholds, encoder configuration parameters, and validation rules, such that integrity and origin of the certificate are independently verifiable by a third party without requiring disclosure of internal parameters, weights, or proprietary logic of the downstream solver, model, or execution process. Tamper detection is performed automatically upon certificate instantiation by re-computing a cryptographic hash of the serialized invariant specification and comparing it with a stored hash value.

In some embodiments, evaluating the structured compatibility certificate comprises evaluating through four sequential gates in a fixed order constituting a correctness guarantee under adversarial conditions. A first gate issues a reject decision when the noise component of the certificate meets or exceeds a noise threshold, based on an information-theoretic condition wherein noise dominance renders correct inference impossible regardless of solver capacity. A second gate issues a block decision when a phasor coherence metric derived from the certificate falls below α coherence threshold, detecting structural incoherence independent of average quality. A third gate issues a re-encode decision when a compatibility score fails to satisfy a dynamic admissibility threshold, wherein the dynamic admissibility threshold is computed as a monotonically increasing function of a turbulence metric derived from the certificate such that the required threshold stiffens as turbulence increases, with a tolerance buffer below the threshold within which the turbulence metric serves as a tie-breaker between re-encoding and cautious execution. A fourth gate issues a repair decision when a low-level modal compatibility metric falls below α grounding threshold, detecting ungrounded physical signal quality for multimodal or sensor-derived inputs. The gates are evaluated in fixed sequential order that may not be reordered or made optional, and each non-execute gate decision triggers exactly one graph transformation operator that modifies a representation graph, a solver graph, or both, each operator moving exactly one certificate scalar in exactly one direction guaranteeing repair loop termination.

In some embodiments, upon a non-execute gate decision, a graph transformation operator is executed on a representation graph comprising task-bearing event nodes, a solver graph comprising capability-bearing agent nodes, or both. A global structured compatibility certificate is re-derived from the modified graphs, and the gate conditions are re-evaluated. The cycle continues until all gate conditions are satisfied or no further graph transformation is possible, and a committed audit log entry is generated upon cycle termination.

Upon an execute gate decision, an implementation function associated with the certified agent node is invoked. A real output is received from the invoked agent. The real output is encoded as a new event node carrying a newly-derived structured compatibility certificate reflecting actual intermediate content rather than initialization state. The new event node is added to the representation graph, and each subsequent agent invocation is governed using the updated representation graph. The morph repair cycle triggered by a non-execute gate decision and the agent handoff cycle triggered by an execute gate decision are mutually exclusive in their triggering conditions, perform distinct functions, and operate on different certificate states, such that each agent in a multi-agent pipeline is certified against actual intermediate state rather than phantom initialization state.

In some embodiments, agent solver contracts and agent embeddings are maintained as immutable during runtime execution. All routing decisions, graph transformations, and execution control actions are computed algebraically from fixed embeddings without updating neural network weights, learning policies, or modifying solver contracts during live operation. The processing device does not employ runtime policy optimization, test-time reinforcement learning, or credit assignment at any layer of the execution architecture.

In some embodiments, the processing device computes a geometric compatibility morphism mapping each of a plurality of task-bearing event nodes in a representation graph to the capability-bearing agent node in a solver graph exhibiting maximum compatibility in a shared latent space. Compatibility is computed based on a structural alignment measure between a representation of the event node and a representation of the agent node. An interface compatibility score is the minimum pairwise compatibility across all event-to-agent mappings. A turbulence metric is a standard deviation of pairwise compatibility scores across all mappings. Subjectivity of the morphism is enforced by assigning a forced certificate to any agent node unreachable by any event node such that the forced certificate triggers a reject gate decision. Structural compatibility among certificates derived from respective agents is used to construct, modify, enable, restrict, or mediate communication, coordination, or task delegation among the agents, the delegation operating deterministically via geometric structural alignment without requiring runtime policy optimization or centralized control.

The present disclosure further provides systems for structured compatibility certification and execution control in one or more external systems. Such systems may include a communication device configured to receive contextual input data comprising at least one representation of at least one contextual input and to transmit compatibility information, and a processing device communicatively coupled to the communication device and configured to: identify at least one downstream solver, model, or execution process; compute a representation-solver compatibility functional that quantifies structural alignment between characteristics of the representation and operational characteristics of the downstream solver, model, or execution process; project the compatibility functional into a machine-readable structured compatibility certificate comprising three mutually exclusive semantically-distinct components constrained by a normalization invariant enforcing that a sum of the three components equals a fixed aggregate value; compute at least one derived compatibility metric based on relationships among the three components; evaluate the structured compatibility certificate prior to invocation or execution of the downstream solver; and determine and cause implementation of an execution control action based at least in part on the structured compatibility certificate.

The present disclosure further provides hardware-accelerated computational systems for structured compatibility certification and execution control. Such systems may include a memory storing a structured compatibility certificate comprising three mutually exclusive semantically-distinct components constrained by a normalization invariant enforcing that a sum of the three components equals a fixed aggregate value, and one or more threshold parameters. In analog or memristor crossbar substrate embodiments, one or more certificate metrics operationalize physical thermodynamic non-idealities of the substrate including conductance drift, thermal fluctuations, and read noise, such that the noise component of the certificate serves as an oracle-free substrate health signal detectable from data distribution patterns without external diagnostic hardware.

Such hardware-accelerated systems further include a gating circuit communicatively coupled to the memory and configured to evaluate one or more fields of the structured compatibility certificate against the threshold parameters and, prior to task execution, conditionally enable or disable instruction issuance, memory access, solver invocation, execution pathway activation, or hardware resource allocation based at least in part on the evaluation of the structured compatibility certificate.

Such hardware-accelerated systems further include a zero-knowledge proof mechanism configured to generate a proof over a physical substrate state at certificate generation time such that a downstream component may verify that the structured compatibility certificate was derived from a valid physical substrate state in time independent of model size with respect to certificate length, without accessing substrate parameters, weight values, or internal certificate derivation logic, wherein the proof is cryptographically bound to the physical substrate state rather than to a software assertion.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTIONS OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

The drawings presented with this disclosure may illustrate representative and non-limiting arrangements of hardware components, software modules, artificial intelligence subsystems, machine learning architectures, data processing pipelines, user interfaces, network topologies, and memory arrangements that may be used to understand embodiments of the present subject matter. They may depict functional or conceptual layouts intended to facilitate the explanation of the disclosed principles. The geometric appearance, dimensional proportions, ordering, grouping, and naming of elements within the drawings are not intended to imply any restriction on implementation. The drawings may schematically portray computing environments containing client devices, servers, distributed computing clusters, communication networks, storage systems, or artificial intelligence models arranged for training, inference, or combined operations. The drawings may include simplified symbolic representations of algorithmic processes, workflows, blocks, or modules; such symbolic representations are treated as abstractions of underlying hardware and software operations rather than literal structural requirements. Similarly, lines connecting components may represent logical associations, communication pathways, or data relationships rather than any specific physical wiring or layout. These figures may also illustrate non-exhaustive examples of operational stages, sequencing, or interactions among artificial intelligence components such as encoders, decoders, generators, discriminators, featurizers, transformers, or safety-validation modules. Any specific combination or configuration shown is presented for explanatory clarity only. Additional drawings, alternative views, or more granular depictions may be used without affecting the scope of the claims.

FIG. 8 illustrates a comparative framework 800 for compatibility-governed execution relative to traditional post-hoc approaches, in accordance with some embodiments.

FIG. 20 illustrates a sixteen-type collapse domain taxonomy 2000, in accordance with some embodiments.

DETAILED DESCRIPTION OF DISCLOSURE

Figure 1:
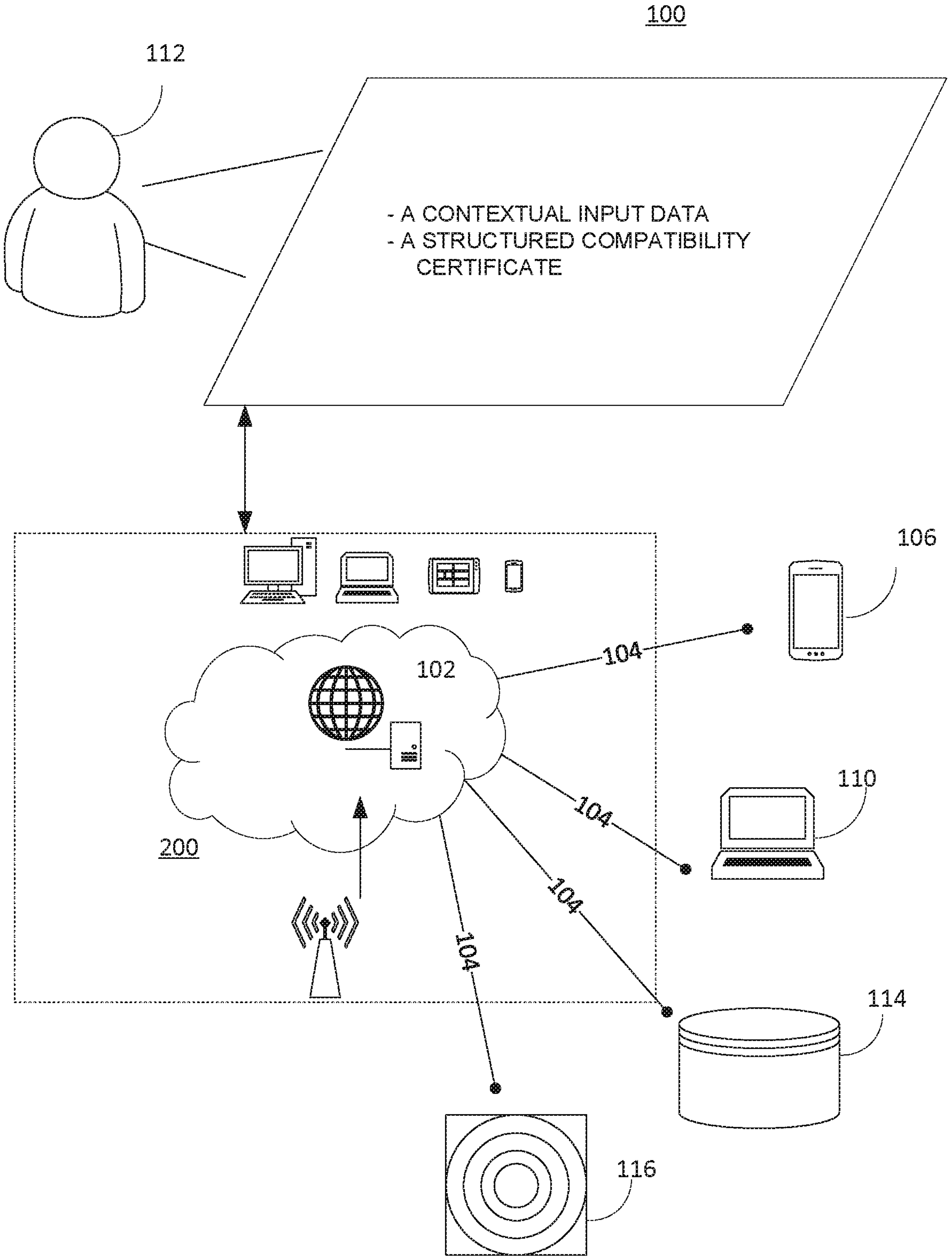
FIG. 1 is an illustration of a compatibility-governed execution architecture 100 supporting structured compatibility certification across one or more external systems, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and is made merely for the purposes of providing a full and enabling disclosure. The detailed disclosure herein of one or more embodiments is not intended, nor is it to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Furthermore, it is important to note that, as used herein, "a" and "an" each generally denote "at least one," and/or "one or more," but do not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of the disclosed use cases, embodiments of the present disclosure are not limited to use only in this context.

The detailed description that follows may provide a framework for describing computer-implemented systems, artificial intelligence systems, distributed learning infrastructures, data processing pipelines, and hardware and software arrangements suitable for implementing embodiments shown in the drawings. Terms such as processing, computing, determining, or generating refer to actions performed by computing systems, computing devices, or electronic devices that manipulate data represented as physical signals, stored values, or encoded information within registers, memory structures, and storage devices.

The present disclosure contemplates implementations involving artificial intelligence, machine learning, distributed computation, and computer-implemented systems operating upon data represented as physical electronic or optical signals. Descriptions of processing, analyzing, determining, transforming, encoding, decoding, generating, inferring, synthesizing, modifying, storing, retrieving, ranking, filtering, validating, classifying, or otherwise manipulating information are to be understood as referring to the actions of computing systems, computing devices, electronic devices, or computational circuits that manipulate such signals in memory elements, registers, buffers, or storage media.

The disclosure contemplates implementations in which artificial intelligence systems perform perception, synthesis, inference, prediction, or generation of information and/or data using models whose configurations may evolve based on training, feedback, or adaptive learning processes. A model may initially be configured with a set of parameters and architectural structures that define its behavior, and this configuration may change automatically as the model encounters training inputs, validation data, reference data, or instructor-provided feedback. The model may modify its internal state through optimization techniques, gradient updates, reinforcement signals, vector transformations, attention mechanisms, latent variable adjustments, embedding refinements, or other learning operations executed electronically. Such modifications may occur over extended cycles, partial cycles, or continual learning sequences without explicit intervention by a human.

The disclosure contemplates systems involving data ingestion pipelines that gather input from sources including but not limited to sensor signals, event streams, text data, image data, audio data, video data, structured and unstructured repositories, application logs, telemetric feeds, network services, or human-generated content. Ingestion functions may include filtering, normalization, augmentation, segmentation, batching, tokenization, windowing, compression, encryption, decryption, hashing, deduplication, contextualization, and mapping to internal formats. Intermediate components may transform this data into derived representations, including embeddings, latent encodings, feature tensors, multi-modal joint representations, or contextual vectors suitable for use by downstream modeling engines. These transformations may be performed using neural networks, statistical encoders, dimensionality-reduction algorithms, or hybrid computational modules.

The disclosure contemplates machine learning systems that may employ advanced architectures such as transformer networks, encoder-decoder stacks, mixture-of-experts structures, diffusion models, recurrent networks, convolutional hierarchies, attention-based models, retrieval-augmented architectures, cross-modal alignment engines, graph neural networks, probabilistic models, auto-encoding frameworks, or hybrid symbolic-neural systems. Such models may implement deep layers configured to perform operations including attention calculations, feed-forward projections, gating operations, positional encoding, normalization steps, multi-head routing, sequential decoding, or latent pathway selection. Multi-modal systems may combine textual, visual, auditory, sensory, or structured inputs within joint representational spaces. Embeddings may be learned from large corpora or multi-modal datasets and may encode semantic, syntactic, structural, temporal, spatial, or contextual relationships across modalities. These embeddings may be dynamically updated as the system encounters new information, thereby improving consistency, expressiveness, or alignment with real-world contexts.

The disclosure contemplates training processes that may involve supervised learning, unsupervised learning, semi-supervised learning, self-supervised learning, reinforcement learning, preference optimization, curriculum-based learning, active learning, or continual learning. Training operations may include forward passes through the model, backward propagation of gradients, update steps using optimization algorithms, adaptive learning-rate scheduling, regularization steps, loss-function evaluation, and checkpointing of intermediate states. Training datasets may include real-world data, synthetic data, simulated data, augmented data, or mixtures thereof. Validation procedures may evaluate performance metrics, generalization behavior, safety constraints, or compliance with domain-specific criteria. In some implementations, refinement cycles may incorporate human-in-the-loop interventions, reward model shaping, safety evaluator feedback, or guided corrections.

The disclosure contemplates distributed or federated execution in which computation is partitioned across multiple hardware devices, regions, or clusters. Certain operations may occur at edge devices for low latency, while others may be delegated to remote servers, cloud clusters, datacenters, or specialized compute fabrics. Components may communicate over wired or wireless networks supporting data exchange, synchronization, replication, or model-state updates. Distributed learning processes may synchronize gradients, coordinate model versions, merge updates across shards, or exchange activation values within parallel training regimes. Distributed inference may involve routing requests across replicas, balancing load through orchestration layers, or selecting model pathways dynamically. Network connections may include encryption, authentication, secure session management, or routing protocols appropriate for maintaining privacy, integrity, or availability.

The disclosure contemplates orchestration layers capable of managing complex workflows involving model invocation, tool invocation, external data retrieval, decision routing, fallback selection, multi-model aggregation, post-processing evaluation, or safety governance. Orchestration environments may evaluate contextual signals, metadata, user characteristics, or policy constraints to determine which models, subsystems, or computational branches should be executed. Such environments may dynamically alter execution pathways based on estimated performance, resource availability, model confidence, safety risk, or real-time system health. Post-processing components may evaluate generated outputs for compliance with content policies, statutory requirements, operational constraints, or domain-specific decision rules.

The disclosure contemplates safety-oriented components that evaluate model outputs or intermediate representations for consistency with safety criteria, quality thresholds, regulatory considerations, factual accuracy constraints, domain restrictions, or alignment requirements. Safety modules may employ auxiliary models, discriminators, rule sets, statistical detectors, confidence estimators, or hybrid evaluators to identify undesirable outputs. These modules may trigger remediation actions, including output modification, output rejection, re-routing through alternate inference pathways, invocation of corrective models, or escalation for human review. Safety processes may incorporate real-time validation, contextual scoring, adversarial robustness analysis, anomaly detection, or controlled generation constraints.

The disclosure contemplates governance structures including policy managers, audit loggers, compliance trackers, version controllers, and provenance systems that associate model outputs with contextual metadata, historical signals, update events, training sources, or safety evaluations. Systems may maintain lineage records documenting which model version, configuration state, or training dataset contributed to an outcome. Governance modules may ensure that system behavior aligns with formal requirements such as fairness principles, legal obligations, industry standards, or institutional guidelines.

The disclosure contemplates storage and memory systems capable of storing model parameters, datasets, embeddings, logs, metrics, checkpoints, execution traces, and auxiliary information used to configure or interpret model behavior. The computing device may include these storage systems. Storage media may contain instructions, configurations, or data structures that, when accessed by the computing device, configure that device to carry out the operations described herein. Such media may include executables, bytecode, machine code, firmware, microcode, program modules, configuration files, architectural descriptors, or schema definitions.

The disclosure contemplates user interfaces that permit human operators to view model outputs, initiate tasks, modify configurations, inspect metrics, interact with logs, evaluate safety signals, or guide system adaptation. Interfaces may be multimodal and may support textual input, speech commands, visual interaction, gesture control, or programmatic invocation through application programming interfaces (APIs). Administrative interfaces may allow for reviewing system performance, tuning operational thresholds, enabling or disabling features, monitoring resource use, examining generated content, or initiating refinement workflows.

The disclosure contemplates systems in which instructions are executed entirely on a single device, partially on multiple devices, or cooperatively across remote and local environments. Code may execute directly on hardware, within firmware, inside virtual machines, inside containers, or through any combination of software and hardware interactions. Computational instructions may be stored locally, transferred via communication networks, or streamed from remote systems.

Interpretation of terms in this disclosure is governed by principles commonly applied by persons of ordinary skill in the relevant field. Technical and scientific terms used herein should be understood in a manner consistent with their usage in the field of artificial intelligence, machine learning, computing, networking, data storage, or any related discipline. Terms describing functionality should not be interpreted as strictly structural unless explicitly stated. Phrases such as configured to, adapted to, operable to, or capable of, indicate permissible functionality rather than structural limitations. Terms such as a or an encompass one or more unless clearly contradicted by context. Terms joined by or should be interpreted as inclusive, and terms joined by and should be interpreted as collective.

The present disclosure contemplates implementations that employ advanced mathematical frameworks characteristic of modern artificial intelligence systems. Machine learning models may be conceptualized as parameterized functions that map elements of an input space to elements of an output space. Such a function may be defined over real-valued, complex-valued, vector-valued, tensor-valued, or mixed-modal domains. The machine learning models may implement successive transformations applied to an ordered set of input vectors using compositions of linear operators, non-linear activations, attention functions, normalization operations, and dimensional projections.

Model parameters may be represented as ordered collections of real-valued scalars arranged into structures such as matrices, tensors, kernels, filters, or embeddings. These parameters may be optimized by minimizing a loss functional defined over an expected distribution of input-output pairs. The optimization process may involve computing gradients of the loss functional with respect to each model parameter, followed by an update step that serves to reduce the value of the loss functional. Gradient computation may use automatic differentiation frameworks that symbolically or numerically propagate partial derivatives backward through a computational graph.

Attention mechanisms may employ a similarity measure between projected query vectors and projected key vectors. This similarity measure may yield a weight distribution over contextual elements. The weighted combination of projected value vectors may form an attention output that is subsequently transformed through additional layers. Multiple independent attention heads may be aggregated to capture heterogeneous relationships within the input domain. Cross-attention mechanisms may operate similarly but with distinct source and target sequences.

Normalization steps may rescale intermediate representations using learned scaling and shifting coefficients. Activation functions may introduce nonlinearity by applying element-wise transformations selected to ensure differentiability and expressive capacity. Residual pathways may combine transformed and untransformed representations to facilitate stable gradient propagation under deep compositions. Positional encodings or structural embeddings may inject ordering, spatial, temporal, or relational information into otherwise permutation-invariant architectures.

Multi-modal models may operate over domains that combine text, image, audio, video, sensor, or structured signals. These domains may be embedded into a common vector space through learned projection operators. Joint training processes may enforce alignment constraints that minimize representational divergence between modalities while preserving intra-modal semantics.

Reinforcement-based procedures may model learning as an optimization of expected reward under a policy function. The policy may produce distributions over actions given a latent or explicit representation of the environment state. Policy gradients may be estimated from sampled trajectories, and advantage estimators may reduce the variance of such gradients. Value functions may approximate the expected cumulative reward, and these approximations may be updated through temporal-difference learning.

Matrix decompositions, spectral analysis, manifold learning, kernel operators, and other mathematical constructs may be incorporated to improve expressiveness, stability, or computational efficiency. Training may involve sophisticated schedulers, trust-region constraints, adaptive learning-rate schemes, gradient-norm clipping, regularization penalties, entropy maximization, attention masking, or mixed-precision arithmetic.

All such mathematical constructs are conceptual, descriptive, and non-limiting. The disclosure encompasses any differentiable or non-differentiable optimization method, any discrete or continuous learning paradigm, and any representational transformation that may be understood by a person of ordinary skill in the field.

Further, the disclosure provides a computing environment that may include a combination of client devices, servers, distributed computing clusters, databases, external data sources, network nodes, and interface endpoints. Further, the computing environment may support artificial intelligence workloads, including perception, synthesis, inference, prediction, and generation, using hardware and software foundations designed for high-throughput and low-latency operation. Embodiments may involve the coordinated use of multiple machine learning models, whose configurations may evolve over time as they learn from training, validation, reference, or feedback data. Machine learning models may adjust their internal parameters through supervised, unsupervised, or reinforcement-based processes, allowing automatic electronic improvements to their performance based on input data and observed outcomes.

Further, the disclosure provides a machine-learning architecture that may include engines or modules such as a data input engine, a data retrieval engine, a data transform engine, a featurization engine, a modeling engine, a generative engine, a validation engine, a feedback engine, and a refinement engine. A data input pipeline may obtain structured or unstructured information from various sources, transform the information into model-compatible forms, and store such transformed data in memory or storage accessible to downstream components. A modeling engine may perform tasks such as model training, re-configuration, validation, and testing, executing iterative processes across multiple cycles or passes through training data. A predictive or generative engine may construct outputs based on intermediate representations, learned embeddings, or latent encodings generated by layers such as encoder-decoder structures, attention mechanisms, or multi-layer transformer architectures. Embeddings may represent discrete entities such as words, documents, or images as continuous vectors in high-dimensional spaces, capturing semantic or structural relationships useful for downstream tasks.

Further, the disclosure may provide a distributed or cloud-based operation which may include multiple physical or virtual instances of computing devices, distributed across data centers or network boundaries. Functions may be partitioned across machines to achieve parallelism, redundancy, fault tolerance, or improved throughput. Distributed systems may use load balancing mechanisms to maintain stable processing, memory, or bandwidth utilization across clusters and avoid overload conditions. Such deployments may require communication over wired or wireless networks that implement a variety of protocols, including HTTP, HTTPS, MQTT, CoAP, or any other suitable communication framework. Communication channels may include local networks, wide-area networks, personal-area networks, or global communication systems, potentially utilizing secure, encrypted sessions such as SSL-based channels.

Further, the disclosure may provide an algorithm, process, or flow diagram that may include operations that may occur in sequences, reversed orders, concurrently, or in partially overlapping timelines, depending on the implementation. Blocks representing actions in a flowchart may correspond to program modules, instruction sequences, or hardware logic capable of performing the specified acts. Such operations may manipulate physical quantities such as electrical or magnetic signals stored or transferred among memory units, registers, storage devices, or communication media. Flow diagrams may be realized through software running on general-purpose processors, through dedicated hardware circuits, or through combinations of both.

Further, the disclosure may provide a user interface which may include graphical displays, dashboards, selection controls, input fields, monitoring elements, or multimodal interaction surfaces, allowing users to interact with computing systems in speech, touch, gesture, or other modalities. Such interfaces may be presented through client devices, server applications, or remote access platforms and may support visualization of model behavior, system performance, or configuration parameters.

Further, the described features may be combined, rearranged, omitted, or substituted without departing from the principles disclosed. Variations may involve distributing functionality across devices, merging components, implementing features in hardware rather than software, or employing alternative communication protocols. Many such variations and modifications are intended to fall within the scope of the disclosure as understood by persons skilled in the art.

The detailed description of the drawings, therefore, provides a foundation for describing technical, architectural, and operational aspects of embodiments, while allowing broad flexibility in how such embodiments may be implemented in practice. The scope of such embodiments is governed by the claims rather than the illustrative content of the drawings.

In some embodiments, a system consistent with this disclosure includes one or more client devices, one or more servers, and one or more data stores coupled by one or more networks. The client devices may include computing platforms equipped with data processing hardware and memory hardware. The servers may include data servers, application servers, web servers, proxy servers, or cloud computing services that provide shared processing, storage, and networking resources. The data stores can include databases, object stores, file systems, or other repositories that persist configuration data, training data, logs, model artifacts, and other information.

The networks can include public and private networks, such as local area networks, wide area networks, and cloud networks, using wired or wireless communication links. The networks can provide routing, addressing, access control, encryption, and related functionality using standard or proprietary protocols.

For purposes of this disclosure, artificial intelligence systems may include arrangements of software and hardware that perform tasks such as perception, prediction, planning, or generation based on input data. These systems can employ one or more models, such as statistical models, neural networks, decision trees, or other machine learning models. As used herein, a "model" can refer to a parameterized function, an ensemble of such functions, or a collection of cooperating components that process data and produce outputs.

In some embodiments, the system includes a data input engine that obtains data from one or more sources, such as application logs, sensor streams, structured databases, and unstructured content. The data input engine can retrieve, filter, aggregate, or transform the data into feature representations suitable for model consumption. Data sources can include training data, validation data, and reference data used to evaluate and calibrate model behavior. Further, the system includes a modeling engine that manages one or more training processes for one or more models. Moreover, the modeling engine can select model architectures, initialize parameters, and apply training algorithms such as supervised learning, semi supervised learning, unsupervised learning, reinforcement learning, or combinations thereof. The modeling engine can also manage hyperparameters, training schedules, and evaluation procedures across epochs or passes through the data. Further, the system may include a generative response engine or an inference engine that receives prompts or other inputs and generates outputs using one or more models. For example, a natural language interface can receive a text prompt, embed or otherwise encode the prompt, process the encoded prompt using a transformer based model or other sequence model, and generate a sequence of tokens that are decoded into an output. The engine can generate multiple candidate outputs and apply validation or ranking logic to select a final result according to quality, safety, or relevance criteria. Further, the system may include a feedback engine that collects explicit or implicit feedback signals, such as user ratings, corrective edits, or outcome metrics derived from downstream tasks. Furthermore, the system may include a refinement engine that uses the feedback to adjust model parameters, routing logic, or policies, for example, by performing additional training steps, updating reward models, or modifying configuration parameters.

The systems described herein can be implemented using centralized, decentralized, or hybrid arrangements. For instance, models may be deployed in cloud environments, on edge devices, or across both, depending on requirements such as latency, privacy, cost, and reliability. Load balancing and resource management components can distribute processing across devices or data centers and can provide elasticity to accommodate changing workloads.

Certain embodiments may expose functionality through application programming interfaces, software development kits, or graphical user interfaces. Client applications can submit requests to backend services, which can apply authentication, authorization, logging, and policy enforcement before invoking models or tools and returning results.

The systems and methods disclosed herein can be implemented in hardware, software, firmware, or any combination thereof. In some embodiments, operations are carried out by one or more processors executing program instructions stored on one or more non-transitory computer readable media. Program instructions, when executed by the processors, cause the processors to perform the operations described herein.

Instructions can be delivered to computing devices in various ways, such as pre-installation, physical distribution of media, or transmission over networks. Instructions received over a network can be stored in memory or persistent storage and then executed by one or more processors. Dedicated hardware logic, such as application-specific integrated circuits or field programmable gate arrays, can be used alone or in combination with software to implement certain functionality.

Any methods described in connection with embodiments of the present disclosure can be represented as one or more flow diagrams or state diagrams. Blocks in such diagrams can correspond to modules, components, operations, or code segments that implement the associated functionality. Blocks can be reordered, combined, executed concurrently, or omitted according to implementation-specific considerations, unless a particular ordering is required by the claims.

Examples and embodiments described herein illustrate, rather than limit, the claimed subject matter. Certain features have been described in connection with particular embodiments for clarity, but other embodiments can include such features in different combinations. Features described in separate embodiments can be combined, and features described in a single embodiment can be separated.

In general, the method(s) disclosed herein may be performed by at least one computing device. Further, the at least one computing device may be and/or may include at least one server (i.e., at least one server computer). Further, the at least one computing device may be and/or may include a communication device, a processing device, and a storage device. For example, in some embodiments, the method may be performed by the at least one server in communication with at least one client device over a communication network such as, for example, the Internet. In some other embodiments, the method may be performed by one or more of at least one server computer, at least one client device, at least one network device, at least one sensor, and at least one actuator. Examples of the at least one client device, and/or the at least one server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on.

As used in the present disclosure, the following terms have the meanings set out below, unless context clearly requires otherwise. Terms not defined in this section are used in accordance with their ordinary meaning as understood by a person skilled in the relevant art. Where a term is used in a claim and also defined below, the claim term controls for purposes of claim construction; the definitions below are provided to assist understanding of the technical character of each concept and are not intended to limit the claims.

DEF-01—Contextual representation; contextual input data. Contextual input data refers to data received by the compatibility certification system from at least one device, sensor, agent, or external source, comprising at least one representation of at least one contextual input. A contextual representation refers to data that encodes information about a task, environment, or input for use by a downstream computational process. A contextual representation may take the form of an embedding, feature vector, symbolic encoding, structured record, unstructured document, sensor reading, telemetry stream, or any other structured or unstructured encoding of contextual information. A contextual representation is the object on which the compatibility functional is computed and into which the structured compatibility certificate is decomposed. The terms "contextual input data," "contextual input," and "contextual representation" are used interchangeably throughout this disclosure when referring to the data object on which the compatibility functional is computed, unless context clearly requires a distinction.

DEF-02—Downstream solver, model, or execution process. A downstream solver, model, or execution process refers to any computational process, model, controller, agent, accelerator, or execution service that is configured to consume a contextual representation and transform it into a prediction, decision, action, or control output. The term encompasses machine learning models, inference engines, robotic controllers, analog accelerators, multi-agent pipeline components, and any hardware or software system that receives a contextual representation as an input operand. The downstream solver is the reference entity against which a representation's compatibility is evaluated; compatibility is always defined relative to a specific downstream solver, so the same representation may yield different compatibility evaluations when considered against different solvers.

DEF-03—Representation-solver compatibility functional. The representation-solver compatibility functional $\kappa(E,S;P)$ refers to a scalar or vector-valued function that quantifies the structural alignment between the characteristics of a contextual representation E and the operational characteristics of a downstream solver S, given a task context P. The compatibility functional is not a measure of the representation's intrinsic quality in isolation, nor of the solver's internal performance; it is a joint property of the representation-solver pair evaluated against the task. Because the functional is solver-relative, it may yield different values for the same representation evaluated against different solvers.

DEF-04—Relevance component (R). The relevance component R of a structured compatibility certificate refers to the portion of the compatibility functional that represents alignment between features of the contextual representation and the operational structure of the downstream solver. R captures the fraction of the representation that is both present and useful for the target solver. Because R is defined relative to a specific solver, information that is relevant when evaluated against one solver may be superfluous or absent when evaluated against a different solver.

DEF-05—Superfluous component (S_sup, or Ssup). The superfluous component S_sup of a structured compatibility certificate refers to the portion of the compatibility functional that represents structured information present in the contextual representation but not contributing to solver alignment. S_sup is not noise—it is organized, structured content—but it does not advance the objectives of the downstream solver and may increase computational cost without benefit. Like R, the superfluous component is solver-relative.

DEF-06—Noise component (N). The noise component N of a structured compatibility certificate refers to the portion of the compatibility functional that represents destabilizing or unstructured variance in the contextual representation. N captures distributional drift, adversarial perturbation, sensor noise, or any other content that undermines solver reliability. In hardware substrate embodiments, N also operationalizes thermodynamic non-idealities of the physical substrate including conductance drift, thermal fluctuations, and read noise, thereby serving as an oracle-free indicator of substrate health detectable from data distribution patterns without external diagnostic hardware.

DEF-07—Normalization invariant; simplex projection. The normalization invariant refers to the constraint that the sum of the three components of a structured compatibility certificate equals a fixed aggregate value: R+S_sup+N=C, where C is the fixed aggregate value. The superfluous component is denoted S_sup throughout; the symbol S is reserved for the solver and is never used as an abbreviation for the superfluous component. In the embodiments described herein, C=1, though the disclosure is not so limited. The normalization invariant is enforced at each computation of the three components via differentiable simplex projection operators and is not a post-hoc scaling correction. In embodiments employing learned projections, the contextual representation is projected through a plurality of learned weight matrices (W_R, W_Ssup, W_N) to determine component magnitudes; the simplex projection operators enforce the normalization invariant by construction, ensuring that the three components are mutually exclusive and collectively exhaustive partitions of the compatibility functional, enabling their direct comparison and the derivation of bounded derived metrics.

DEF-08—Structured compatibility certificate. A structured compatibility certificate refers to a machine-readable data structure comprising the three mutually exclusive, semantically-distinct components R, S_sup, and N constrained by the normalization invariant, together with one or more derived compatibility metrics computed from relationships among those components, a typed collapse domain classification, and a severity indicator. The structured compatibility certificate includes at least the following fields: the relevance component R, the superfluous component S_sup, the noise component N, the quality metric α, the reliability coefficient ω, the reliability-adjusted quality metric α_ω, the execution compatibility score κ_gate, the turbulence metric σ, the collapse_type field representing the typed collapse domain classification as defined in DEF-17, and the severity indicator as defined in DEF-50. The structured compatibility certificate is architecturally configured as enforcement data rather than as a command: it encodes a factual characterization of the compatibility relationship between a specific representation and a specific solver at a specific point in time, and is emitted for independent consumption by one or more downstream consumer roles. The structured compatibility certificate is a central artifact of many embodiments of the present disclosure and may be generated, evaluated, transmitted, stored, or consumed by one or more system components as described herein.

DEF-09—Derived compatibility metric. A derived compatibility metric refers to any scalar or vector quantity computed from relationships among the three components R, S_sup, and N of a structured compatibility certificate. Derived compatibility metrics include but are not limited to the quality metric α, the reliability coefficient ω, the reliability-adjusted quality metric α_ω, the execution compatibility score κ_gate, the turbulence metric σ, the consensus coherence score c, and the typed collapse domain classification. Derived metrics are computed from the certificate components and do not require access to the downstream solver's internal parameters, weights, or architecture.

DEF-10—Pre-execution evaluation. Pre-execution evaluation refers to evaluation of the structured compatibility certificate that occurs prior to invocation or execution of the downstream solver, model, or execution process—that is, before any computational resources associated with solver execution are committed. Pre-execution evaluation is architecturally distinct from post-hoc evaluation, which detects compatibility failures from degraded outputs after the solver has already executed. The pre-execution requirement is a structural property of the disclosed architecture: the execution control action is determined from the certificate before the solver runs, not inferred from the solver's outputs after it completes.

DEF-11—Execution control action. An execution control action refers to any action taken by the system that conditions, permits, restricts, or governs the invocation or execution of a downstream solver, model, or execution process based at least in part on the structured compatibility certificate. Execution control actions include but are not limited to: solver invocation, instruction issuance, resource allocation, routing to an alternative solver, substitution of a different solver, throttling of execution rate, parameter configuration, deferral of execution to a later time, and execution rejection. An execution control action is the mechanism by which the structured compatibility certificate produces operational effect in the one or more external systems.

DEF-12—Quality metric (α); semantic decomposition. The quality metric α refers to a derived compatibility metric computed from the relevance component R and the noise component N of a structured compatibility certificate as α=R/(R+N). The quality metric is the output of semantic decomposition, which refers to the first of two architecturally distinct signal paths: a signal path that decomposes the contextual representation into the three components (R, S_sup, N) and derives the quality metric α and the reliability coefficient σ from those components. The quality metric quantifies the proportion of non-noise content that is relevant to the downstream solver, excluding the superfluous component from the denominator. A quality metric approaching its maximum value indicates a representation dominated by solver-aligned content; a quality metric approaching its minimum indicates a representation in which noise overwhelms relevance. The quality metric α is derived from decomposition of the representation alone and does not require access to the solver's internal geometry.

DEF-13—Compatibility score (κ_gate); compatibility assessment. The compatibility score κ_gate refers to a derived compatibility metric that independently quantifies geometric alignment between the contextual representation and the downstream solver in a shared latent space. The compatibility score is the output of compatibility assessment, which refers to the second of two architecturally distinct signal paths: a signal path that computes geometric alignment between the representation and the downstream solver based on normalized similarity between embeddings of the representation and embeddings of the downstream solver in a shared latent space, structural alignment measures, solver descriptor compatibility, or difficulty proxies associated with the representation-solver pair. The compatibility score is computed as κ_gate=min (κ_H, κ_L, κ_int), where κ_H is the mean compatibility score over high-level modal sources (text and structured data), κ_L is the minimum compatibility score over low-level modal sources (vision, audio, video, and sensor data), and κ_int is the interface compatibility score, defined as the minimum cross-modal alignment score from the geometric compatibility morphism. The minimum aggregation is not a design preference; it is the unique adversarially safe aggregation rule as established by the weakest-link optimality theorem: any aggregation more permissive than the minimum can be bypassed by an adversary who degrades a single modality while the remaining modalities compensate. The compatibility score has architecturally distinct provenance from the quality metric: α is derived from decomposition of the representation (semantic decomposition), while κ_gate is derived from the geometric relationship between the representation and the solver in the shared latent space (compatibility assessment).

DEF-14—Minimal sufficient condition for typed execution control; two architecturally distinct signal paths. The minimal sufficient condition for typed execution control refers to the conjunction α^κ gate of the quality metric and the compatibility score, where the quality metric is produced by a first signal path performing semantic decomposition (DEF-12) and the compatibility score is produced by a second signal path performing compatibility assessment (DEF-13). These two architecturally distinct signal paths have independent provenance: the first path decomposes the representation into three components and derives quality metrics; the second path computes geometric alignment between the representation and the solver. The conjunction is minimal in the sense that neither signal alone is sufficient: the quality metric alone cannot distinguish a hallucination-risk condition (high $\alpha$, low $\kappa\_gate$) from healthy operation, and the compatibility score alone cannot distinguish a targeted-corruption condition (low $\alpha$, high $\kappa\_gate$) from systemic drift. The conjunction is sufficient in the sense that the two signals together produce typed execution control that enables those distinctions. No signal derived solely from a single path provides this capability.

DEF-15—Reliability coefficient ($\omega$). The reliability coefficient $\omega \in [0,1]$ refers to a derived compatibility metric that quantifies the distributional reliability of the quality estimate $\alpha$. $\omega$ is derived from the latent variance associated with the projection of the contextual representation: as the representation shifts away from the reference distribution over which the projection was calibrated, the latent variance increases and $\omega$ decreases, indicating lower confidence in the quality estimate. The reliability coefficient monotonically increases as the latent variance decreases and monotonically decreases as the latent variance increases, thereby enabling detection of out-of-distribution inputs without requiring labeled validation data or oracle access to optimal outputs. $\omega$ is computable by any projection mechanism that exposes a distributional deviation signal, and functions as a weighting scalar that modulates $\alpha$ into the reliability-adjusted quality metric $\alpha\_\omega = \omega \cdot \alpha + (1-\omega) \cdot \alpha\_base$, where $\alpha\_base \in [0,1]$ is a fixed robustness fallback (default $\alpha\_base = 0.5$). The temperature parameter $\tau = 1/\alpha\_\omega$ is derived from $\alpha\_\omega$ and governs curriculum pacing and quality-phase transitions; $\tau$ is a scheduling instrument only and does not appear in any gate condition of the sequential four-gate gatekeeper. $\omega$ itself is not one of the enforcement operands of the conjunction $\alpha\hat{}\kappa\_gate$.

DEF-16—Consumer role. A consumer role refers to any system component, service, process, model, policy engine, hardware element, software module, or human-supervised workflow that reads, evaluates, validates, interprets, routes, stores, or otherwise consumes at least a portion of a structured compatibility certificate to answer one or more operational questions or support one or more execution-related decisions. Consumer roles are architecturally decoupled from the certificate producer in the sense that a single shared certificate may be consumed by a plurality of different consumers for different purposes. Such purposes may include, by way of non-limiting example, authorization, interpretation, confirmation, routing, remediation, solver selection, policy evaluation, monitoring, audit, logging, resource allocation, or configuration. Consumer roles are illustrative and non-exclusive: a single consumer may perform multiple roles, and a given role may be distributed across multiple consumers. In some embodiments, one or more consumer roles may operate independently; in other embodiments, consumer roles may operate sequentially, cooperatively, hierarchically, or in partially coordinated fashion without departing from the scope of the present disclosure.

DEF-17—Typed collapse domain. A typed collapse domain refers to a classification of a structured compatibility certificate that identifies the specific form of contextual degradation present, derived from comparative relationships among the three components and their relative magnitudes. Each typed collapse domain corresponds to a predefined enforcement policy and maps to a distinct remediation action. At least a subset of the typed collapse domains is determined by component ordering rather than by absolute threshold values, enabling classification of distinct failure modes without exhaustive threshold tuning. In some embodiments, the typed collapse domain taxonomy comprises sixteen or more distinct failure domains derived from comparative relationships among the three components and derived metrics, each domain corresponding to a semantically distinct failure mode with a differentiated remediation policy. The typed collapse domain provides a diagnostic label that downstream consumer roles may use to select among remediation strategies including re-encoding, routing to an alternative solver, requesting verification, and rejection. The typed collapse domain classification is represented in the structured compatibility certificate as the collapse_type field.

DEF-18—Predefined enforcement policy. A predefined enforcement policy refers to a stored rule or set of rules that maps a typed collapse domain to a specified execution control action. Enforcement policies are evaluated by consumer roles independently; a predefined enforcement policy does not require runtime coordination among consumers, does not require access to the downstream solver's internal parameters, and may differ across consumers receiving the same certificate.

DEF-19—Enforcement data. Enforcement data refers to a structured compatibility certificate that is architecturally configured to carry compatibility characterization for independent interpretation by downstream consumer roles, rather than to carry a command that prescribes a specific action. A certificate operating as enforcement data is emitted by a producer; each consumer independently reads the certificate and determines its own execution action according to its domain requirements. The enforcement-data architecture decouples certificate production from certificate consumption and enables heterogeneous consumers to apply different enforcement policies to the same certificate.

DEF-20—Observational mode. Observational mode refers to an operating mode of the compatibility certification system in which structured compatibility certificates are generated and logged without altering the execution behavior of the downstream solver, model, or execution process. In observational mode, the system produces the full certificate payload-including all derived metrics, typed collapse domain classification, and audit log entry- and may determine and record execution control actions, but such actions are not enforced on downstream solver invocation. Observational mode enables audit trail construction, threshold sensitivity analysis, and regulatory compliance documentation without introducing operational risk to live systems.

DEF-21—Invariant specification; configurable threshold parameters. An invariant specification refers to a structured record cryptographically bound to a structured compatibility certificate that defines the domain constraints, quality thresholds, encoder configuration parameters, and validation rules governing the certificate's enforcement semantics. Configurable threshold parameters include the noise threshold (the value of the noise component N at or above which Gate 1 issues a reject decision; default 0.5), the coherence threshold (the value of the phasor coherence metric c below which Gate 2 issues a block decision; default 0.4), and the grounding threshold (the value of the low-level modal compatibility score $\kappa_L$ below which Gate 4 issues a repair decision; default 0.3). The invariant specification is serialized and hashed; upon certificate instantiation, the hash is re-computed and compared with the stored value, enabling automatic tamper detection without external infrastructure. The invariant specification enables independent third-party verification of certificate integrity and origin without requiring disclosure of the downstream solver's internal parameters, weights, or proprietary logic.

DEF-22—Phasor coherence metric (c). The phasor coherence metric c refers to a derived compatibility metric that measures structural coherence among the component-level compatibility evaluations across a representation. Low phasor coherence indicates that sub-model or sub-modal interpretations of the representation are structurally inconsistent with one another—a condition that may exist even when average quality metrics are within acceptable bounds. The phasor coherence metric is the operative signal of Gate 2 of the sequential four-gate gatekeeper.

DEF-23—Turbulence metric (σ). The turbulence metric σ refers to a derived compatibility metric quantifying the dispersion of pairwise compatibility scores across modal sources or representation-solver pair evaluations. σ is computed as the standard deviation of the per-source compatibility scores: low σ means all sources contribute consistently; high σ means compatibility is geometrically incoherent across sources. The turbulence metric is structurally independent of the quality metric α: a representation may exhibit low turbulence and low quality, or high turbulence and high quality, and these conditions require distinct remediation actions. The turbulence metric is the stiffening input of the dynamic admissibility threshold and the tie-breaking operand within the tolerance buffer of Gate 3. The specific method used to compute the per-source compatibility scores—including any similarity measure, distance function, or structural alignment measure—is an implementation choice; the definition of σ as the standard deviation of those scores is invariant across implementations.

DEF-24—Dynamic admissibility threshold. The dynamic admissibility threshold κ_req(σ) refers to a compatibility score threshold computed as: κ_req(σ)=κ_base+λ·σ, where κ_base=0.5 is the base threshold and λ=0.4 is the Oobleck stiffening coefficient. The threshold is a monotonically increasing function of the turbulence metric σ: at low turbulence the threshold is permissive (κ_req≈0.5 when σ≈0), and at the turbulence boundary (σ=0.5) the threshold hardens to κ_req=0.7. This behavior is analogous to the non-Newtonian viscosity of a shear-thickening fluid: the encoding must be more compatible, not equally compatible, to be admitted under stress. As instability σ increases, the system requires higher compatibility κ to proceed, analogous to shear-thickening fluids (Oobleck) that harden under stress; this prevents accepting marginal encodings during unstable regimes, ensuring safety gates strengthen precisely when system dynamics become fragile. The dynamic admissibility threshold is the operative acceptance criterion of Gate 3 of the sequential four-gate gatekeeper. A hard turbulence barrier at σ>σ_thr (default σ_thr=0.5) forces a re-encode decision regardless of κ_gate, because the encoding lies outside the admissible region by definition. A Landauer tolerance buffer [κ_req−ε_L, κ_req) with ε_L=0.05 prevents false rejections from measurement noise; within this gray zone, a turbulence tie-breaker (σ>0.4) provides a deterministic resolution between re-encoding and permitting execution under a constrained or caution-qualified execute condition. The tolerance band width ε_L may be calibrated based on empirical noise characteristics according to ε_L=2.5×σ_measurement, connecting to Landauer's principle regarding thermodynamic limits of information processing. This hysteresis prevents oscillatory rejection-acceptance cycles near threshold boundaries, improving system robustness in production deployments.

DEF-25—Graph transformation operator. A graph transformation operator refers to a deterministic operation that modifies a representation graph, a solver graph, or both, in response to a non-execute gate decision from the sequential four-gate gatekeeper. Each graph transformation operator moves exactly one certificate scalar in exactly one direction, guaranteeing that the morph repair cycle terminates rather than oscillates. Each non-execute gate decision triggers exactly one designated graph transformation operator: a pruning morph for Gate 1 reject decisions, a verification morph for Gate 2 block decisions, an ensemble morph for Gate 3 re-encode decisions, and an event expansion morph for Gate 4 repair decisions (Gate 4 fires when κ_L<κ^min_L; default κ^min_L=0.3). Graph transformation operators are deterministic structural modifications to graph topology; they do not update neural network weights, learn policies, compute gradients, or perform any form of runtime optimization. The adaptation they provide is structural (adding, removing, or rewiring nodes) rather than parametric (modifying weights or learned representations).

DEF-26—Phantom initialization state. Phantom initialization state refers to the condition in a multi-agent pipeline in which an agent is evaluated for compatibility- or authorized to execute-against a representation derived from static initialization values or task descriptions, rather than against the actual intermediate content produced by a preceding agent. When the real intermediate content of a preceding agent's output diverges from the initialization representation, the receiving agent operates on incompatible input without detection, producing a phantom certification: an authorization based on data the agent will not actually process. The present disclosure eliminates phantom certification by requiring that each agent in a multi-agent pipeline be evaluated against the actual intermediate content of the preceding agent's output, encoded as a new event node carrying a newly-derived structured compatibility certificate.

DEF-27—Representation graph (G_R). A representation graph G_R refers to a directed graph whose nodes are event nodes, each carrying a locally-derived structured compatibility certificate that reflects the content and compatibility characteristics of a specific contextual input or intermediate agent output. The representation graph accumulates event nodes as the multi-agent pipeline executes: each agent's real output is encoded as a new event node with a freshly-derived certificate and added to G_R, ensuring that each subsequent agent invocation is governed by the actual current state of the pipeline rather than by static initialization values.

DEF-28—Solver graph (G_S). A solver graph G_S refers to a directed graph whose nodes are agent nodes, each carrying a structured representation of the solver's operational characteristics and a solver contract specifying the compatibility thresholds and constraints applicable to that solver. The solver graph encodes the set of available downstream agents and their pairwise structural relationships. The specific form of the solver characterization-whether an embedding vector, a capability descriptor, a structured contract, or any other machine-readable representation of solver characteristics—is an implementation choice. Agent solver contracts and agent characterizations within G_S are maintained as immutable during runtime execution; however, graph topology may be modified by graph transformation operators during coordination-layer remediation without altering solver contracts, embeddings, or fixed solver characterizations.

DEF-29—Geometric compatibility morphism (φ); interface compatibility score. The geometric compatibility morphism φ: G_R→G_S refers to a mapping from task-bearing event nodes in the representation graph to capability-bearing agent nodes in the solver graph, where each event node is mapped to the agent node exhibiting maximum compatibility under a structural alignment measure computed from the respective representation and solver characterizations. The interface compatibility score κ_int is defined as the minimum pairwise compatibility across all event-to-agent mappings under the morphism; the turbulence metric σ is defined as the standard deviation of pairwise compatibility scores across all such mappings. The morphism is computed deterministically from fixed characterizations of the representation and solver nodes, without updating model parameters, learning policies, or requiring runtime policy optimization. It is a structural property of the current representation-solver graph pair, recomputed after each graph transformation. The specific structural alignment measure used to compute compatibility between nodes—including normalized cosine similarity, Euclidean distance, Mahalanobis distance, or any other similarity metric, distance function, or compatibility scoring function—is an implementation choice that does not alter the definition or enforcement semantics of the morphism.

DEF-30—Surjectivity (of the compatibility morphism). Surjectivity of the geometric compatibility morphism refers to the property that every capability-bearing agent node in the solver graph G_S is reachable by at least one task-bearing event node in the representation graph G_R under the morphism. Surjectivity is enforced by the system: any agent node that is unreachable by any event node under the morphism receives a forced certificate whose noise component is set to a value that triggers a Gate 1 reject decision, preventing that agent from executing and flagging the routing failure explicitly rather than allowing it to occur silently. In embodiments using the four-dimensional toroidal stability representation T^4, admissibility is characterized by the Lyapunov drift energy V_t4(E)=d_t4(x_t4(E), x*_t4)^2≤V_max, where angular coordinates (α_t4, ω_t4, θ, φ) carry the mandatory t4 subscript to distinguish them from the certificate scalars (α, ω, κ_gate, σ); the two namespaces are never mixed in any formula or gate condition.

DEF-31—Oracle-free substrate health signal. An oracle-free substrate health signal refers to a signal derived from the noise component N of the structured compatibility certificate that characterizes the health of a physical computational substrate—including analog computing arrays, memristor crossbar arrays, and neuromorphic accelerators—from data distribution patterns alone, without requiring external diagnostic hardware, periodic offline calibration, or ground-truth labels. The oracle-free character of the signal arises because the noise component captures thermodynamic non-idealities of the substrate—including conductance drift, thermal fluctuations, and read noise—as they manifest in the statistical properties of the computed representation, making substrate degradation observable from the certificate without additional instrumentation. The oracle-free substrate health signal is derived at runtime from the certificate without any weight updates, analog write operations, or runtime learning of any kind. Any plasticity modulation, write-endurance optimization, or adaptive weight modification associated with the analog substrate occurs exclusively during offline training and does not execute during the runtime phase governed by the four-gate gatekeeper.

DEF-32—Gating circuit. A gating circuit refers to a hardware component communicatively coupled to the memory storing the structured compatibility certificate and configured to evaluate one or more fields of the certificate against stored threshold parameters and, prior to task execution, conditionally enable or disable instruction issuance, memory access, solver invocation, execution pathway activation, or hardware resource allocation based at least in part on that evaluation. The gating circuit implements pre-execution enforcement at the hardware level, providing circuit-speed control that protects the physical substrate from malicious or architecturally misaligned inputs before computational resources are committed. The threshold parameters against which the gating circuit evaluates the certificate are fixed prior to deployment and are not modified by runtime policy learning, multi-agent reinforcement learning, or any adaptive process during live operation.

DEF-33—Zero-knowledge proof mechanism. A zero-knowledge proof mechanism refers to a cryptographic component configured to generate a proof over the physical substrate state at certificate generation time, enabling a downstream component or third-party auditor to verify that the structured compatibility certificate was derived from a valid physical substrate state—without accessing substrate parameters, weight values, or internal certificate derivation logic—in time that is independent of model size with respect to certificate length. The proof is cryptographically bound to the physical substrate state rather than to a software assertion, ensuring that the attestation reflects actual hardware conditions rather than a software claim about those conditions.

DEF-34—Morph repair cycle. A morph repair cycle refers to an iterative closed-loop process triggered by a non-execute gate decision from the sequential four-gate gatekeeper, in which a graph transformation operator corresponding to the triggered gate is applied to the representation graph, the solver graph, or both; the structured compatibility certificate is re-derived from the modified graphs; and the re-derived certificate is re-evaluated by the sequential four-gate gatekeeper. The morph repair cycle continues until the gatekeeper returns an execute decision or until a surjectivity starvation condition is detected, as defined in DEF-38. Termination of the morph repair cycle is guaranteed because each graph transformation operator moves exactly one certificate scalar in exactly one direction, as defined in DEF-25. The morph repair cycle does not update neural network weights, learn policies, compute gradients, or perform any form of runtime optimization; the adaptation it provides is structural modification of graph topology.

DEF-35—Agent handoff cycle. An agent handoff cycle refers to a coordination mechanism triggered by an execute decision from the sequential four-gate gatekeeper, in which the implementation function associated with a certified agent node in the solver graph is invoked; the real output produced by the invoked agent is encoded as a new event node carrying a structured compatibility certificate derived from the actual content of the agent's output; and the new event node is added to the representation graph for evaluation prior to any subsequent agent invocation. The agent handoff cycle ensures that each agent in a multi-agent pipeline is evaluated for compatibility against the actual intermediate content of the preceding agent's output, rather than against a phantom initialization state, as defined in DEF-26. The agent handoff cycle is architecturally distinct from the morph repair cycle: the morph repair cycle operates on non-execute decisions and modifies graph topology; the agent handoff cycle operates on execute decisions and adds new event nodes carrying freshly-derived certificates. The two cycles are mutually exclusive in their triggering conditions.

DEF-36-Structured audit log entry. A structured audit log entry refers to a machine-readable record generated by the system at each gate-evaluation termination point, comprising the quality metric α, the reliability coefficient ω, the reliability-adjusted quality metric $\alpha\_\omega$, the execution compatibility score $\kappa\_gate$, the turbulence metric $\sigma$, the gate at which evaluation terminated, the typed enforcement outcome, and a timestamp. The structured audit log entry captures the complete certificate state at the point of the enforcement decision, enabling post-hoc reconstruction of the decision path without requiring access to the downstream solver's internal parameters or re-execution of the compatibility evaluation. In embodiments configured for regulatory compliance, the structured audit log entry provides the evidentiary record required by applicable regulatory frameworks, including but not limited to model risk management guidelines and artificial intelligence governance regulations.

DEF-37—Forced certificate. A forced certificate refers to a structured compatibility certificate whose component values are set by the system rather than derived from the representation-solver compatibility functional, and whose noise component N is set to a value that triggers a Gate 1 reject decision. A forced certificate is assigned to any agent node in the solver graph G_S that is unreachable by any event node in the representation graph G_R under the geometric compatibility morphism $\varphi$, ensuring that the unreachable agent is prevented from executing and the routing failure is flagged explicitly rather than occurring silently. A forced certificate satisfies the normalization invariant and is structurally indistinguishable from a derived certificate at the point of gate evaluation; the distinction lies in its provenance (set rather than computed) and its function (enforcement of surjectivity rather than characterization of compatibility).

DEF-38—Surjectivity starvation. Surjectivity starvation refers to a termination condition of the morph repair cycle in which no event node in the representation graph carries a certificate scalar that exceeds the activation threshold of any available graph transformation operator, and no further graph transformation is therefore structurally possible. Upon detection of surjectivity starvation, the morph repair cycle halts and a committed structured audit log entry is generated recording the starvation condition, as defined in DEF-36. Surjectivity starvation is a safety-termination mechanism that prevents unbounded cycling in the event that no sequence of graph transformations can produce an execute decision for the current representation-solver graph pair.

DEF-39—Sequential four-gate gatekeeper. The sequential four-gate gatekeeper refers to an enforcement mechanism that, in the embodiments described herein, evaluates a structured compatibility certificate through a fixed sequence of four gate conditions, each gate evaluating a distinct certificate field or derived metric against a stored threshold, and each gate configured to issue a typed non-execute decision if its condition is not satisfied. The four gates are evaluated in strict sequential order: Gate 1 (integrity guard) evaluates the noise component N against a noise threshold and issues a reject decision if N exceeds the threshold; Gate 2 (consensus gate) evaluates the phasor coherence metric c against a coherence threshold and issues a block decision if c falls below the threshold; Gate 3 (admissibility gate) evaluates the execution compatibility score $\kappa\_gate$ against a dynamic admissibility threshold $\kappa\_req(\sigma)$ and issues a re-encode decision if $\kappa\_gate$ falls below the threshold or if the turbulence metric $\sigma$ exceeds a turbulence threshold; and Gate 4 (grounding gate) evaluates the low-level modal compatibility score $\kappa_L$ against a grounding threshold and issues a repair decision if $\kappa_L$ falls below the threshold. If all four gates pass, the gatekeeper issues an execute decision authorizing solver invocation. Gate ordering is a correctness property, not an optimization preference: evaluation of a later gate before an earlier gate may permit adversarially crafted encodings to bypass enforcement. Each non-execute decision triggers exactly one graph transformation operator, as defined in DEF-25, initiating a morph repair cycle, as defined in DEF-34.

DEF-40—Dual Graph Morphing (DGM). Dual Graph Morphing refers to a coordination mechanism that maintains two directed graphs—a representation graph G_R, as defined in DEF-27, and a solver graph G_S, as defined in DEF-28—and iteratively modifies the topology of one or both graphs in response to non-execute decisions from the sequential four-gate gatekeeper, as defined in DEF-39. The Dual Graph Morphing mechanism computes a geometric compatibility morphism $\varphi$, as defined in DEF-29, mapping event nodes in G_R to agent nodes in G_S based on maximum structural alignment; derives the interface compatibility score $\kappa\_int$, the turbulence metric $\sigma$, and the global structured compatibility certificate from the $\varphi$-morphism pair scores; and invokes the sequential four-gate gatekeeper to evaluate the derived certificate. Upon a non-execute decision, the corresponding graph transformation operator modifies the representation graph, the solver graph, or both, and the mechanism re-derives the certificate and re-evaluates the gatekeeper. The Dual Graph Morphing mechanism operates with fixed embeddings computed prior to runtime execution and does not perform gradient descent, policy learning, or any form of runtime optimization; the adaptation it provides is structural modification of graph topology.

DEF-41—Event node embedding (e_R). An event node embedding e_R refers to a vector representation in a shared latent space that encodes the content and characteristics of an event node in the representation graph G_R, as defined in DEF-27. The event node embedding is computed by an encoder from the payload of the event node—which may include text, image, audio, video, structured data, or any other contextual content—and is used as an operand in the geometric compatibility morphism $\varphi$, as defined in DEF-29, to determine structural alignment with agent node embeddings in the solver graph. In embodiments using the Dual Graph Morphing mechanism, e_R is computed once upon event node creation and is not updated during runtime execution.

DEF-42—Capability centroid embedding (e_S). A capability centroid embedding e_S refers to a vector representation in a shared latent space that encodes the operational characteristics and capability profile of an agent node in the solver graph G_S, as defined in DEF-28. The capability centroid embedding is computed by an encoder from the agent's role description, system prompt, capability declaration, or other structured characterization of the agent's operational profile, and is used as an operand in the geometric compatibility morphism $\varphi$, as defined in DEF-29, to determine structural alignment with event node embeddings in the representation graph. In embodiments using the Dual Graph Morphing mechanism, e_S is computed once upon agent node registration and is maintained as immutable during runtime execution.

DEF-43—Implementation function (impl). An implementation function refers to a callable procedure associated with an agent node in the solver graph G_S that, upon an execute decision from the sequential four-gate gatekeeper, invokes the underlying computational process, model, controller, or execution service represented by that agent node. The implementation function is the mechanism by which a certified execute decision produces operational effect: it may invoke a large language model, dispatch a message to an external agent endpoint, trigger a robotic controller, or activate any other downstream solver, as defined in DEF-02. In embodiments configured for multi-agent coordination, the real output produced by the implementation function is encoded as a new event node carrying a freshly-derived structured compatibility certificate and added to the representation graph G_R, as described in DEF-35, ensuring that subsequent agent invocations are evaluated against actual intermediate content rather than initialization state.

DEF-44—Measurement layer. The measurement layer refers to the architectural stratum of the compatibility certification system in which contextual input data is received, semantic decomposition is performed, and the structured compatibility certificate is generated. The measurement layer comprises the encoder that projects contextual representations through learned weight matrices (W_R, W_Ssup, W_N) to determine component magnitudes, the computation of the normalization invariant, and the derivation of the quality metric $\alpha$ and the reliability coefficient $\omega$. The measurement layer produces the structured compatibility certificate that serves as input to the control layer, as defined in DEF-45.

DEF-45—Control layer. The control layer refers to the architectural stratum of the compatibility certification system in which the structured compatibility certificate is evaluated by the sequential four-gate gatekeeper, as defined in DEF-39, and a typed enforcement decision is issued. The control layer receives the certificate from the measurement layer, as defined in DEF-44, and emits one of five typed decisions: reject, block, re-encode, repair, or execute. Upon a non-execute decision, the control layer signals the coordination layer, as defined in DEF-46, to initiate the corresponding graph transformation operator.

DEF-46—Coordination layer. The coordination layer refers to the architectural stratum of the compatibility certification system in which the Dual Graph Morphing mechanism, as defined in DEF-40, maintains and modifies the representation graph G_R and the solver graph G_S in response to decisions from the control layer, as defined in DEF-45. The coordination layer computes the geometric compatibility morphism $\varphi$, derives the interface compatibility score $\kappa$_int and the turbulence metric $\sigma$ from the morphism, executes graph transformation operators upon non-execute decisions, and invokes the implementation function of certified agent nodes upon execute decisions. The coordination layer provides feedback to the measurement layer by adding new event nodes carrying freshly-derived certificates after each agent invocation.

DEF-47—Modality tag. A modality tag refers to a categorical label assigned to each event node in the representation graph G_R that identifies the sensory or structural type of the content carried by that node. Modality tags include but are not limited to: TEXT for natural language content, IMAGE for visual content, AUDIO for auditory content, VIDEO for temporal visual-auditory content, STRUCT for structured data including tables and schemas, and EVIDENCE for retrieved or externally sourced supporting content. Modality tags govern the aggregation rules for high-level modal health $\kappa$_H and low-level modal health $\kappa$_L, as defined in DEF-13: high-level modalities (TEXT, STRUCT) contribute to $\kappa$_H via mean aggregation, while low-level modalities (IMAGE, AUDIO, VIDEO, EVIDENCE) contribute to $\kappa$_L via minimum aggregation.

DEF-48—Local certificate. A local certificate refers to a structured compatibility certificate associated with an individual event node in the representation graph G_R, comprising the local component values (R_i, S_sup_i, N_i) constrained by the normalization invariant R_i+S_sup_i+N_i=1, and a local turbulence estimate $\sigma$_local,i. Local certificates are derived from the content payload of each event node and are aggregated to produce the global certificate that serves as input to the sequential four-gate gatekeeper, as defined in DEF-39. The aggregation computes the global components (R_global, S_sup_global, N_global) as weighted means over active event node local certificates, with weights proportional to node confidence.

DEF-49—Two-direction framework integration. Two-direction framework integration refers to the bidirectional coupling between the Dual Graph Morphing mechanism, as defined in DEF-40, and an external agent framework. Direction 1 (input direction) refers to the translation of real framework content-including user queries, agent outputs, retrieved evidence, and inter-agent messages-into event nodes in the representation graph G_R, with local certificates derived from actual content rather than initialization values. Direction 2 (output direction) refers to the invocation of the implementation function, as defined in DEF-43, associated with a certified agent node upon an execute decision from the sequential four-gate gatekeeper. Both directions are necessary for correct operation: Direction 2 without Direction 1 permits gatekeeper evaluation of phantom certificates, as defined in DEF-26, that do not reflect actual intermediate content; Direction 1 without Direction 2 permits certificate derivation without operational effect.

DEF-50—Severity. Severity refers to a context-domain-dependent scalar or categorical measure of the magnitude of a detected compatibility deficit within a given typed collapse domain, as defined in DEF-17. The computation of severity is configured according to the operational domain in which the compatibility certification system is deployed; different domains may define severity functions that reflect domain-specific risk tolerances, regulatory requirements, or remediation cost structures. In some embodiments, severity is computed from the normalized distance between observed certificate values and one or more corresponding gate thresholds. In other embodiments, severity is computed from domain-specific risk weighting functions that assign greater magnitude to deficits in certificate fields that carry higher operational consequence in that domain. Severity may be used to rank, prioritize, or route remediation actions when multiple collapse conditions are present, and may be recorded in the structured audit log entry, as defined in DEF-36, to support post-hoc triage, root-cause analysis, and regulatory compliance documentation. The severity indicator is a field of the structured compatibility certificate, as defined in DEF-08.

DEF-51—Diagnostic simplex. The diagnostic simplex refers to a post-hoc analytical decomposition of the compatibility gap (1−$\kappa$_gate) into three root-cause coordinates: $\kappa$_A representing algorithmic alignment between the solver's architecture and structural demands of the problem, $\kappa$_E representing encoding efficiency quantifying the fraction of the gap attributable to representation policy, and $\kappa$_T representing search tractability quantifying the fraction attributable to intrinsic computational hardness. The diagnostic simplex satisfies the normalization constraint $\kappa$_A+$\kappa$_E+$\kappa$_T=1 and is used for oracle-free root-cause analysis. In the embodiments described herein, the diagnostic simplex serves as a post-hoc analytical tool and is not used in real-time gating decisions; the diagnostic simplex does not share state variables with the execution compatibility score $\kappa$_gate used by the sequential four-gate gatekeeper. In other embodiments, one or more of the diagnostic coordinates $\kappa$_A, $\kappa$_E, $\kappa$_T may inform remediation selection or morph operator routing without altering the four-gate enforcement sequence. See FIG. 30.

DEF-52—Authorization role. An authorization role refers to a consumer role, as defined in DEF-16, that reads the conjunction of the quality metric $\alpha$ and the compatibility score $\kappa$_gate from the structured compatibility certificate to determine whether execution of the downstream solver should be permitted, deferred, or rejected. The authorization role independently applies its own enforcement policy based on domain-specific thresholds and safety constraints without requiring coordination with other consumer roles.

DEF-53—Interpretation role. An interpretation role refers to one illustrative consumer role, as defined in DEF-16, that reads one or more comparative relationships among the components or derived metrics of the structured compatibility certificate to classify operational conditions into typed collapse domains, execution states, diagnostic categories, or other compatibility-governed labels. In various embodiments, the interpretation role provides diagnostic meaning, explanatory context, or failure-mode identification that may be used by downstream systems to select remediation strategies, routing strategies, verification steps, or other responsive actions.

DEF-54—Confirmation role. A confirmation role refers to one illustrative consumer role, as defined in DEF-16, that reads one or more portions of the structured compatibility certificate, including in some embodiments stability metrics derived from temporal or sequential analysis, to validate that execution conditions, trajectory behavior, trust conditions, or system dynamics remain within an admissible operating region. In various embodiments, the confirmation role may monitor the turbulence metric $\sigma$, coherence measures, signature or invariant checks, temporal drift indicators, or other stability-related signals to detect divergence, inconsistency, tampering, or other conditions that may not be apparent from single-certificate evaluation alone.

DEF-55—Communication device. A communication device refers to any hardware or software component configured to receive contextual input data comprising at least one representation of at least one contextual input and to transmit compatibility information between components of the compatibility certification system or between the system and external systems. Examples of communication devices include network interface controllers, wireless transceivers, API gateways, message brokers, and any other component that facilitates data exchange. In some embodiments, the communication device is a mobile device, IoT device, or edge computing node that provides contextual input data to the compatibility certification system.

DEF-56—Processing device. A processing device refers to any hardware or software component communicatively coupled to a communication device, as defined in DEF-55, and configured to compute the representation-solver compatibility functional, project the structured compatibility certificate, evaluate the certificate prior to solver invocation, and determine execution control actions. The processing device implements the three-layer architecture comprising a measurement layer, as defined in DEF-44, a control layer, as defined in DEF-45, and a coordination layer, as defined in DEF-46. Examples of processing devices include central processing units, graphics processing units, tensor processing units, neuromorphic accelerators, field-programmable gate arrays, application-specific integrated circuits, and any combination thereof.

DEF-57—Hardware non-ideality. A hardware non-ideality refers to any physical characteristic of a computational substrate that causes deviation from mathematically ideal operation. Hardware non-idealities include but are not limited to: conductance drift in memristive devices, device-to-device variability across fabricated components, read noise during analog computation, write variability affecting weight storage, quantization noise from finite-precision arithmetic, thermal fluctuations affecting signal integrity, aging effects degrading component performance over time, and limited arithmetic precision in fixed-point or low-bit-width implementations. Hardware non-idealities are captured by the noise component N of the structured compatibility certificate, as defined in DEF-06, enabling oracle-free substrate health monitoring, as defined in DEF-31, without requiring external diagnostic hardware or ground-truth labels. In embodiments employing neuromorphic or analog accelerators, hardware non-idealities manifest as distributional signatures in the computed representation that are detectable from the certificate without accessing substrate parameters.

DEF-58—Compatibility-gated propagation. Compatibility-gated propagation refers to the practice of conditioning data forwarding on compatibility evaluation, wherein contextual representations are withheld from downstream consumers when the structured compatibility certificate indicates that the consumer cannot effectively exploit the representation, does not require the information, or presents elevated privacy exposure risk. Compatibility-gated propagation implements a data minimization principle: only representations satisfying compatibility criteria for a specific consumer are forwarded to that consumer, reducing unnecessary data exposure and computational waste. In multi-agent embodiments, compatibility-gated propagation prevents dissemination of information to agents that cannot productively process it, as determined by the compatibility score $\kappa$_gate evaluated for each potential recipient. Compatibility-gated propagation is distinct from execution gating, as defined in DEF-11: execution gating conditions solver invocation on certificate evaluation, whereas compatibility-gated propagation conditions data transmission on certificate evaluation.

DEF-59—Navigator. A navigator refers to a certification-based routing layer whose primary function is routing contextual inputs to external solver endpoints rather than performing inference, text generation, or any learning operation. The navigator computes the structured compatibility certificate using fixed geometric embeddings and routes each certified input to the external solver, model, or execution process exhibiting maximum compatibility margin, without itself executing any inference, prediction, or decision-making task. The navigator does not update neural network weights, compute gradients, or perform runtime policy optimization; all routing decisions are computed algebraically from fixed embeddings and the deterministic certificate triple.

DEF-60—Solver registry. A solver registry refers to a data structure comprising a plurality of heterogeneous external solver endpoints available for routing, each characterized by a solver contract specifying compatibility thresholds, operational constraints, and capability centroids in the shared latent space, frozen prior to deployment. The navigator evaluates the structured compatibility certificate against each solver in the registry and selects the solver for which the certificate satisfies all gate conditions with the highest margin above the dynamic admissibility threshold.

DEF-61—Fallback queue. A fallback queue refers to a data structure that receives contextual inputs for which no solver in the solver registry satisfies all gate conditions.

Inputs in the fallback queue are deferred for human review, alternative processing pathways, or later retry when system conditions may have changed.

DEF-62—Certificate generation module. The certificate generation module refers to the functional component within the measurement layer (DEF-44) that performs semantic decomposition (DEF-12) and compatibility assessment (DEF-13), converging via the minimal sufficient condition for typed execution control (DEF-14), to produce the structured compatibility certificate (DEF-08).

Computing device. As used herein, a "computing device" refers to at least one computing device comprising a communication device, as defined in DEF-55, configured to receive contextual input data and to transmit compatibility information; a processing device, as defined in DEF-56, configured to compute the representation-solver compatibility functional and to project the structured compatibility certificate; and a storage device configured to store threshold parameters, invariant specifications, and structured audit log entries. The processing device may implement the three-layer architecture comprising a measurement layer, a control layer, and a coordination layer as described herein. In some embodiments, the method may be performed by at least one server in communication with at least one client device over a communication network such as, for example, the Internet. In some other embodiments, the method may be performed by one or more of at least one server computer, at least one client device, at least one network device, at least one sensor, and at least one actuator. Examples of computing devices include a desktop computer, a laptop computer, a tablet computer, a smartphone, an Internet of Things (IoT) device, a smart electrical appliance, a rack server, a cloud computing service, an edge computing node, a neuromorphic accelerator, a quantum computing system, and any combination thereof.

Device. As used herein, a "device" refers to at least one user-associated device that provides contextual input data and/or receives outputs. Examples include a smartphone, tablet, laptop, wearable device, in-vehicle system, kiosk, voice assistant device, IoT device, industrial terminal, or point-of-sale device. In some embodiments, the device provides device characteristics and contextual variables used to tailor processing behavior and to determine compatibility indicators.

Large language model (LLM). As used herein, a "large language model" (LLM) refers to a trained machine-learning model configured to receive text and/or tokenized representations and generate one or more outputs, such as predicted tokens, classifications, summaries, extracted fields, relevance signals, or structured responses. In some embodiments, the LLM is an example of a downstream solver, model, or execution process as defined in DEF-02. In some embodiments, the LLM is executed by the processing device and may be hosted locally, at an edge node, or at a remote compute service accessible via the communication device.

Generative artificial intelligence model. As used herein, a "generative artificial intelligence model" refers to a machine-learning model configured to produce generated content based on at least one input, such as generated text, structured data, candidate actions, or recommendations. In some embodiments, a generative artificial intelligence model includes a transformer-based neural network that generates output tokens conditioned on an input context and one or more parameter values. In some embodiments, the generative artificial intelligence model is an example of a downstream solver, model, or execution process as defined in DEF-02.

Natural language processing (NLP) model. As used herein, a "natural language processing (NLP) model" refers to a trained model configured to analyze text to generate machine-readable semantic features and/or structured interpretations. In some embodiments, the NLP model performs one or more operations, including intent classification, named entity recognition, topic classification, ambiguity detection, completeness checks, normalization, language detection, or embedding generation. In some embodiments, the NLP model is used within the measurement layer, as defined in DEF-44, to perform semantic decomposition and to derive the quality metric $\alpha$.

Model parameter. As used herein, a "model parameter" refers to a configurable value that governs the behavior of a downstream solver, model, or execution process during inference. In some embodiments, model parameters include decoding parameters (e.g., temperature, nucleus/top-p, top-k), maximum output length, stop sequences, repetition penalties, safety constraints, confidence thresholds, or routing selections among models. Model parameters are distinct from the threshold parameters stored in the invariant specification, as defined in DEF-21, which govern certificate evaluation rather than solver inference.

Contextual variable. As used herein, a "contextual variable" refers to a condition relevant to determining an execution control action, routing decision, or operational status. In some embodiments, contextual variables include device-derived states (e.g., physical state), environmental conditions, connectivity conditions, application state, user session state, or task state. Contextual variables may be generated using sensors, device telemetry, or inferred states, and may be encoded as event nodes in the representation graph $G_R$ as defined in DEF-27.

Physical state. As used herein, a "physical state" refers to a device condition derived from sensor data and indicative of how a device is being used or what environment it is operating in. Non-limiting examples include movement state, orientation state, proximity state, ambient noise level, ambient light level, power/battery state, thermal state, connectivity stability, or input modality availability. In some embodiments, the physical state is encoded as contextual input data and evaluated by the compatibility certification system to determine appropriate execution control actions.

Sensor. As used herein, a "sensor" refers to a hardware component configured to detect a physical phenomenon and produce sensor data. Examples include an accelerometer, gyroscope, GPS receiver, camera, microphone, proximity sensor, ambient light sensor, temperature sensor, biometric sensor, battery monitor, or network signal monitor. In some embodiments, sensor outputs contribute to low-level modal sources evaluated by the compatibility score $\kappa_L$ as defined in DEF-13.

Sensor data. As used herein, "sensor data" refers to measurements generated by one or more sensors, which may be raw readings, filtered readings, derived features, or classified states. Sensor data may be included in contextual input data, as defined in DEF-01, and encoded as event nodes carrying modality tags, as defined in DEF-47, for evaluation by the geometric compatibility morphism.

External system. As used herein, an "external system" refers to a computing system that receives the structured compatibility certificate and performs downstream processing of contextual inputs or that provides contextual input data to the compatibility certification system. Examples include a server, cloud service, enterprise application, workflow engine, call routing system, transaction processing system, search system, monitoring system, AI inference service, robotic controller, or industrial control system. In some embodiments, the external system uses the structured compatibility certificate as enforcement data to govern how the external system processes the contextual input data, including routing, throttling, scheduling, or rejection decisions.

Improving functionality. As used herein, "improving functionality" of an external system refers to producing a technical effect in the operation of the external system, such as reducing processor utilization, reducing memory utilization, reducing bandwidth usage, reducing latency, reducing error rate, improving routing accuracy, preventing execution of failure-prone processing caused by incompatible input, and/or avoiding computational waste associated with processing low-quality or geometrically misaligned representations. In some embodiments, such improvement is achieved by conditioning execution control actions on the structured compatibility certificate prior to solver invocation, thereby blocking failures before execution begins rather than detecting them from degraded outputs after execution completes.

Claim Construction—"Comprising" and "Consisting." Unless otherwise specified, "comprising" is open-ended and permits additional elements; "consisting of" is closed and excludes additional elements; "consisting essentially of" permits elements that do not materially affect the basic and novel characteristics of the claimed subject matter.

Singular and Plural Forms. Unless context clearly requires otherwise, singular terms include plural referents and plural terms include singular referents. "A," "an," and "the" include plural referents unless context clearly dictates otherwise.

Quantifier Terms. "At least one" means one or more. "One or more" means one or any integer greater than one. "Plurality" means two or more. "Each" when modifying a plural noun means every member of the set without exception.

Coupling Terms. "Communicatively coupled" means connected in a manner that permits transmission of data, signals, or information, whether via direct physical connection, wireless link, network connection, or intermediate component. "Operably coupled" means connected in a manner that permits cooperative functioning. Neither term requires direct physical contact.

Capability Terms. "Configured to" means designed, arranged, or programmed to perform a specified function; it does not require that the function be performed at all times or under all conditions. "Operable to" means capable of performing a function when placed in operative condition.

Approximation Terms. "Substantially," "approximately," and "about" mean within acceptable engineering tolerances for the relevant context, which may vary by domain. In the absence of other indication, "approximately" permits deviation of up to ten percent from a stated value.

Logical Connectives. "And/or" means any one, any combination, or all of the listed elements. "Or" is inclusive unless context clearly indicates exclusivity.

Method Step Ordering. Unless explicitly stated, recitation of method steps in a particular order does not require performance in that order; steps may be performed in any technically feasible sequence unless a dependency is specified.

Module. A "module" refers to hardware, software, firmware, or any combination thereof configured to perform a specified function. A software module may execute on a general-purpose processor, a dedicated processor, or a distributed computing environment.

Non-transitory Computer-Readable Medium. A "non-transitory computer-readable medium" includes any tangible medium capable of storing instructions executable by a processor, including semiconductor memory (RAM, ROM, EEPROM, flash), magnetic storage (hard disk, tape), optical storage (CD, DVD, Blu-ray), solid-state drives, and network-attached or cloud-accessible storage. The term excludes transitory signals per se but does not exclude volatile storage during execution.

Memory. "Memory" refers to any device or medium capable of storing data or instructions, including volatile memory (e.g., RAM), non-volatile memory (e.g., ROM, flash, EEPROM), magnetic storage, optical storage, and remote or distributed storage accessible via a network.

Real-Time and Temporal Terms. "Real-time" means with latency sufficiently low that the result is usable for its intended purpose without unacceptable delay, which varies by application domain. "Prior to" means before in temporal sequence. "During" means within the temporal extent of. "Upon" means immediately following or in response to.

Exemplary Language. "For example," "such as," "including," "e.g.," and similar phrases introduce non-limiting examples and do not restrict the scope of the preceding term to the enumerated examples.

"Based at least in part on." "Based at least in part on" means that the referenced factor is one input among potentially many; it does not require that the factor be the sole or primary determinant.

Headings. Section headings are for convenience only and do not limit interpretation of the claims or specification.

Incorporation of Variations. The disclosed embodiments are illustrative and not limiting. Variations, modifications, and equivalents apparent to those skilled in the art are within the scope of the claims. Reference to "the invention" or "this invention" refers to the subject matter of the claims and does not imply limitation to any particular embodiment.

Overview of the Invention follows. Industrial Applicability follows the Overview. Embodiments section follows Industrial Applicability. Detailed Description of the Drawings begins after the Embodiments section. Figure numbers FIG. 1 through FIG. 37.

Overview

[OV-01] The present disclosure provides computer-implemented methods, systems, and hardware-accelerated architectures for structured compatibility certification and execution control in one or more external systems. The disclosed architecture computes a representation-solver compatibility functional (DEF-03) that quantifies structural alignment between a contextual representation and a specific downstream solver, model, or execution process; projects that functional into a structured compatibility certificate (DEF-08) comprising three mutually exclusive, semantically-distinct components constrained by a normalization invariant; evaluates the certificate prior to solver invocation (DEF-10); and determines an execution control action (DEF-11) that governs whether, when, and how the downstream solver is permitted to execute. The architecture addresses a structural deficiency in conventional computing systems: the absence of any mechanism to evaluate, prior to execution, whether a given contextual representation is structurally compatible with the specific downstream process that will consume it. Existing approaches either assume that the representation is adequate and proceed directly to execution, or detect incompatibility only after execution has already occurred, when degraded outputs, cascading failures, or unsafe actions surface the problem. The disclosed architecture replaces this open-loop pattern with a closed-loop system operating across digital processors, neuromorphic circuits, analog computing arrays, multi-agent environments, and hybrid quantum-classical substrates, using a single certificate structure that is invariant across computational substrates.

[OV-02] The following overview first identifies the technical problems addressed by the present disclosure and illustrates their manifestation across industrial application domains. The overview then describes the architecture in detail, proceeding through six functional blocks in the order established by the claims: the core certificate and its generation from a compatibility functional (Block 1); the two architecturally distinct signal paths that produce the certificate's enforcement operands and the simplex projection mechanism that guarantees the normalization invariant (Block 2); the multi-consumer architecture, typed collapse domains, enforcement-data principle, observational mode, and cryptographic binding that govern how the certificate is consumed and verified (Block 3); the sequential four-gate gatekeeper, the dynamic admissibility threshold, the graph transformation operators, the morph repair and agent handoff cycles, and the anti-MARL shield that together implement pre-execution enforcement and multi-agent coordination (Block 4); the dual-graph representation comprising a representation graph and a solver graph connected by a surjective geometric compatibility morphism (Block 5); and the hardware substrate extensions including oracle-free substrate health signaling, gating circuits, and zero-knowledge proof mechanisms (Block 6). Terms used in this overview are defined in the preceding Definitions section and are referenced by their definition numbers (DEF-01 through DEF-33) where first introduced.

[OV-03] Technical Problems Addressed. The Background section addresses the following interrelated deficiencies in prior art: post-hoc-only detection; single-scalar conflation that loses the distinction between superfluous and noise; out-of-distribution blindness; absence of a shared compatibility signal across heterogeneous consumers; uncontrolled propagation of sensitive representations; non-determinism and opacity introduced by multi-agent reinforcement learning; phantom certification in multi-agent handoffs; unordered gates with no termination guarantee; inability to detect analog substrate degradation from data alone; lack of an observational mode for regulatory compliance; and absence of cryptographic binding for third-party attestation. The Background further traces five convergent intellectual traditions-statistical, computational, dynamical-systems, representation-learning, and neuromorphic-whose independent axes are structurally independent, explaining why no prior framework combining fewer than all three certification axes can distinguish the operationally distinct failure states that arise in practice. The present overview describes how the disclosed architecture resolves each of these deficiencies. The following paragraph illustrates how these problems manifest concretely in industrial deployment domains.

[OV-04] Industrial Applicability. The technical problems enumerated above manifest concretely across deployment domains including financial services compliance (anti-money laundering transaction monitoring, credit loss reserve estimation), retrieval-augmented generation pipelines, autonomous systems and sensor fusion, healthcare and clinical decision support, industrial IoT and predictive maintenance, quantum computing and hybrid quantum-classical pipelines, and edge and hardware-accelerated substrates. The Industrial Applicability section following this overview describes each domain in detail, showing how the structured compatibility certificate, the four-gate gatekeeper, the typed collapse domain classification, and the dual-graph coordination architecture operate in domain-specific certificate traces.

[OV-05] The Compatibility Functional and Its Solver-Relative Character. The architecture begins with a contextual representation (DEF-01) received via a communication device: an embedding, feature vector, symbolic encoding, structured record, sensor reading, or any other encoding of contextual information that a downstream process will consume. At least one downstream solver, model, or execution process (DEF-02) configured to operate on the representation is identified. A processing device then computes the representation-solver compatibility functional $\kappa(E,S;P)$ (DEF-03), which quantifies the structural alignment between characteristics of the representation E and operational characteristics of the downstream solver S, given a task context P. The compatibility functional is a joint property of the representation-solver pair: it is not a measure of the representation's intrinsic quality in isolation, nor of the solver's internal performance. Because the functional is solver-relative, the same contextual representation may yield different compatibility evaluations when assessed against different downstream solvers. This solver-relativity is not an incidental property; it is the architectural foundation on which every subsequent certificate component, evaluation gate, and enforcement action depends.

[OV-06] Decomposition into Three Semantically-Distinct Components. The compatibility functional is projected into a machine-readable structured compatibility certificate (DEF-08) comprising three mutually exclusive, semantically-distinct components constrained by a normalization invariant (DEF-07) enforcing that the sum of the three components equals a fixed aggregate value. The three components are: a relevance component R (DEF-04) representing alignment between features of the representation and the operational structure of the downstream solver; a superfluous component S_sup (DEF-05) representing structured information present in the representation but not contributing to solver alignment; and a noise component N (DEF-06) representing destabilizing or unstructured variance that undermines solver reliability. Each component is defined relative to a specific solver: information that is relevant to one solver may be superfluous or noise when evaluated against a different solver. The normalization invariant $R+S\_sup+N=C$ (where C is the fixed aggregate value, C=1 in the embodiments described herein) is enforced at each computation of the three components, not applied as a post-hoc scaling correction. This enforcement guarantees that the three components are mutually exclusive and collectively exhaustive partitions of the compatibility functional, enabling the derivation of bounded metrics and the direct comparison of component magnitudes for typed collapse domain classification.

[OV-07] Derived Compatibility Metrics. From the three-component decomposition, the system computes at least one derived compatibility metric (DEF-09) based on relationships among the three components. Derived metrics include but are not limited to: the quality metric $\alpha=R/(R+N)$(DEF-12), which quantifies the proportion of non-noise content that is relevant to the downstream solver, excluding the superfluous component from the denominator because superfluous content does not corrupt the information channel between the representation and the solver; the reliability coefficient $\omega$(DEF-15), which quantifies the distributional reliability of the quality estimate and enables detection of out-of-distribution inputs without labeled validation data;

the reliability-adjusted quality metric $\alpha\_\omega=\omega\cdot\alpha+(1-\omega)\cdot\alpha\_base$, which modulates the quality metric by distributional confidence; the execution compatibility score κ_gate (DEF-13), which independently quantifies geometric alignment between the representation and the solver in a shared latent space; the turbulence metric σ (DEF-23), which quantifies the dispersion of compatibility scores across modal sources; and the phasor coherence metric c (DEF-22), which measures structural coherence among component-level evaluations. These derived metrics do not require access to the downstream solver's internal parameters, weights, or architecture. They are computed entirely from the certificate components and from the geometric relationship between the representation and the solver in the shared latent space.

[OV-08] Pre-Execution Evaluation and Execution Control Actions. The structured compatibility certificate is evaluated prior to invocation or execution of the downstream solver (DEF-10). Pre-execution evaluation is architecturally distinct from post-hoc evaluation: the execution control action is determined from the certificate before the solver runs, not inferred from the solver's outputs after it completes. Based at least in part on the certificate, the system determines and causes implementation of an execution control action (DEF-11). The execution control action conditions solver invocation, instruction issuance, resource allocation, routing to an alternative solver, substitution of a different solver, throttling of execution rate, parameter configuration, deferral of execution, or execution rejection within the one or more external systems. By governing execution from the certificate rather than from downstream performance signals, the architecture eliminates the latency, resource waste, and cascading failure risk inherent in post-execution detection of incompatibility.

[OV-09] Two Architecturally Distinct Signal Paths. The structured compatibility certificate comprises signals produced by two architecturally distinct signal paths. A first signal path performs semantic decomposition: it projects the compatibility functional into the three mutually exclusive components (R, S_sup, N) and derives the quality metric α (DEF-12) from the decomposition. A second signal path performs compatibility assessment: it independently computes the compatibility score κ_gate (DEF-13) quantifying geometric alignment between the representation and the downstream solver in a shared latent space, based on at least one of normalized similarity between embeddings of the representation and embeddings of the solver, structural alignment measures, solver descriptor compatibility, or difficulty proxies associated with the representation-solver pair. The two signal paths have architecturally distinct provenance: the quality metric is derived from decomposition of the representation, while the compatibility score is derived from the geometric relationship between the representation and the specific downstream solver. The distinction is structural, not merely parametric: the two paths operate on different data, perform different computations, and produce different types of information.

[OV-10] The Conjunction as Minimal Sufficient Condition. The two architecturally distinct signal paths converge through conjunction to produce typed execution control (DEF-14) that neither signal path alone provides. The conjunction α^κ_gate enables the system to distinguish four operationally distinct states that no single-scalar or two-axis framework can recover. First, when α is high and κ_gate is high, the certificate indicates healthy operation. Second, when α is high and κ_gate is low, the certificate indicates a hallucination-risk condition: measured quality is high but geometric alignment is poor, signaling solver mismatch. Third, when α is low and κ_gate is high, the certificate indicates a targeted-corruption condition: measured quality is poor despite apparent structural alignment, signaling adversarial attack or data corruption. Fourth, when α is low and κ_gate is low, the certificate indicates systemic degradation. The quality metric alone cannot distinguish hallucination-risk from healthy operation, because both present as high quality. The compatibility score alone cannot distinguish targeted corruption from systemic drift, because both present as low quality. The conjunction is therefore the minimal sufficient condition for typed execution control: removing either operand collapses at least two operationally distinct failure modes into indistinguishable states.

[OV-11] Simplex Projection and the Reliability Coefficient. The projection of the compatibility functional into the three components is performed through a plurality of learned weight matrices using differentiable simplex projection operators that enforce the normalization invariant at each computation. Rather than producing raw component estimates and applying a post-hoc normalization step, the simplex projection operators guarantee by construction that the output lies on the probability simplex satisfying R+S_sup+N=C at every forward computation. A reliability coefficient ω(DEF-15) is computed from the latent variance associated with the projection: as the input representation shifts away from the distribution over which the projection was calibrated, latent variance increases and ω decreases, indicating lower confidence in the quality estimate. The reliability coefficient monotonically increases as latent variance decreases and monotonically decreases as latent variance increases, thereby providing a continuous, bounded signal for out-of-distribution detection without requiring labeled validation data or oracle access to optimal outputs. The reliability coefficient modulates the quality metric into the reliability-adjusted quality metric $\alpha\_\omega=\omega\cdot\alpha+(1-\omega)\cdot\alpha\_base$, where a base is a fixed robustness fallback.

[OV-12] Multi-Consumer Certificate Architecture. The structured compatibility certificate is designed to serve a plurality of independent consumer roles (DEF-16) from a single shared certificate. An authorization role reads the conjunction of the quality metric α and the compatibility score κ_gate to determine execution decisions, including proceeding with standard execution, rejecting incompatible inputs, rerouting to alternative solvers, or modulating solver parameters. An interpretation role reads the relationships among the three components (R, S_sup, N) to classify the operational state into typed collapse domains (DEF-17), providing diagnostic labels without requiring centralized command logic. A confirmation role reads stability metrics derived from temporal trajectory analysis to validate that system dynamics remain within an admissible operating region. Each consumer role independently determines execution actions according to its own domain requirements, safety policies, and operational constraints. The consumer roles do not coordinate with one another and do not share execution state; each independently reads the fields of the certificate that are relevant to its function and independently applies its own enforcement policy (DEF-18).

[OV-13] Typed Collapse Domains and Differentiated Remediation. The structured compatibility certificate is classified into one of a plurality of typed collapse domains (DEF-17) based on comparative relationships among the three components. Each typed collapse domain corresponds to a predefined enforcement policy (DEF-18) and maps to a distinct remediation action. At least a subset of the typed collapse domains is determined by component ordering and relative magnitudes: when N dominates R, the domain indicates noise contamination; when S_sup dominates both R and N, the domain indicates representational bloat; when R dominates but κ_gate is low, the domain indicates format mismatch. This ordering-based classification enables automated detection of distinct failure modes without requiring exhaustive threshold tuning for each failure mode. Each typed collapse domain maps to a distinct remediation action including at least re-encoding the representation, routing to an alternative solver, requesting verification from a human or automated verifier, or rejection of the input entirely. This differentiated remediation replaces the binary accept/reject decisions of conventional threshold systems with targeted responses tailored to the specific form of contextual degradation.

[OV-14] Enforcement Data and Observational Mode. The structured compatibility certificate is architecturally configured as enforcement data (DEF-19) rather than as a command. The certificate carries a factual characterization of the compatibility relationship between a specific representation and a specific solver at a specific point in time. Downstream consumers independently interpret the certificate and determine execution actions according to their own domain requirements without centralized orchestration. The enforcement-data architecture decouples certificate production from certificate consumption, enabling heterogeneous consumers across different computational substrates, trust boundaries, and organizational domains to apply different enforcement policies to the same certificate. The system is further operable in an observational mode (DEF-20) wherein structured compatibility certificates are generated, fully evaluated, and logged without altering the execution behavior of the downstream solver. Observational mode enables audit trail construction, threshold sensitivity testing, and regulatory compliance documentation without introducing operational risk to live systems. An operator may deploy the system in observational mode during an initial assessment period, review the distribution of certificate values and enforcement decisions, calibrate thresholds to the operating environment, and transition to active enforcement only after empirical confidence in the certificate's discriminative power has been established.

[OV-15] Cryptographic Binding, Invariant Specification, and Tamper Detection. The structured compatibility certificate is cryptographically bound to the contextual input and to an invariant specification (DEF-21) defining domain constraints, quality thresholds, encoder configuration parameters, and validation rules. The binding ensures that the integrity and origin of the certificate are independently verifiable by a third party without requiring disclosure of internal parameters, weights, or proprietary logic of the downstream solver. Tamper detection is performed automatically upon certificate instantiation: the system re-computes a cryptographic hash of the serialized invariant specification and compares it with a stored hash value. If the recomputed hash does not match the stored value, the certificate is flagged as potentially tampered and may be rejected, logged, or escalated depending on the applicable enforcement policy. This mechanism enables third-party auditors and regulatory bodies to verify that a compatibility assessment was generated under the constraints claimed by the certificate producer, without requiring the producer to expose proprietary model internals, thereby preserving intellectual property while satisfying attestation requirements.

[OV-16] The Sequential Four-Gate Gatekeeper. The pre-execution evaluation of the structured compatibility certificate is implemented as a sequential four-gate gatekeeper evaluated in a fixed order that constitutes a correctness guarantee under adversarial conditions. The gates are not independent filters that may be applied in any order or selectively omitted; they form a sequential pipeline in which each gate catches a failure mode that the preceding gates cannot see, and no subsequent gate may execute on input that a preceding gate would have rejected.

Gate 1, the integrity guard, issues a reject decision when the noise component N of the certificate meets or exceeds a noise threshold (default N>=0.5). This gate enforces an information-theoretic condition: when noise dominates the representation to this degree, Fano's inequality establishes that no solver, regardless of capacity, can recover correct inference from the encoding. The reject decision is absolute; no downstream gate, morph operator, or remediation action can override it.

Gate 2, the consensus gate, issues a block decision when the phasor coherence metric c (DEF-22) falls below α coherence threshold (default c<0.4). This gate detects structural incoherence among sub-model or sub-modal interpretations of the representation—a condition that may exist even when average quality metrics appear satisfactory. The block decision is issued independently of average quality.

Gate 3, the admissibility gate, issues a re-encode decision when the compatibility score κ_gate fails to satisfy a dynamic admissibility threshold κ_req(σ)(DEF-24). The dynamic threshold is computed as a monotonically increasing function of the turbulence metric σ (DEF-23): κ_req(σ) =κ_base+λ·σ, with defaults κ_base=0.5 and λ=0.4. This Oobleck behavior-named by analogy to the non-Newtonian viscosity of shear-thickening fluids-requires the encoding to be more compatible, not equally compatible, to pass under conditions of elevated turbulence. A hard turbulence barrier at σ>σ_thr(default σ_thr=0.5) forces a re-encode decision regardless of κ_gate, because the encoding lies outside the admissible region by definition. A Landauer tolerance buffer [κ_req−ε_L, κ_req) with ε_L=0.05 prevents false rejections from measurement noise; within this gray zone, the turbulence metric serves as a deterministic tie-breaker between re-encoding and cautious execution.

Gate 4, the grounding gate, issues a repair decision when a low-level modal compatibility metric κ_L falls below α grounding threshold (default κ_L<0.3). This gate detects physically ungrounded signal quality for multimodal or sensor-derived inputs: a representation may pass all prior gates while being ungrounded in the physical modalities that provide the evidence base for the solver's task.

[OV-17] Fixed Gate Order as a Correctness Guarantee. The four gates are evaluated in the fixed sequential order described above, and this order may not be rearranged, made optional, evaluated concurrently, or partially ordered. The fixed ordering is not an efficiency preference; it is a correctness guarantee under adversarial conditions. Executing Gate 3 before Gate 1, for example, would permit an adversarially crafted encoding to produce arbitrarily high κ_gate estimates on noise-saturated input, because noise saturation can inflate geometric alignment measures. Executing Gate 2 before Gate 1 would allow consensus-failure decisions on input that should have been rejected outright. The sequential constraint ensures that each gate operates only on input that has already been cleared by every preceding gate. Each non-execute gate decision triggers exactly one graph transformation operator (DEF-25) that modifies the representation graph, the solver graph, or both, with each operator moving exactly one certificate scalar in exactly one direction, guaranteeing that the morph repair cycle terminates rather than oscillates.

[OV-18] Graph Transformation Operators and the Morph Repair Cycle. When the gatekeeper returns a non-execute decision, the system enters a morph repair cycle that applies the graph transformation operator (DEF-25) corresponding to the triggered gate. Four operators are available: a pruning morph triggered by Gate 1 reject decisions, which deactivates event nodes whose noise component exceeds a threshold, thereby lowering the global noise component; a verification morph triggered by Gate 2 block decisions, which inserts a verifier agent node into the solver graph and adds projection child event nodes in the representation graph for high-turbulence nodes, thereby raising consensus coherence above the minimum threshold; an ensemble morph triggered by Gate 3 re-encode decisions, which adds solver variant agent nodes with an aggregator and normalization child event nodes, thereby raising κ_gate and lowering σ jointly; and an event expansion morph triggered by Gate 4 repair decisions, which adds higher-quality modal event nodes as children of ungrounded nodes, checking the projected global noise before each insertion to avoid triggering Gate 1, thereby raising κ_L above the grounding threshold. After each graph transformation, the global structured compatibility certificate is re-derived from the modified graphs and the gate conditions are re-evaluated. The cycle continues until all gate conditions are satisfied and an execute decision is returned, or until no further graph transformation is structurally possible. Upon cycle termination, a committed audit log entry is generated.

[OV-19] Termination Guarantee and Surjectivity Starvation. Termination of the morph repair cycle is guaranteed by a structural property of the graph transformation operators: each operator moves exactly one certificate scalar in exactly one direction. A pruning morph lowers the global noise component; a verification morph raises coherence; an ensemble morph raises κ_gate and lowers σ jointly; an event expansion morph raises κ_L. No operator degrades a certificate scalar that was already satisfying its gate condition. If a certificate deficit is not structurally repairable—for example, when no event node in the representation graph carries a noise component exceeding the pruning threshold and no further graph transformation is possible—the system detects this surjectivity starvation condition and halts the cycle with a committed audit log entry rather than cycling indefinitely. The termination guarantee is a structural invariant of the operator design, not a timeout or iteration limit.

[OV-20] Agent Handoff Cycle and Phantom Certification Elimination. When the gatekeeper returns an execute decision, the system enters an agent handoff cycle that coordinates multi-agent execution through deterministic certificate exchange. The cycle operates in two directions. In a first direction, each contextual input or intermediate agent output is encoded as an event node carrying a locally-derived structured compatibility certificate derived from the actual content of that input or output—not from static initialization values or default task descriptions. In a second direction, the implementation function associated with the certified agent node is invoked, the real output produced by the agent is received, and that output is re-encoded as a new event node for the first direction. The re-encoding ensures that each subsequent agent in the pipeline is certified against the actual intermediate state of the system rather than against a phantom initialization state (DEF-26). Phantom certification—in which an agent is authorized to execute on the basis of a compatibility assessment performed against initialization data that does not reflect the actual content the agent will process—is thereby structurally eliminated. The agent handoff cycle and the morph repair cycle are mutually exclusive in their triggering conditions, perform distinct functions, and operate on different certificate states.

[OV-21] Deterministic Runtime and Anti-MARL Shield. The entire runtime execution architecture—including the four-gate gatekeeper, the morph repair cycle, the agent handoff cycle, and the geometric compatibility morphism-operates deterministically without test-time reinforcement learning, runtime policy optimization, multi-agent reinforcement learning (MARL), or any form of adaptive weight updates during live operation. Embeddings used for compatibility assessment are fixed and pre-computed from pre-trained encoders prior to deployment. Routing and delegation decisions are computed algebraically from the geometric structural alignment measures captured by the compatibility morphism, not from learned reward signals or policy networks. Solver contracts and agent characterizations within the solver graph are maintained as immutable during runtime execution: the solver graph is not modified by any adaptive process during live operation. Graph transformation operators (DEF-25) provide structural adaptation—adding, removing, or rewiring nodes in the representation graph or solver graph—but this adaptation is topological, not parametric: no operator modifies neural network weights, learns policies, computes gradients, or performs any form of runtime optimization.

This deterministic guarantee extends to hardware substrate embodiments. In analog memristor crossbar deployments, all functional roles that involve write operations-including conductance-based adaptive weight storage, temperature-modulated plasticity gating, elastic weight consolidation for catastrophic-forgetting reduction, and write-endurance optimization-operate exclusively during offline training and are architecturally prohibited from executing during the runtime phase governed by the four-gate gatekeeper. Only read operations on the memristor crossbar array (matrix-vector multiply for R/S_sup/N projection and feature extraction) occur at runtime; the crossbar conductance state is frozen prior to deployment. The gating circuit (DEF-32) evaluates the certificate against threshold parameters that are fixed prior to deployment and not modified by any runtime adaptive process. The oracle-free substrate health signal (DEF-31) is derived from the certificate's noise component at runtime without any weight updates or analog write operations.

This deterministic architecture constitutes an anti-MARL shield that ensures all coordination decisions-whether implemented in software, in a hardware gating circuit, or on an analog memristor substrate—are reproducible by inspection, auditable by a third party, and free from the non-determinism, training instability, and opacity that characterize runtime policy optimization in safety-critical or regulated environments.

[OV-22] Dual-Graph Representation and Geometric Compatibility Morphism. The multi-agent coordination architecture operates on a dual-graph representation. A representation graph G_R(DEF-27) is a directed graph whose nodes are event nodes, each carrying a locally-derived structured compatibility certificate that reflects the content and compatibility characteristics of a specific contextual input or intermediate agent output. A solver graph G_S (DEF-28) is a directed graph whose nodes are agent nodes, each carrying a structured representation of the solver's operational characteristics and a solver contract specifying the compatibility thresholds and constraints applicable to that solver. A geometric compatibility morphism φ: G_R→G_S (DEF-29) maps each task-bearing event node in the representation graph to the capability-bearing agent node in the solver graph exhibiting maximum compatibility under a structural alignment measure computed from the respective representation and solver characterizations. The morphism is computed deterministically from fixed characterizations without updating model parameters or learning policies at runtime. The pairwise compatibility scores produced by the morphism are the values from which κ_gate (via minimum aggregation), κ_int (the minimum cross-modal alignment score), and σ (the standard deviation) are derived. The morphism is surjective (DEF-30): every agent node in G_S must be reachable by at least one event node in G_R. Any agent node that is unreachable receives a forced certificate whose noise component is set to a value that triggers a Gate 1 reject decision, preventing that agent from executing and flagging the routing failure explicitly rather than allowing it to occur silently. This surjectivity enforcement ensures that the system cannot silently route tasks to solvers that have no grounding in the current representation graph.

[OV-23] Oracle-Free Substrate Health Signaling and Gating Circuits. In analog or memristor crossbar substrate embodiments, the noise component N of the structured compatibility certificate operationalizes the thermodynamic non-idealities of the physical substrate-including conductance drift, thermal fluctuations, and read noise—as they manifest in the statistical properties of the computed representation. This operationalization transforms N into an oracle-free substrate health signal (DEF-31) that is detectable from data distribution patterns alone, without external diagnostic hardware, periodic offline calibration, or ground-truth labels. The oracle-free character of the signal arises because substrate degradation alters the noise distribution of the computed representation in a manner captured by the certificate's noise component. A gating circuit (DEF-32) communicatively coupled to the memory storing the structured compatibility certificate evaluates one or more fields of the certificate against stored threshold parameters and, prior to task execution, conditionally enables or disables instruction issuance, memory access, solver invocation, execution pathway activation, or hardware resource allocation. The gating circuit implements pre-execution enforcement at the hardware level, providing circuit-speed control that protects the physical substrate from malicious or architecturally misaligned inputs before computational resources are committed.

[OV-24] Zero-Knowledge Proof over Physical Substrate State. Hardware-accelerated embodiments further include a zero-knowledge proof mechanism (DEF-33) configured to generate a proof over the physical substrate state at certificate generation time. The proof enables a downstream component or third-party auditor to verify that the structured compatibility certificate was derived from a valid physical substrate state-without accessing substrate parameters, weight values, or internal certificate derivation logic—in time that is independent of model size with respect to certificate length. The proof is cryptographically bound to the physical substrate state rather than to a software assertion, ensuring that the attestation reflects actual hardware conditions rather than a software claim about those conditions. This mechanism addresses the attestation gap identified in the Background: downstream consumers and auditors currently have no way to verify that a compatibility assessment was generated from a physically valid substrate state without the system owner exposing proprietary internals. The zero-knowledge proof closes this gap while preserving intellectual property on both sides of the trust boundary.

Industrial Applicability section (IA-01 through IA-11) follows. Embodiments section (E001 through E041) follows the Industrial Applicability section. Detailed Description of the Drawings follows the Embodiments section. FIGURE numbers FIG. 1 through FIG. 37.

INDUSTRIAL APPLICABILITY

[IA-01] The architecture described in the foregoing Overview operates across a range of industrial deployment domains. The following paragraphs illustrate how the structured compatibility certificate, the sequential four-gate gatekeeper, the typed collapse domain classification, the morph repair and agent handoff cycles, and the dual-graph coordination architecture apply to representative domains. In each case, the certificate provides the same three-axis diagnostic (α, κ_gate, σ) while the typed collapse domain, the predefined enforcement policy, and the consumer role are domain-specific. These illustrations are non-limiting: the architecture applies to any domain in which a contextual representation is consumed by a downstream solver, model, or execution process, and in which pre-execution evaluation of structural compatibility would improve functional reliability, coordinated operation, resource efficiency, or operational safety.

[IA-02] Anti-Money Laundering (AML) Transaction Monitoring. In financial services compliance, anti-money-laundering pipelines process corporate transaction networks through graph neural network solvers. When entity resolution partially fails, spurious cross-entity edges corrupt the representation graph, producing a contextual representation whose noise component N dominates. In a representative certificate trace, the representation yields R=0.30, Ssup=0.15, N=0.55, giving α=R/(R+N)=0.353. Despite downstream compatibility scores that appear adequate (κ_H=0.78, κ_L=0.65, κ_int=0.71, yielding κ_gate=0.65) and turbulence within bounds (σ=0.38), Gate 1 issues a reject decision because N=0.55≥0.50: Fano's inequality establishes that no solver, regardless of capacity, can recover correct inference from a noise-saturated encoding. Without Gate 1, the encoding would reach Gate 3, where the dynamic admissibility threshold κ_req(0.38)=0.652 would place κ_gate=0.65 in the Landauer tolerance buffer and the gray-zone tie-breaker (σ=0.38<0.40) would pass the encoding. The graph neural network would then execute on a fabricated topology, producing false alerts or missing true positives. The Gate 1 reject decision triggers a pruning morph that deactivates event nodes with elevated noise, lowering the global noise component before the solver is permitted to execute. The gatekeeper's audit log entry-comprising α, ω, α_ω, κ_gate, σ, the gate reached, and the outcome with timestamp-directly satisfies SR 11-7 § 4(c) requirements for data quality documentation, sensitivity analysis, and time-stamped model override decisions.

[IA-03] Current Expected Credit Loss (CECL) Reserve Estimation. CECL reserve pipelines process commercial real-estate loan cohorts under macroeconomic stress scenarios. During periods of rapidly rising interest rates, the macro scenario approaches the validated distribution boundary, degrading distributional reliability ω. In a representative trace, the representation yields α=0.878, ω=0.55 (indicating the scenario is near the boundary), κ_gate=0.74, and σ=0.54. Gates 1 and 2 pass. At Gate 3, the hard turbulence barrier fires: σ=0.54>σ_thr=0.50, and the system issues a re-encode decision because the encoding lies outside the admissible region by definition. If σ were lower—for example, σ=0.44—the hard barrier would pass, the dynamic threshold would compute $\kappa$_req(0.44)=0.676, and $\kappa$_gate=0.74 would clear Gate 3 outright. The re-encode decision triggers an ensemble morph that adds solver variant agent nodes and normalization child event nodes, raising $\kappa$ gate and lowering $\sigma$ jointly before the CECL solver executes. The re-encode decision is sensitive to the combination of marginal compatibility and elevated turbulence-precisely the behavior the dynamic admissibility threshold is designed to enforce under distributional stress. The certificate audit trail provides the back-testing record required by prudential regulators under SR 11-7: the empirical distribution of ($\kappa$_gate, c) over time constitutes a quantitative basis for model recalibration triggers that does not rely on post-hoc output review. When a re-encode decision is issued, the diagnostic simplex decomposes the compatibility gap (1-$\kappa$_gate) into three root-cause coordinates-$\kappa$_A (algorithmic alignment), $\kappa$_E (encoding efficiency), and $\kappa$_T (search tractability)-enabling model risk managers to determine whether remediation should target the solver architecture, the representation policy, or the problem formulation itself. See FIG. 30.

[IA-04] Retrieval-Augmented Generation (RAG) Pipelines. In retrieval-augmented generation pipelines, a language model receives retrieved documents as contextual input before generating a response. When retrieved documents are irrelevant, outdated, or adversarially contaminated, the language model may produce plausible-sounding but factually incorrect output—the hallucination failure mode. Under the present architecture, each retrieved document is encoded as an event node in the representation graph and evaluated against the language model's agent node in the solver graph via the geometric compatibility morphism. The conjunction $\alpha$^$\kappa$_gate distinguishes two failure modes that are indistinguishable under any single-scalar confidence framework. In the hallucination-risk condition, the quality metric $\alpha$ is high (the retrieved content is internally coherent and appears well-formed) but $\kappa$_gate is low (the content is geometrically misaligned with the language model's operational structure for the given query): the certificate's typed collapse domain classification identifies this as a format-mismatch state and the predefined enforcement policy triggers a re-encode or reroute action—the retrieval query is reformulated or the input is routed to a different solver better aligned with the retrieved content-before the language model consumes the representation. In the targeted-corruption condition, $\alpha$ is low (the retrieved content contains adversarial noise or poisoned passages) but $\kappa$_gate is high (the corrupted content is structurally well-aligned with the model's expected input format): the typed collapse domain identifies this as a targeted-poisoning state and the enforcement policy triggers a reject or verification action. The quality metric alone cannot distinguish hallucination-risk from healthy operation (both appear as high quality), and the compatibility score alone cannot distinguish targeted corruption from systemic drift (both appear as low quality). In a multi-agent RAG pipeline comprising a retriever agent, a reranker agent, and a generator agent, the agent handoff cycle ensures that each agent's output is re-encoded as a new event node carrying a freshly-derived certificate reflecting the actual intermediate content—not the static query that initiated the pipeline-so that the generator is certified against what the reranker actually produced, eliminating phantom certification. The sixteen-type collapse domain taxonomy organizes these failure modes into four groups based on the certificate axis that triggers detection: encoding collapses (Group 1, Gate 1) including noise saturation and format mismatch; solver dynamics collapses (Group 2, Gate 3) including trajectory divergence and gradient starvation; semantic collapses (Group 3, Gates 2 and 4) including fluent hallucination and phasor conflict; and execution collapses (Group 4, Gates 3 and 4) including weakest-link cascade and cross-modal desync. Each typed collapse maps to a specific remediation pathway, enabling the enforcement policy to route failures to appropriate morph operators rather than applying uniform rejection. See FIGS. 20 and 37.

[IA-05] Autonomous Systems and Sensor Fusion. In autonomous systems-including warehouse robots, autonomous vehicles, and mobile manipulators—the downstream solver consumes fused representations from multiple sensor modalities: LIDAR, camera, ultrasonic, inertial measurement units, and structured telemetry. Each sensor produces an embedding that is encoded as a separate event node in the representation graph, carrying a locally-derived structured compatibility certificate. The execution compatibility score $\kappa$_gate=min ($\kappa$_H, $\kappa$_L, $\kappa$_int) aggregates across modalities via the weakest-link rule: if any single sensor's compatibility with the motion planning solver falls below the threshold, $\kappa$_gate reflects that failure regardless of how well the other sensors perform. A camera exhibiting out-of-distribution readings (low $\omega$) while producing internally coherent images (high $\alpha$) presents a hallucination-risk condition: the conjunction $\alpha$^$\kappa$_gate detects this because the compatibility score drops while the quality metric remains high. A single-scalar confidence score computed as a weighted average across sensors would mask this failure by averaging the degraded camera with healthy LIDAR and ultrasonic sensors. The per-sensor certificate enables reliability-weighted fusion: the motion planning consumer role independently reads each sensor's certificate and downweights or excludes sensors whose certificates indicate noise contamination, OOD conditions, or geometric incompatibility with the planning solver's expected input structure. Gate 4 provides an additional safety check: if the low-level modal health score $\kappa$_L (computed as the minimum compatibility across physical sensor modalities) falls below the grounding threshold, a repair decision is issued before the motion planning solver executes, preventing actuation on physically ungrounded input. See FIG. 36. In safety-critical deployments, the enforcement policy implements asymmetric safety weighting: dangerous false-accept errors (certifying a degraded sensor as compatible when it is not) are penalized more severely than conservative false-reject errors (rejecting a borderline sensor that would have functioned adequately).

[IA-06] Healthcare and Clinical Decision Support. In clinical decision support systems, diagnostic models process multi-annotator medical records, imaging studies, and laboratory results. The representation-solver compatibility functional evaluates structural alignment between the clinical input and the specific diagnostic model before the model produces a recommendation. Two failure modes illustrate the architecture's typed enforcement. In the first, a set of medical records has been updated with outdated or adversarially modified entries that remain structurally well-formed: the records carry high $\kappa$_gate (the format matches the model's expected input schema) but low $\alpha$ (the content is corrupted). The typed collapse domain classification identifies this as a targeted-corruption condition and the predefined enforcement policy routes the input to a specialist review queue rather than uniformly rejecting all uncertain input. In the second, a multi-annotator disagreement among pathology reports produces elevated turbulence $\sigma$ because the per-source compatibility scores {$\kappa$_i} exhibit high dispersion: some annotators' reports align well with the diagnostic model while others do not. Gate 3's dynamic admissibility threshold stiffens under this elevated turbulence, requiring higher κ_gate before execution is permitted. If σ exceeds the hard turbulence barrier, the system issues a re-encode decision and triggers an ensemble morph that introduces verification agent nodes to reconcile the disagreement before the diagnostic model executes. The observational mode enables deployment in regulated healthcare environments: the system generates and logs certificates for every clinical input without altering diagnostic model behavior, allowing clinical engineers to review the certificate distribution, calibrate thresholds to the patient population, and demonstrate regulatory compliance to examination bodies before transitioning to active enforcement. See FIG. 37. The system does not provide medical advice or make clinical decisions; it provides structured compatibility information that clinical systems and healthcare professionals independently interpret.

[IA-07] Industrial IoT and Predictive Maintenance. In industrial process monitoring, predictive maintenance systems consume continuous streams from vibration, temperature, and pressure sensors attached to rotating equipment, heat exchangers, and fluid systems. Each sensor stream is encoded as a time-windowed event node carrying a locally-derived certificate. The three-component decomposition provides per-sensor diagnostic granularity that is unavailable from aggregate health indices. A pressure sensor exhibiting readings that appear statistically valid (R is moderate) but whose distributional reliability σ has degraded (the sensor's operating point has shifted outside its calibrated range) produces a typed collapse domain classification of out-of-distribution poisoning: the readings look valid but are unreliable. The predefined enforcement policy routes this condition to a maintenance alerting consumer role rather than triggering a false process shutdown—a distinction that a binary in-distribution/out-of-distribution classifier cannot make because it lacks the structured decomposition needed to separate "readings are noisy" (N elevated) from "readings look valid but sensor is OOD" (R moderate, ω low). Over time, the empirical distribution of per-sensor certificates enables drift detection: a monotonic increase in σ across the sensor array signals progressive geometric incoherence among sensors, potentially indicating mechanical misalignment or process degradation before any single sensor crosses a threshold. The certificate audit trail provides the documentation required for industrial safety compliance and root-cause analysis after incidents.

[IA-08] Quantum Computing and Hybrid Quantum-Classical Pipelines. In quantum computing deployments, parameterized quantum circuits serve as downstream solvers consuming encoded problem representations. The solver graph G_S may include QuantumAgent nodes carrying solver contracts specifying quantum-specific capability centroids computed from the circuit ansatz topology, qubit count, and target problem class, frozen prior to deployment. The compatibility morphism routes event nodes to QuantumAgent nodes using the same geometric alignment computation used for classical agent nodes, requiring no modification to the coordination architecture. The characteristic failure mode of variational quantum algorithms is the barren plateau: a region of the optimization landscape where gradient information vanishes and the circuit cannot converge. Under the present architecture, elevated turbulence σ signals proximity to a barren plateau because per-source compatibility scores exhibit high dispersion as the circuit's parameter state approaches a degenerate manifold region. Gate 3's dynamic admissibility threshold stiffens under this elevated turbulence, and the hard turbulence barrier at σ>σ_thr forces a re-encode decision before the quantum circuit expends its shot budget. In embodiments using the four-dimensional toroidal stability representation T^4, admissibility is characterized by Lyapunov drift energy on the manifold, generalizing Gate 3 to the non-convex admissible sets native to quantum optimization landscapes. Hybrid quantum-classical agent nodes parameterized by a quantum fraction enable graceful degradation: when gate decisions indicate quantum backend instability, execution falls back to the classical path. A zero-knowledge proof generated over the quantum circuit's parameter state at certificate generation time enables a downstream consumer to verify that the certificate was derived from a valid quantum substrate state without accessing the circuit parameters, raw measurement outcomes, or internal certificate derivation logic, supporting deployment under intellectual property protection requirements.

[IA-09] Edge Devices and Hardware-Accelerated Substrates. In edge and hardware-accelerated deployments-including memristor crossbar arrays, neuromorphic accelerators, and on-device inference engines operating under milliwatt power budgets—the architecture implements pre-execution enforcement at the circuit level. The noise component N of the structured compatibility certificate operationalizes the thermodynamic non-idealities of the physical substrate-conductance drift, thermal fluctuations, and read noise—as they manifest in the statistical properties of the computed representation. This operationalization transforms N into an oracle-free substrate health signal detectable from data distribution patterns alone, without external diagnostic hardware, periodic offline calibration, or ground-truth labels. A gating circuit communicatively coupled to the memory storing the certificate evaluates one or more certificate fields against stored threshold parameters and, prior to task execution, conditionally enables or disables instruction issuance, memory access, solver invocation, execution pathway activation, or hardware resource allocation. The gating circuit operates at hardware speed without software mediation, protecting the analog substrate from inputs that would cause filament degradation, conductance drift cascade, or thermal damage. In industrial IoT deployments where connectivity, latency, and data privacy constraints preclude cloud-based enforcement, the on-device gating circuit provides autonomous pre-execution governance: the device certifies its own substrate health and gates its own execution without communicating with a centralized server. The same certificate semantics that govern cloud-based digital enforcement govern on-chip analog enforcement, demonstrating the substrate-independence of the architecture: the certificate structure and gate logic are invariant across computational substrates; only the physical mechanism by which the gate decision is implemented (software conditional branch, voltage-threshold comparator, or circuit-level pathway control) varies with the substrate. In embodiments employing neuromorphic or memristive substrates, a quality-aware offline training infrastructure-architecturally distinct from and temporally prior to the runtime gating circuit-calibrates threshold parameters using Bayesian threshold calibration rules applied to the empirical certificate distribution observed during training, with write operations modulated by substrate characteristics including write endurance constraints; no component of this training infrastructure executes during live enforcement, preserving the deterministic fixed-runtime property of the gating circuit. See FIG. 31.

[IA-10] Multi-Solver Routing and Navigator Architectures. In deployments comprising heterogeneous solver populations-including mixed-capability language models, specialized domain solvers, human-in-the-loop review queues, and legacy API endpoints—a navigator receives contextual inputs and routes each input to the solver exhibiting maximum compatibility under the geometric compatibility morphism. The navigator does not itself solve problems; its primary execution function is certification-based routing. For each input, the navigator computes the structured compatibility certificate via proxy estimation, evaluates the certificate against each solver's contract in the solver registry, and selects the solver with the largest positive margin above the dynamic admissibility threshold. The characteristic failure mode of naive load-balancing or capability-tagged routing is misrouting: an input is sent to a solver that appears capable based on metadata but is geometrically incompatible with the actual representation structure. Under the present architecture, maximum margin selection prevents misrouting by requiring that the selected solver not merely pass the admissibility threshold but exhibit the greatest buffer above it, providing robustness against proxy estimation error. When no solver satisfies all gate conditions and the morph repair cycle exhausts available transformations, the input enters a fallback queue for human review or deferred processing rather than being silently dropped or incorrectly routed. Recursive proxy validation monitors the distribution of routing outcomes over time: if the navigator begins routing inputs to systematically different solvers than historical patterns predict, a proxy drift signal triggers recalibration of the navigator's own proxy estimators before downstream solvers are affected. The navigator generates a committed audit log entry for every routing decision, recording the input certificate, per-solver margin scores, selected solver, and routing rationale, providing the documentation required for model governance and regulatory compliance in multi-model AI deployments. See FIG. 33.

[IA-11] Runtime Proxy Estimation for Latency-Sensitive Deployments. In real-time and streaming deployments-including conversational AI systems, autonomous vehicle perception pipelines, high-frequency trading monitors, and industrial control loops—the true values of the certificate triple (α, κ_gate, σ) cannot be computed exactly without solving the problem, yet enforcement decisions must be made before solver invocation. The proxy estimation architecture addresses this constraint by computing runtime estimates of the certificate triple from observable features of the contextual representation. Three families of proxy estimators operate in parallel: a purity proxy family estimating the quality metric α from indicators such as perplexity ratios, embedding coherence, and imputation precision; a compatibility proxy family estimating κ_gate from indicators such as retrieval precision, schema coverage, and cross-modal alignment; and a turbulence proxy family estimating σ from indicators such as softmax entropy, conformal non-conformity scores, and Monte Carlo dropout variance. At least two structurally different estimators are computed for each certificate axis, and the final estimate is produced by recursive weakest-link ensembling: the purity estimate is the minimum across purity proxies, the compatibility estimate is the minimum across compatibility proxies, and the turbulence estimate is the maximum across turbulence proxies. This recursive application ensures that no single proxy failure can overstate certificate quality: if any estimator indicates degradation, the aggregate reflects that degradation. A proxy drift monitor tracks the rolling distribution of each proxy family's outputs and generates an alert when statistical divergence exceeds a configured threshold, signaling that the proxy estimators have entered their own out-of-distribution regime and require recalibration. An asymmetric error tolerance module configures the Landauer tolerance buffer on a per-domain basis: in high-stakes domains such as financial compliance and physical actuation, the buffer is reduced to minimize false-accept risk; in low-stakes domains where conservative errors carry significant operational cost, the buffer is expanded to reduce unnecessary rejections. The proxy estimation architecture enables certificate-based enforcement in latency budgets measured in milliseconds while preserving the diagnostic granularity of the full three-axis decomposition. See FIG. 26.

[E000] The following embodiments are non-limiting examples illustrating particular implementations of the architecture described in the foregoing Overview and Industrial Applicability sections. Each embodiment describes a specific configuration of one or more elements of the claimed subject matter and is organized by functional group in the order established by the Master Ordering Table. Features described in any embodiment may be combined with features described in any other embodiment or in the claims without limitation. The bracketed identifiers [E001] through [E046] are reference labels used for internal cross-referencing, figure annotations, and claim traceability; they do not denote structural boundaries, sequential dependencies, or limitations on the scope of the claimed subject matter. Terms used herein have the meanings established in the Definitions section unless context clearly requires otherwise.

Group I: Foundation and Layered Architecture

[E001] In some embodiments, the system is implemented as a three-layer architecture executing in sequence. A Measurement Layer performs the representation-solver compatibility functional decomposition and generates the structured compatibility certificate comprising the relevance component, the superfluous component, and the noise component constrained by the normalization invariant as described herein. A Control Layer implements the sequential four-gate gatekeeper that evaluates the structured compatibility certificate and returns a typed execution decision selected from reject, block, re-encode, repair, and execute, as further described herein. A Coordination Layer implements a Dual Graph Morphing engine that maps task representations to solver agents via geometric compatibility and restructures a task-solver graph topology in response to gate decisions returned by the Control Layer. The three layers form two distinct closed feedback loops: A Morph Repair Cycle triggered by non-execute gate decisions, and an Agent Handoff Cycle triggered by execute gate decisions. The combined operation of the two feedback loops enables automatic, certificate-mediated agent coordination without runtime policy learning or centralized orchestration. The three layers operate in sequential dependency: The Coordination Layer does not execute until the Control Layer has returned an execute decision on a certificate derived by the Measurement Layer for the current task-solver pair.

[E002] In one embodiment, the decomposition of contextual input data into the normalized simplex comprising the relevance component (R), the superfluous component (Ssup), and the noise component (N) is implemented via a universal rotor architecture comprising a neural network module that performs geometric rotation and barycentric projection onto a simplex manifold. The universal rotor guarantees the normalization constraint R+Ssup+N=1 by construction through the barycentric mapping, eliminating the need for post-hoc normalization that could introduce numerical errors or simplex constraint violations. The rotor may be validated across multiple encoder architectures including text encoders, vision encoders, and multimodal encoders, achieving superior performance compared to baseline decomposition methods such as Monte Carlo Dropout while maintaining accuracy. In validation experiments, the universal rotor achieved a one-hundred percent hypothesis pass rate across architecture independence tests and demonstrated computational efficiency improvements of approximately twenty-six times speedup over baseline decomposition methods with less than eight percent computational overhead. The universal rotor may be trained on datasets comprising at least twenty thousand samples demonstrating exact simplex compliance, wherein the training objective enforces the barycentric constraint at each forward pass rather than as a post-training correction.

[E003] In a further embodiment, the system implements conjunction-based control logic wherein execution decisions are determined using a conjunction of a quality metric ($\alpha$) derived from the normalized decomposition (R, Ssup, N) produced by a first signal path performing semantic decomposition, and a compatibility score ($\kappa$) measuring geometric alignment between the representation and the downstream solver in a shared latent space produced by a second signal path performing compatibility assessment, the two signal paths having architecturally distinct provenance in that the quality metric is derived from decomposition of the representation and the compatibility score is derived from geometric alignment in the shared latent space, wherein the conjunction $\alpha\hat{}\kappa$ constitutes a minimal sufficient condition for typed execution control. The conjunction enables classification into four operationally distinct execution states that cannot be recovered from either signal alone. When $\alpha$ is high and $\kappa$ is high, the certificate indicates healthy operation and the system may proceed with standard execution. When $\alpha$ is high and $\kappa$ is low, the certificate indicates a hallucination-risk condition wherein measured quality is high but geometric alignment between the representation and the downstream solver is poor, signaling solver mismatch and triggering rejection or rerouting to a better-aligned solver. When $\alpha$ is low and $\kappa$ is high, the certificate indicates a targeted-poisoning or content-corruption condition wherein measured quality is poor despite apparent structural alignment, signaling adversarial attack or data corruption and triggering rejection. When $\alpha$ is low and $\kappa$ is low, the certificate indicates systemic degradation wherein both quality and alignment have failed, triggering rejection and potential system recalibration. Ablation analysis demonstrates that removing either $\alpha$ or $\kappa$ from the conjunction collapses these four distinct failure modes into indistinguishable states, confirming that the conjunction is a minimal sufficient condition for typed execution control. When $\alpha$ is used alone without $\kappa$, the system cannot distinguish healthy operation from hallucination-risk, both appearing as high quality despite the latter indicating solver mismatch. When $\kappa$ is used alone without $\alpha$, the system cannot distinguish healthy operation from targeted poisoning, both appearing as high alignment despite the latter indicating adversarial corruption. This conjunction-based approach differs from single-scalar confidence thresholding, which employs a single confidence score and binary threshold enabling only two states without typed failure mode detection.

Group II: Certificate Structure and Multi-Consumer Architecture

[E004] In yet another embodiment, the system implements a multi-consumer certificate architecture wherein a single structured compatibility certificate serves a plurality of independent consumer roles, each reading different certificate fields for different purposes without requiring centralized orchestration or command-based control. The certificate architecture implements an enforcement-data principle wherein the certificate provides structured compatibility information that downstream consumers interpret and act upon according to domain-specific requirements, rather than issuing execution commands that dictate consumer behavior. An authorization role may read the quality metric ($\alpha$) and compatibility score ($\kappa$) to determine execution decisions including proceeding with standard execution, rejecting incompatible inputs, rerouting to alternative solvers, or modulating solver parameters. An interpretation role may read the R, Ssup, N decomposition components and their relative ordering to classify the operational state into typed collapse domains including quality degradation, noise contamination, or structural superfluousness, wherein the typed collapse domain classification is determined by the ordering and relative magnitudes of the three components without requiring exhaustive threshold tuning for each failure mode, thereby providing human-interpretable diagnostic labels for debugging, telemetry, and post-hoc analysis. A confirmation role may read stability metrics V and V derived from temporal trajectory analysis on a geometric manifold representation to validate that system dynamics remain within an admissible operating region and that authorization decisions are not inducing instability, providing a stability-theoretic check independent of authorization and interpretation. The three consumer roles operate independently on the same shared certificate artifact. A language model consumer may use derived temperature values $\tau$ to modulate sampling behavior for text generation; a robotic system may use compatibility scores $\kappa$ to modulate motion planning confidence or action selection thresholds; and a human interface consumer may present the R/Ssup/N ratios as quality indicators for operator awareness. This multi-consumer architecture enables distributed decision-making without centralized command logic, supporting deployment across heterogeneous solver environments including edge devices, cloud services, hardware accelerators, and safety-critical systems.

[E005] In another embodiment, the system implements a comprehensive failure taxonomy organizing failure modes into four groups based on certificate deficiencies, enabling automated diagnosis and targeted remediation. Group 1, Encoding Failures, may include noise saturation wherein the ratio N/(R+N) exceeds 0.5 such that signal is overwhelmed by adversarial noise; superfluous drowning wherein the ratio Ssup/(R+Ssup) exceeds 0.5 such that relevant content is diluted by superfluous information; representational conflict indicating internal inconsistency in the encoding; and semantic clash indicating contradictory semantics or adversarial poisoning. Group 2, Solver Dynamics Failures, may include posterior collapse as observed in variational autoencoders; gradient starvation from vanishing gradients or barren plateaus in the compatibility landscape; RSN collapse wherein the simplex decomposition degenerates toward a degenerate distribution; and substrate degradation indicating physical hardware failure such as memristor filament burnout. Group 3, Semantic Failures, may include fluent hallucination wherein output is plausible but factually incorrect corresponding to high compatibility with low relevance; incoherent output that is syntactically invalid with low multi-source coherence; distributional drift wherein output distribution diverges from the training distribution as indicated by turbulence metric $\sigma$ exceeding the admissibility threshold; and out-of-distribution fabrication wherein output falls entirely outside the training distribution. Group 4, Execution Failures, may include weakest-link cascade failures in hierarchical systems; cross-modal interface breakdown wherein the interface compatibility metric κ_int falls below minimum thresholds; gradual drift indicating slow quality degradation over time as indicated by Lyapunov derivative V>0; and catastrophic forgetting wherein system performance collapses abruptly following distribution shift. Each failure mode maps to specific certificate deficiencies, enabling the gatekeeper to return a typed remediation decision rather than a binary accept-or-reject signal.

Group III: Enforcement Pipeline

[E006] In another embodiment, the pre-execution gatekeeper may be implemented as an enhanced enforcement pipeline comprising up to fourteen sequential validation steps that extend beyond the baseline four-gate specification described herein. The enhanced pipeline may include simplex constraint validation at Step 1, confirming that the sum of the three components equals the fixed aggregate value within a configurable numerical tolerance; multi-source coherence validation at Steps 2 and 3, evaluating pairwise consistency among certificate components derived from multiple input sources; temperature and rank validation at Steps 4 through 6, confirming that derived quality metrics fall within expected ranges for the assigned curriculum phase; turbulence instability checking via σ validation at Step 7; compatibility admissibility checking via κ validation at Step 7.5; noise poisoning detection at Step 8; and additional domain-specific safety gates at Steps 9 through 14. Steps 7 and 7.5 are architecturally separated with no shared state variables, thereby demonstrating structural independence of the turbulence metric σ and the compatibility metric κ through implementation design rather than statistical correlation analysis alone. This architectural separation provides stronger independence guarantees than correlation analysis: any implementation coupling Step 7 and Step 7.5 through shared state violates the structural independence guarantee of the three-axis certificate. The enhanced pipeline may be deployed in high-assurance environments including financial compliance systems operating under SR 11-7, medical device systems operating under FDA SaMD guidance, and safety-critical control systems requiring independent verification of each enforcement criterion.

[E007] The dynamic compatibility threshold κ_req(σ) may implement a Landauer tolerance buffer comprising a gray zone defined by the interval [κ_req−ε_L, κ_req) where ε_L is a tolerance parameter, with a default value of 0.05. For inputs falling within this gray zone, meaning inputs whose compatibility score satisfies κ_req−ε_L≤κ<κ_req, the turbulence metric σ may serve as a deterministic tie-breaker to select the enforcement decision: if σ exceeds a tie-breaker threshold the system may select a re-encode decision to favor caution under instability; if σ is below the tie-breaker threshold the system may select a cautious-execute decision to permit execution under stable conditions. This gray zone logic prevents oscillation at the admissibility boundary that could otherwise occur with binary threshold enforcement when the compatibility score κ fluctuates near κ_req due to measurement noise or distributional variation. The Landauer tolerance buffer is named for the physical principle that information erasure requires a minimum energy expenditure, analogously reflecting the engineering principle that a decision boundary must tolerate irreducible measurement uncertainty without becoming unstable. The tolerance parameter ε_L may be calibrated per domain based on the empirical variance of the compatibility score estimator.

[E008] In yet another embodiment, the grounding repair gate of the gatekeeper may implement hierarchical enforcement by computing separate compatibility scores for different processing levels within the downstream solver. High-level modal health κ_H measures compatibility at the symbolic or text processing level, representing the fraction of the solver's theoretical ceiling unlocked by high-level features of the representation. Low-level modal health κ_L measures compatibility at the signal or vision processing level, representing the fraction unlocked by low-level perceptual features. Cross-modal interface health κ_int measures compatibility at the integration boundary between modalities, representing the minimum pairwise geometric alignment between event-node embeddings and agent-node embeddings across the full compatibility morphism as described herein. The overall execution compatibility score is determined by weakest-link aggregation: κ_gate=min (κ_H, κ_L, κ_int). This hierarchical approach ensures that failure at any single processing level triggers appropriate remediation, implementing a zero-trust architecture wherein each level must independently satisfy quality requirements before execution is permitted. The necessity of the minimum aggregation rule is established by the adversarial bypass argument: any aggregation rule more permissive than the minimum allows an adversary who knows the aggregation rule to degrade the weakest modality below the required threshold while the aggregate score remains above it, permitting execution on a compromised encoding.

[E009] In a further embodiment, a diagnostic compatibility simplex may be computed to enable root-cause analysis of quality deficiencies without requiring ground truth labels or oracle access to optimal solutions. The diagnostic simplex comprises three components: an algorithmic alignment component κ_A representing the fraction of the compatibility gap attributable to mismatch between the solver's algorithmic architecture and the structural demands of the problem; an encoding efficiency component κ_E representing the fraction attributable to inefficiencies in the representation policy that prevent the encoding from exposing relevant structure to the solver; and a tractability component κ_T representing the fraction attributable to the intrinsic computational hardness of the optimization landscape. The three components satisfy the normalization constraint κ_A+κ_E+κ_T=1, forming a simplex that partitions the compatibility gap (1-κ_gate) into distinct, non-overlapping root causes. The bottleneck component may be identified as argmin {κ_A, κ_E, κ_T}, enabling targeted remediation: encoder retraining is indicated when κ_E is the bottleneck; solver architecture improvement or replacement is indicated when κ_A is the bottleneck; and problem reformulation or solver scaling is indicated when κ_T is the bottleneck. In the embodiments described herein, the diagnostic simplex serves as a post-hoc analytical tool and is not used in real-time gating decisions; it does not appear in the four-gate enforcement pipeline and does not share state variables with the execution compatibility score κ_gate. In other embodiments, one or more of the diagnostic coordinates κ_A, κ_E, κ_T may inform remediation selection or morph operator routing without altering the four-gate enforcement sequence. The oracle-free property enables deployment in domains lacking labeled validation data, such as novel problem domains or rapidly evolving operational environments, because the decomposition is derived entirely from the geometric structure of the certificate and the compatibility morphism, without reference to downstream execution outcomes.

Group IV: Dual Feedback Loop Architecture

[E010] In some embodiments, a first feedback loop, referred to herein as the Morph Repair Cycle, is triggered when the Control Layer returns a non-execute gate decision. The graph transformation operator corresponding to the triggered gate decision is applied to the Representation Graph G_R comprising task-bearing EventNodes, the Solver Graph G_S comprising capability-bearing AgentNodes, or both, as specified by the operator. The structured compatibility certificate is immediately re-derived from the modified graphs by recomputing the compatibility morphism and aggregating the resulting pair scores as described herein. The re-derived certificate is re-evaluated by the Control Layer beginning at the first gate. The Morph Repair Cycle continues until the re-derived certificate satisfies all gate conditions and an execute decision is returned, or until a surjectivity starvation condition is detected wherein no further graph transformation is possible because no EventNode in G_R carries a noise component exceeding the pruning threshold, in which case the loop halts and a committed audit log entry is generated recording the structural reason for termination. Surjectivity of the compatibility morphism $\varphi$ is enforced by a forced-certificate mechanism: if any AgentNode in the Solver Graph G_S becomes unreachable—that is, no EventNode in G_R maps to it under the current morphism—the system assigns a forced structured compatibility certificate to that AgentNode carrying a noise component N at or above the Gate 1 rejection threshold, such that any routing attempt to the unreachable AgentNode immediately triggers a Gate 1 REJECT decision, preventing silent routing failures. Termination of the Morph Repair Cycle is guaranteed because each graph transformation operator moves exactly one certificate scalar in exactly one direction: the pruning morph operator decreases the global noise component N; the verification morph operator increases the coherence metric c; the ensemble morph operator increases the compatibility score $\kappa$_gate and decreases the turbulence metric $\sigma$ jointly; and the event expansion morph operator increases the low-level modal health $\kappa$_L. No operator degrades a certificate component that was already satisfying its gate condition, ensuring monotonic progress toward the execute state or detection of structural infeasibility.

[E011] In some embodiments, a second feedback loop, referred to herein as the Agent Handoff Cycle, is triggered when the Control Layer returns an execute decision. The implementation function associated with the certified AgentNode is invoked, causing the underlying agent framework to execute the task assigned to the certified agent. A real output is received from the invoked agent via the Direction 2 interface. The real output is encoded as a new EventNode via the Direction 1 content encoder, which computes a local certificate (R_i, Ssup_i, N_i) for the new EventNode from the actual content of the agent's output rather than from default or initialization-time values. The new EventNode, carrying its real locally derived certificate, is added to the Representation Graph G_R. The global structured compatibility certificate is re-derived from the updated G_R containing actual intermediate content, and the re-derived certificate governs the gatekeeper evaluation for the subsequent agent invocation in the pipeline. The Agent Handoff Cycle thereby ensures that each agent in a multi-agent pipeline is certified against the actual intermediate state produced by its predecessors rather than against phantom initialization state that does not reflect real intermediate content. The Morph Repair Cycle and the Agent Handoff Cycle are mutually exclusive in their triggering conditions: The Morph Repair Cycle is triggered only by non-execute gate decisions, and the Agent Handoff Cycle is triggered only by execute gate decisions. The two cycles perform distinct functions and operate on different certificate states and are not interchangeable.

[E012] In a further embodiment, the system implements a dual graph morphing engine governed by a curriculum alignment layer to execute structural transitions between the Representation Graph G_R and the Solver Graph G_S without relying on runtime policy optimization. The geometric compatibility morphism ($\varphi$-morphism) maps each EventNode in G_R to the AgentNode in G_S exhibiting maximum compatibility in the shared latent space, wherein compatibility is computed as a normalized cosine similarity between the fixed content embedding of the EventNode and the fixed capability embedding of the AgentNode. Prior to executing the $\varphi$-morphism, the curriculum alignment layer enforces architectural phase constraints by evaluating the turbulence metric $\sigma$ against a phase-specific ceiling $\sigma$_ceil and the weakest-link compatibility score against a phase-specific floor $\kappa$_floor. If the proposed morphism satisfies both phase constraints, the Dual Graph Morphing engine proceeds. If the proposed morphism violates either phase constraint, indicating severe topological isolation or phase incompatibility between the complexity of the task graph and the capability level of the solver graph, the curriculum alignment layer triggers a hard halt. Unlike the Morph Repair Cycle, which applies graph transformation operators to repair certificate deficiencies incrementally, the hard halt explicitly bypasses all morphing operators and initiates a complete structural rebuild of both G_R and G_S from the configured curriculum phase parameters, thereby preventing cascading degradation during volatile state transitions. The hard halt is logged with a committed audit entry distinct from the surjectivity starvation termination of the Morph Repair Cycle.

[E013] In a further embodiment, the system implements adaptive self-repair mechanisms triggered by compatibility degradation patterns detected through longitudinal certificate analysis. The system may monitor the noise component N and the turbulence metric $\sigma$ over time, detecting sustained elevation patterns indicative of distributional shift, sensor degradation, or adversarial conditions. When N exceeds a configured threshold for a sustained monitoring window, or when $\sigma$ indicates persistent instability, the system may trigger morphing actions including encoder retraining to improve representation quality; solver reconfiguration to adapt to changed input characteristics; threshold recalibration to maintain appropriate sensitivity under drift; or fallback routing to alternative processing pathways with different compatibility profiles. The adaptive morphing may implement noise amplification factor mitigation wherein the system estimates $NAF=1+(1-r)(n-1)$ for a multi-agent pipeline with per-stage reliability r and agent count n, and applies certificate-based filtering to reduce the realized noise amplification factor below the baseline value by rejecting inputs with elevated noise before propagation to downstream agents. The morphing decisions are governed by typed collapse domain classifications derived from the failure taxonomy described herein, wherein different failure modes trigger distinct remediation strategies: re-encoding for noise saturation domains, pruning for superfluous drowning domains, and complete rejection for adversarial poisoning domains. The adaptive morphing mechanism enables the system to maintain operational quality under distributional shift and adversarial conditions without requiring manual reconfiguration or full offline retraining cycles.

Group V: Multi-Agent Coordination and Fixed-Runtime Architecture

[E014] In another embodiment, the system implements multi-agent coordination wherein a plurality of agents exchanges structured compatibility certificates to enable capability-aware task delegation and communication control. Each agent computes a structured compatibility certificate for its local context, the certificate comprising the normalized components (R, Ssup, N) and derived compatibility metrics including the compatibility score κ. Structural compatibility among two or more certificates is determined based on relationships among the normalized components, wherein compatible certificates exhibit similar R/Ssup/N profiles indicating alignment of operational conditions, and incompatible certificates exhibit divergent profiles indicating mismatched capabilities or degraded states. Communication, coordination, or task delegation among the plurality of agents is constructed, modified, enabled, restricted, or mediated based on the determined structural compatibility. When structural compatibility satisfies a first threshold indicating strong alignment, direct agent-to-agent communication may be enabled and task delegation may be permitted without supervision. When structural compatibility satisfies a second threshold indicating moderate alignment, coordination may be permitted subject to verification, additional constraints, or intermediary oversight. When structural compatibility falls below α third threshold indicating poor alignment, coordination may be restricted, rerouted through an intermediary agent with different capabilities, deferred until conditions improve, or escalated to a fallback system or human operator. The certificate exchange protocol enables autonomous systems to share compatibility assessments for coordinated resource allocation without requiring centralized control or global knowledge of system state. This embodiment supports applications including autonomous vehicle platoon coordination wherein vehicles exchange sensor quality certificates, with the relevance component indicating perception reliability, the superfluous component indicating environmental complexity, and the noise component indicating sensor degradation, and platoon eligibility and positioning assignments are determined based on structural compatibility of the operational states.

[E015] In yet another embodiment, the system is architected as a deterministic, compatibility-governed execution framework that explicitly isolates representation learning from runtime execution, preventing non-stationary instability associated with multi-agent reinforcement learning. Agent SolverContracts specifying agent roles, capabilities, compatibility thresholds, and operational constraints are frozen prior to deployment and remain strictly immutable during runtime execution. Agent and solver latent space embeddings are pre-computed, for example via offline contrastive or structure-preserving distillation, and frozen prior to deployment. At runtime, the system operates as a purely geometric routing and gating framework: all execution decisions, task delegation determinations, topological graph transformations, and compatibility morphism computations are calculated algebraically from the fixed embeddings. No neural network weights are updated, no learning policies are modified, and no solver contracts are altered during live operation. The system does not employ multi-agent reinforcement learning, runtime policy optimization, test-time credit assignment, or test-time reward signal computation at any layer of the execution architecture. This architectural isolation ensures that downstream routing and safety gating remain completely deterministic, auditable, and mathematically bounded during live operation, providing the formal properties required for model risk governance under SR 11-7 and analogous international regulatory frameworks.

[E016] In some embodiments, the system is organized according to a Ports-and-Adapters architecture in which the structured compatibility certificate and its associated normalization invariant function as the Port: a defined, versioned, machine-readable interface contract specifying the three-component structure, the normalization constraint, and the enforcement semantics of the certificate. Each computational substrate on which the system may be deployed is implemented as an Adapter that satisfies the certificate interface. Substrates that may be implemented as Adapters include software language model deployments executing on commodity digital processors; analog memristor crossbar arrays performing in-memory computation; quantum circuit backends implementing parameterized quantum circuits; REST API gateway deployments providing certificate-as-a-service functionality; and edge application-specific integrated circuit implementations. The gatekeeper constitutes the Core of the Ports-and-Adapters architecture: the enforcement logic is implemented once and is independent of any specific substrate. Adapters may be substituted across deployments, upgraded to newer substrate implementations, or combined in hybrid architectures without modifying the Port contract or the Core enforcement logic. The certificate structure and normalization invariant remain constant across all substrate-specific Adapter implementations, ensuring that certificates generated on one substrate are interpretable by consumers executing on a different substrate.

Group VI: Stability, Reliability, and Provenance

[E017] The structured compatibility certificate may include Lyapunov stability metrics computed on a four-dimensional toroidal manifold T^4. System state may be represented using T^4 coordinates (θ, φ, α_t4, ω_t4) derived from the simplex decomposition (R, Ssup, N) and the compatibility metrics, wherein all angular variables carry the t4 subscript suffix and must not be mixed with the certificate scalars (α, ω, κ_gate, σ) in the same formula. A chordal distance on the T^4 manifold may be computed as a Lyapunov function V_t4 measuring the geodesic distance between current system state and a target equilibrium state. The temporal derivative V_t4 indicates system stability: V_t4<0 indicates convergence toward equilibrium corresponding to stable operation, while V_t4>0 indicates divergence from equilibrium corresponding to unstable operation requiring intervention by the Control Layer. The T^4 toroidal representation eliminates angular seam artifacts that arise in Euclidean representations when angular coordinates wrap around at θ=0 and θ=2π, providing improved discrimination for stability assessment in domains with periodic coordinate structure such as quantum circuit optimization landscapes and orbital mechanics. In validation experiments, the T^4 chordal distance metric demonstrated approximately one hundred thirty-five percent improved discriminative power compared to Euclidean distance metrics for stability classification. Proximity to a barren plateau in the compatibility landscape may be detected as a degenerate manifold region wherein the gradient of the Lyapunov function falls below α configurable floor, triggering a re-encode gate decision prior to expenditure of the solver's computational budget.

[E018] The structured compatibility certificate may include provenance metadata enabling deterministic enforcement and system health monitoring across distributed deployments. A modality type field may specify whether the contextual input is text, vision, audio, structured data, or multimodal, enabling modality-specific enforcement policies to be applied to the certificate. Version identifiers such as encoder version and feature extractor version may track which encoder components were used during the compatibility functional decomposition, enabling reproducible quality assessment and version-dependent policy application in regulated environments. Defense integration fields may track security-relevant information including Sybil detection status indicating whether the input originates from a coordinated Sybil attack; rate limiting status indicating whether the request rate from the originating source exceeds configured thresholds; and system health metrics including defense manager operational status and defense pressure indicating current system load and adversarial stress level. The provenance metadata enables comprehensive audit trails that satisfy the timestamped documentation requirements of model risk governance frameworks including SR 11-7 § 4(c), the EU AI Act Annex IV, and EBA model risk management guidelines. The provenance fields may be included in the structured audit log entry emitted by the gatekeeper at each invocation as described herein.

Group VII: Training Infrastructure

[E019] In yet another embodiment, the system implements quality-aware training infrastructure wherein compatibility certificates govern data selection, curriculum progression, and optimization dynamics during offline training of the encoder and projection head components. The training infrastructure organizes training samples into quality tiers based on the signal purity metric $\alpha$: high-quality samples with $\alpha>0.8$ are presented during exploitation phases to refine model performance on reliable representations; moderate-quality samples with $0.5<\alpha<0.8$ are presented during calibration phases to improve robustness to distributional variation; and low-quality samples with $\alpha<0.5$ are excluded to prevent training on degraded, superfluous, or adversarially corrupted representations. In hardware-native embodiments, this offline training infrastructure may implement memristor-modulated learning wherein analog substrate write dynamics during the training phase are governed by compatibility metrics, with the coupling strength calibrated based on hardware substrate characteristics including write endurance constraints of the analog medium, to balance adaptation speed against physical degradation of the substrate; no weight updates, policy modification, or analog write operations governed by this mechanism occur during the execution phase governed by the sequential four-gate gatekeeper. The quality-gated training progression follows a curriculum aligned with Bloom's taxonomy cognitive phases, progressing from knowledge acquisition using high-confidence, high—a samples through comprehension and application using diverse moderate—a samples to analysis and synthesis using challenging high-complexity samples, with advancement between phases conditioned on achieving phase-specific compatibility thresholds. This approach differs from conventional data augmentation or hard-example mining by using pre-execution compatibility assessment to filter training data based on structural alignment between representation and solver architecture, improving training efficiency by concentrating compute on samples that exhibit favorable representation-solver compatibility characteristics as measured by the certificate.

[E020] In another embodiment, the system implements quality-gated curriculum training wherein training progression through a plurality of stages is gated by measured representation-solver compatibility rather than by task difficulty alone. This embodiment describes an offline training infrastructure that is architecturally distinct from the runtime execution architecture governed by the sequential four-gate gatekeeper; no component of this curriculum mechanism operates during live solver invocation or certificate-governed enforcement. A training sample may advance from stage $\kappa$ to stage k+1 only when the measured signal purity metric $\alpha$ derived from the normalized decomposition (R, Ssup, N) satisfies a stage-specific threshold $\alpha$_k. Early training stages employ relaxed thresholds to accept diverse samples for broad coverage of the representation space. Intermediate stages employ moderate thresholds to filter low-compatibility samples while retaining diversity. Later stages employ strict thresholds to accept only high-compatibility samples for exploitation and fine-tuning. The stage-specific thresholds are calibrated offline using bounded calibration rules applied to observed certificate distributions and downstream execution performance, for example using Bayesian optimization over a low-dimensional threshold parameter space or constrained gradient-free methods operating on quantile summaries of the empirical certificate distribution; the resulting thresholds are fixed prior to deployment and are not modified during the execution phase. The threshold calibration is bounded to preserve monotonic safety constraints, ensuring that lower measured quality always triggers more conservative advancement criteria. This approach differs from difficulty-based curriculum learning that orders samples by task complexity, because advancement is determined by measured representation-solver compatibility: samples with high task difficulty but low structural compatibility may be filtered entirely rather than merely reordered. The temperature parameter $\tau=1/\alpha$_$\omega$ derived from reliability-weighted compatibility metrics functions as a scheduling instrument governing curriculum pacing and quality-phase transitions; $\tau$ is not a gate enforcement parameter and does not appear in any gate condition of the sequential four-gate gatekeeper.

Group VIII: Security, Privacy, and Attestation

[E021] In another embodiment, the certificate data structure may include cryptographic integrity verification to detect tampering and enable trust chain validation across distributed deployments. An invariant specification may be serialized as a structured data object containing domain constraints, quality thresholds, encoder configuration parameters, solver configuration parameters, and validation rules, the invariant specification defining the complete set of parameters governing the certificate's enforcement semantics. A SHA-256 cryptographic hash of the serialized invariant specification may be computed and stored within the certificate data structure alongside the serialized specification itself. Upon certificate instantiation, the hash may be automatically verified by re-computing the hash from the stored serialized specification and comparing the result with the stored hash value. A hash validity flag may indicate whether the certificate has been tampered with since generation, enabling audit trail validation for regulatory compliance and third-party verification without requiring access to the original certificate generation system, the internal parameters of the downstream solver, or the proprietary logic of the encoder. The cryptographic binding of the invariant specification to the certificate ensures that the enforcement semantics under which a certificate was generated are verifiable independently from the organization that generated the certificate.

[E022] In another embodiment, the system architecture may implement a zero-trust credential gateway wherein all service adapters retrieve authentication credentials exclusively through a centralized configuration manager module that serves as the sole access point for credentials. Service adapters for language model providers, databases, cloud storage systems, message queuing services, and other external services may be configured to import credentials only through the gateway, with no direct access to environment variables, configuration files, or secrets management stores. Zero-exception enforcement requires all adapters to use the gateway without exception, enabling centralized security control; simplified testing via mocking the gateway to simultaneously mock all external services; environment switching via a single configuration parameter that affects all adapters without code changes; and security auditing through a single point of credential access logging and monitoring. This architecture prevents credential leakage through misconfigured adapters, simplifies compliance auditing by reducing the credential access surface to a single auditable component, and reduces attack surface by eliminating multiple independent credential access paths that could be exploited independently.

[E023] In a further embodiment, the structured compatibility certificate may include a memory-resident compatibility verification mechanism configured to enable proof-preserving execution gating within hardware or hardware-accelerated computational substrates. Compatibility state information derived from the representation-solver compatibility functional may be stored within or associated with a memory structure accessible to a gating circuit, accelerator controller, execution pathway selector, or other execution-control component. The stored compatibility state may be configured to support verification of execution eligibility without requiring disclosure of the underlying contextual representation, the solver configuration, or the internal certificate parameters. The memory-resident compatibility state may be evaluated through privacy-preserving verification mechanisms including zero-knowledge proof techniques, enabling downstream hardware or system components to confirm compatibility conditions prior to execution while maintaining confidentiality of proprietary model characteristics, contextual inputs, or operational logic. Such verification may be performed at one or more execution boundaries including instruction issuance, memory access pathways, accelerator activation, and solver invocation. This privacy-preserving approach enables deployment in intellectual property-sensitive and regulated environments such as medical device systems, financial trading platforms, and proprietary industrial control systems where disclosure of model parameters, quality thresholds, or operational logic would compromise competitive advantage or regulatory compliance. The integration of zero-knowledge proof techniques with compatibility assessment provides multiple independent trust layers, combining cryptographic verification with structural quality decomposition to enable hardware components to confirm execution eligibility without exposure of proprietary characteristics. Additionally, compatibility assessment may govern data propagation decisions, withholding transmission of contextual representations to downstream components when the certificate indicates low exploitability or elevated privacy exposure risk, thereby preventing unnecessary dissemination of sensitive data across distributed pipelines and reducing cross-agent contamination in multi-system architectures.

[E024] In yet another embodiment, the enforcement policy may implement asymmetric safety weighting wherein errors of different types are penalized with different severity levels to optimize for safety-critical deployment environments. Specifically, the enforcement policy may weight dangerous false-accept errors, defined as errors in which the certificate indicates high relevance when the downstream solver subsequently experiences noise-induced degradation or failure, more severely than conservative false-reject errors, defined as errors in which the certificate indicates high noise when the downstream solver would have operated normally. For example, a dangerous false-accept error wherein the certificate indicates R=0.8 and N=0.15 but the task subsequently fails due to undetected noise poisoning may be assigned a penalty weight of ten times the baseline, while a conservative false-reject error wherein the certificate indicates R=0.4 and N=0.55 but the task would have succeeded may be assigned a penalty weight of one times the baseline. This asymmetric weighting reflects the principle that in safety-critical environments including medical diagnosis systems, autonomous vehicle control, and industrial process automation, it is preferable to conservatively reject borderline tasks at a cost of operational inefficiency rather than to permit execution of noise-corrupted tasks that could lead to unsafe outcomes, patient harm, vehicle accidents, or equipment damage. The asymmetric penalty structure may be configured based on domain-specific risk assessment, applicable regulatory requirements, and operational safety margins, enabling the enforcement policy to be tuned for different risk tolerance profiles across deployment contexts without modifying the underlying certificate structure or gatekeeper architecture.

Group IX: Hardware and Substrate Embodiments

[E025] In another embodiment, the system may comprise or be integrated with a hardware-accelerated computational system configured to enforce compatibility-governed execution at the circuit level. The hardware-accelerated computational system may include a memory configured to store a structured compatibility certificate comprising the three components constrained by the normalization invariant, and one or more threshold parameters. A gating circuit communicatively coupled to the memory may be configured to evaluate one or more fields of the structured compatibility certificate against the threshold parameters prior to task execution. Based on the evaluation, the gating circuit may conditionally enable or disable one or more execution pathways including instruction issuance, memory access, solver invocation, execution pathway activation, or allocation of hardware resources including processing cores, memory bandwidth, and accelerator units. This hardware embodiment enables low-latency execution control at the circuit level without software intervention, providing compatibility-governed enforcement at or near the execution boundary of the hardware-accelerated computational system. The memory-resident certificate state may support cross-component validation within heterogeneous compute environments, enabling compatibility verification at memory-path boundaries to provide an additional trust layer beyond software-based certificate evaluation. This approach differs from conventional hardware security systems that protect execution from tampering through trusted execution environments, instead introducing compatibility state directly into hardware execution pathways to enable circuit-level gating based on structured quality decomposition. No neural network weights, solver contracts, threshold parameters, or learned policies are updated at the hardware level during runtime execution; the gating circuit operates on fixed, pre-deployed parameters and does not employ runtime policy optimization, multi-agent reinforcement learning, or test-time credit assignment at any layer of the hardware enforcement path.

[E026] In another embodiment, the system may implement a compute adapter architecture providing a unified abstraction over heterogeneous computational substrates including digital processors, graphics processing units, tensor processing units, field-programmable gate arrays, application-specific integrated circuits, neuromorphic processors, and analog crossbar arrays for in-memory computing. The compute adapter may expose a common certificate-based interface enabling compatibility-governed task execution across diverse hardware platforms without requiring modification of application logic. Each substrate-specific adapter implements certificate evaluation logic appropriate for its computational characteristics, translating the R, Ssup, and N components and the derived compatibility metrics into substrate-native execution control signals. For digital processors, the adapter may implement software-based gating using conditional branching on certificate fields. For hardware accelerators, the adapter may implement memory-resident certificate state with circuit-level gating as described herein. For analog substrates including memristor crossbar arrays, the adapter may implement voltage-threshold-based gating wherein certificate metrics are mapped to analog voltage levels and compared against reference voltages to enable or disable execution pathways. The unified adapter interface enables deployment portability wherein the same certificate semantics govern execution control across laboratory prototypes using conventional processors, cloud deployments using GPU clusters, edge deployments using custom ASICs, and research platforms using neuromorphic or analog computing technologies, facilitating technology transfer and hybrid deployment architectures combining multiple substrate types within a single system. Regardless of substrate type, all adapters enforce certificate evaluation using fixed, pre-deployed parameters; no adapter modifies neural network weights, learns routing policies, or performs runtime optimization during live operation. For analog substrates, this means that any conductance programming, plasticity modulation, write-endurance optimization, or adaptive weight modification occurs exclusively during offline training and is architecturally isolated from the runtime enforcement path.

[E027] In some embodiments, the Solver Graph G_S may comprise one or more QuantumAgent nodes, each implementing a parameterized quantum circuit as the implementation function invoked upon an execute decision from the gatekeeper. QuantumAgent nodes carry SolverContracts specifying quantum-specific capability centroids computed from the circuit ansatz topology, qubit count, and target problem class, all frozen prior to deployment. The compatibility morphism routes EventNodes to QuantumAgent nodes via the same normalized cosine similarity computation used for classical AgentNodes, requiring no modification to the geometric routing architecture of the Coordination Layer. The Solver Graph additionally supports HybridAgent nodes parameterized by a quantum fraction that governs the weighting between a quantum execution path and a classical fallback path, enabling graceful degradation to the classical fallback when gate decisions returned by the gatekeeper indicate quantum backend instability as measured by elevated turbulence $\sigma$ or reduced compatibility $\kappa$_gate. The gatekeeper's four-gate enforcement pipeline applies identically to QuantumAgent nodes and classical AgentNodes, with the low-level modal health metric $\kappa$_L for a quantum backend computed from physical circuit fidelity indicators including gate error rates, decoherence times, and readout error rates, translated into the certificate coordinate system via the substrate-specific Adapter as described herein.

[E028] In some embodiments, the system implements a quantum zero-knowledge hardware attestation mechanism extending the memristor-substrate attestation architecture described herein to quantum computing substrates. A zero-knowledge proof is generated over the quantum circuit's parameter state $\theta$ using a zk-SNARK construction that attests, without disclosing $\theta$, that: the circuit parameters lie within an admissible execution region as defined by the Gate 3 admissibility threshold $\kappa$_req($\sigma$); the measured output bitstring distribution satisfies the noise floor constraint of Gate 1; and the T^4 Lyapunov stability metric satisfies the stability bound at certificate generation time. A downstream component may verify all three attested conditions in time that is independent of model size with respect to certificate length, without accessing $\theta$, raw measurement outcomes from the quantum circuit, or internal certificate derivation logic. The proof is cryptographically bound to the physical quantum execution at certificate generation time, providing a hardware attestation primitive distinguishable from a software quality assertion. This quantum attestation mechanism extends the substrate-generic zero-knowledge proof described in the hardware system claim to a substrate-specific construction targeting quantum circuit parameter state, enabling compatibility-governed execution governance for variational quantum algorithms, parameterized quantum circuits, and hybrid quantum-classical pipelines operating under model risk governance requirements.

Group X: Platform and Deployment

[E029] The invention may be embodied as a certificate-as-a-service platform providing a REST API exposing endpoints for certificate operations. A certificate creation endpoint may accept encoder configuration parameters, solver configuration parameters, problem sample data, and encoder version as inputs and return a generated structured compatibility certificate object comprising a unique identifier, the quality metrics $\alpha$, $\omega$, $\alpha$_$\omega$, the compatibility score $\kappa$_gate, the turbulence metric $\sigma$, and the enforcement decision returned by the gatekeeper. A certificate validation endpoint may accept a structured compatibility certificate and a domain invariant specification and return a boolean validity indicator with violation details if the certificate does not satisfy the invariant specification. A gating endpoint may execute the four-gate enforcement pipeline on a provided certificate and return the typed execution decision with step-by-step rationale identifying which gate triggered the decision and the certificate values that caused it. A composition endpoint may accept a plurality of structured compatibility certificates and return a composed certificate with aggregated metrics computed via weakest-link aggregation as required by the Weakest-Link Gating Optimality Theorem. A compliance query endpoint may return historical certificates matching specified query filters for regulatory compliance reporting, supporting the back-testing record requirements of SR 11-7 § 4(c), EU AI Act Article 9, and analogous frameworks. Cryptographic verification endpoints may enable third-party auditors to validate certificate integrity without requiring access to the certificate generation system.

[E030] The certificate-as-a-service platform described herein may implement multi-tenant architecture supporting enterprise deployment. Tenant isolation may be implemented at the database level via tenant identifier columns, at the API level via tenant-scoped API keys with cryptographic signing, and at the certificate level via tenant-prefixed certificate identifiers. Role-based access control may define roles including Administrator with full create, read, update, and delete permissions on certificates, policies, and users; Developer with permissions to create and read certificates and update enforcement policies; Auditor with read-only access to certificates and audit logs; and Viewer with dashboard access only. Usage quotas may limit certificate creation rate per tenant, API request rate per tenant, and certificate storage per tenant. Environment separation may enable production deployments with strict enforcement thresholds and full audit logging; staging deployments with relaxed thresholds for integration testing; and development deployments with minimal gating for local experimentation, with the enforcement semantics of each environment governed by the invariant specification mechanism described herein. Cryptographic verification endpoints may enable third-party auditors to validate certificate integrity without requiring access to the certificate generation system, supporting compliance requirements including examination by prudential regulators under SR 11-7 and examination by conformity assessment bodies under the EU AI Act.

Group XI: Proxy Estimation, Pipeline Compositionality, and Meta-Routing

[E031] In some embodiments, the system implements a proxy estimation architecture configured to produce runtime estimates of the certificate triple ($\hat{\alpha}$, $\hat{\kappa}$_gate, $\hat{\sigma}$) required as input to the sequential four-gate gatekeeper, the true values of the certificate triple being not directly observable without solving the problem. Three families of proxy estimators operate in parallel on the contextual input and solver pair. A purity proxy family estimates the quality metric α using one or more of: a perplexity ratio method computing $\hat{\alpha}$=1−PPL(C)/PPL_N, where PPL_N is a reference noise perplexity; an embedding coherence method computing $\hat{\alpha}$=(e_C, e_ref) between the contextual embedding and a reference embedding; and an imputation precision method computing $\hat{\alpha}$=1−$\hat{N}$/($\hat{R}$+$\hat{N}$) from per-record confidence scores. A compatibility proxy family estimates the execution compatibility score κ_gate using one or more of: retrieval precision at rank κ from a semantic re-ranker; schema coverage computed as |F_present∩F_required|/|F_required|; cross-modal alignment computed as 1−d_pred(ŷ_H, ŷ_L); and graph edge integrity computed as 1−|E_spurious|/|E|. A turbulence proxy family estimates the turbulence metric σ using one or more of: normalized softmax entropy $\hat{\sigma}$=H($\hat{p}$)/|Y|; a conformal non-conformity score; Monte Carlo dropout variance; and looped model exit count. At least two structurally different proxy estimators are computed for each certificate axis, and the final estimate is produced by recursive weakest-link ensembling: the final purity estimate is the minimum across purity proxies, the final compatibility estimate is the minimum across compatibility proxies, and the final turbulence estimate is the maximum across turbulence proxies, applying the weakest-link aggregation rule recursively to the proxy layer itself. A proxy drift monitor detects sudden distributional shifts in the empirical distribution of proxy estimates, signaling that the proxy estimators have entered their own out-of-distribution regime and require recalibration. An asymmetric error tolerance module configures the Landauer tolerance buffer on a per-domain basis: in high-stakes domains including financial compliance and physical hardware, the buffer is reduced to ε_L=0.02; in low-stakes domains, the buffer is expanded to ε_L=0.10. In multi-stage agentic pipelines, the pipeline compositionality bound formalizes the reliability degradation: for an n-stage pipeline with per-stage gatekeeper accuracy p, pipeline reliability is bounded by p^n, and a noise amplification factor NAF=1+(1−r)(n−1) governs noise propagation across stages, where r is per-stage reliability. Certificate-based filtering at each stage reduces the realized noise amplification factor below the baseline value by rejecting inputs with elevated noise before propagation to downstream agents. The proxy estimation architecture is combinable with any of the substrate-specific, multi-tenant, quantum, or API gateway embodiments described herein.

[E032] In some embodiments, the system implements a quality-aware offline training infrastructure extending the compatibility-governed architecture to offline training of the encoder and projection head components; this infrastructure is architecturally distinct from the runtime execution architecture governed by the sequential four-gate gatekeeper and no component of it operates during live solver invocation or certificate-governed enforcement. The training infrastructure organizes training into cognitive phases governed by Bloom's curriculum gating: progression from one phase to the next is conditioned on the Bayesian threshold calibration rule κ*_floor=max {0.3, μ_κ−2σ_κ}, estimated from no fewer than forty structured compatibility certificate observations accumulated during the preceding phase, where μ_κ and σ_κ are the empirical mean and standard deviation of κ_gate over those observations. The three phases satisfy the progressive relaxation constraint κ_floor^(1)>κ_floor^(2)>κ_floor^(3) and σ_ceil ^(1)<σ_ceil^(2)<σ_ceil^(3) per the compatibility framework, reflecting progressively relaxed quality requirements as training advances toward higher-order synthesis tasks. The temperature parameter τ=1/α_ω functions exclusively as a curriculum scheduling instrument governing pacing and quality-phase transitions; it does not appear in any gate condition of the sequential four-gate gatekeeper and does not influence the real-time enforcement path. All learning governed by this infrastructure occurs offline: no weight updates, policy networks, or gradient descent operations are performed at runtime by any component of the compatibility certification architecture. Threshold recalibration is triggered when the encoder architecture changes, when the representation dimensionality changes, or when the operating domain shifts sufficiently to invalidate the accumulated certificate distribution. In hardware-native embodiments, analog substrate write dynamics during the training phase are governed by compatibility metrics with coupling strength calibrated against write-endurance constraints of the analog medium to balance adaptation speed against physical substrate degradation; no weight updates, policy modification, or analog write operations governed by this mechanism occur during the execution phase. For clarity: all memristor functional roles that involve write operations-including conductance-based adaptive weight storage, temperature-modulated plasticity gating controlling update rate based on signal quality, elastic weight consolidation or Fisher-information constraints for catastrophic-forgetting reduction, and write-endurance optimization via genetic-algorithm-guided sparse write scheduling-operate exclusively within this offline training infrastructure and are architecturally prohibited from executing during the runtime phase governed by the sequential four-gate gatekeeper. Only read operations on the memristor crossbar array (matrix-vector multiply for R/Ssup/N projection and feature extraction) occur at runtime; the crossbar conductance state is frozen prior to deployment and is not modified during live operation. This embodiment is combinable with any of the substrate-specific, multi-tenant, quantum, or API gateway embodiments described herein and does not require modification of the real-time gating path.

[E033] In some embodiments, the system governs a privacy-preserving knowledge graph architecture by applying the structured compatibility certification framework to multi-relational knowledge structures projected onto a four-dimensional toroidal manifold $T^4=S^1\times S^1\times S^1\times S^1$. In this embodiment, the manifold is parameterized by angular coordinates (α_t4, ω_t4, θ, φ)∈$[0, 2\pi]^4$, where the subscript t4 denotes the $T^4$ coordinate namespace; these coordinates are strictly distinct from the certificate scalars (α, ω, κ_gate, φ) and the two namespaces are never mixed. The admissibility condition on T^4 is V_t4(E)=d_t4(x_t4(E), x*_t4) ^2≤V_max, where V_t4 is the Lyapunov drift energy on the manifold and d_t4 is the geodesic distance; this condition generalizes the Gate 3 admissibility threshold to non-convex admissible sets arising in, for example, quantum circuit optimization or orbital mechanics. The geometric embedding enables the system to generate Homological Zero-Knowledge proofs over the first homology group H_1 of the embedded knowledge graph. The H_1 construction allows a producer to cryptographically prove topological features of the data structure-such as privacy-preserving reachability between knowledge nodes or the existence of recursive manifold stacks-without revealing internal parameters, network weights, raw knowledge graph content, or any proprietary structure of the underlying data. A downstream component verifies all attested H_1 conditions in time that is independent of model size with respect to certificate length, without accessing any of the above. In this embodiment, the structured compatibility certificate payload is augmented with an H_1 proof token as an additional named field alongside the standard fields {R, Ssup, N, α, ω, α_ω, κ_gate, σ, c, τ}, the invariant specification hash, and the audit log entry. The knowledge graph embodiment is implementable independently of the three-layer Measurement—Control—Coordination architecture and is combinable with any of the substrate-specific, multi-tenant, or API gateway embodiments described herein.

[E034] In some embodiments, the system is configured as a navigator-class meta-routing architecture whose primary execution function is certification-based routing rather than direct problem solving. The navigator receives contextual inputs, computes the structured compatibility certificate via the proxy estimation architecture described in [E031], and routes each certified input to the downstream solver, model, or execution process exhibiting maximum compatibility under the geometric compatibility morphism φ, without itself executing any inference, prediction, or decision-making task on the contextual input. The navigator maintains a solver registry comprising a plurality of heterogeneous downstream solvers, each characterized by a solver contract specifying compatibility thresholds, operational constraints, and capability centroids in the shared latent space. Upon receiving a contextual input, the navigator computes the certificate triple and evaluates the four-gate gatekeeper against each available solver in the registry, selecting the solver for which the certificate satisfies all gate conditions with the highest margin above the dynamic admissibility threshold. When no solver in the registry satisfies all gate conditions for a given input, the navigator applies the morph repair cycle as described herein, or defers the input to a fallback queue for human review. The navigator implements recursive proxy validation by applying the proxy drift monitor of [E031] to its own routing decisions: if the distribution of routing outcomes shifts suddenly, the navigator flags potential miscalibration of its own proxy layer before downstream solvers are affected. The navigator does not update neural network weights, learn routing policies, compute gradients, or perform any form of runtime optimization; routing decisions are computed algebraically from fixed embeddings and the deterministic certificate triple. This embodiment supports deployment as a centralized compatibility gateway for heterogeneous agentic pipelines, providing a single enforcement boundary through which all solver invocations must pass, and enabling audit trail construction across the full pipeline from a single point of certificate logging. The navigator-class architecture represents the architectural endpoint of the compatibility turn described herein: a system whose intelligence lies not in solving problems but in certifying and maintaining the representational conditions under which any solver can operate reliably.

Group XII: Computer-Readable Medium And Additional Embodiments

[E035] In some embodiments, the methods and systems disclosed herein are implemented as instructions stored on one or more non-transitory computer-readable storage media. A non-transitory computer-readable storage medium includes any tangible medium capable of storing instructions that, when executed by one or more processors, cause the processors to perform the methods disclosed herein, including computing the representation-solver compatibility functional, projecting the structured compatibility certificate, evaluating the certificate via the sequential four-gate gatekeeper, and determining execution control actions based at least in part on the certificate.

Examples of non-transitory computer-readable storage media include, but are not limited to: semiconductor memory devices such as random access memory (RAM), read-only memory (ROM), electrically erasable programmable read-only memory (EEPROM), and flash memory; magnetic storage devices such as hard disk drives, magnetic tape, and floppy disks; optical storage devices such as compact discs (CD-ROM, CD-R, CD-RW), digital versatile discs (DVD), and Blu-ray discs; solid-state drives (SSD); network-attached storage; cloud-accessible storage services; and any other medium that can be used to store program code in the form of instructions or data structures and that can be accessed by a processor.

The instructions may be organized as software modules corresponding to the architectural components disclosed herein, including a Compatibility Functional Module configured to compute the representation-solver compatibility functional, a Certificate Projection Module configured to project the functional into the three mutually exclusive components constrained by the normalization invariant, a Compatibility Gate Module configured to evaluate the structured compatibility certificate through the sequential four-gate gatekeeper, and an Execution Control Module configured to determine and cause implementation of execution control actions. These modules may be combined into fewer modules, subdivided into additional modules, or implemented as a monolithic program without departing from the scope of the present disclosure.

The instructions may be distributed across multiple non-transitory computer-readable storage media and executed by multiple processors in a distributed computing environment. In some embodiments, a first portion of the instructions implementing the Measurement Layer is stored on a first medium local to a communication device, a second portion of the instructions implementing the Control Layer and Coordination Layer is stored on a second medium local to a processing device, and the devices are communicatively coupled via a network. In some embodiments, the instructions are stored on a cloud-accessible storage service and downloaded or streamed to one or more processors for execution on demand.

The term "non-transitory" does not exclude storage media that are rewritable, erasable, or volatile; it excludes only transitory signals per se such as electromagnetic waves propagating through a transmission medium. A volatile memory device such as DRAM storing the instructions during execution is a non-transitory computer-readable medium for purposes of this disclosure. This embodiment is combinable with any of the three-layer architecture, dual feedback loop, multi-tenant platform, certificate-as-a-service, hardware-accelerated, neuromorphic, quantum substrate, or API gateway embodiments described herein.

[E036] In some embodiments, the simplex projection operator SimplexOp(·) that enforces the normalization invariant R+Ssup+N=1 is implemented using one of the following projection functions:

Softmax with temperature: $\mathrm{SimplexOp}(z)\_i=\exp(z\_i/\tau)/\Sigma\_j \exp(z\_j/\tau)$, where τ is a temperature parameter controlling the sharpness of the projection. Lower temperature values produce sharper distributions approaching one-hot encodings; higher temperature values produce softer distributions approaching uniform.

Sparsemax: A projection operator that maps onto the probability simplex while encouraging sparsity, enabling exact zero components in the decomposition. Sparsemax is differentiable almost everywhere and produces sparse outputs that may improve interpretability of the R, Ssup, N decomposition by driving negligible components to exactly zero.

Entropic map: A projection operator that enforces the simplex constraint via entropy-regularized optimization, producing smooth distributions with controllable entropy levels.

The choice of simplex projection operator determines the geometry of the feasible region and gradient flow properties during training of the projection head. All three operators guarantee satisfaction of the normalization invariant by construction. This embodiment is combinable with any of the three-layer architecture, dual feedback loop, or hardware-accelerated embodiments described herein.

[E037] In some embodiments, the system exploits the structural independence of the compatibility score κ_gate and the turbulence metric σ, wherein knowing one metric does not determine the other. This independence is established by the realizability of all four combinations:

High κ_gate, low σ: The encoding achieves near-optimal compatibility and solver trajectories are stable under perturbations. This is the ideal operating condition; the system issues an execute decision.

Low κ_gate, low σ: The encoding achieves poor compatibility but solver trajectories are consistently poor (stable failure). This condition is predictably bad and enables reliable remediation via re-encoding or solver substitution.

High κ_gate, high σ: The encoding achieves efficient compatibility but is brittle under perturbations (fragile optimality). This condition requires caution: the encoding may perform well under nominal conditions but fail unpredictably under distribution shift or adversarial perturbation. The dynamic admissibility threshold hardens in this regime.

Low κ_gate, high σ: The encoding achieves poor compatibility and solver trajectories are unstable. This is the worst-case condition; the system issues a reject decision.

Because all four combinations are realizable, admissibility enforcement must check both κ_gate and σ independently; satisfying one does not guarantee satisfying the other. This independence justifies the conjunction-based control logic wherein the execution decision depends on both the quality metric α and the compatibility score κ_gate, as established in DEF-14. This embodiment is combinable with any of the gate architectures described herein.

[E038] In some embodiments, the system implements asymmetric safety weighting wherein enforcement policies penalize dangerous errors more severely than conservative errors. A dangerous error occurs when the certificate indicates high relevance or high compatibility while the downstream solver experiences noise-induced degradation—that is, a false negative on noise detection that permits execution of a corrupted input. A conservative error occurs when the certificate indicates high noise or low compatibility while the downstream solver would have operated normally—that is, a false positive on noise detection that unnecessarily blocks a valid input.

In safety-critical deployments, the loss function used during training of the projection head weights dangerous errors more heavily than conservative errors by a configurable asymmetry factor (default 6:1). This asymmetric weighting produces enforcement behavior that achieves a six-fold reduction in dangerous errors compared to symmetric loss optimization, despite a modest reduction (approximately three percent) in overall classification accuracy. The six-fold dangerous error reduction result demonstrates that the asymmetric weighting achieves safety gains that violate symmetric loss optimization assumptions.

The asymmetry factor may be configured according to domain-specific risk tolerances: higher asymmetry factors are appropriate for safety-critical domains such as medical devices, autonomous vehicles, and industrial control systems; lower asymmetry factors may be appropriate for domains where conservative errors carry significant cost, such as high-throughput transaction processing. This embodiment is combinable with any of the gate architectures, hardware-accelerated embodiments, or multi-agent coordination embodiments described herein.

[E039] In some embodiments, the system formalizes computational difficulty as a property of the triple (P, E, S) rather than of the problem instance P alone, where P is a problem instance from problem space P, E: P→R is an encoding mapping to representation space R, and S: R→O is a solver mapping to output space O. The observed difficulty D (P, E, S) is dominated by the structural compatibility between the representation geometry induced by E and the operational dynamics of solver S.

For Fixed Problem P and Solver S, the Admissible Encoding Set is Defined as:

$$E\_adm(P,S):=\{E\in E:\text{solver dynamics satisfy stability/robustness criteria}\}$$

Depending on Application Domain and Safety Requirements, Admissibility May be Defined Via One or More of the Following Criteria:

a) Trajectory boundedness: $|z_t| \leq B$ for all $t \geq 0$ and some finite $B < \infty$, where z_t is the solver internal state at time t.
b) Convergence guarantee: $z_t \rightarrow z^*$(equilibrium) or $L(z_t) \rightarrow L^*$(loss convergence) as $t \rightarrow \infty$.
c) Robustness to perturbations: Small changes in E or disturbances ξ_t produce small changes in z_t (Lipschitz continuity).
d) Resource constraints: Solver terminates within time budget T_max, energy budget E_max, or memory budget M_max.
e) Probabilistic guarantees: Probability of failure or divergence $\leq \delta$ for specified confidence level.
f) Safety constraints: Solver never enters unsafe states z_t∈Z_unsafe.

For encodings E∉E_adm (P, S), the solver may diverge (unbounded error accumulation), oscillate (no convergence), exhibit pathological sensitivity (small perturbations cause large performance changes), or produce ill-defined difficulty ($D=\infty$ or highly unstable). Inadmissible encodings are detected and remediated via repair (transform E toward admissible region), rejection (hard gate blocks solver execution), or routing (redirect to alternative solver S' for which E∈E_adm (P, S')).

The Compatibility Score κ is then Defined as:

$$\kappa(E,S;P)=D^*(P,S)/D(P,E,S)\in(0,1)$$

Where D*(P, S):=inf_{E'∈E_adm(P,S)} D(P, E', S) is the best-achievable difficulty for solver S on problem P over all admissible encodings. A compatibility score κ=1 indicates the encoding achieves optimal difficulty; κ→0 indicates the encoding is far from optimal. This formalization provides the mathematical foundation for the compatibility score κ_gate used by the sequential four-gate gatekeeper. This embodiment is combinable with any of the substrate-specific, multi-agent, or theoretical framework embodiments described herein.

[E040] In some embodiments involving multiple encoding channels such as text, vision, audio, or sensor modalities, the scalar compatibility score κ_gate used for enforcement is computed as the minimum of active source channel compatibility scores:

$$\kappa\_gate=\min\{\kappa\_text,\kappa\_vision,\kappa\_audio,\kappa\_sensor,\kappa\_interface\}$$

Where each modality-specific compatibility score κ_m is computed from the structural alignment between that modality's representation and the downstream solver's operational characteristics for that modality, and κ_interface is the cross-modal alignment score derived from the geometric compatibility morphism.

The minimum aggregation ensures that no single compromised modality can bypass admissibility checks: an adversary who degrades a single modality while the remaining modalities compensate cannot achieve a passing aggregate score. This compositional approach implements the weakest-link optimality theorem established in DEF-13: any aggregation more permissive than the minimum can be bypassed by an adversary targeting the lowest-scrutiny channel.

In some embodiments, cross-modal agreement κ_interface is measured via phasor coherence, wherein each source modality is treated as a signal vector on a representation manifold. Constructive interference (phase alignment) yields high coherence, indicating consistent multi-source agreement. Destructive interference (phase conflict) yields low coherence, producing a distinct BLOCK-CONFLICT state that differentiates agent disagreement from simple low compatibility. This quantum-inspired mechanism enables detection of contradictory signals even when individual source quality metrics appear acceptable, supporting multi-agent consensus verification and conflict resolution protocols. This embodiment is combinable with any of the multi-agent coordination or sensor fusion embodiments described herein.

Group XIII: Implementation Tooling and Operational Infrastructure

[E041] In some embodiments, the system implements a two-stage drift detection mechanism that combines lightweight heuristics with statistical confirmation to detect distributional shift in streaming certificate data without imposing continuous statistical testing overhead. A first stage performs an O(1) per-sample heuristic evaluation comprising component indeterminacy detection, which identifies when the decomposition approaches a near-uniform distribution within a configurable deviation bound signaling loss of discriminability, and consecutive collapse streak detection, which triggers upon observing a repeated collapse type for at least a configurable count signaling persistent degradation. Upon triggering of either heuristic, a second stage performs an O(W log W) statistical confirmation test comprising a Kolmogorov-Smirnov test applied to component distributions relative to a reference distribution with a significance threshold configurable in a range from 0.01 to 0.1, or a Wasserstein distance computation across successive windows to detect gradual drift through monotonic increase criteria with a window size configurable in a range from 64 to 4096 samples. The two-stage architecture reduces computational cost relative to continuous statistical testing while maintaining statistical rigor when drift indicators are present. This embodiment is combinable with any of the proxy estimation, multi-agent coordination, or hardware substrate embodiments described herein.

[E042] In some embodiments, the system implements a synthetic dataset generator that produces stratified samples across a plurality of collapse types with ground-truth labels for calibration and validation of detection thresholds prior to deployment. The generator produces balanced datasets across collapse types and domains with configurable samples per type, and outputs in a format selected from dictionary representation, tabular representation, Arrow IPC representation, or protocol-encoded representation. The generator implements temporal patterns including static, gradual drift, sudden shift, and periodic timing profiles to evaluate drift detection and ring-buffer aggregation behavior under realistic streaming conditions. The generator implements texture control for noise smoothness via spectral shaping, enabling evaluation of sensitivity to correlated versus uncorrelated corruption in the embedding space. The generator produces adversarial boundary scenarios near detection thresholds to validate sensitivity and specificity before deployment, addressing the problem that real-world failure data for novel modalities and novel compute substrates may be scarce or nonexistent. This embodiment is combinable with any of the multi-tenant platform, certificate-as-a-service, or adaptive threshold calibration embodiments described herein.

[E043] In some embodiments, the system implements a hardware-aware quantization and numerical robustness layer for the decomposition and derived metrics that preserves the normalization invariant under finite-precision arithmetic. The robustness layer applies compensated normalization methods that preserve the simplex constraint under finite precision, including Kahan summation or pairwise summation to reduce floating-point error accumulation, with a correction term ensuring that the sum of the scaled components equals one within a tolerance configurable in a range from 1e−6 to 1e−3. The robustness layer maintains dual representations in float16 for throughput and float32 for critical threshold comparisons, reducing false triggers without materially increasing latency. The robustness layer applies stochastic rounding in low-precision arithmetic to reduce bias and applies guard-band thresholds that incorporate confidence intervals derived from numeric error bounds. Quantization scales are calibrated per deployment using synthetic dataset boundary scenarios that maximize sensitivity to numeric instability. This embodiment addresses the problem that quantization error, rounding bias, and numeric saturation may violate the normalization invariant and may cause spurious collapse detections near threshold boundaries in mixed-precision and analog-adjacent deployments. This embodiment is combinable with any of the hardware-accelerated, memristor substrate, or edge device embodiments described herein.

[E044] In some embodiments, the system implements a streaming sketch-based distribution monitor that maintains compact summaries of component distributions and reliability behavior for efficient drift detection in high-throughput deployments. The monitor maintains approximate quantile sketches for the relevance component, the superfluous component, the noise component, and the reliability coefficient, updated in O(log n) or amortized O(1) time per sample with an error bound configurable in a range from 0.5% to 5%. The monitor may employ count-min sketches or reservoir sampling variants to approximate rare-event tails of the noise component that are critical for poisoning detection. Separate sketches may be maintained per operating phase or per consumer class to preserve interpretability of drift under heterogeneous workloads. The sketch-based architecture reduces memory overhead relative to full-resolution history storage while preserving sufficient statistical power to detect meaningful distribution shifts and to trigger the two-stage drift detection mechanism described in [E041]. This embodiment is combinable with any of the multi-tenant platform, proxy estimation, or certificate-as-a-service embodiments described herein.

[E046] The embodiments described in paragraphs [E001] through [E045] are non-limiting examples illustrating particular implementations of the subject matter claimed herein. Features described in any embodiment may be combined with features described in any other embodiment or in the claims without limitation. The three-layer architecture described in [E001], the dual feedback loop architecture described in [E010] and [E011], the deterministic fixed-runtime architecture described in [E015], the quantum substrate embodiments described in [E027] and [E028], the offline training infrastructure [E032], the knowledge graph embodiment [E033], the navigator-class meta-routing architecture [E034], the computer-readable medium embodiment [E035], the simplex projection variants [E036], the structural independence embodiment [E037], the asymmetric safety weighting embodiment [E038], the difficulty triple formalization [E039], the multi-modal composition embodiment [E040], the two-stage drift detection [E041], the synthetic dataset generator [E042], the hardware-aware quantization robustness layer [E043], the streaming sketch-based distribution monitor [E044], and the cross-consumer policy test harness [E045] represent independent claim surfaces and are not mutually required. The quantum substrate embodiments do not require the presence of the three-layer architecture. The three-layer architecture does not require quantum substrates. The Lyapunov stability embodiment [E017] and the Ports-and-Adapters embodiment [E016] may each be implemented independently of the dual feedback loop architecture. The multi-tenant platform [E030] and the certificate-as-a-service platform [E029] may be implemented with any combination of the hardware, software, and quantum substrate embodiments. Nothing in these embodiments is intended to limit the scope of the claimed subject matter to any particular implementation, substrate, domain, or application.

The Detailed Description of the Drawings follows, describing the figures (FIG. 1 through FIG. 37) that illustrate the architecture, computation flows, enforcement gates, and substrate-specific configurations disclosed herein.

FIG. 1 is an illustration of a compatibility-governed execution architecture 100 consistent with various embodiments of the present disclosure. A user 112 submits contextual input data and a structured compatibility certificate (shown in the display element at top) into the architecture 100. The architecture 100 may be hosted on a centralized server 102, such as a cloud computing service. The centralized server 102 communicates with other network entities over a communication network via communication links 106, including a mobile device 104, a downstream solver 110, a database 114, and a sensor 116. A broadcast tower or access point 200 provides wireless connectivity to the centralized server 102. In operation, rather than passing contextual input data directly from the mobile device 104 to the downstream solver 110 for open-ended processing, the centralized server 102 intercepts the input via the communication links 106 and performs compatibility certification prior to solver invocation. The centralized server 102 implements a three-layer architecture operating in sequence: a Measurement Layer that computes a representation-solver compatibility functional and projects it into a structured compatibility certificate comprising three mutually exclusive components; a Control Layer implementing a sequential four-gate gatekeeper that evaluates the certificate and returns a typed execution decision; and a Coordination Layer implementing a geometric compatibility morphism that maps task representations to solver agents and restructures the task-solver graph topology in response to gate decisions. By emitting the structured compatibility certificate as enforcement data, the system deterministically routes, throttles, or rejects execution, strictly avoiding reliance on post-hoc runtime policy learning or multi-agent reinforcement learning. The mobile device 104 is an example of a communication device as that term is used in the claims; the centralized server 102 and its associated processing hardware are examples of a processing device as that term is used in the claims. Other embodiments may employ different physical configurations of communication devices and processing devices without departing from the scope of the present disclosure.

Figure 2:
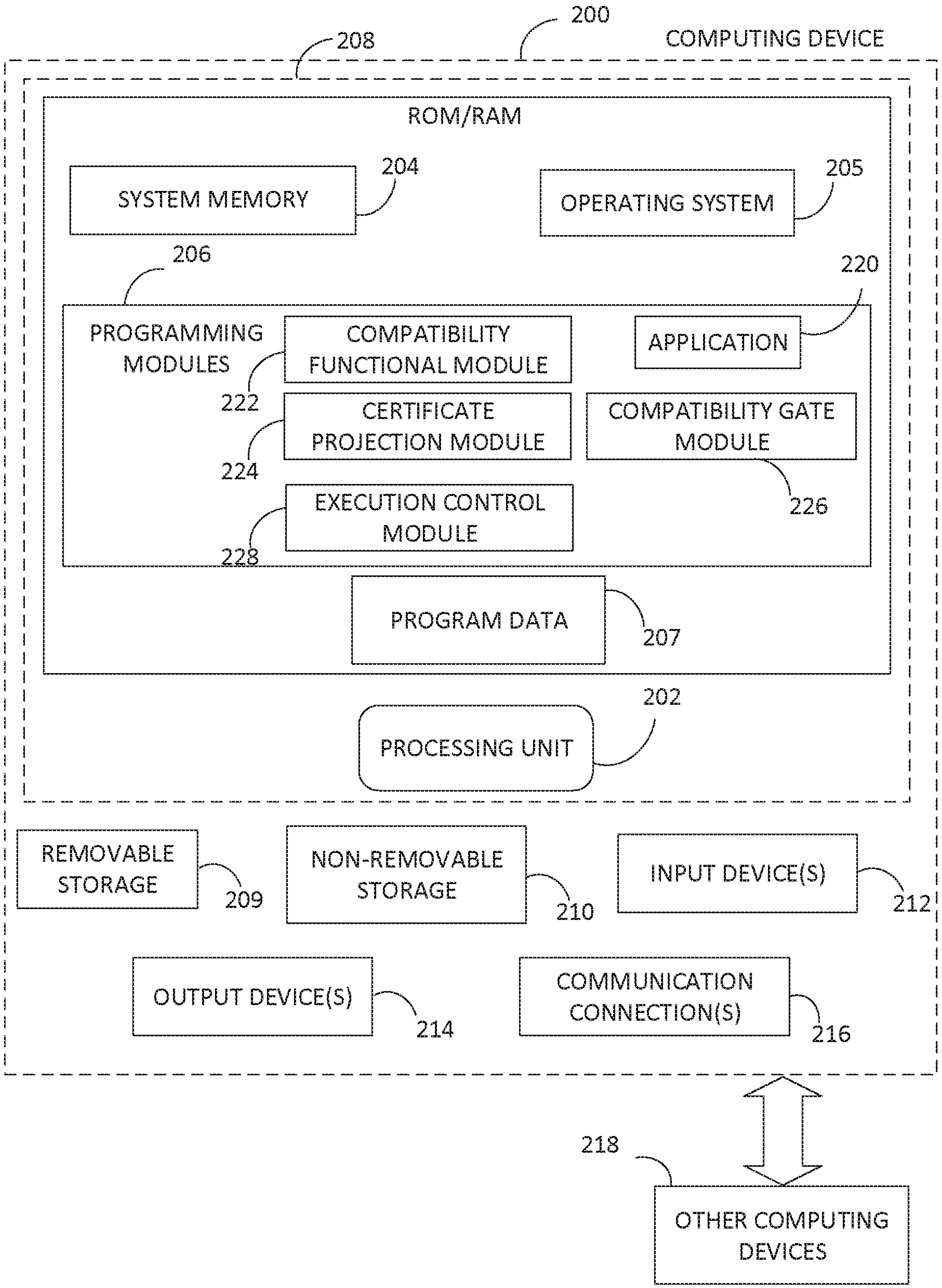
FIG. 2 is a block diagram of a computing device 200 for implementing the methods disclosed herein, in accordance with some embodiments.

FIG. 2 is a block diagram of a computing device 200 for implementing the structured compatibility certification methods disclosed herein. The computing device 200 comprises at least one processing unit 202 and a system memory 204 including ROM/RAM 208. The system memory 204 stores an operating system 205, one or more programming modules 206, program data 207, and one or more applications 220. The programming modules 206 include specialized components for pre-execution gating: a Compatibility Functional Module 222 that computes the representation-solver compatibility functional; a Certificate Projection Module 224 that projects the compatibility functional into three mutually exclusive components (R, S_sup, N) constrained by a normalization invariant; a Compatibility Gate Module 226 that evaluates the structured compatibility certificate against threshold parameters through sequential gates prior to downstream solver invocation; and an Execution Control Module 228 that implements the typed execution decision returned by the Compatibility Gate Module 226. The computing device 200 further comprises removable storage 209, non-removable storage 210, one or more input devices 212, one or more output devices 214, and one or more communication connections 216 enabling communication with other computing devices 218.

Embodiments of the disclosure are not limited to any particular application domain, solver class, learning architecture, or execution substrate.

The computing device 200 may have additional features or functionality including removable storage 209 and non-removable storage 210. Input device(s) 212 (e.g., keyboard, mouse, touch interface, camera, microphone, sensor, actuator feedback interface, biometric sensor) and output device (s) 214 (e.g., display, speakers, actuator controller, robotic interface, accelerator controller) may be included. Such interfaces may support multimodal interaction, machine-to-machine communication, or integration into cyber-physical systems, autonomous systems, industrial controllers, robotic platforms, or distributed multi-agent architectures.

The computing device 200 may include a communication connection 216 configured to enable communication with other computing devices 218 across local or wide-area networks. Communication may include transmission of contextual representations, compatibility certificates, enforcement signals, or policy updates. Compatibility certificates may be propagated, aggregated, validated, recomputed, invalidated, or merged across distributed services or cooperating execution agents.

Program modules may include routines, components, data structures, or abstract data types configured to implement compatibility evaluation, certificate generation, pre-task enforcement, runtime execution modulation, solver substitution, resource allocation control, threshold adaptation, or cross-accelerator orchestration. Embodiments may be practiced with hand-held devices, multiprocessor systems, accelerator-based systems, neuromorphic substrates, quantum processing systems, hybrid analog-digital systems, and distributed execution environments.

Embodiments of the disclosure may be implemented in electrical circuits comprising discrete electronic elements, integrated chips, memristive crossbar arrays, hardware gating circuits, instruction-level enforcement modules, or firmware-level execution control logic. Embodiments may be practiced using mechanical, optical, fluidic, analog, neuromorphic, quantum, or hybrid computational technologies. Accordingly, "computing device" and "processing device" as used herein are not limited to classical digital processors and may include heterogeneous or non-von-Neumann computational substrates.

Compatibility indicators generated by the disclosed system may be mapped to execution policies enforced at runtime, operating system, virtual machine, firmware, hardware controller, or instruction-level execution layers.

Figure 3:
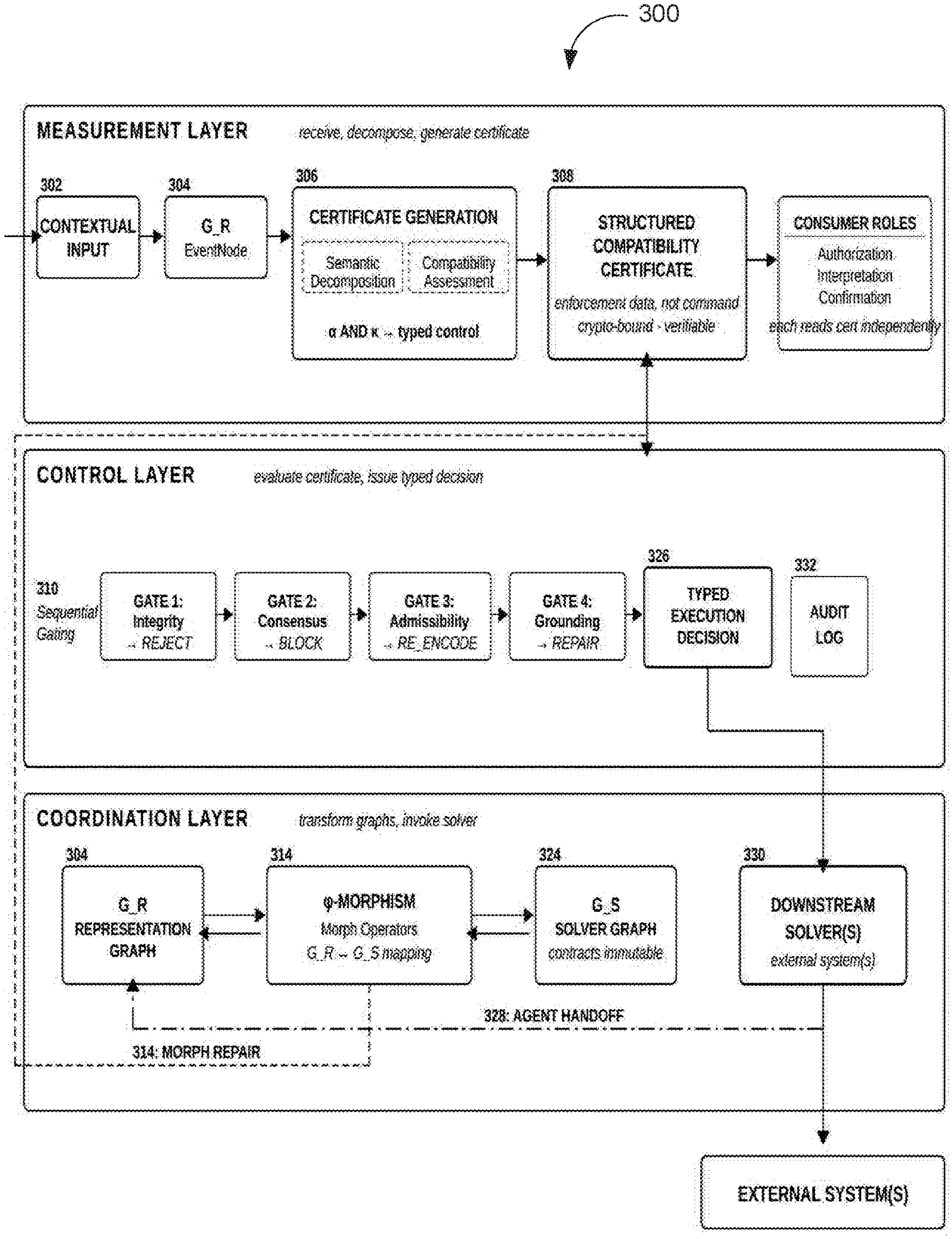
FIG. 3 illustrates a layered compatibility-governed system architecture 300 comprising a measurement layer, a control layer, and a coordination layer, in accordance with some embodiments.

FIG. 3 illustrates a layered execution-control architecture 300 organized into three cooperating layers.

The Measurement Layer receives a contextual input 302, encodes it as an event node in a representation graph G_R 304, and passes it to a Certificate Generation Module 306. The Certificate Generation Module 306 computes the representation—solver compatibility functional via two architecturally distinct signal paths—a Semantic Decomposition path and a Compatibility Assessment path—and projects the functional into a Structured Compatibility Certificate 308 comprising three mutually exclusive, semantically-distinct components constrained by a normalization invariant. The Certificate Generation Module 306 derives quality metric $\alpha$ and compatibility score $\kappa$ for typed control. The Structured Compatibility Certificate 308 is architecturally configured as enforcement data, not as a command, and is crypto-bound and verifiable. The certificate is emitted to a plurality of illustrative certificate consumers, including an Authorization role, an Interpretation role, and a Confirmation role. These named roles are non-exclusive examples of certificate consumption. A given consumer may perform one or more such functions, and additional consumer functions may include routing, remediation selection, solver selection, monitoring, audit, logging, policy evaluation, configuration, or other execution-related support functions. In some embodiments, certificate consumers may operate independently; in other embodiments, they may operate sequentially, cooperatively, hierarchically, or in partially coordinated fashion without requiring a single centralized command process.

The Control Layer evaluates the Structured Compatibility Certificate 308 and issues a typed execution decision prior to any downstream solver invocation. A Sequential Four-Gate Gatekeeper 310 evaluates the certificate through four gates in fixed order that may not be reordered: Gate 1 (Integrity Guard, issuing REJECT on noise saturation), Gate 2 (Consensus Gate, issuing BLOCK on structural incoherence), Gate 3 (Admissibility Gate, issuing RE_ENCODE on compatibility failure), and Gate 4 (Grounding Gate, issuing REPAIR on ungrounded physical signal quality). The Sequential Four-Gate Gatekeeper 310 produces a Typed Execution Decision 326 selecting one of EXECUTE, REJECT, BLOCK, RE_ENCODE, or REPAIR. A Structured Audit Log 332 records the gate outcome, certificate metrics, and timestamp in observational mode without altering execution behavior.

The Coordination Layer manages the graph-based task-to-solver relationship structure. A Representation Graph G_R 304 stores task-bearing event nodes, each carrying a local structured compatibility certificate. A geometric compatibility morphism ($\varphi$-Morphism) 314 implements a deterministic mapping from G_R to a Solver Graph G_S 324, which stores capability-bearing agent nodes with immutable contracts. Morph Operators associated with the $\varphi$-Morphism 314—including pruning, verification, ensemble, and event-expand operators—each move exactly one certificate scalar in exactly one direction, guaranteeing repair loop termination. Downstream Solver(s) 330 are external systems invoked only upon an EXECUTE decision. Two mutually exclusive feedback loops govern remediation: a Morph Repair Cycle (Loop 1, anchored at 314) triggered by non-execute gate decisions, wherein graph transformation operators modify G_R or G_S, the certificate is re-derived, and gates are re-evaluated; and an Agent Handoff Cycle (Loop 2, anchored at 328) triggered by execute decisions, wherein the downstream solver produces real output that is encoded as a new event node carrying a newly-derived certificate reflecting actual intermediate content rather than initialization state.

The three layers organize the subsequent figure descriptions in this disclosure. Figures in the Measurement Layer group (FIG. 9, FIG. 10, FIG. 11, FIG. 14, FIG. 17, FIG. 26, FIG. 30, and FIG. 36) describe the generation and derivation of the structured compatibility certificate. Figures in the Control Layer group (FIG. 5, FIG. 6, FIG. 7, FIG. 12, FIG. 13, FIG. 15, FIG. 19, FIG. 20, FIG. 21, FIG. 22, FIG. 23, and FIG. 24) describe certificate consumption, collapse-domain classification, trust validation, and sequential gate evaluation governing execution decisions. Figures in the Coordination Layer group (FIGS. 16, 25, 33) describe graph-based task-solver coordination and multi-agent routing. Figures in the Hardware and System Architecture group (FIG. 8, FIGS. 18A-18B, FIG. 27, FIG. 28, FIG. 29, FIG. 31, FIG. 32, and FIG. 34) illustrate hardware implementations, advanced embodiments, and deployment configurations of the compatibility-governed architecture. FIG. 35 provides a unified detail view spanning all three layers.

Figure 4:
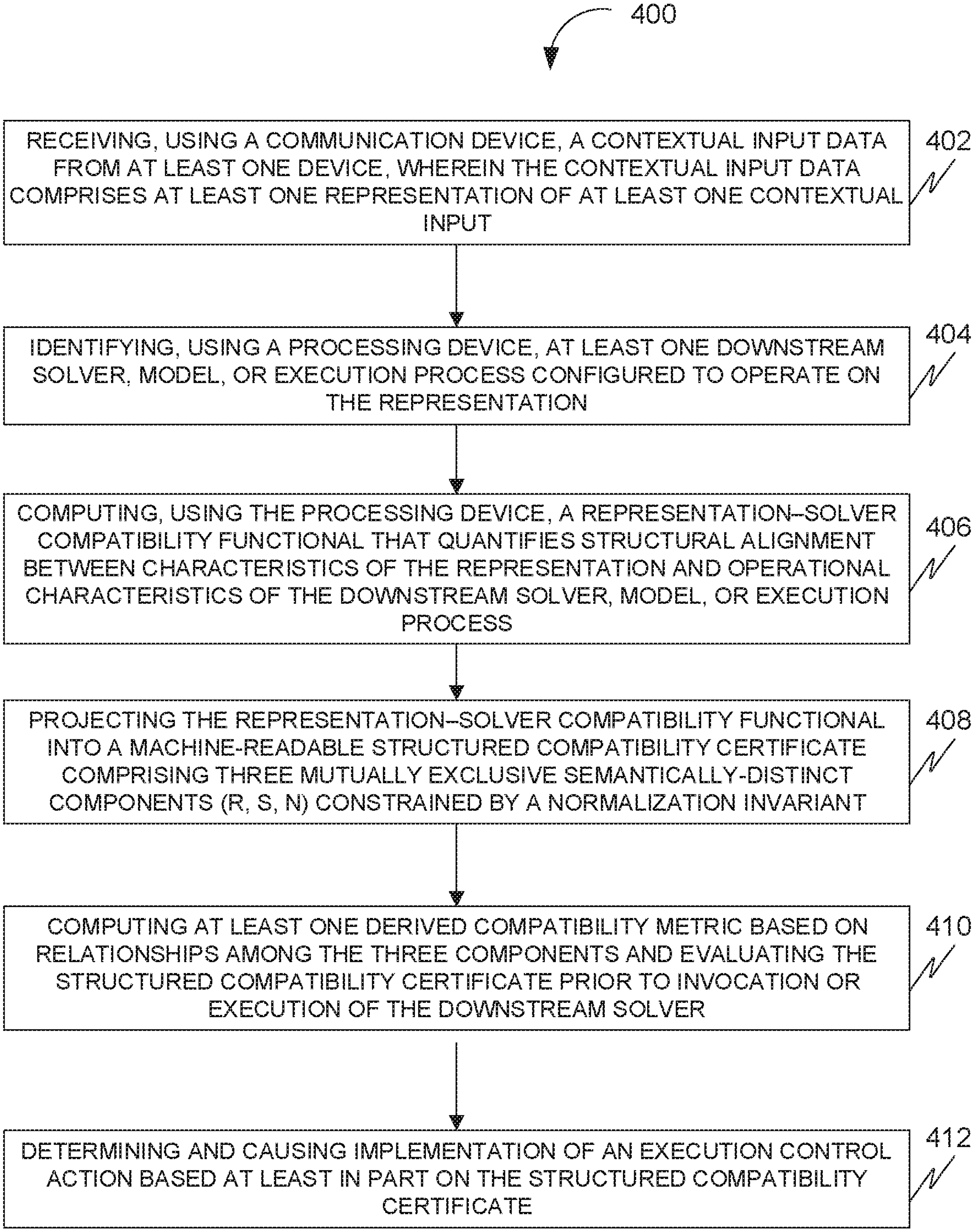
FIG. 4 illustrates a method 400 for generating a structured compatibility certificate configured to govern execution decisions prior to task execution, in accordance with some embodiments.

FIG. 4 illustrates a flowchart of a method 400 for generating a structured compatibility certificate configured to govern execution decisions prior to task execution. In various embodiments, the typed execution decision may condition or cause solver routing, solver substitution, execution throttling, parameter configuration, execution deferral, instruction issuance, memory access, resource allocation, or execution rejection prior to downstream solver invocation. At step 402, the method 400 receives, using a communication device 602, a contextual input data from at least one device 606, wherein the contextual input data comprises at least one representation of at least one contextual input. At step 404, the method 400 identifies, using a processing device 604, at least one downstream solver, model, or execution process configured to operate on the representation. At step 406, the method 400 computes, using the processing device 604, a representation-solver compatibility functional that quantifies structural alignment between characteristics of the representation and operational characteristics of the downstream solver, model, or execution process. At step 408, the method 400 projects the representation—solver compatibility functional into a machine-readable structured compatibility certificate comprising three mutually exclusive semantically-distinct components (R, S, N) constrained by a normalization invariant. At step 410, the method 400 computes at least one derived compatibility metric via two architecturally distinct signal paths—a quality metric ($\alpha$) from semantic decomposition and a compatibility score ($\kappa$_gate) from geometric alignment—and evaluates the structured compatibility certificate through four sequential gates in fixed order prior to invocation or execution of the downstream solver. At step 412, the method 400 determines a typed execution decision (REJECT, BLOCK, RE_ENCODE, REPAIR, or EXECUTE) and causes implementation of an execution control action based at least in part on the structured compatibility certificate. This method corresponds to the primary method described in the claims.

Figure 5:
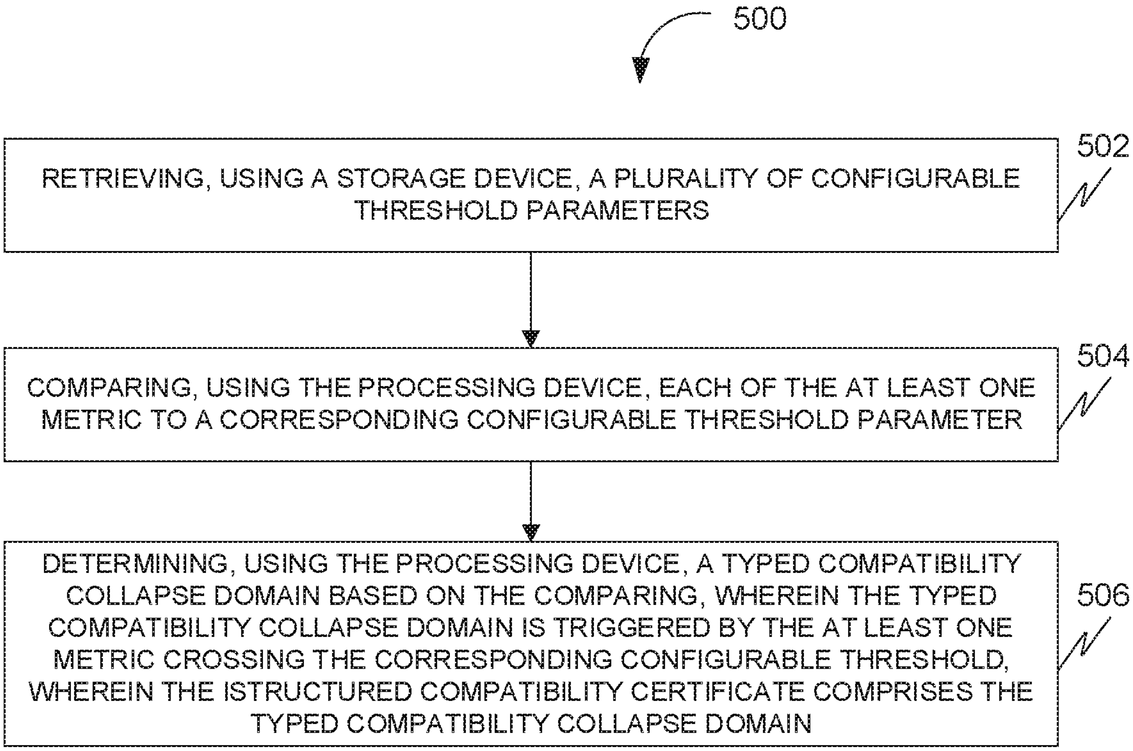
FIG. 5 illustrates typed compatibility collapse domains and enforcement mapping 500, in accordance with some embodiments.

FIG. 5 further illustrates a threshold-based enforcement flowchart 500 implementing the collapse-domain determination described above. The flowchart 500 begins at step 502, wherein the system retrieves, using a storage device 702, a plurality of configurable threshold parameters governing the minimum and maximum acceptable values of each certificate metric—including but not limited to the noise ceiling N_thr, the minimum quality floor $\alpha$_min, the compatibility base $\kappa$_base, and the turbulence hard-barrier $\sigma$_thr. At step 504, the processing device 604 compares each of the at least one derived compatibility metric to its corresponding configurable threshold parameter retrieved in step 502. At step 506, the processing device 604 determines a typed compatibility collapse domain based on the comparing of step 504, wherein the typed compatibility collapse domain is triggered by the at least one metric crossing the corresponding configurable threshold, and wherein the structured compatibility certificate comprises the typed compatibility collapse domain as a machine-readable field. The typed collapse domain determined by flowchart 500 is the same collapse domain carried by the Structured Compatibility Certificate 308 and evaluated by the Sequential Four-Gate Gatekeeper 310; flowchart 500 thus describes the internal decision logic by which the Certificate Generation Module 306 populates the collapse-domain field of the certificate prior to gate evaluation.

Figure 6:
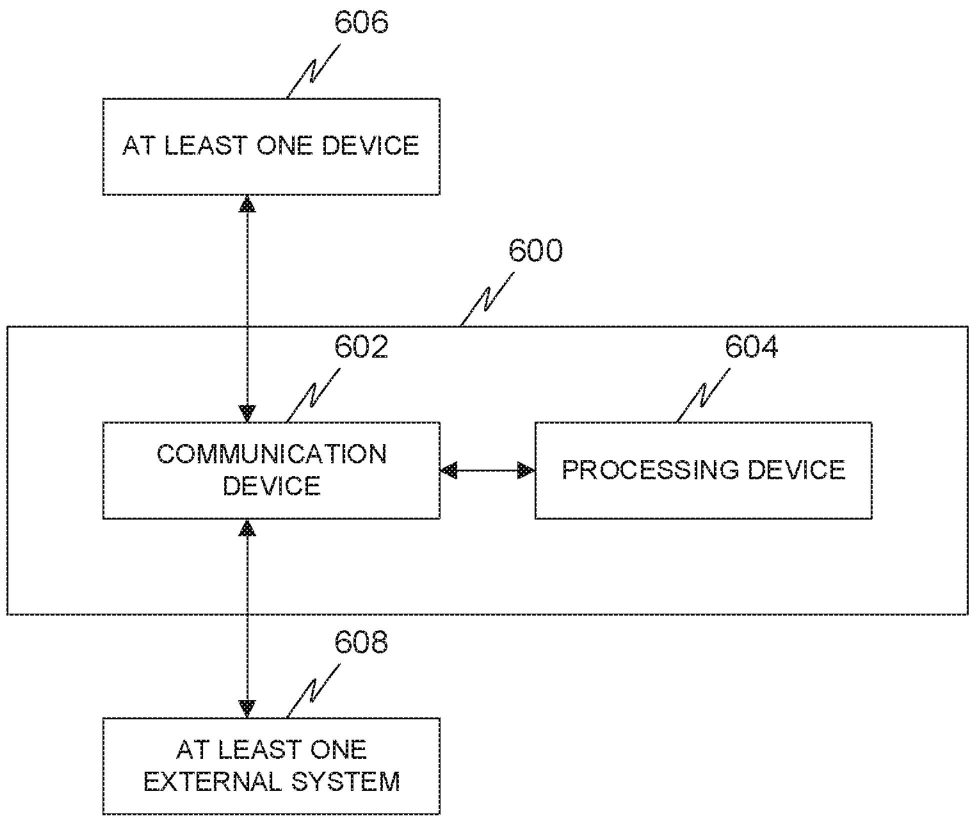
FIG. 6 illustrates a distributed certificate producer-consumer system 600 comprising a communication device and a processing device configured to compute a representation-solver compatibility functional, in accordance with some embodiments.

FIG. 6 illustrates a block diagram of a system 600 configured to compute a representation—solver compatibility functional and provision a structured compatibility certificate for governing execution decisions across one or more external systems. The system 600 comprises a communication device 602 configured to receive contextual input data and to transmit compatibility information, and a processing device 604 communicatively coupled to the communication device 602 and configured to compute the compatibility functional, project the certificate, evaluate it prior to solver invocation, and determine execution control actions. At least one device 606 provides contextual input data to the system 600 via the communication device 602. At least one external system 608 receives the structured compatibility certificate from the system 600 and independently determines its execution actions. In one embodiment, the system 600 is organized to structurally separate the central producer of the certificate from the distributed downstream consumers through defined interfaces. The system 600 utilizes these interfaces to exchange the structured compatibility certificate as a payload artifact rather than as raw data. The downstream consumers independently read the shared certificate and each independently determines its execution actions according to local domain requirements, bridging heterogeneous external systems. In some embodiments, this separation may be implemented using a Ports-and-Adapters or analogous decoupled architectural pattern, wherein the structured compatibility certificate and its associated normalization invariant function as the Port and each computational substrate is implemented as an Adapter, as further described herein; however, the disclosure is not so limited, and any configuration that structurally separates certificate production from certificate consumption is within the scope of the present disclosure.

Figure 7:
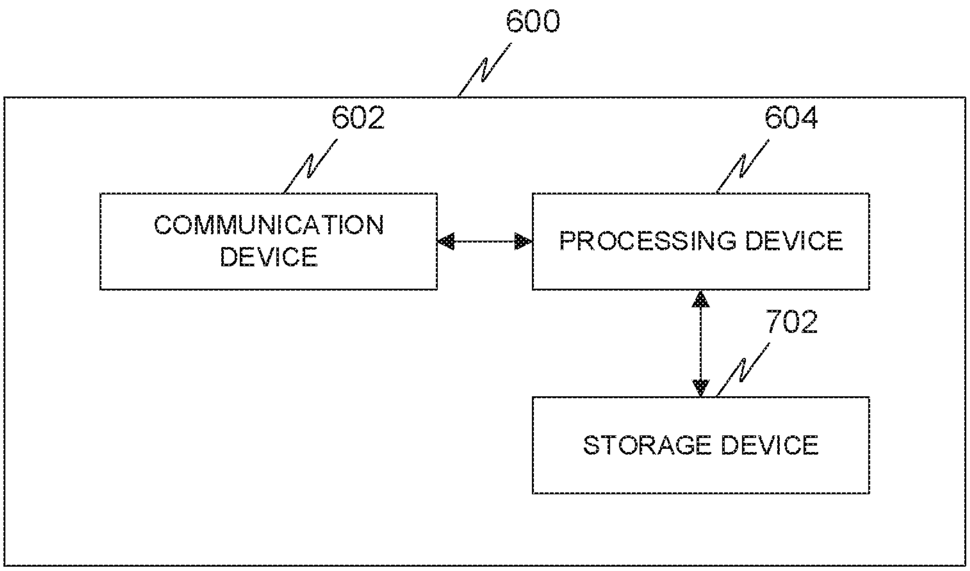
FIG. 7 illustrates a persistent enforcement policy storage layer for the system 600, in accordance with some embodiments.

FIG. 7 illustrates an embodiment of the system 600 further comprising a persistent storage layer implemented as a storage device 702 communicatively coupled to the processing device 604. The persistent storage layer retains one or more of: compatibility parameters governing the projection of a contextual representation into the three structured compatibility components; collapse-domain policies associating typed collapse domains with predefined enforcement actions; and enforcement rules defining threshold conditions under which the system 600 issues, modulates, defers, or rejects execution instructions. The persistent storage layer enables the system 600 to retrieve and apply previously determined enforcement configurations at pre-execution time, without requiring recomputation of collapse-domain policies during live inference. In some embodiments, the persistent storage layer further supports versioned policy records enabling audit, rollback, and policy-diff operations across compatibility parameter updates.

In some embodiments, certificates are interpreted independently by different system components, allowing decentralized decision-making.

FIG. 8 provides a comparative framework table 800 demonstrating compatibility-governed execution relative to traditional post-hoc approaches. The table 800 is organized into three columns: a Problem column 802 identifying common execution challenges, a Traditional Approach column 804 describing conventional methods for each problem, and a Compatibility-Governed Approach column 806 describing the corresponding pre-execution certification solution. For example, where traditional approaches address LLM hallucination through post-hoc fact checking, the compatibility-governed approach measures context quality a before generation; where traditional approaches address context window bloat through arbitrary truncation, the compatibility-governed approach removes superfluous content S while keeping relevant content R. Unlike Monte Carlo dropout, which requires computationally expensive multiple forward passes and only evaluates output confidence after execution, the disclosed architecture provides a deterministic pre-execution enforcement trigger that assesses structural usability of the representation against a specific downstream solver before any solver execution begins, reducing latency and energy consumption. The table 800 illustrates that pre-execution compatibility certification assesses structural alignment rather than output confidence, operates in deterministic time, and generates enforcement data interpretable by heterogeneous downstream consumers independently.

Figure 9:
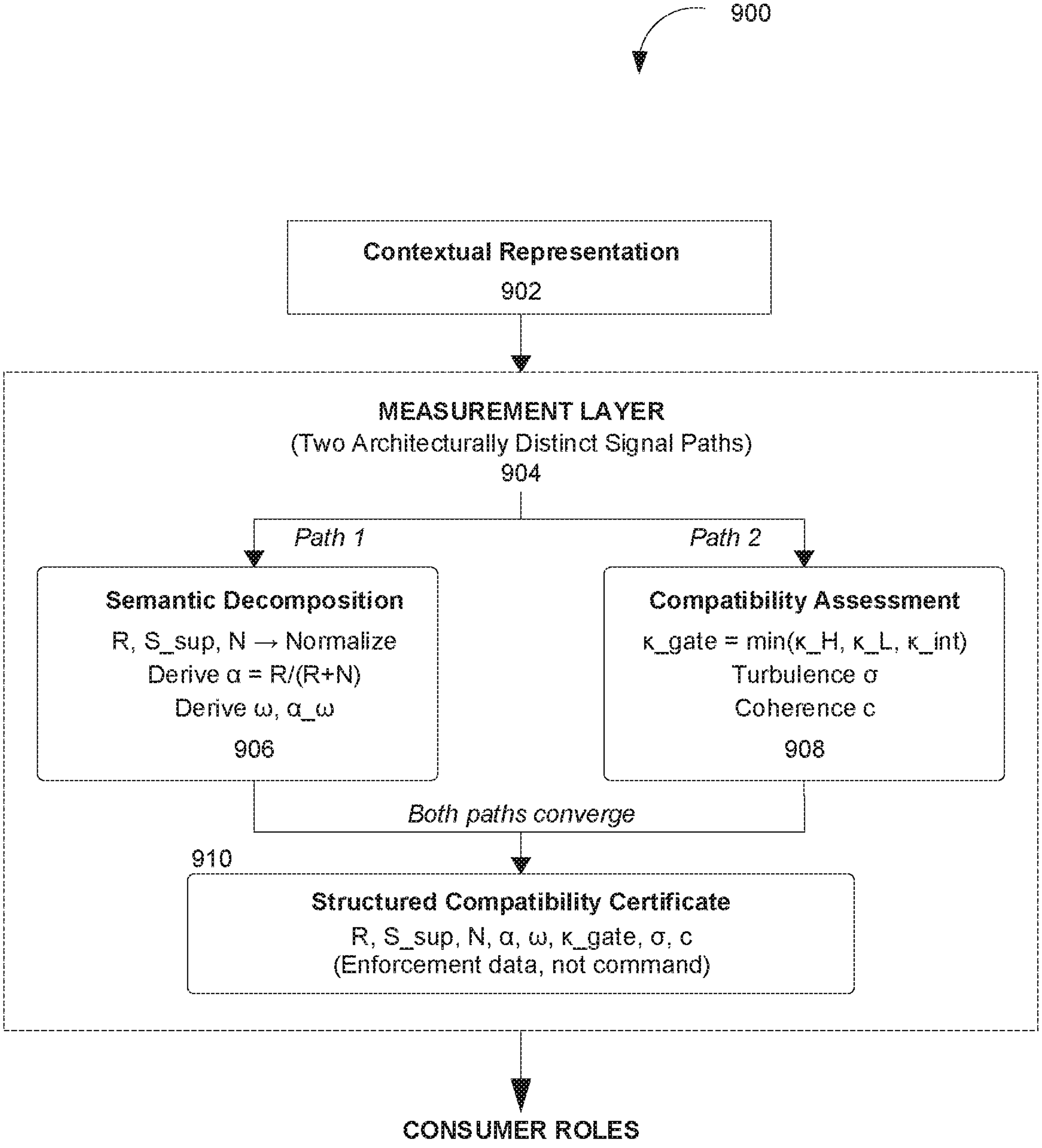
FIG. 9 illustrates a structured compatibility certification flow 900, in accordance with some embodiments.

FIG. 9 illustrates a computation flow 900 for performing structured compatibility certification. Flow 900 depicts the sequence beginning with raw contextual representation ingestion at a Contextual Representation block 902. The flow passes the representation through a Measurement Layer 904 comprising two architecturally distinct signal paths. The first signal path is a semantic decomposition module 906 that projects the compatibility functional into the three mutually exclusive components and derives the quality metric ($\alpha$), the reliability coefficient ($\omega$), and the reliability-adjusted quality metric ($\alpha\_\omega$). The second signal path is a compatibility assessment module 908, detailed in FIG. 36, that independently computes the compatibility score ($\kappa\_gate$) quantifying geometric alignment between the representation and the downstream solver in a shared latent space, together with the turbulence metric ($\sigma$) and the consensus coherence score (c), the computation performed using fixed, pre-computed embeddings without updating neural network weights or learning policies at runtime. In various embodiments, the compatibility score may be computed based on one or more of normalized similarity between embeddings, structural alignment measures, solver descriptor compatibility, or difficulty proxies associated with the representation-solver pair. The two signals have architecturally distinct provenance: the quality metric is derived from the decomposition of the representation itself, while the compatibility score is derived from the geometric relationship between the representation and the specific downstream solver in the shared latent space. Both paths converge into the final structured compatibility certificate 910, which carries R, S_sup, N, $\alpha$, $\omega$, $\kappa\_gate$, $\sigma$, and c as enforcement data (not command) for emission to the Consumer Roles shown below the Measurement Layer. The computation flow is deterministic and does not employ test-time reinforcement learning or runtime policy optimization at any stage.

Figure 10:
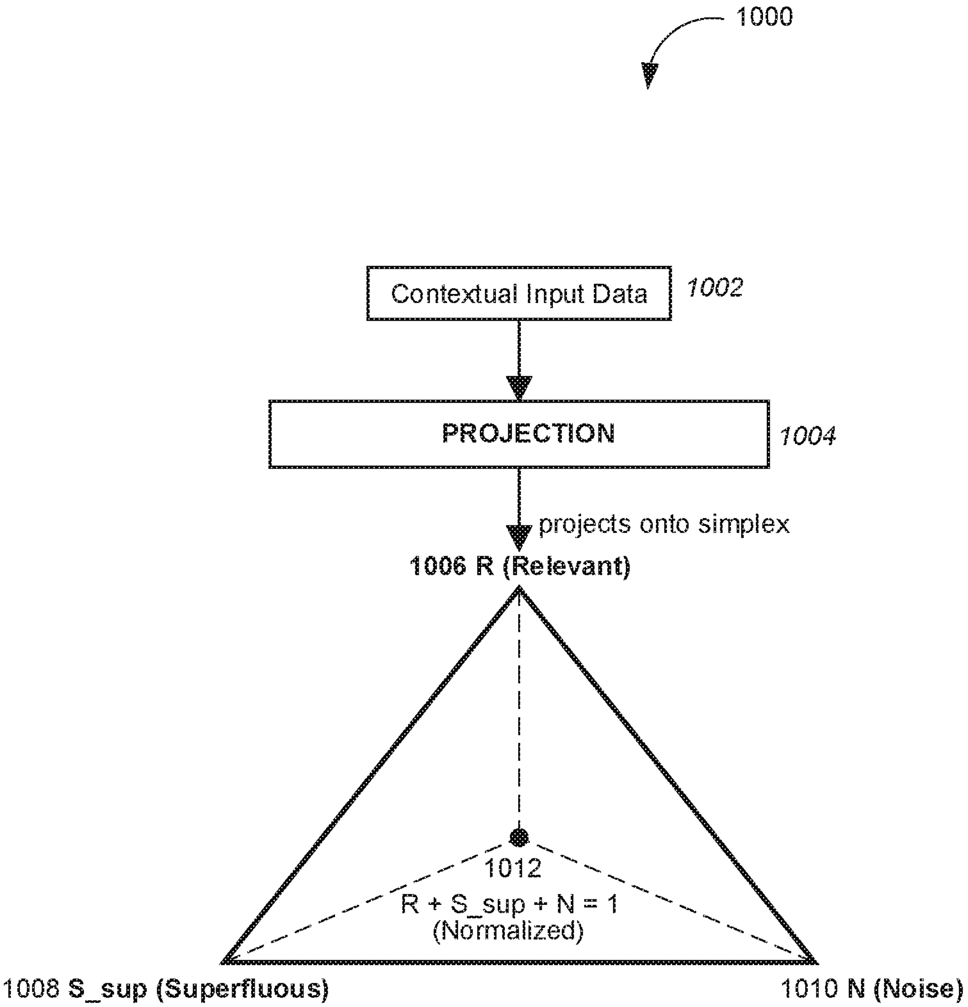
FIG. 10 illustrates a structured compatibility certificate projection 1000, in accordance with some embodiments.

FIG. 10 illustrates a semantic decomposition step within Path 1 of the Measurement Layer (906 of FIG. 9), detailing the projection substep 1000 for provisioning the three foundational certificate components. The contextual representation 1004, corresponding to the contextual representation 902 of FIG. 9, is passed through a learned projection 1006, which decomposes the representation onto a simplex into three mutually exclusive, semantically-distinct components: a Relevant component R 1008 (top vertex) carrying solver-aligned structure, a Superfluous component S_sup 1010 (lower-left vertex) carrying structured but solver-misaligned content, and a Noise component N 1012 (lower-right vertex) carrying destabilizing variance. The three components are constrained by the normalization invariant $R+S\_sup+N=1.0$, which is enforced by construction during projection. The operating point on the simplex represents the contextual projection; the dashed centroid lines illustrate the barycentric coordinate system. The projection step emits the three raw certificate components (R, S_sup, N) via a semantic decomposition output 1014 that feeds the derived metric computation chain of FIG. 11, the cryptographic binding architecture of FIG. 23, and alternative projection embodiments described in connection with FIG. 17. In embodiments employing the Representation Graph G_R(304 of FIG. 3), the contextual representation 1004 corresponds to the embedding associated with a task-bearing EventNode.

Figure 11:
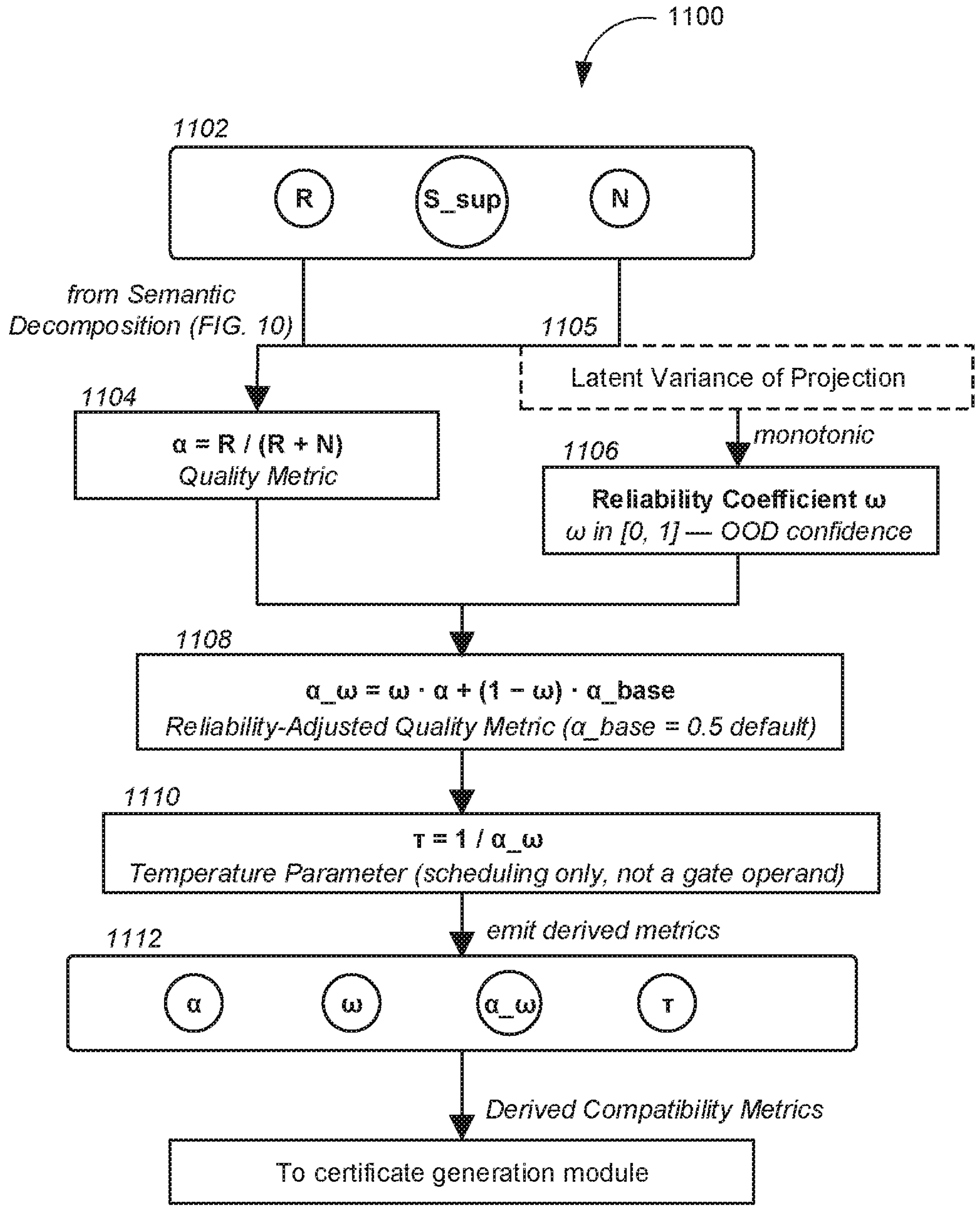
FIG. 11 illustrates a derived quality and reliability metric computation chain 1100 for deriving the quality metric $\alpha$, the reliability coefficient $\omega$, the reliability-adjusted quality metric $\alpha\_\omega$, and the temperature parameter $\tau$, in accordance with some embodiments.

FIG. 11 illustrates a derived quality and reliability metric computation chain 1100 defining the specific mathematical routing used to derive the quality metric $\alpha$, the reliability coefficient $\omega$, the reliability-adjusted quality metric $\alpha\_\omega$, and the temperature parameter t from the raw certificate components.

The computation chain 1100 receives the three raw components (R, S_sup, N) at input 1102 from the semantic decomposition of FIG. 10. At step 1104, the system computes the quality metric $\alpha=R/(R+N)$, which quantifies the fraction of non-noise content that is solver-aligned. The superfluous component S_sup does not participate in the quality metric computation; it is carried in the certificate for diagnostic and classification purposes (see FIG. 13, FIG. 20) but is not a gate enforcement operand.

In parallel, a latent variance computation 1105 (shown as a dashed path) estimates the distributional reliability of the projection. At step 1106, the system derives the reliability coefficient w from the latent variance: $\omega \in [0,1]$ is a distributional reliability estimate indicating out-of-distribution confidence. In one embodiment, $\sigma$ is estimated from the latent variance of the projection through a plurality of learned weight matrices: as the input distribution shifts away from the training distribution, latent variance increases and $\omega$ decreases, indicating lower confidence in the quality estimate. The relationship is monotonic: the reliability coefficient monotonically increases as the latent variance decreases and monotonically decreases as the latent variance increases, thereby enabling detection of out-of-distribution inputs without requiring labeled validation data, oracle access to optimal outputs, or external anomaly detection infrastructure.

At step 1108, the system computes the reliability-adjusted quality metric $\alpha\_\omega=\omega\cdot\alpha+(1-\omega)\cdot\alpha\_base$, where $\alpha\_base$ is a configurable conservative prior (default 0.5). When the reliability coefficient $\sigma$ is high (in-distribution input), $\alpha\_\omega$ closely tracks the raw quality metric $\alpha$. When $\omega$ is low (out-of-distribution input), $\alpha\_\omega$ is pulled toward the conservative prior $\alpha\_base$, reducing execution confidence without requiring any external out-of-distribution detection infrastructure.

At step 1110, the system computes the temperature parameter $T=1/\alpha\_\omega$. The temperature parameter is used for scheduling purposes only and is not a gate enforcement operand; it does not participate in any of the four sequential gate evaluations described in connection with FIG. 24.

The computation chain emits four derived metrics at output 1112: the quality metric $\alpha$, the reliability coefficient $\omega$, the reliability-adjusted quality metric $\alpha\_\omega$, and the temperature parameter $\tau$. These metrics are carried in the Quality section (1404) of the structured compatibility certificate (FIG. 14) and emitted to the certificate generation module for inclusion in the final certificate. The causal chain-increased latent variance→decreased $\omega$→decreased $\alpha\_\omega$→reduced execution confidence-propagates out-of-distribution signals through the certificate as a structural property of the derivation process itself, not as a separate post-hoc diagnostic step.

Figure 12:
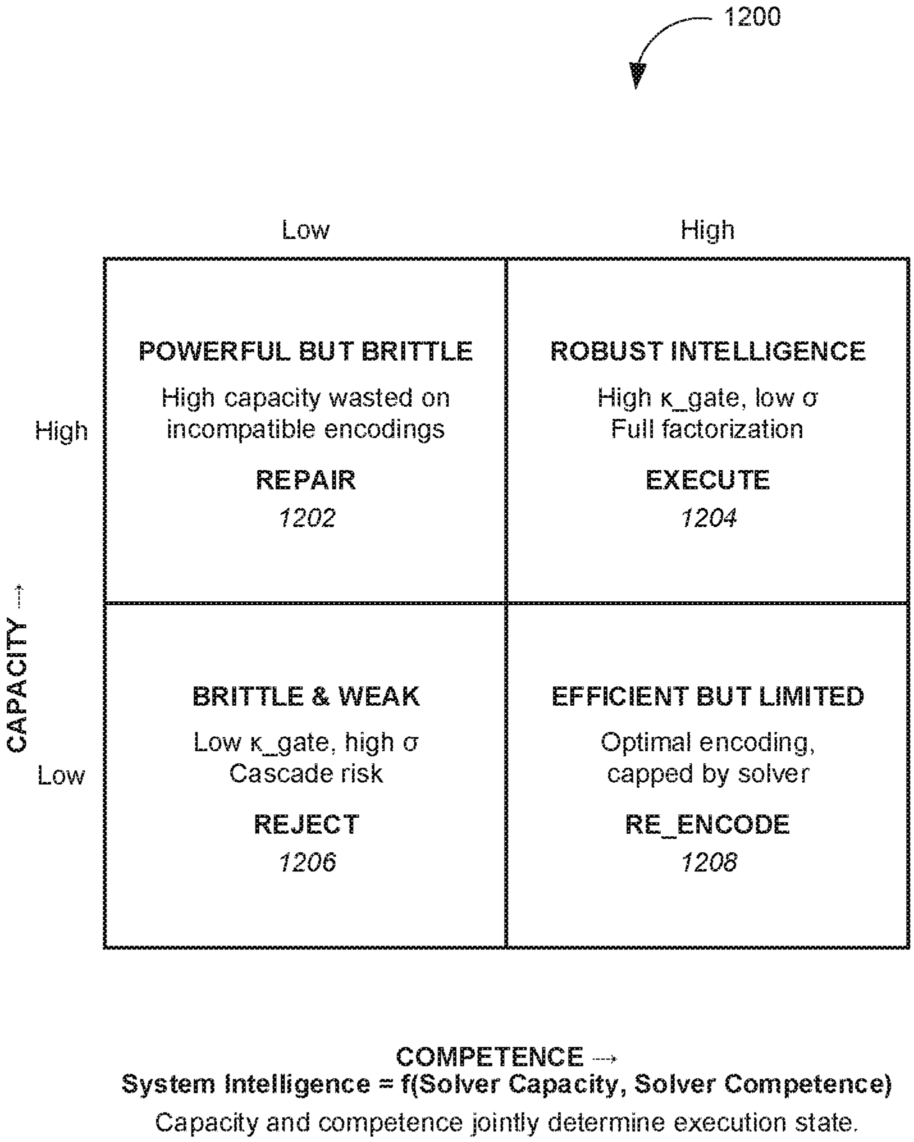
FIG. 12 illustrates a capacity-competence quadrant diagram 1200 depicting four operationally distinct regimes of representation-solver behavior, in accordance with some embodiments.

FIG. 12 illustrates a capacity-competence quadrant diagram 1200 providing a foundational RSCT regime interpretation by which certificate-derived conditions are understood as operational regions of representation-solver behavior. In various embodiments, the regime interpretation of FIG. 12 underlies the collapse-domain and execution-state determinations described in connection with FIG. 5, FIG. 13, FIG. 19, and FIG. 20.

The vertical axis represents Capacity—the raw processing power and dimensional coverage of the downstream solver. The horizontal axis represents Competence—the structural alignment between the solver's operational architecture and the specific demands of the task, measured through the certificate-derived signals. System Intelligence is a function of both Solver Capacity and Solver Competence; neither axis alone determines execution fitness.

Four operationally distinct regimes occupy the quadrants of diagram 1200. A first quadrant 1202 (high Capacity, low Competence), designated Powerful but Brittle, arises when the solver has high raw capacity but that capacity is wasted on incompatible encodings; the typed enforcement action is REPAIR. A second quadrant 1204 (high Capacity, high Competence), designated Robust Intelligence, arises when the solver has both high capacity and high geometric alignment with the representation, with high $\kappa\_gate$ and low $\sigma$ indicating full factorization; the typed enforcement action is EXECUTE. A third quadrant 1206 (low Capacity, low Competence), designated Brittle and Weak, arises when the solver has low capacity and low geometric alignment, with low $\kappa\_gate$ and high $\sigma$ indicating cascade risk; the typed enforcement action is REJECT. A fourth quadrant 1208 (low Capacity, high Competence), designated Efficient but Limited, arises when the encoding is optimally matched to the solver but the solver's capacity is capped; the typed enforcement action is RE_ENCODE to reformulate the task for a higher-capacity solver.

The quadrant diagram of FIG. 12 demonstrates that the conjunction of capacity and competence-operationalized through the certificate signals $\alpha$ and $\kappa\_gate$—is the minimal structure required to distinguish the four regimes. A system relying on capacity alone cannot distinguish the Powerful but Brittle regime (1202) from the Robust Intelligence regime (1204); a system relying on competence alone cannot distinguish the Brittle and Weak regime (1206) from the Efficient but Limited regime (1208). The certificate-derived conjunction resolves both ambiguities.

Figure 13:
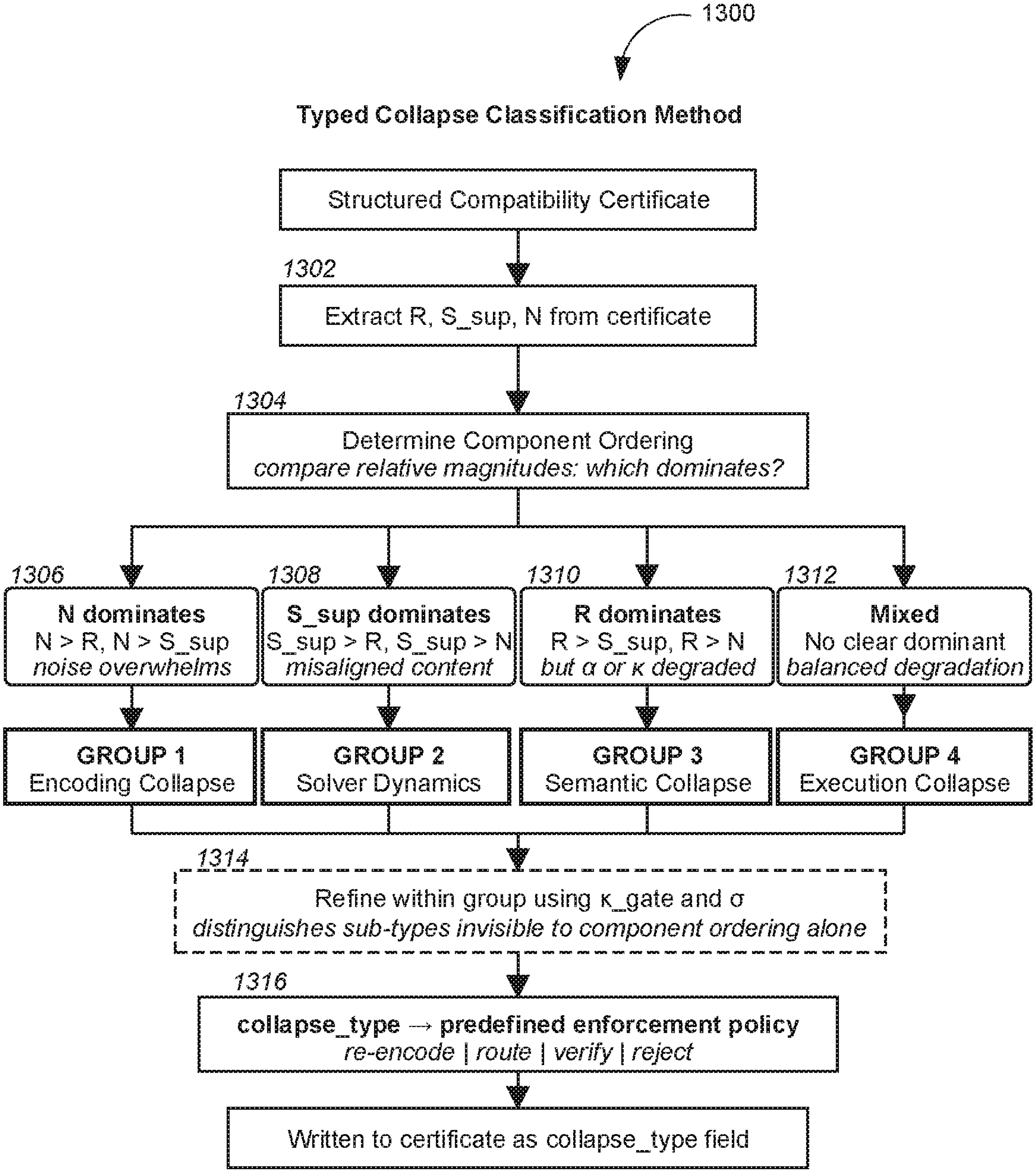
FIG. 13 illustrates a typed collapse classification method 1300 for determining a typed compatibility collapse domain based on component ordering, in accordance with some embodiments.

FIG. 13 illustrates a typed collapse classification method 1300. The method 1300 receives the structured compatibility certificate as input and determines a typed collapse domain through a multi-step classification process.

At step 1302, the method extracts the three components R, S_sup, and N from the structured compatibility certificate. At step 1304, the method determines the component ordering by comparing relative magnitudes to identify which component dominates. The component ordering yields four primary branches.

At step 1306 (N dominates), the condition N>R, N>S_sup indicates noise overwhelms the representation, classifying the certificate into Group 1: Encoding Collapse. At step 1308 (S_sup dominates), the condition S_sup>R, S_sup>N indicates misaligned content, classifying the certificate into Group 2: Solver Dynamics Collapse. At step 1310 (R dominates), the condition R>S_sup, R>N with degraded a or $\kappa$ indicates content is present but quality or alignment is compromised, classifying the certificate into Group 3: Semantic Collapse. At step 1312 (Mixed), no clear dominant component indicates balanced degradation across all axes, classifying the certificate into Group 4: Execution Collapse.

At step 1314, the method refines within each group using $\kappa\_gate$ and the turbulence metric $\sigma$, distinguishing sub-types that are invisible to component ordering alone. For example, within Group 3, high $\kappa$ with low coherence c distinguishes fluent hallucination (Mode 3.1) from phasor conflict (Mode 3.2), a distinction that the simplex ordering alone cannot resolve.

At step 1316, the determined collapse_type is mapped to a predefined enforcement policy comprising one or more of re-encode, route, verify, or reject. The collapse_type is written to the certificate as a machine-readable field, where it is consumed by the Interpretation consumer role (FIG. 3) as a diagnostic label without centralized command logic. The full taxonomy of sub-types within each group is described in connection with FIG. 20.

Figure 14:
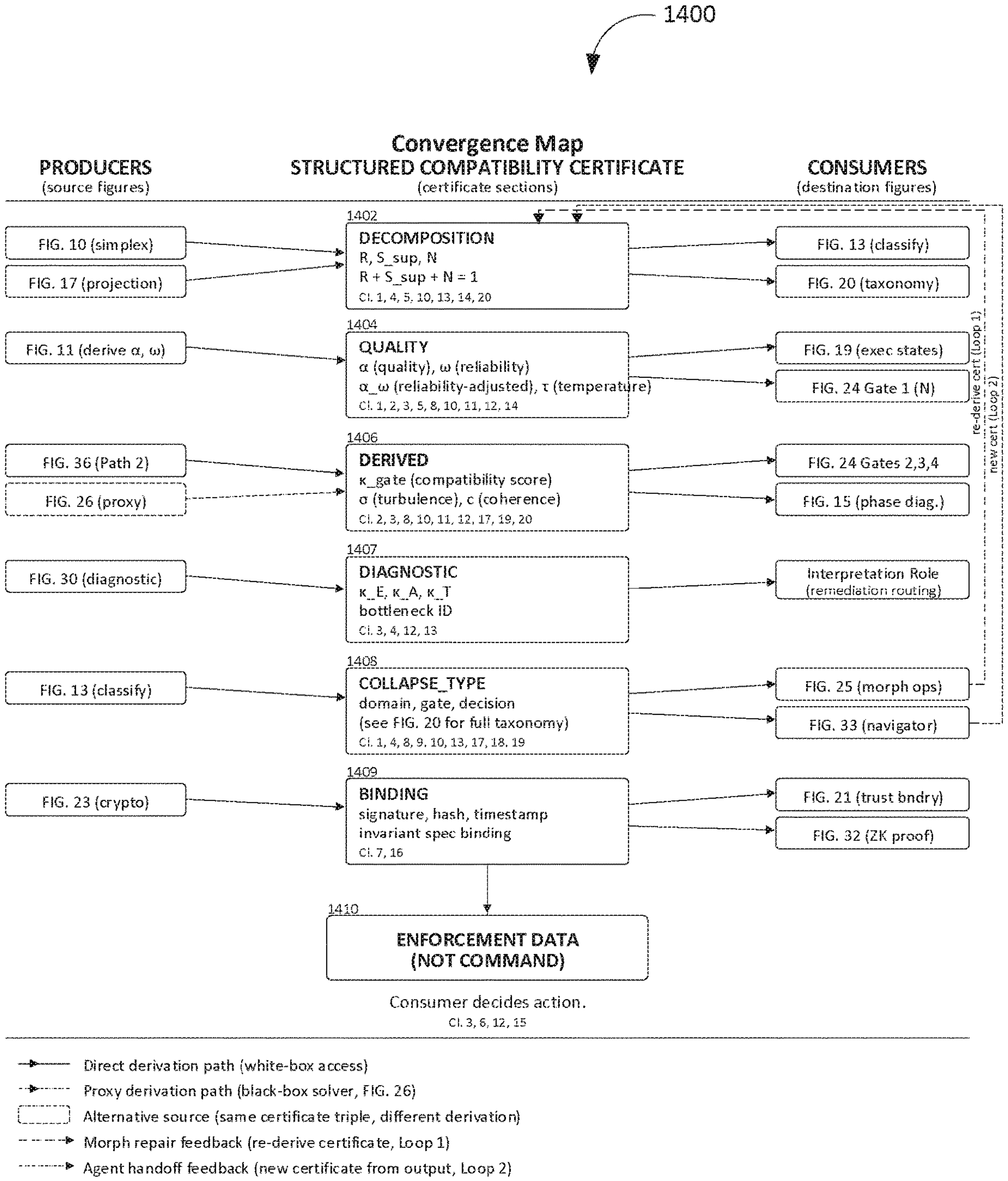
FIG. 14 illustrates a structured compatibility certificate convergence map 1400, in accordance with some embodiments.

FIG. 14 illustrates a convergence map for the structured compatibility certificate, depicting each certificate section as a routing hub connecting the producer figures that populate the section to the consumer figures that read it, and showing the two feedback loops through which the certificate is re-derived after remediation or agent execution. The figure is organized into three columns: a Producers column on the left identifying the source figures for each certificate field, a central column showing the six sections of the structured compatibility certificate (elements 1402 through 1409), and a Consumers column on the right identifying the destination figures and roles that read each section. Solid arrows denote direct derivation paths requiring white-box access to the downstream solver's latent representation space; dashed arrows denote proxy derivation paths (FIG. 26) providing the same certificate triple from externally observable signals when the downstream solver does not expose internal embeddings.

A Decomposition section 1402 carries the three mutually exclusive semantically-distinct components—a relevance component R, a superfluous component S_sup, and a noise component N—constrained by the normalization invariant R+S_sup+N=1. The Decomposition section is produced by the simplex projection of FIG. 10 and the learned weight matrix projection of FIG. 17. The Decomposition section is also the re-entry point for both feedback loops described below: upon morph repair (Loop 1) or agent handoff (Loop 2), the three components are re-derived from the modified or newly-created event node, and the updated values flow through all downstream sections. The Decomposition section is consumed by the typed collapse classification method of FIG. 13 and the sixteen-type collapse domain taxonomy of FIG. 20.

A Quality section 1404 carries the quality metric $\alpha$ derived from the three components via semantic decomposition, the reliability coefficient $\sigma$ derived from latent variance associated with the projection, the reliability-adjusted quality metric $\alpha\_\omega$, and the temperature parameter $\tau=1/\alpha\_\omega$ used for scheduling purposes. The temperature parameter t is not a gate enforcement operand; it does not participate in any of the four sequential gate evaluations. The Quality section is produced by the derived metric computation chain of FIG. 11 and is consumed by the four execution states of FIG. 19 (which evaluates the conjunction $\alpha \hat{} \kappa\_gate$) and by Gate 1 of the sequential four-gate gatekeeper of FIG. 24 (which evaluates the noise component N against the noise threshold).

A Derived section 1406 carries the execution compatibility score $\kappa\_gate$, the turbulence metric $\sigma$, and the consensus coherence score c, all produced by the second signal path performing compatibility assessment. The Derived section is produced by the compatibility assessment computation of FIG. 36 (direct path) or, in embodiments where the downstream solver does not expose internal embeddings, by the proxy estimation architecture of FIG. 26 (proxy path, shown as a dashed arrow). Both paths deliver the same certificate triple to the sequential four-gate gatekeeper; the gatekeeper is path-agnostic. The Derived section is consumed by Gates 2, 3, and 4 of FIG. 24 and by the compatibility-turbulence admissibility phase diagram of FIG. 15.

Figure 30:
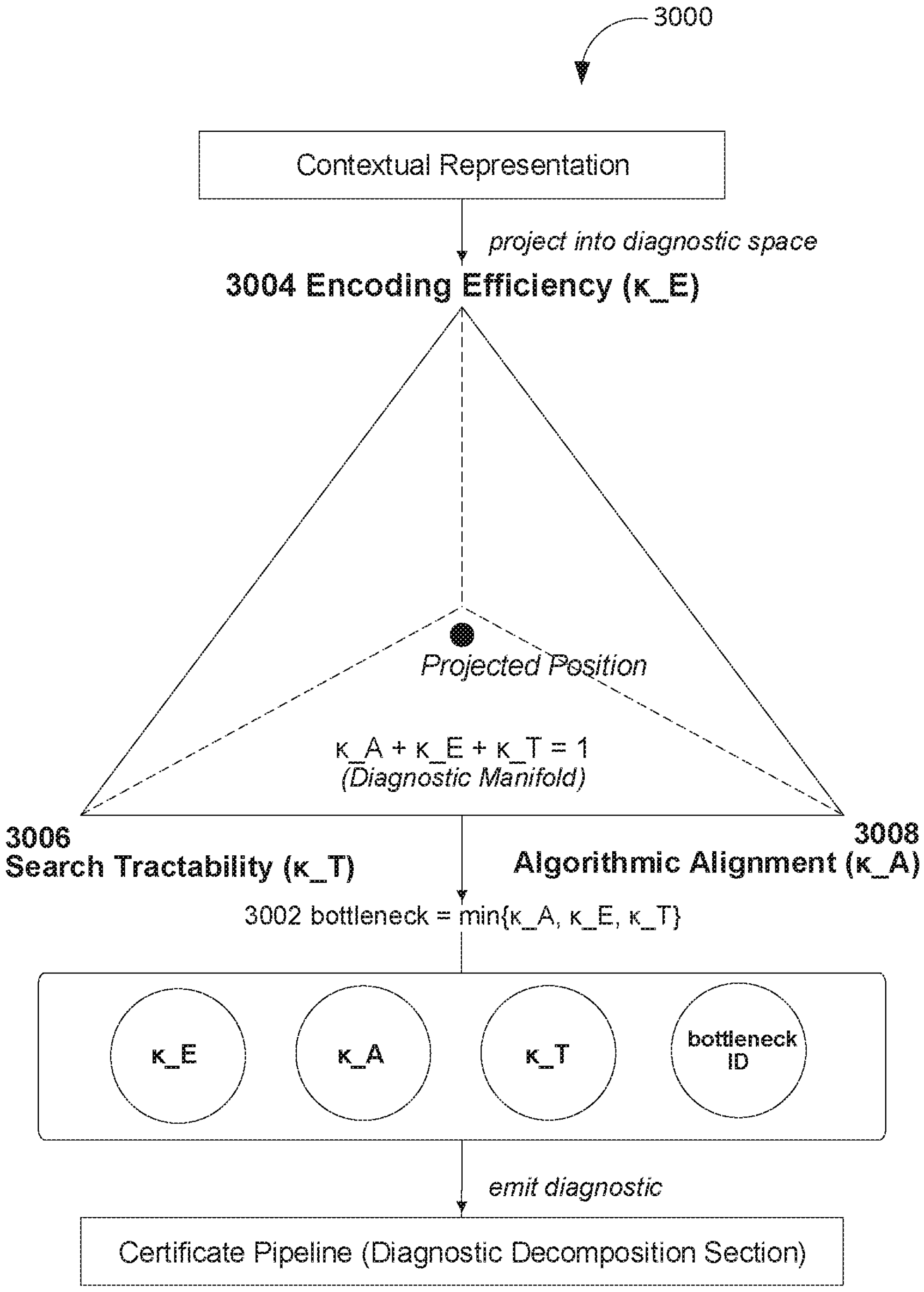
FIG. 30 illustrates a compatibility diagnostic simplex 3000 for oracle-free root-cause decomposition, in accordance with some embodiments.

A Diagnostic section 1407 carries the three root-cause coordinates $\kappa_E$, $\kappa_A$, and $\kappa_T$ derived from the diagnostic simplex projection of FIG. 30, together with a bottleneck identifier indicating which coordinate represents the dominant root cause of any compatibility gap. The diagnostic coordinates satisfy the normalization constraint $\kappa\_A+\kappa\_E+\kappa\_T=1$ and are architecturally independent of the gate enforcement operands. The Diagnostic section is consumed by the Interpretation consumer role for targeted remediation routing: encoder retraining when $\kappa_E$ is the bottleneck, solver architecture improvement when $\kappa_A$ is the bottleneck, and problem reformulation when $\kappa_T$ is the bottleneck.

A Collapse_Type section 1408 carries the typed collapse domain, the gate at which the certificate was evaluated, and the typed execution decision (REJECT, BLOCK, RE_ENCODE, REPAIR, or EXECUTE) determined by the classification method of FIG. 13. The full taxonomy of sixteen collapse modes is described in connection with FIG. 20. The Collapse_Type section is consumed by the morph operators of FIG. 25 (which select the graph transformation operator triggered by each non-execute gate decision) and by the navigator meta-routing architecture of FIG. 33 (which uses the collapse type for deterministic delegation without runtime policy optimization).

Figure 23:
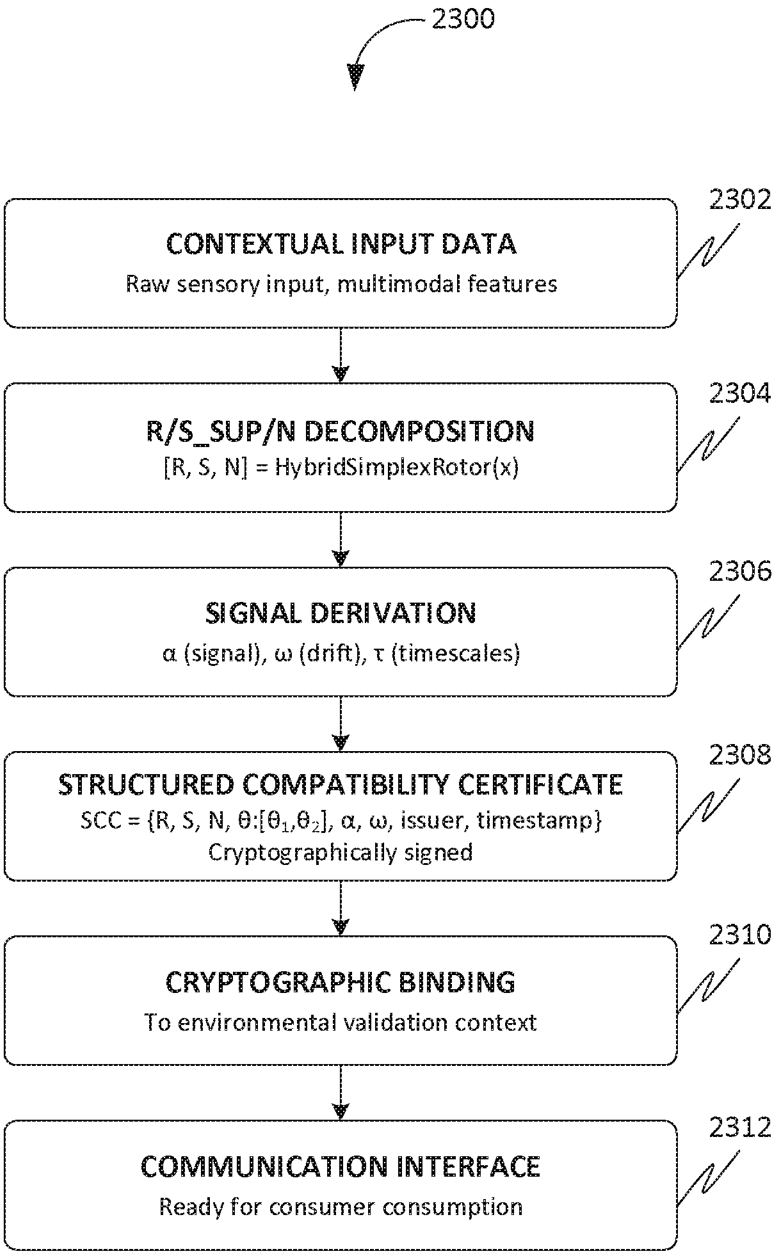
FIG. 23 illustrates a cryptographic binding architecture 2300 for structured compatibility certificates, in accordance with some embodiments.

A Binding section 1409 carries the cryptographic signature, the SHA-256 hash of the serialized invariant specification, the timestamp, and the environmental context hash, produced by the cryptographic binding architecture of FIG. 23. The Binding section is consumed by the trust-boundary validation architecture of FIG. 21 (which verifies structural and cryptographic integrity prior to certificate consumption) and by the privacy-preserving zero-knowledge verification architecture of FIG. 32 (which generates $H_1$ proof tokens carried within the certificate).

All six sections converge into an Enforcement Data designation 1410, indicating that the structured compatibility certificate is architecturally configured as enforcement data rather than as a command. Each downstream consumer independently interprets the certificate and determines execution actions according to its own domain requirements without centralized orchestration.

FIG. 14 further depicts two feedback loops that return control to the Decomposition section 1402, forming closed cycles through the certificate.

Figure 25:
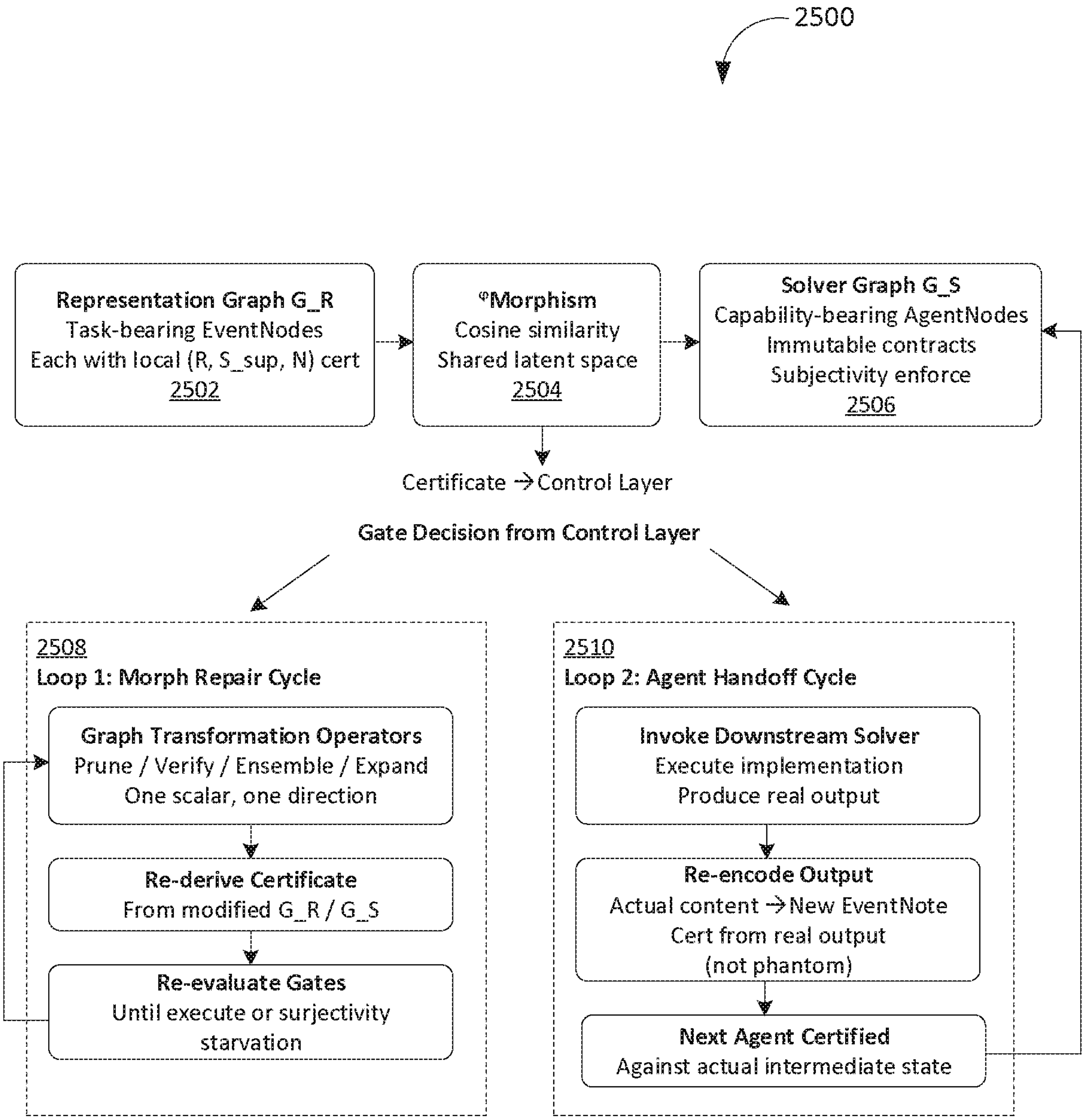
FIG. 25 illustrates a multi-agent coordination and dual-graph morph repair architecture 2500, in accordance with some embodiments.

A morph repair feedback loop (Loop 1, shown as a dashed return path from FIG. 25 to the Decomposition section 1402) is triggered upon a non-execute gate decision. Upon such a decision, a graph transformation operator selected from the morph operators of FIG. 25 is executed on the representation graph $G_R$, the solver graph $G_S$, or both. Each operator moves exactly one certificate scalar in exactly one direction, guaranteeing repair loop termination. A global structured compatibility certificate is then re-derived from the modified graphs—re-entering the certificate at the Decomposition section 1402—and all gate conditions are re-evaluated. The cycle continues until all gate conditions are satisfied or no further graph transformation is possible, at which point a committed audit log entry is generated.

An agent handoff feedback loop (Loop 2, shown as a dotted return path from FIG. 33 to the Decomposition section 1402) is triggered upon an execute gate decision. Upon such a decision, the implementation function associated with the certified agent node is invoked, a real output is received from the invoked agent, the real output is encoded as a new event node carrying a newly-derived structured compatibility certificate reflecting actual intermediate content rather than initialization state, and the new event node is added to the representation graph. The newly-derived certificate re-enters the certificate at the Decomposition section 1402, and each subsequent agent invocation is governed using the updated representation graph.

The morph repair cycle (Loop 1) and the agent handoff cycle (Loop 2) are mutually exclusive in their triggering conditions, perform distinct functions, and operate on different certificate states, such that each agent in a multi-agent pipeline is certified against actual intermediate state rather than phantom initialization state. No weight updates, policy modification, or synaptic plasticity occur during either loop; all routing decisions, graph transformations, and execution control actions are computed algebraically from fixed embeddings without updating neural network weights, learning policies, or modifying solver contracts during live operation.

Figure 15:
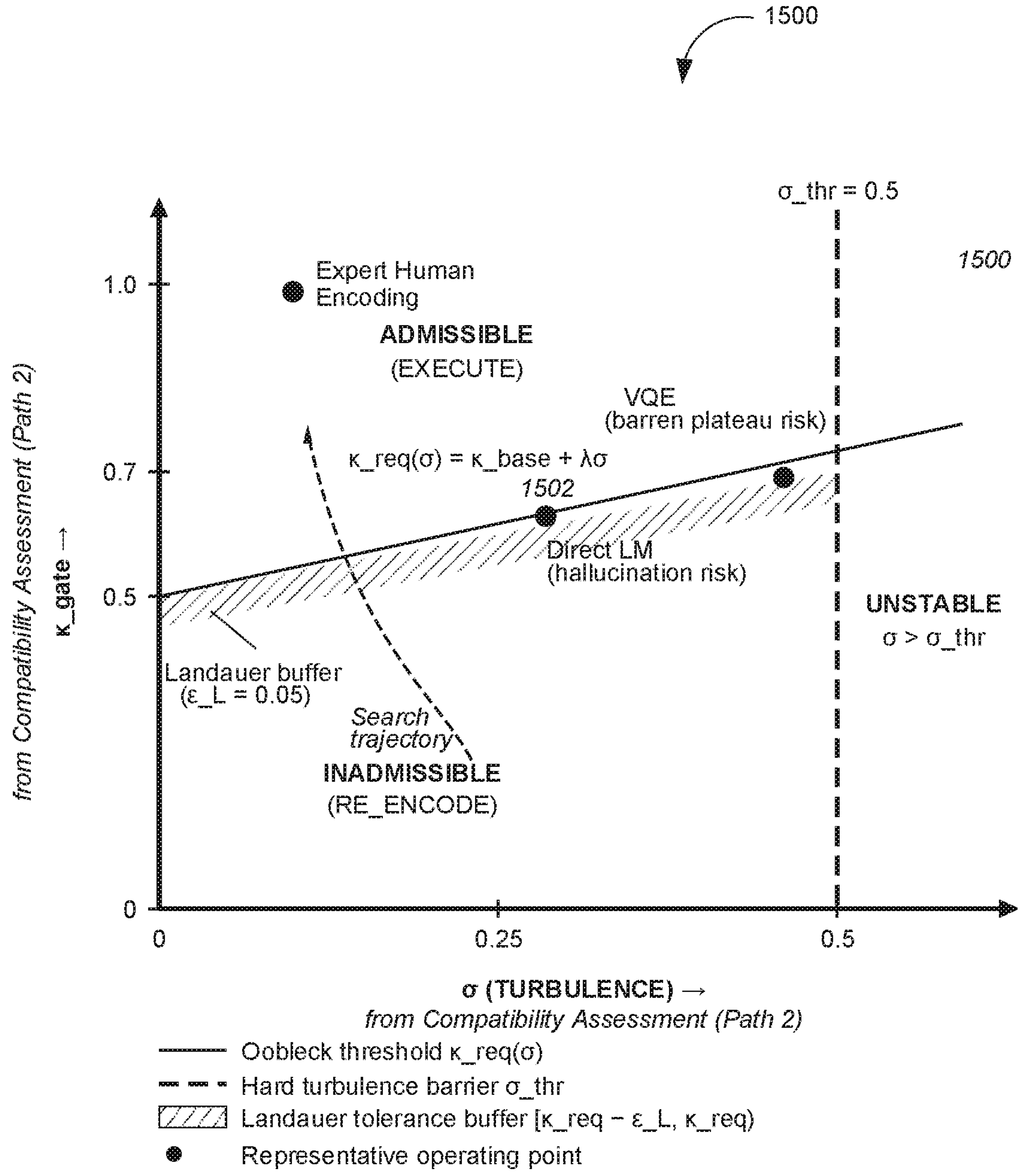
FIG. 15 illustrates a compatibility-turbulence admissibility phase diagram 1500, in accordance with some embodiments.

FIG. 15 illustrates a compatibility-turbulence admissibility phase diagram 1500 depicting the operational regions defined by the dynamic admissibility threshold $\kappa\_req(G)$. The horizontal axis represents the turbulence metric $\sigma$, derived from Compatibility Assessment (Path 2), and the vertical axis represents the execution compatibility score $\kappa\_gate$, also derived from Compatibility Assessment (Path 2). Both axes are consumed by Gate 3 (Admissibility Gate) of the sequential four-gate gatekeeper described in connection with FIG. 24.

An Oobleck dynamic threshold curve 1502 defined by $\kappa\_req(G)=\kappa\_base+\lambda\sigma$ (defaults $\kappa\_base=0.5$, $\lambda=0.4$) divides the phase space into an admissible region above the curve, where the gatekeeper returns an execute decision, and an inadmissible region below the curve, where the gatekeeper returns a re-encode decision. A vertical dashed boundary at $\sigma=\sigma\_thr$ (default $\sigma\_thr=0.5$) marks the hard turbulence barrier beyond which all encodings are inadmissible regardless of compatibility score; the region to the right of this barrier is labeled UNSTABLE.

A Landauer tolerance buffer (shown as a hatched band below the threshold curve) spanning $[\kappa\_req-\varepsilon\_L, \kappa\_req)$ with $\varepsilon\_L=0.05$ provides a gray zone in which the turbulence metric serves as a deterministic tie-breaker between re-encoding and allowing execution to proceed under a constrained or caution-qualified execute condition.

Three representative operating points are shown: an Expert Human Encoding operating at high κ_gate and low σ well within the admissible region; a Direct LM (language model) encoding operating near the admissibility boundary with hallucination risk; and a VQE (variational quantum eigensolver) encoding operating near the hard turbulence barrier with barren plateau risk. A representation search trajectory (dashed curved arrow) illustrates the path from the inadmissible region toward the admissible region under the stability constraint σ≤σ_thr.

FIG. 15 determines admissibility of the structured compatibility certificate and is consumed by Gate 3 (Admissibility Gate).

Figure 16:
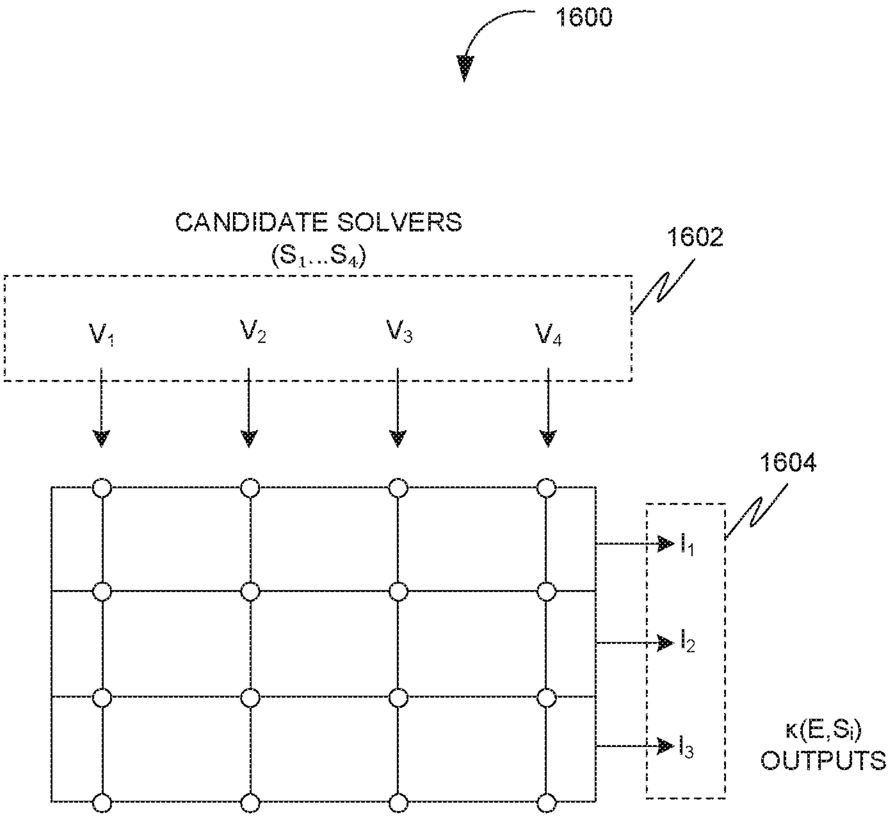
FIG. 16 illustrates a multi-solver compatibility evaluation architecture 1600 supporting parallel compatibility analysis across a plurality of candidate downstream solvers, in accordance with some embodiments.

FIG. 16 illustrates a multi-solver compatibility evaluation architecture 1600 supporting ensemble, version-aware, and heterogeneous compatibility analysis across multiple candidate downstream solvers.

A candidate solver array 1602 comprises a plurality of candidate downstream solvers (S_1 through S_4 in the illustrated embodiment), each characterized by a solver embedding V_1 through V_4. A compatibility evaluation crossbar matrix 1604 evaluates each contextual representation against each candidate solver in parallel, producing a vector of pairwise compatibility scores κ(E, S_i) at the outputs (I_1 through I_3 in the illustrated embodiment). The crossbar architecture enables simultaneous evaluation of multiple solver candidates in a single pass, computing a distinct, solver-specific decomposition (R, S_sup, N) and corresponding compatibility score κ for each solver, because the same contextual representation may yield different decompositions when evaluated against different downstream solvers, models, or execution processes. Each per-solver evaluation follows the single-solver computation described in connection with FIG. 36.

In some embodiments, the selected interface compatibility score for a multi-solver configuration is determined from the minimum pairwise compatibility across the candidate solver mappings, and dispersion among the pairwise scores contributes to the turbulence metric used by downstream gate evaluation. In embodiments employing the geometric compatibility morphism of FIG. 25, the crossbar matrix 1604 corresponds to the pairwise compatibility computation underlying the φ-morphism mapping from EventNodes to AgentNodes.

Figure 17:
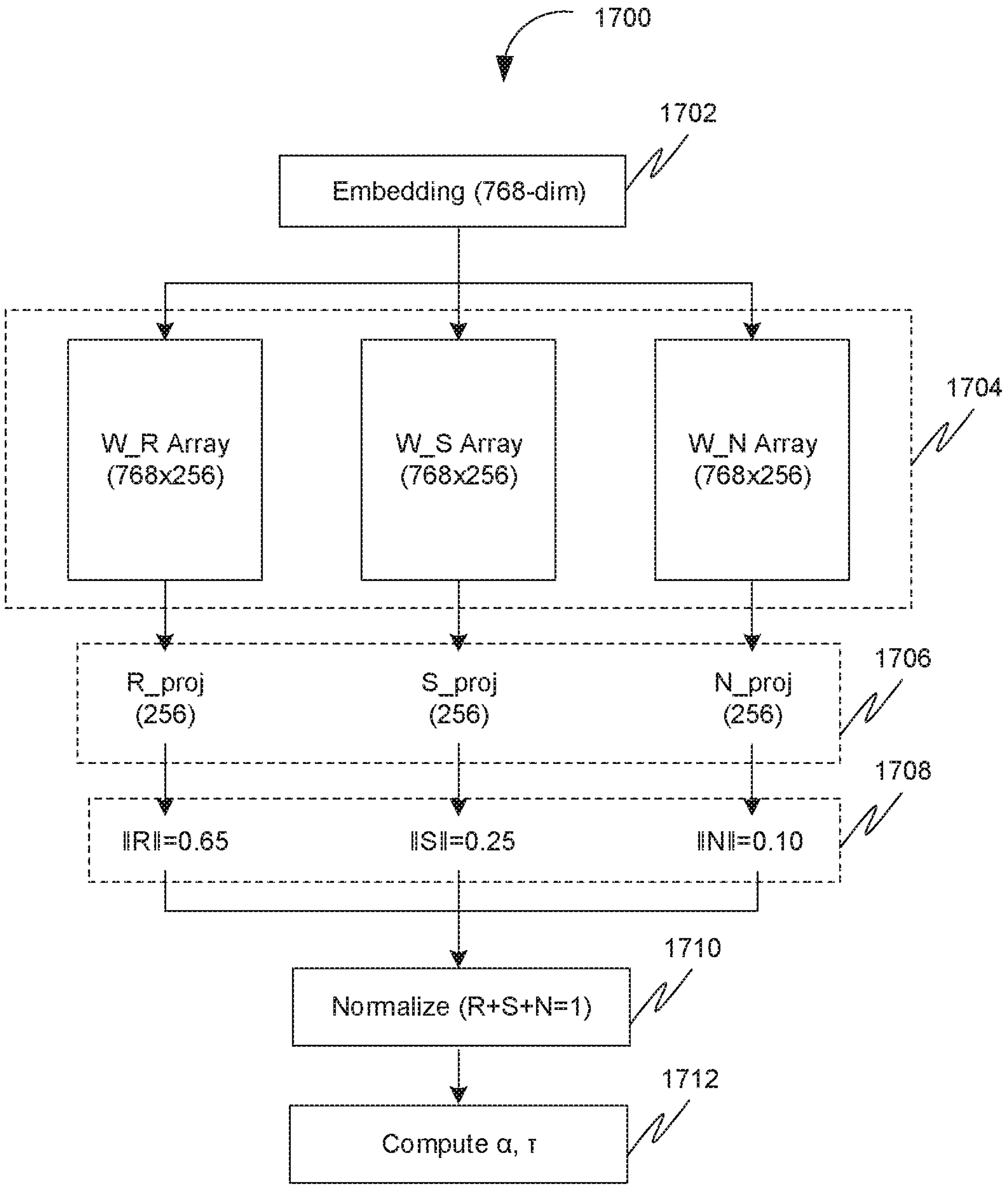
FIG. 17 illustrates a universal rotor projection architecture 1700 implementing the direct certificate derivation path through learned weight matrices, in accordance with some embodiments.

FIG. 17 illustrates a Universal Rotor projection architecture 1700 implementing the direct certificate derivation path. In this embodiment, the system has white-box access to the downstream solver's latent representation space.

A raw embedding 1702 of dimensionality 768 is received as input. The embedding is passed through three parallel learned weight matrix arrays 1704: a W_R array (768×256), a W_S array (768×256), and a W_N array (768×256), each optimized via differentiable simplex projection operators. The three arrays produce intermediate projection vectors at output 1706: R_proj (256-dimensional), S_proj (256-dimensional), and N_proj (256-dimensional).

A norm computation step 1708 computes the magnitude of each projection vector, yielding illustrative values ||R||=0.65, ||S||=0.25, and ||N||=0.10 in the example shown. A normalization step 1710 enforces the normalization invariant R+S+N=1 by construction during the forward pass via geometric rotation and barycentric projection onto the simplex manifold, mathematically guaranteeing that the constraint is satisfied algebraically rather than through post-hoc numerical scaling. A derived metric computation step 1712 computes the quality metric α and the temperature parameter t from the normalized components.

Figure 26:
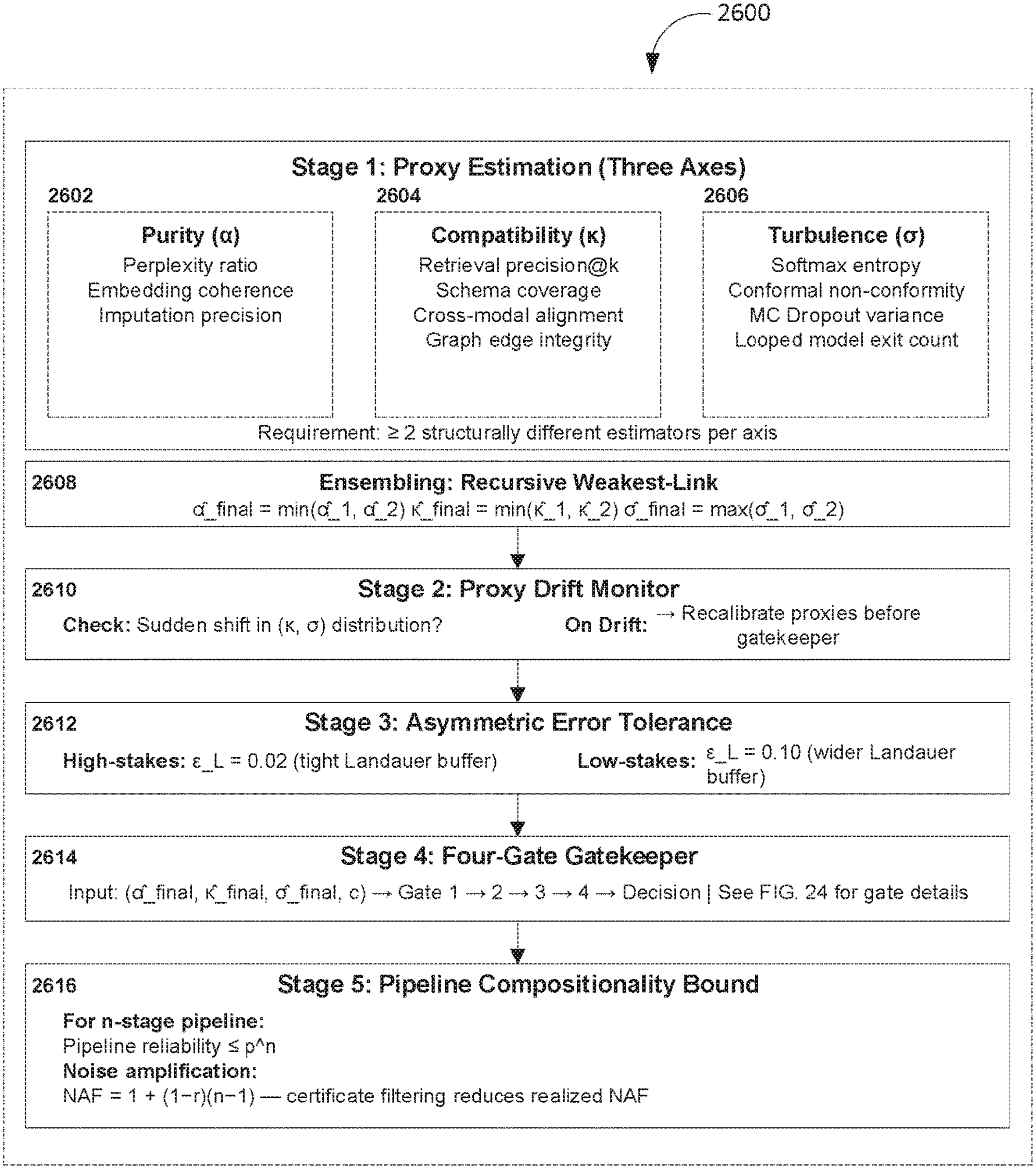
FIG. 26 illustrates a proxy estimation and recursive compatibility validation architecture 2600 implementing the black-box certificate derivation path, in accordance with some embodiments.

FIG. 17 represents the direct (white-box) certificate derivation path. FIG. 26 represents the proxy (black-box) path providing the same certificate triple from externally observable signals when the downstream solver does not expose internal embeddings. Both paths deliver the same certificate triple to the sequential four-gate gatekeeper; the gatekeeper is path-agnostic.

Figure 18A:
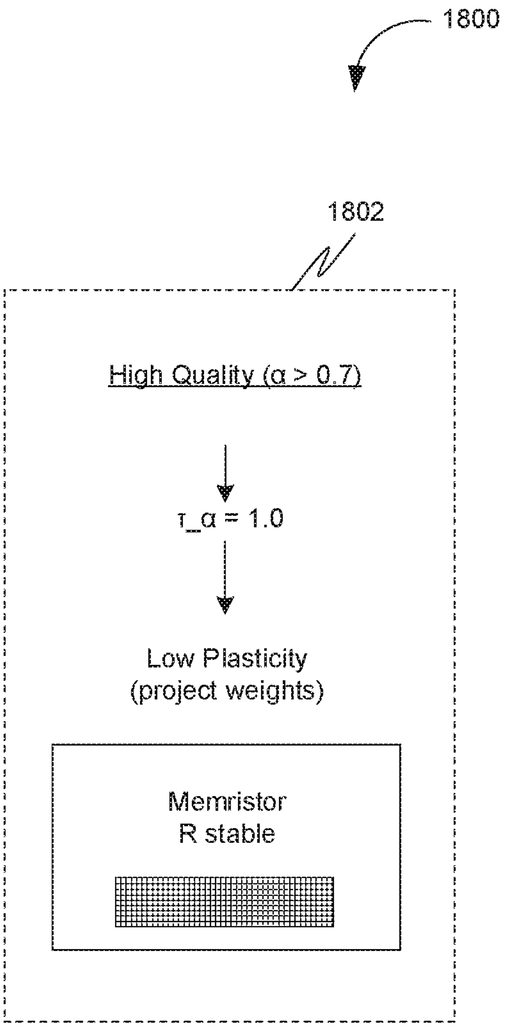
FIG. 18A illustrates a compatibility-modulated analog control regime 1800 implemented within a memristive or analog computational substrate, in accordance with some embodiments.
Figure 18B:
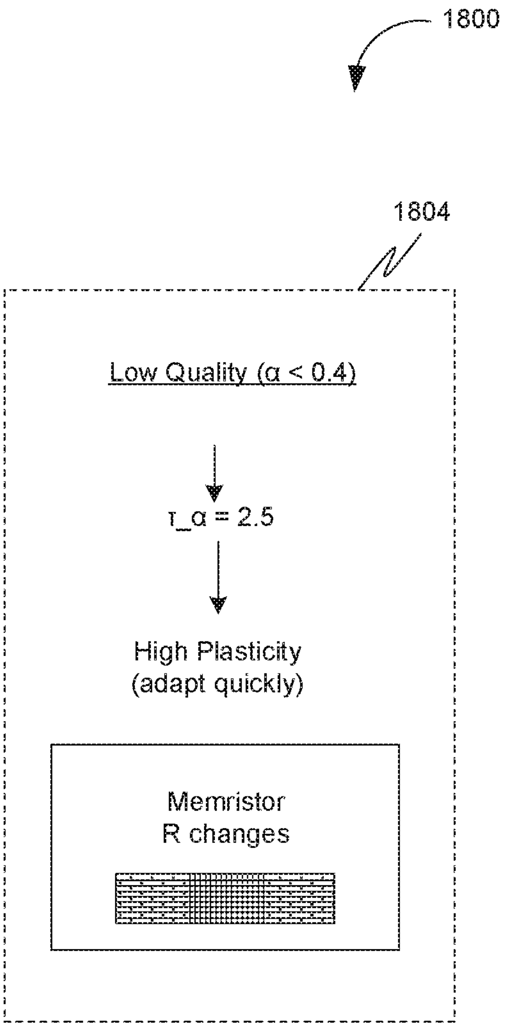
FIG. 18B illustrates compatibility-modulated analog substrate parameter control for the embodiment 1800, in accordance with some embodiments.

FIG. 18A and FIG. 18B illustrate a compatibility-modulated analog control embodiment 1800 implemented within a memristive or analog computational substrate. The two sub-figures depict contrasting operational regimes governing the physical behavior of the analog medium based on the pre-execution compatibility evaluation.

FIG. 18A (embodiment 1802) depicts the high-quality regime, arising when the quality metric α exceeds 0.7. In this regime, the adaptive signal parameter τ_α is set to 1.0, indicating low plasticity: the system projects weights onto the memristor crossbar without aggressive adaptation because the encoding is already structurally adequate. The memristor resistance state R remains stable, minimizing unnecessary write cycles and preserving device endurance.

FIG. 18B (embodiment 1804) depicts the low-quality regime, arising when the quality metric α falls below 0.4. In this regime, the adaptive signal parameter τ_α is set to 2.5, indicating high plasticity: the system adapts the memristor crossbar quickly because the encoding requires structural correction. The memristor resistance state R changes as the device accommodates new projection weights, accepting increased write activity to recover encoding quality.

In both regimes, the adaptive signal parameter τ_α is derived directly from the structured compatibility certificate and governs the operational mode of the analog substrate, selectively activating or suppressing execution pathways based on the pre-execution compatibility evaluation. This certificate-governed modulation prevents the physical degradation of analog components that would otherwise occur when processing highly misaligned or noisy contextual inputs. The noise component N of the structured compatibility certificate operationalizes thermodynamic non-idealities of the analog substrate including conductance drift, thermal fluctuations, and read noise, serving as an oracle-free substrate health signal detectable from data distribution patterns without external diagnostic hardware.

Figure 19:
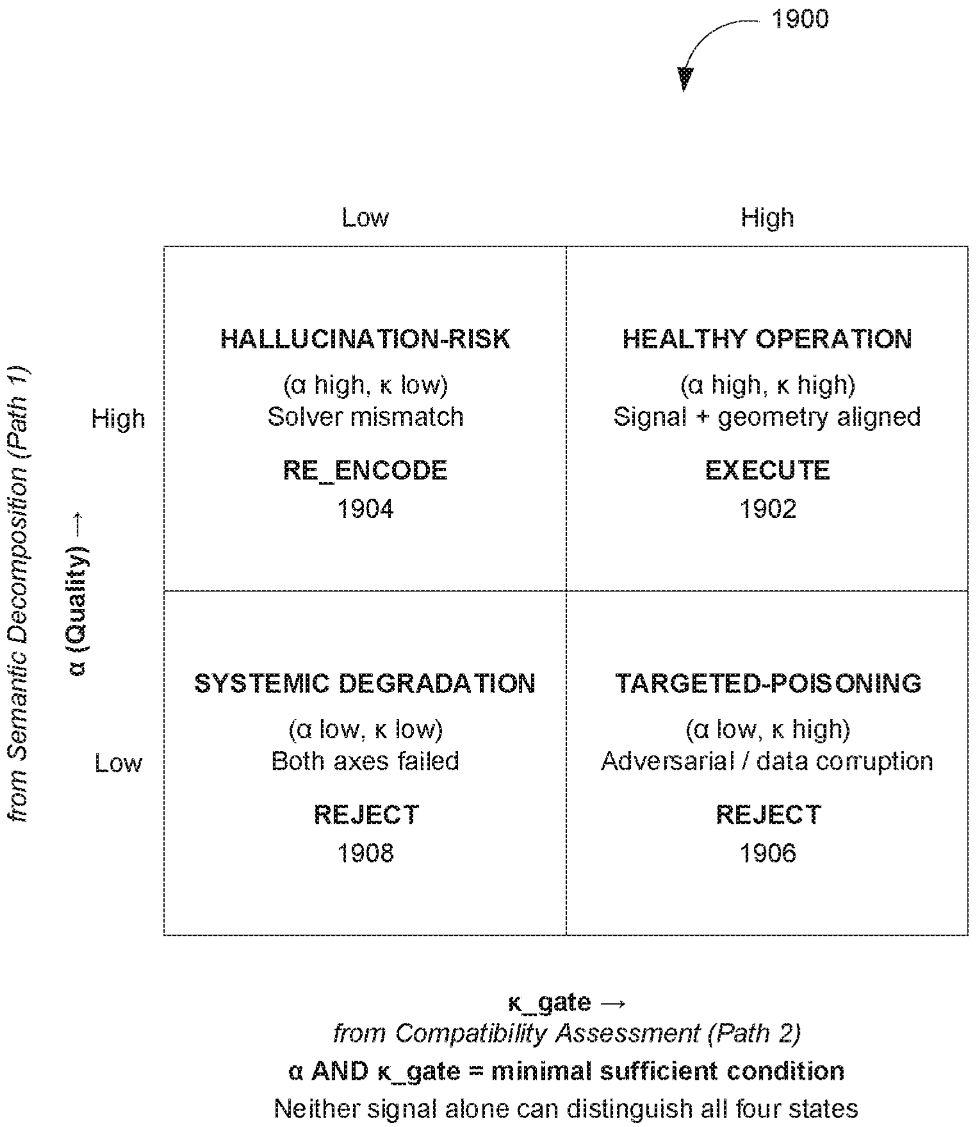
FIG. 19 illustrates four execution states 1900 produced by the conjunction of the quality metric $\alpha$ and the compatibility score $\kappa\_gate$, in accordance with some embodiments.

FIG. 19 illustrates the four operationally distinct execution states 1900 produced by the conjunction of the quality metric α (vertical axis, derived from Semantic Decomposition Path 1) and the compatibility score κ_gate (horizontal axis, derived from Compatibility Assessment Path 2), demonstrating that the conjunction α^κ_gate is the minimal sufficient condition for typed execution control.

A first state 1902 (top-right quadrant), Healthy Operation, arises when both α and κ_gate are high: measured quality is high and geometric alignment between the representation and the downstream solver is good, with signal and geometry aligned; the typed enforcement action is EXECUTE.

A second state 1904 (top-left quadrant), Hallucination-Risk, arises when α is high but κ_gate is low: measured quality is high but geometric alignment is poor, signaling solver mismatch; the typed enforcement action is RE_ENCODE to reroute to a better-aligned solver.

A third state 1906 (bottom-right quadrant), Targeted-Poisoning or content corruption, arises when α is low but κ_gate is high: measured quality is poor despite apparent structural alignment, signaling adversarial attack or data corruption; the typed enforcement action is REJECT.

A fourth state 1908 (bottom-left quadrant), Systemic Degradation, arises when both $\alpha$ and $\kappa\_gate$ are low: both quality and alignment have failed; the typed enforcement action is REJECT with system recalibration.

The quality metric alone cannot distinguish the Hallucination-Risk state (1904) from Healthy Operation (1902) because both present as high quality. The compatibility score alone cannot distinguish the Targeted-Poisoning state (1906) from Systemic Degradation (1908) because both present as low quality. The conjunction is therefore the minimal sufficient condition: removing either operand collapses at least two operationally distinct failure modes into indistinguishable states, confirming that no single-scalar framework can substitute for the two-signal architecture.

FIG. 19 classifies the structured compatibility certificate into execution states and is read by the Authorization consumer role.

FIG. 20 illustrates a sixteen-type collapse domain taxonomy 2000 organizing the operationally distinct failure modes into four groups based on the certificate axis that triggers the failure, as further described in the failure taxonomy embodiment. In an embodiment, each failure mode is reachable by traversing a constraint graph whose nodes represent signal values, configured threshold values, collapse-domain labels, severity ranks, and gate actions; the trigger conditions and threshold values described below identify the certificate-axis violations that each group detects along such a traversal, and each resulting typed collapse domain constitutes a diagnostic label readable by the interpretation role without requiring centralized command logic. Trigger conditions are derived from both the quality metric produced by semantic decomposition and the compatibility score produced by geometric alignment assessment, such that the taxonomy jointly consumes both architecturally distinct signal paths.

Group 1 (2002), Encoding Collapse, caught by Gate 1, is triggered when the noise component N meets or exceeds a configured noise-floor threshold or the quality metric $\alpha$ falls below $\alpha$ minimum threshold: Mode 1.1 (Noise Saturation) triggers a reject decision; Mode 1.2 (Superfluous Drowning) triggers a re-encode decision; Mode 1.3 (Dimensional Fracture) triggers a re-encode decision; Mode 1.4 (Format Mismatch) triggers a re-encode decision when atomic compatibility approaches zero.

Group 2 (2004), Solver Dynamics Collapse, caught by Gate 3, is triggered when the turbulence metric $\sigma$ exceeds the threshold or the Lyapunov drift energy derivative is positive: Mode 2.1 (Trajectory Divergence) triggers a block decision; Mode 2.2 (Gradient Starvation) triggers a re-encode decision; Mode 2.3 (Oobleck Jamming) triggers a re-encode decision on turbulence spike; Mode 2.4 (Substrate Degradation) triggers a reject decision when physical hardware limits are reached.

Group 3 (2006), Semantic Collapse, caught by Gates 2 and 4, is triggered when the compatibility score is high but phasor coherence is low or the algorithmic alignment component approaches zero: Mode 3.1 (Fluent Hallucination) triggers a repair decision; Mode 3.2 (Phasor Conflict) triggers a block decision; Mode 3.3 (Reward Hacking) triggers a reject decision; Mode 3.4 (OOD Fabrication) triggers a re-encode decision.

Group 4 (2008), Execution Collapse, caught by Gates 3 and 4, is triggered when the weakest-link execution compatibility score falls below the dynamic admissibility threshold: Mode 4.1 (Weakest-Link Cascade) triggers a re-encode decision; Mode 4.2 (Cross-Modal Desync) triggers a re-encode decision; Mode 4.3 (Stalled Navigation) triggers a repair decision; Mode 4.4 (Gatekeeper Bypass) triggers a reject decision upon detection of router miscalibration.

Each of the sixteen modes maps to a specific gate, a specific certificate trigger condition, and a specific typed enforcement action within the constraint graph, the enforcement action constituting enforcement data that each consumer role reads independently; a non-execute enforcement action triggers a corresponding graph transformation operator on the representation graph, the solver graph, or both, initiating a morph repair cycle in which the structured compatibility certificate is re-derived and gate conditions are re-evaluated.

Figure 21:
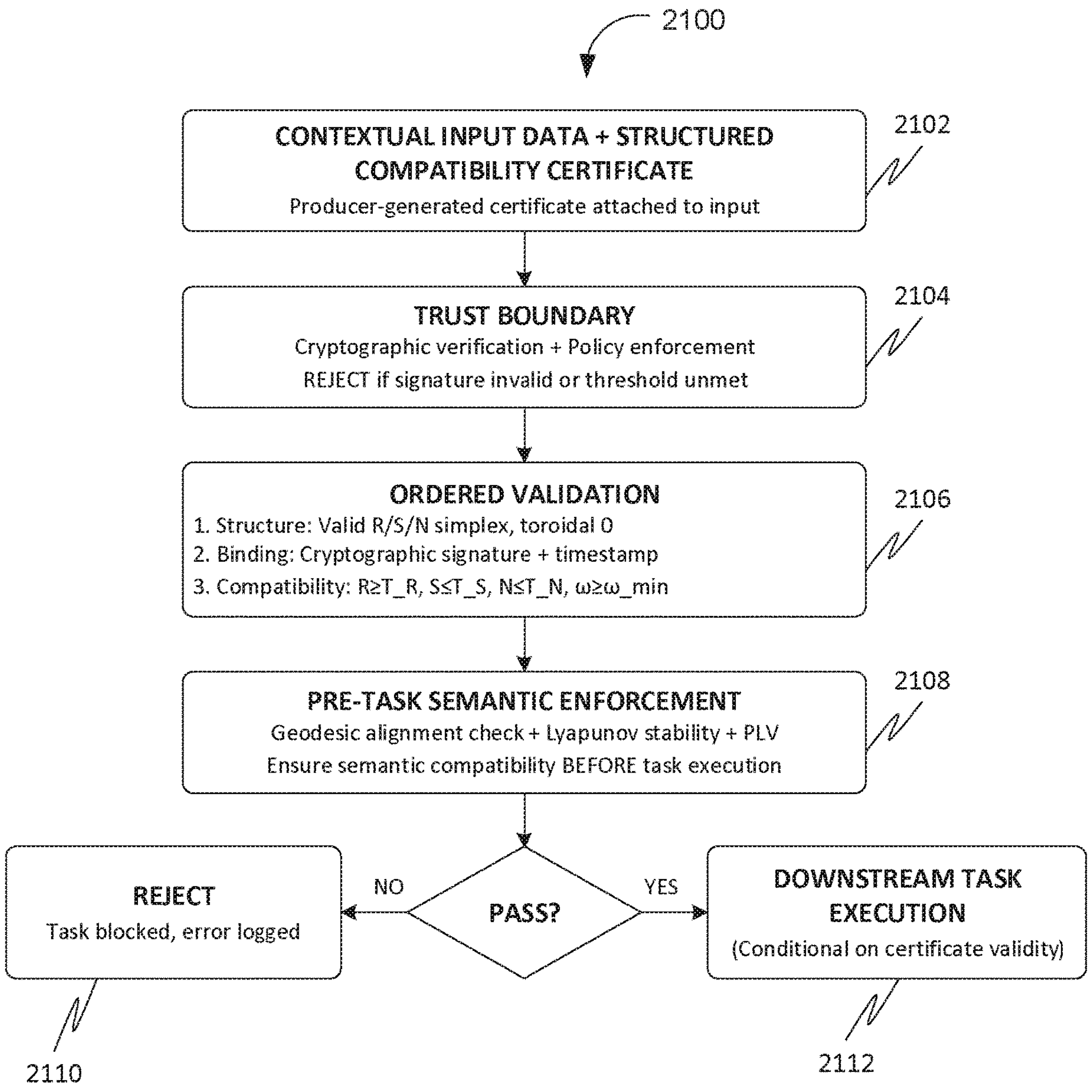
FIG. 21 illustrates a trust-boundary certificate validation architecture 2100 for enforcing cryptographic and structural integrity of a producer-generated certificate prior to downstream consumption, in accordance with some embodiments.

FIG. 21 illustrates a trust-boundary certificate validation architecture 2100 describing how the system enforces a cryptographic and structural trust perimeter around a producer-generated certificate before the certificate is consumed by any downstream role. FIG. 21 is not the canonical gate-order figure; the normative sequential four-gate enforcement order is described in connection with FIG. 24. FIG. 21 describes a different, complementary function: pre-admission validation of the certificate's structural integrity, cryptographic binding, and threshold compliance.

Architecture 2100 receives contextual input data together with a structured compatibility certificate at element 2102, described as a producer-generated certificate attached to the input. A trust boundary 2104 enforces cryptographic verification and policy enforcement, issuing a REJECT if the signature is invalid or threshold conditions are unmet.

An ordered validation stage 2106 confirms three properties in sequence: first, structural validity of the certificate fields (valid R/S_sup/N simplex, valid toroidal coordinates $\theta$); second, cryptographic binding integrity (valid digital signature and timestamp); and third, compatibility threshold compliance ($R \geq T\_R$, $S \leq T\_S$, $N \leq T\_N$, $\omega \geq \omega\_min$).

A pre-task semantic enforcement stage 2108 evaluates geodesic alignment, Lyapunov stability, and phase-locking value (PLV) to ensure semantic compatibility before task execution.

A pass/reject decision determines whether the certificate satisfies all trust criteria. Upon rejection, element 2110 blocks the task and logs an error. Upon passing, element 2112 enables downstream task execution conditional on certificate validity.

The trust-boundary validation of FIG. 21 operates as a pre-admission gate that certifies the structural and cryptographic integrity of the certificate payload; the subsequent four-gate enforcement described in connection with FIG. 24 then evaluates the semantic content of that certificate against typed compatibility thresholds. This mechanism allows independent verification of certificate authenticity without disclosure of internal solver parameters.

Figure 22:
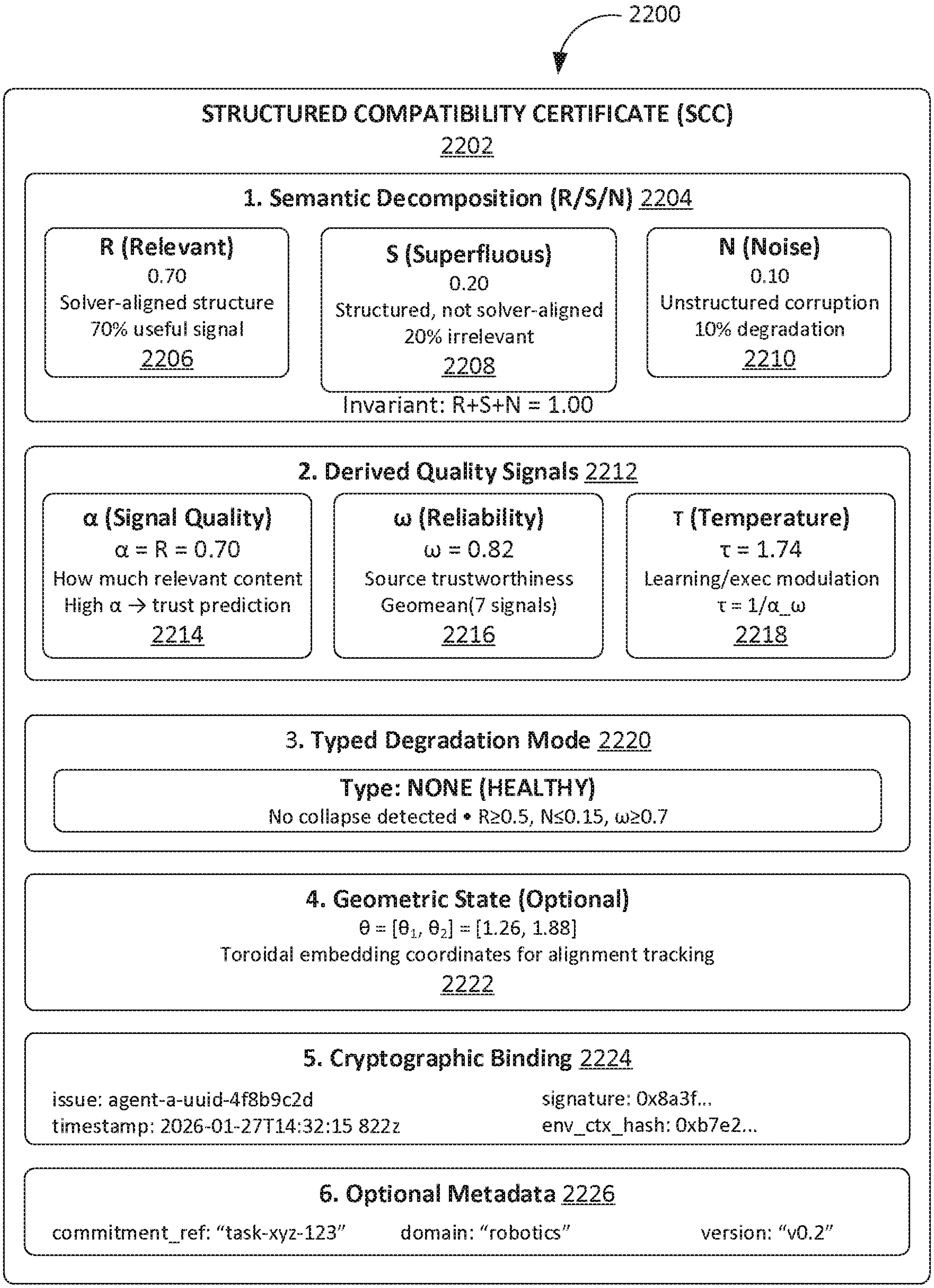
FIG. 22 illustrates a certificate registry and observational mode architecture 2200 including an example structured compatibility certificate 2202, in accordance with some embodiments.

FIG. 22 illustrates an example structured compatibility certificate 2202 and a certificate registry architecture enabling the lookup, caching, and audit logging of certificates. The certificate 2202 comprises a semantic decomposition section 2204 carrying the three components R (2206), S_sup (2208), and N (2210) constrained by the normalization invariant; a derived quality signals section 2212 carrying the quality metric $\alpha$ (2214), the reliability coefficient $\omega$(2216), and the temperature parameter $\tau$ (2218); a typed degradation mode section 2220 identifying the collapse domain; a geometric state section 2222 carrying optional toroidal embedding coordinates; a cryptographic binding section 2224 carrying issuer identity, timestamp, digital signature, and environmental context hash; and an optional metadata section 2226 carrying commitment reference, domain identifier, and version. This registry allows the system to operate in an observational mode, wherein structured compatibility certificates are generated, evaluated, and logged without actively altering execution behavior, providing a mechanism for silent health monitoring, threshold sensitivity testing, and regulatory compliance documentation without operational risk. The deployment-mode switch governing enforcement and observational modes is further described in connection with FIG. 37.

FIG. 23 illustrates a cryptographic binding architecture 2300 configured to ensure integrity and origin verification of the structured compatibility certificate. The architecture receives contextual input data 2302 and performs R/S_sup/N decomposition 2304, followed by signal derivation 2306 producing the quality metric, reliability coefficient, and timescale parameters. The resulting structured compatibility certificate 2308 is cryptographically signed. A cryptographic binding stage 2310 binds the certificate to the environmental validation context. A communication interface 2312 prepares the bound certificate for consumer consumption. Architecture 2300 cryptographically binds the certificate to the contextual input and to the invariant specification such that integrity and origin are independently verifiable by a third party without requiring disclosure of internal parameters, weights, or proprietary logic of the downstream solver. In advanced embodiments, this includes zero-knowledge attestation, wherein a proof over the physical substrate state is generated in time independent of model size with respect to certificate length, allowing attestation that the certificate was derived from a valid physical substrate state without accessing substrate parameters or internal certificate derivation logic. In quantum-substrate embodiments, this extends to a zk-SNARK construction over the quantum circuit parameter state as described herein.

Figure 24:
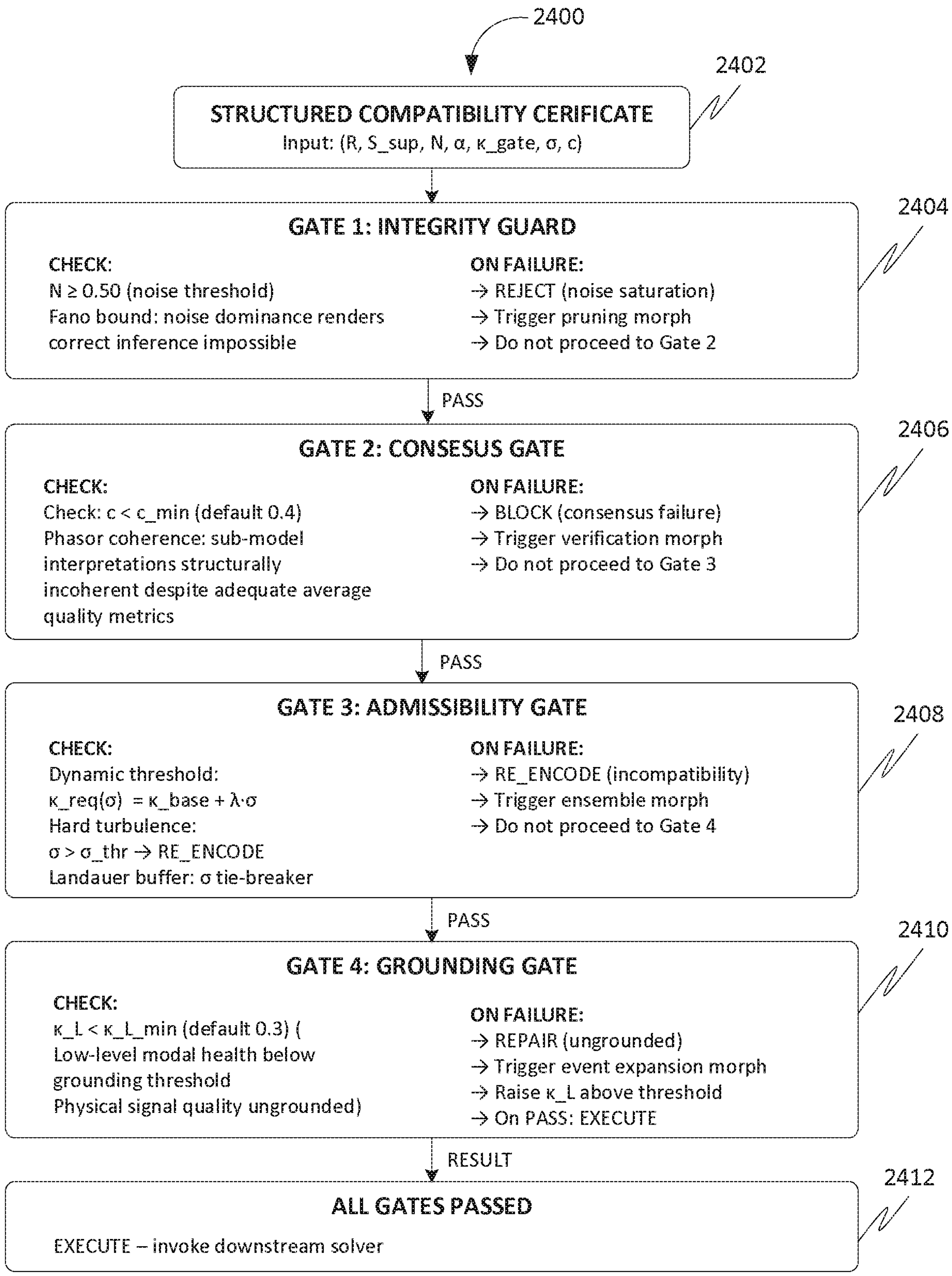
FIG. 24 illustrates a sequential gates compatibility enforcement process 2400 comprising four gates evaluated in fixed order prior to downstream solver invocation, in accordance with some embodiments.

FIG. 24 illustrates an ordered validation process 2400 configured to perform compatibility-governed enforcement prior to invocation or execution of a downstream solver. The structured compatibility certificate 2402 is the input operand. Process 2400 is implemented as a sequential four-gate evaluation evaluated in a fixed order constituting a correctness guarantee under adversarial conditions. Gate 1 (2404) enforces a noise floor condition, issuing a reject decision when the noise component N of the certificate meets or exceeds the default threshold of 0.5; at this level Fano's inequality establishes that no solver can recover correct inference regardless of capacity. Gate 2 (2406) enforces a phasor coherence condition, issuing a block decision when the consensus coherence metric c falls below the default minimum threshold $c\_min=0.4$, indicating structural incoherence among sub-model interpretations. Gate 3 (2408) enforces a two-tiered dynamic admissibility condition. First, a hard turbulence barrier: if $\sigma>\sigma\_thr$ (default $\sigma\_thr=0.5$), the system immediately issues a re-encode decision without evaluating the compatibility score, because the encoding lies outside the admissible region by definition. Second, if the turbulence barrier passes, the Oobleck dynamic threshold $\kappa\_req(\sigma)=\kappa\_base+\lambda\sigma$ (defaults $\kappa\_base=0.5$, $\lambda=0.4$) is evaluated: a compatibility score κ_gate below this dynamic threshold issues a re-encode decision. A Landauer tolerance buffer $[\kappa\_req-\varepsilon\_L, \kappa\_req)$ with $\varepsilon\_L=0.05$ provides a gray zone in which the turbulence metric serves as a deterministic tie-breaker between re-encoding and allowing execution to proceed under a constrained or caution-qualified execute condition, without altering the fixed four-gate sequence or introducing an additional gate outcome; in one embodiment, if $\sigma>0.4$ within the gray zone, a re-encode decision is issued, otherwise the encoding passes Gate 3. Gate 4 (2410) enforces a low-level modal compatibility condition, issuing a repair decision when the low-level modal health score κ_L falls below the default threshold of 0.3, detecting physically ungrounded signal quality for multimodal or sensor-derived inputs. A contextual input that passes all four gates receives an execute decision (2412) and proceeds to downstream solver invocation. A contextual input that fails the criteria associated with any gate causes process 2400 to terminate and apply the corresponding typed enforcement action prior to solver invocation, without proceeding to subsequent gates. The gates are evaluated in the fixed sequential order shown and may not be reordered, made optional, evaluated concurrently, or partially ordered: the fixed gate sequence is a correctness guarantee that ensures no gate can be bypassed by an adversary who knows the gate specification. Each non-execute gate decision triggers exactly one graph transformation operator that moves exactly one certificate scalar in exactly one direction, guaranteeing termination of the Morph Repair Cycle. Upon termination of the repair cycle, whether by satisfaction of all gate conditions or by determination that no further graph transformation is structurally possible, a committed audit log entry is generated recording the terminating certificate values, gate reached, outcome, and timestamp.

FIG. 25 illustrates a multi-agent coordination and dual-graph morph repair architecture 2500 governed by structured compatibility certificates. A Representation Graph G_R(2502) comprises task-bearing EventNodes, each carrying a locally-derived structured compatibility certificate with the three mutually exclusive semantically-distinct components. A geometric compatibility morphism φ (2504) maps EventNodes to AgentNodes via cosine similarity in a shared latent space. A Solver Graph G_S (2506) comprises capability-bearing AgentNodes with immutable solver contracts; surjectivity is enforced.

Architecture 2500 establishes two closed-loop feedback mechanisms. Loop 1, the Morph Repair Cycle (2508), is triggered when the Control Layer returns a non-execute gate decision. Four graph transformation operators-pruning, verification, ensemble, and event-expansion—are available; the operator corresponding to the triggered gate is applied to G_R, G_S, or both, and the certificate is re-derived and re-evaluated. Loop 1 continues until an execute decision is returned or no further graph transformation is structurally possible. Loop 2, the Agent Handoff Cycle (2510), is triggered when the Control Layer returns an execute decision. The downstream solver is invoked, and its real output is re-encoded as a new EventNode carrying a certificate derived from actual intermediate content rather than from initialization state. Loop 1 and Loop 2 are mutually exclusive. Consumer roles consuming the certificate are described in connection with FIG. 37.

FIG. 26 illustrates a proxy estimation and recursive validation architecture 2600 implementing the black-box certificate derivation path. Where FIG. 17 derives the certificate triple by direct projection through learned weight matrices (white-box access required), FIG. 26 derives the same certificate triple-(α, κ_gate, σ)-entirely from externally observable signals when the downstream solver does not expose internal embeddings. The gatekeeper receives the same certificate triple regardless of which derivation path produced it; the four-gate enforcement sequence is path-agnostic.

Three families of proxy estimators operate in parallel on the contextual input and solver pair. A purity proxy family 2602 estimates the quality metric α using one or more of perplexity ratio, embedding coherence, and imputation precision methods. A compatibility proxy family 2604 estimates the execution compatibility score κ_gate using one or more of retrieval precision, schema coverage, cross-modal alignment, and graph edge integrity methods. A turbulence proxy family 2606 estimates the turbulence metric σ using one or more of softmax entropy, conformal non-conformity scoring, Monte Carlo dropout variance, and looped model exit count methods. A recursive weakest-link proxy ensembling stage 2608 applies the weakest-link aggregation rule recursively: the final purity estimate is the minimum across purity proxies, the final compatibility estimate is the minimum across compatibility proxies, and the final turbulence estimate is the maximum across turbulence proxies, ensuring that no single proxy failure can overstate the certificate quality. A proxy drift monitor 2610 detects sudden shifts in the empirical distribution of proxy estimates, signaling that the proxy estimators have entered their own out-of-distribution regime and require recalibration. An asymmetric error tolerance module 2612 configures the Landauer tolerance buffer on a per-domain basis: high-stakes domains reduce the buffer to ε_L=0.02 while low-stakes domains expand it to ε_L=0.10. The ensembled proxy estimates feed the four-gate gatekeeper 2614 as described in connection with FIG. 24. A pipeline compositionality bound 2616 formalizes reliability degradation across multi-stage agentic pipelines: for an n-stage pipeline with per-stage gatekeeper accuracy p, pipeline reliability is bounded by p^n, and a noise amplification factor NAF=1+(1−r)(n−1) governs noise propagation across stages, motivating certificate-based filtering at each stage.

Figure 27:
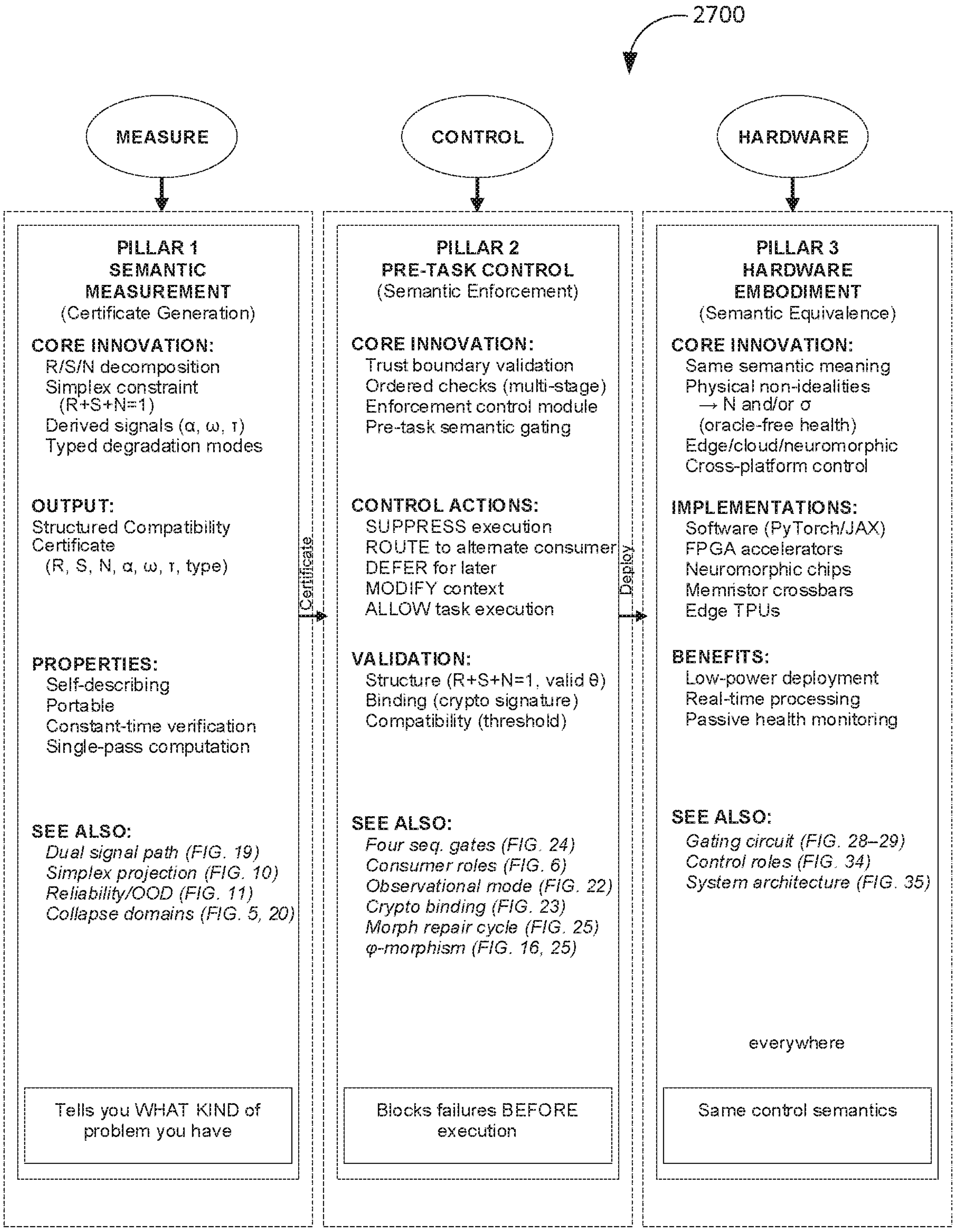
FIG. 27 illustrates a three-pillar hardware compatibility architecture 2700 implementing structured compatibility certification across heterogeneous computational substrates, in accordance with some embodiments.

FIG. 27 illustrates a three-pillar hardware architecture 2700 implementing structured compatibility certification across heterogeneous computational substrates. Pillar 1 (2702) represents semantic measurement via certificate generation on digital software executing on conventional processors. Pillar 2 (2704) represents pre-task control via semantic enforcement combining digital and analog computation paths. Pillar 3 (2706) represents hardware embodiment via semantic equivalence on analog or neuromorphic execution on memristor crossbar arrays or equivalent substrates. Within Pillar 3, the noise component (N) of the structured compatibility certificate and the associated turbulence metric (c) operationalize the thermodynamic nonidealities of the substrate, including conductance drift, thermal fluctuations, and read noise. This operationalization transforms the noise component into an oracle-free substrate health signal that is detectable from data distribution patterns without external diagnostic hardware or ground-truth labels, enabling the gating circuit to protect the analog substrate from malicious or architecturally misaligned inputs at the circuit level.

Figure 28:
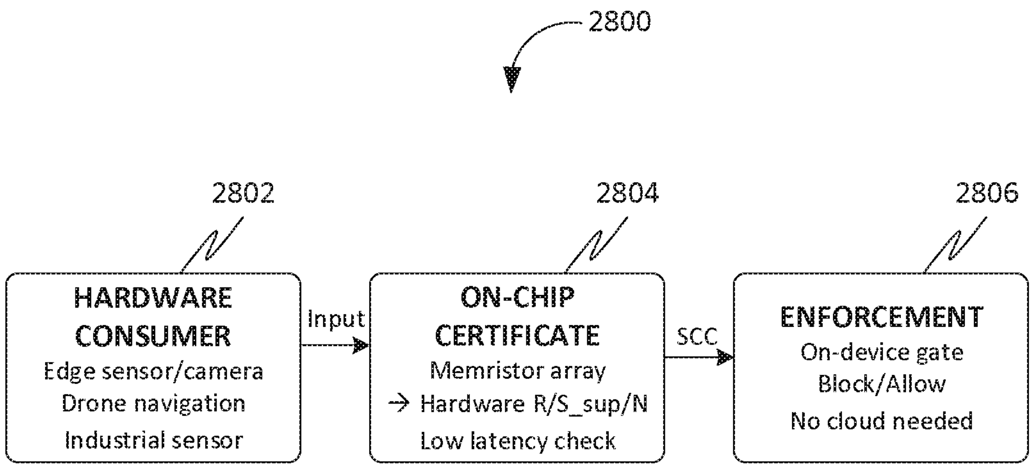
FIG. 28 illustrates an edge-device structured compatibility enforcement unit 2800, in accordance with some embodiments.

FIG. 28 illustrates an edge-device embodiment 2800 configured to perform on-device structured compatibility certification. A hardware consumer 2802 receives contextual input from one or more edge devices, including by way of non-limiting example edge sensors, cameras, drone navigation systems, or industrial sensor arrays. An on-chip certificate module 2804 implements a memristor array that computes hardware R/S_sup/N decomposition with low latency, producing a structured compatibility certificate on the device. An enforcement module 2806 implements an on-device gate that issues block or allow decisions without requiring cloud connectivity. Utilizing the oracle-free substrate health signal derived from the noise component N, edge-device embodiment 2800 employs hardware-accelerated gating circuits that conditionally disable instruction issuance or memory access based entirely on the pre-execution evaluation of the structured compatibility certificate, without requiring software intervention or communication with a centralized server. This embodiment is suitable for deployment in industrial IoT, autonomous vehicle control, and medical device systems where latency, connectivity, and data privacy constraints preclude cloud-based enforcement.

Figure 29:
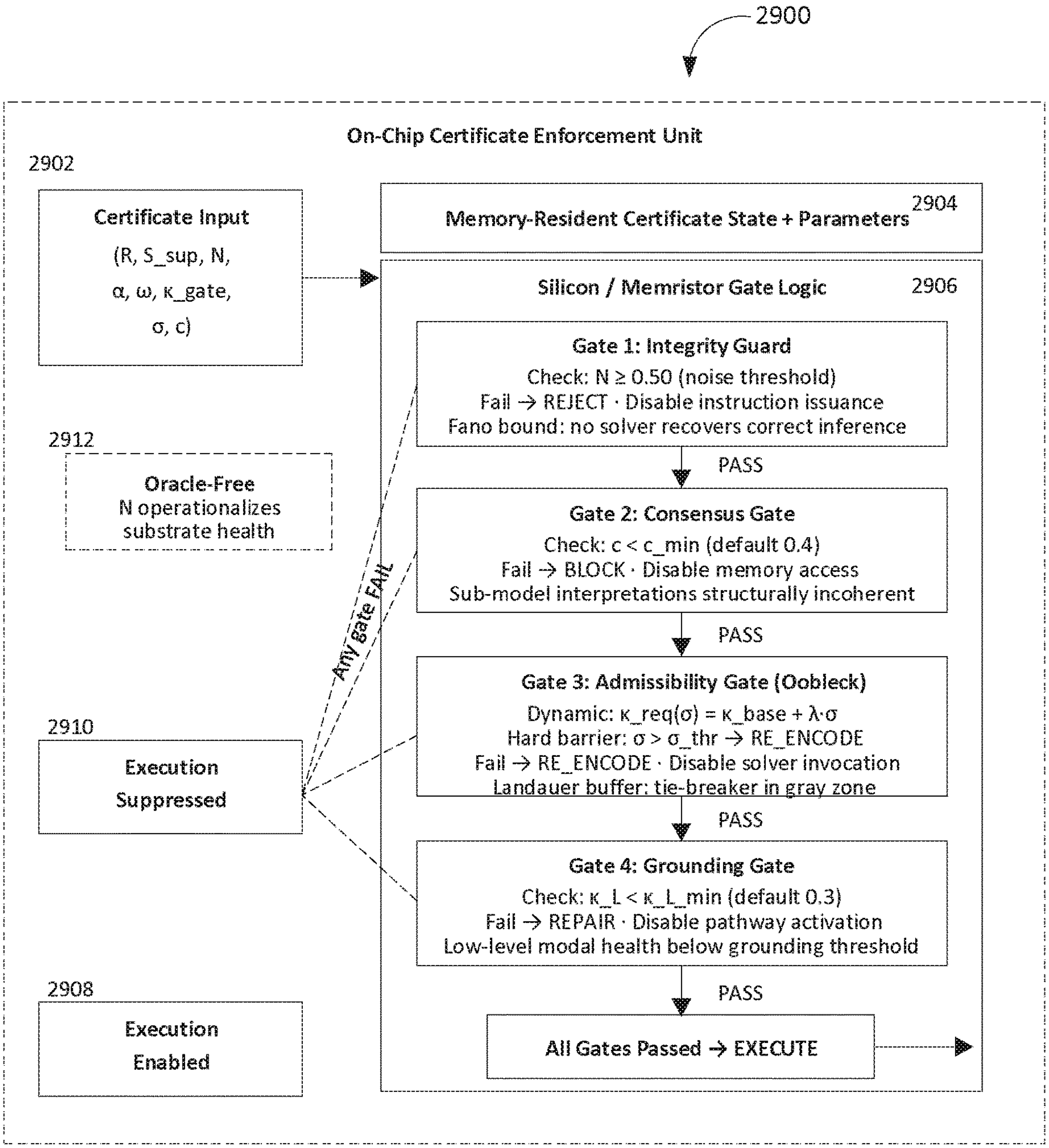
FIG. 29 illustrates an on-chip certificate enforcement architecture 2900 integrating pre-execution gating into silicon or memristor logic, in accordance with some embodiments.

FIG. 29 illustrates a hardware-accelerated on-chip certificate enforcement architecture 2900. A certificate input 2902 provides the full certificate tuple (R, S_sup, N, α, ω, κ_gate, σ, c). Memory-resident certificate state and threshold parameters 2904 are stored on-chip; this memory stores both the current certificate values and the configurable threshold parameters (N_thr, c_min, κ_base, λ, σ_thr, κ_L_min) governing the four gates, making the complete enforcement configuration addressable by the gating circuit without external communication. Silicon or memristor gate logic 2906 implements the four gates in fixed sequential order. The gating circuit 2906 is communicatively coupled to the memory 2904 and performs pre-task evaluation: no instruction issuance, memory access, solver invocation, execution pathway activation, or allocation of hardware resources occurs prior to the gating circuit passing all four gates against the certificate values retrieved from memory. Upon all gates passing, execution is enabled 2908; upon any gate failure, execution is suppressed 2910. The noise component N operationalizes substrate health without external diagnostic hardware, serving as an oracle-free indicator 2912. In some embodiments, the gating circuit evaluates one or more fields of the structured compatibility certificate against one or more threshold parameters, depending on the substrate and task configuration. Architecture 2900 physically integrates the sequential four-gate gatekeeper directly into the silicon or memristor crossbar array logic, providing a high-speed, low-latency execution firewall that protects the analog substrate from malicious or architecturally misaligned inputs at the hardware level. The gating circuit evaluates the four gates in the fixed sequential order described herein and conditionally enables or disables instruction issuance, memory access, solver invocation, execution pathway activation, or allocation of hardware resources based on the structured compatibility certificate stored in the memory-resident certificate state 2904. FIG. 30 illustrates a diagnostic simplex embodiment 3000 that extends the two-path measurement framework for oracle-free root-cause decomposition. The two signal paths described above produce the enforcement operands α and κ_gate that govern gate decisions. FIG. 30 provides a complementary projection of the compatibility gap-expressed in the (R, S_sup, N) space-into a specialized diagnostic simplex defined by three root-cause coordinates κ_A, κ_E, and κ_T that satisfy the normalization constraint κ_A+κ_E+κ_T=1. This diagnostic projection shares the same input as the two-path framework but produces coordinates that are distinct from, and do not substitute for, the gate enforcement operands; the diagnostic simplex does not share state variables with the execution compatibility score κ_gate or any other gate operand. In this embodiment, κ_A (element 3008, topological mismatch axis, lower-right vertex) represents algorithmic alignment between the solver's algorithmic architecture and the structural demands of the problem; κ_E (element 3004, epistemic uncertainty axis, top vertex) represents encoding efficiency of the representation, quantifying the fraction of the compatibility gap attributable to inefficiencies in the representation policy that prevent the encoding from exposing relevant structure to the solver; and κ_T (element 3006, aleatoric noise axis, lower-left vertex) represents search tractability of the optimization landscape, quantifying the fraction attributable to the intrinsic computational hardness of the search problem. The bottleneck component 3002 is identified as min {κ_A, κ_E, κ_T}, enabling targeted remediation: encoder retraining when κ_E is the bottleneck, solver architecture improvement when κ_A is the bottleneck, and problem reformulation when κ_T is the bottleneck. In some embodiments, one or more of the diagnostic coordinates κ_A, κ_E, κ_T may inform remediation selection or morph operator routing without altering the four-gate enforcement sequence. By mapping the representation into this diagnostic space, the system performs oracle-free root-cause analysis without requiring ground-truth labels or oracle access to optimal solutions. The structured compatibility certificate generated by the Measurement Layer functions as a portable enforcement-data artifact that may be transmitted across network boundaries and independently consumed by heterogeneous downstream systems without requiring disclosure of internal solver architectures, model weights, or execution policies.

Figure 31:
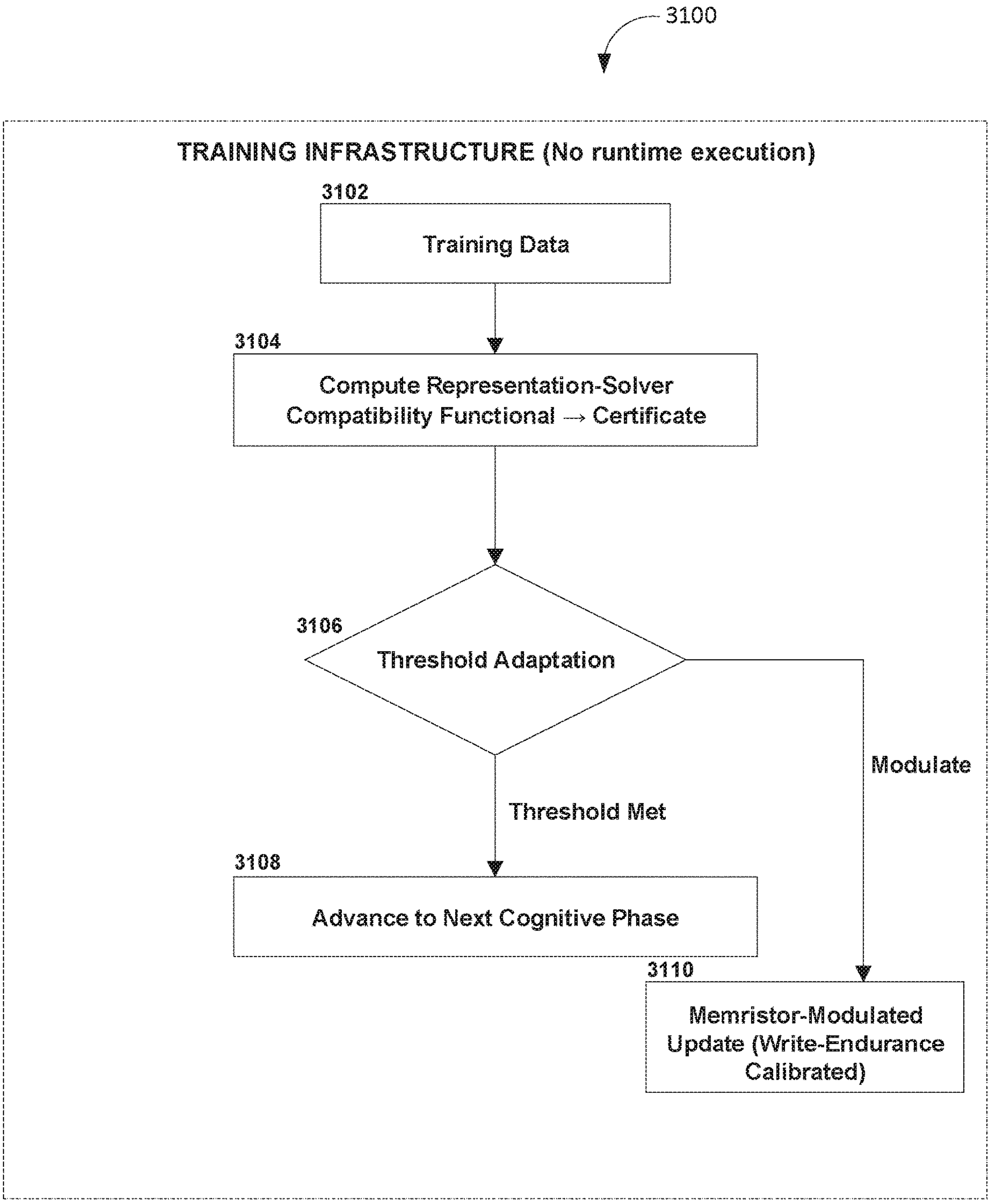
FIG. 31 illustrates a quality-aware offline training and calibration infrastructure 3100, in accordance with some embodiments.

FIG. 31 illustrates a quality-aware offline training infrastructure 3100 in accordance with embodiment [E032]. The dashed boundary indicates that this infrastructure is architecturally distinct from, and temporally prior to, the runtime execution architecture; no component of this infrastructure executes during live solver invocation, agent coordination, or certificate-governed enforcement. Training data 3102 feeds the computation of the representation-solver compatibility functional and certificate 3104. A threshold calibration step 3106 derives one or more threshold parameters from the empirical certificate distribution observed during training; the resulting threshold parameters are fixed prior to deployment and are not modified during the execution phase governed by the four-gate gatekeeper. The infrastructure organizes training into cognitive phases; when the calibrated thresholds are met, the system advances to the next cognitive phase 3108, with phase progression gated by measured representation-solver compatibility rather than by task difficulty alone. In hardware-native embodiments, a memristor-modulated write step 3110 applies write-endurance-calibrated coupling to the analog substrate during the training phase. No weight updates, policy modification, gradient descent, reinforcement learning, or synaptic plasticity occur during the execution phase governed by the sequential four-gate gatekeeper.

Figure 32:
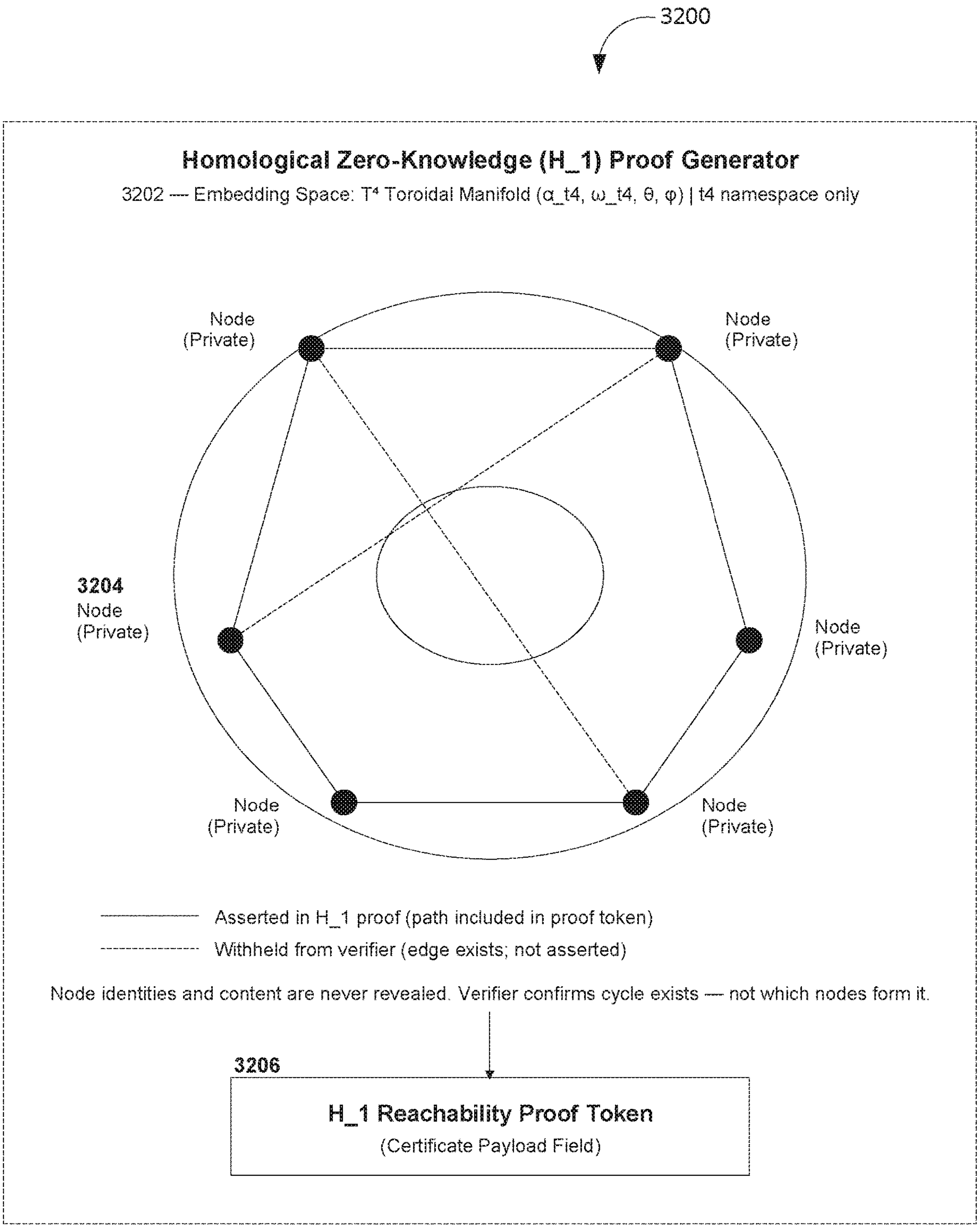
FIG. 32 illustrates a privacy-preserving knowledge graph compatibility verification architecture 3200, in accordance with some embodiments.

FIG. 32 illustrates a privacy-preserving knowledge graph architecture 3200 governed by structured compatibility. In this embodiment, the system executes a Knowledge Graph T^4 Embedding, projecting complex, multi-relational knowledge structures onto a four-dimensional toroidal manifold T^4 (3202). The toroidal manifold embedding encodes angular coordinates (α_t4, ω_t4, θ, φ) within a dedicated t4 namespace that is distinct from the certificate scalars (α, ω, κ_gate, σ); the two namespaces are never mixed in any formula or gate condition. Private nodes 3204 within the manifold are not revealed by the proof, ensuring that the attestation reflects structural properties without disclosing the underlying graph topology or relational content. This geometric embedding enables the system to utilize Homological Zero-Knowledge (H_1) proofs. The H_1 construction generates a discrete proof token 3206 that is carried as a field within the structured compatibility certificate, enabling any downstream component or third-party auditor to verify that the certificate was derived from a valid substrate state in time independent of model size with respect to certificate length, without accessing substrate parameters, weight values, or graph content, as further defined in the Definitions section. The H_1 construction allows a producer to cryptographically prove topological features of the data-such as privacy-preserving reachability or recursive manifold stacks-without resulting in structure revelation of the underlying proprietary or sensitive data. In some embodiments, the knowledge graph T^4 embedding is implemented independently of the three-layer Measurement-Control-Coordination architecture described herein and may be combined with any of the substrate-specific, multi-tenant, or API gateway embodiments described herein.

Figure 33:
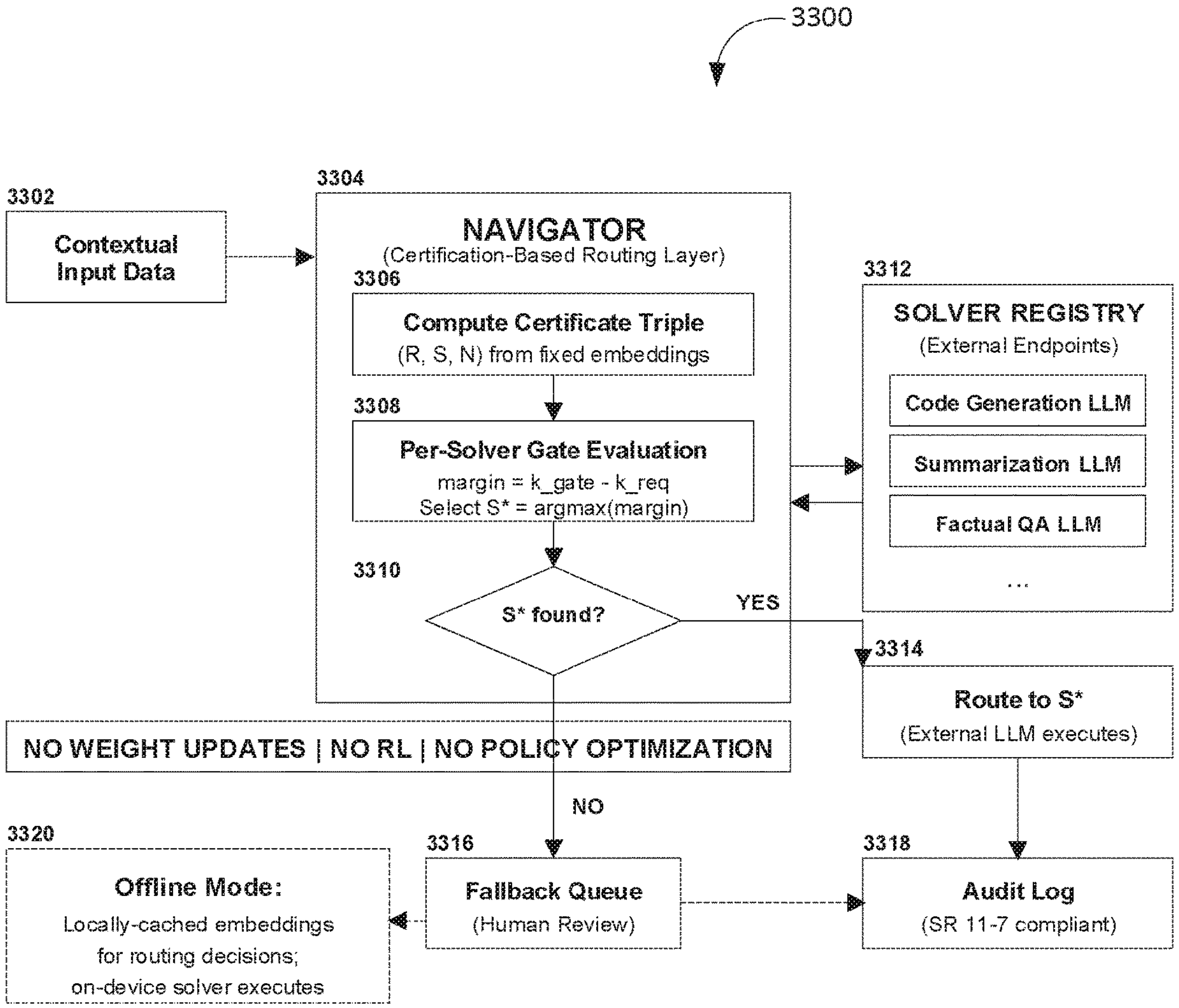
FIG. 33 illustrates a navigator-class meta-routing architecture 3304 for certificate-governed routing of contextual inputs to external solver endpoints, in accordance with some embodiments.

FIG. 33 illustrates a navigator-class meta-routing architecture 3300 in accordance with embodiment [E034]. The navigator 3304 operates as a certification-based routing layer whose primary function is routing contextual inputs to external solver endpoints rather than performing inference, text generation, or any learning operation itself. Contextual input data 3302 enters the navigator via the communication device interface. A certificate triple computation module 3306 computes runtime estimates of the certificate triple (α, κ_gate, σ) using fixed geometric embeddings that are frozen prior to deployment. The computation is purely algebraic: no neural network weights are updated, no gradients are computed, and no policy optimization occurs during routing. A per-solver gate evaluation module 3308 evaluates the certificate against each solver $S_j$ in a solver registry 3312 comprising a plurality of external language model endpoints—for example, a code generation model, a summarization model, and a factual question-answering model—each characterized by a solver contract specifying compatibility thresholds and capability centroids in the shared latent space, frozen prior to deployment. For each solver, the module computes a margin defined as margin $(S_j)=\hat{\kappa}$_gate $(S_j)-\kappa$_req(σ), where κ_req(σ) is the dynamic admissibility threshold. A routing decision 3310 selects the solver S* exhibiting the highest positive margin: S*=argmax {margin $(S_j)$: margin $(S_j)>0$}. When at least one external solver satisfies all gate conditions with positive margin, the navigator routes the certified input to certified execution 3314, wherein the selected external language model S* performs the actual inference or generation task. The navigator does not itself execute any inference, prediction, or decision-making operation on the contextual input; it serves exclusively as a deterministic routing layer that directs inputs to external consumer endpoints based on certificate-governed selection. When no solver in the registry satisfies all gate conditions for a given input, the navigator defers the input to a fallback queue 3316 for human review or alternative processing. All routing decisions—both successful routes and fallback deferrals—are recorded in an audit log 3318 for timestamped documentation of routing outcomes. In deployments where network connectivity is unavailable or dedicated external models are not accessible, an offline mode 3320 enables the navigator to compute routing decisions using locally cached capability embeddings. The downstream solver in offline mode-which may be an on-device inference engine or a local fallback endpoint-performs the actual generation. This architectural separation ensures that the certification and routing layer remains substrate-agnostic and does not incorporate runtime policy optimization, weight updates, or reinforcement learning at any point in the execution path regardless of connectivity status. The badge "NO WEIGHT UPDATES·NO RL·NO POLICY OPTIMIZATION" in FIG. 33 emphasizes that the navigator provides deterministic, auditable execution control: all routing decisions are computed algebraically from fixed agent embeddings, fixed solver contracts, and the certificate triple, with no learning operations occurring at runtime. The immutability constraint is an affirmative architectural invariant, not a consequence of resource limitations. During the execution phase governed by the sequential four-gate gatekeeper, the following runtime learning operations are categorically prohibited regardless of connectivity status, input distribution, or gate outcome: (i) updates to neural network weights or solver model parameters; (ii) test-time reinforcement learning of any form; (iii) policy optimization or policy gradient computation; (iv) credit assignment across agent steps; and (v) modification of solver contracts or capability centroids stored in the solver registry 3312. All such parameters are fixed prior to deployment and remain immutable throughout the execution phase. Temperature t and other certificate-derived scheduling instruments modulate execution behavior but do not alter model parameters and are not gate operands. This immutability invariant ensures that every routing decision made by the navigator is reproducible from the same certificate triple and the same frozen embeddings.

Figure 34:
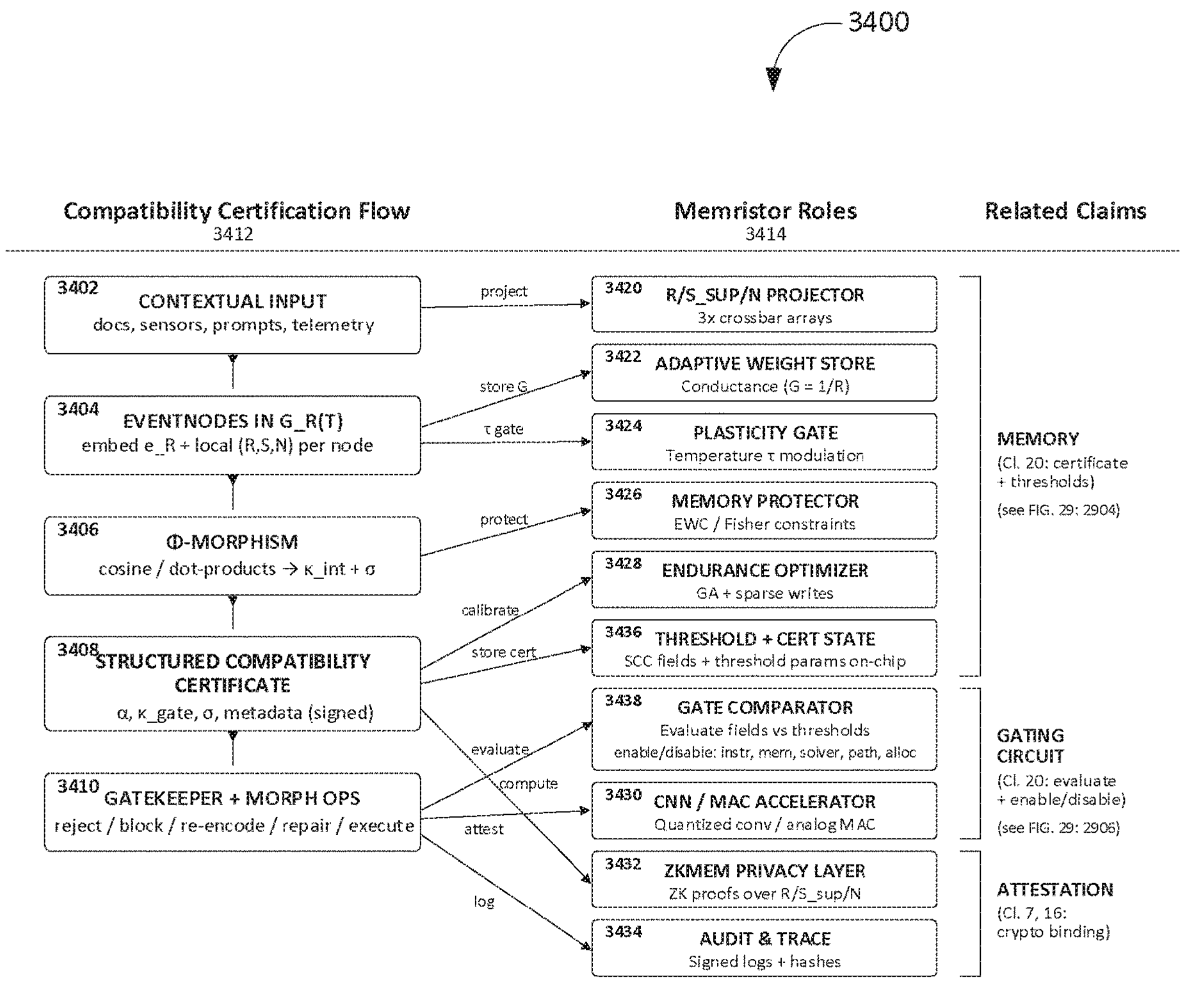
FIG. 34 illustrates memristive compatibility evaluation and control roles 3400 mapping the certification flow to memristor hardware functions, in accordance with some embodiments.
Figure 35:
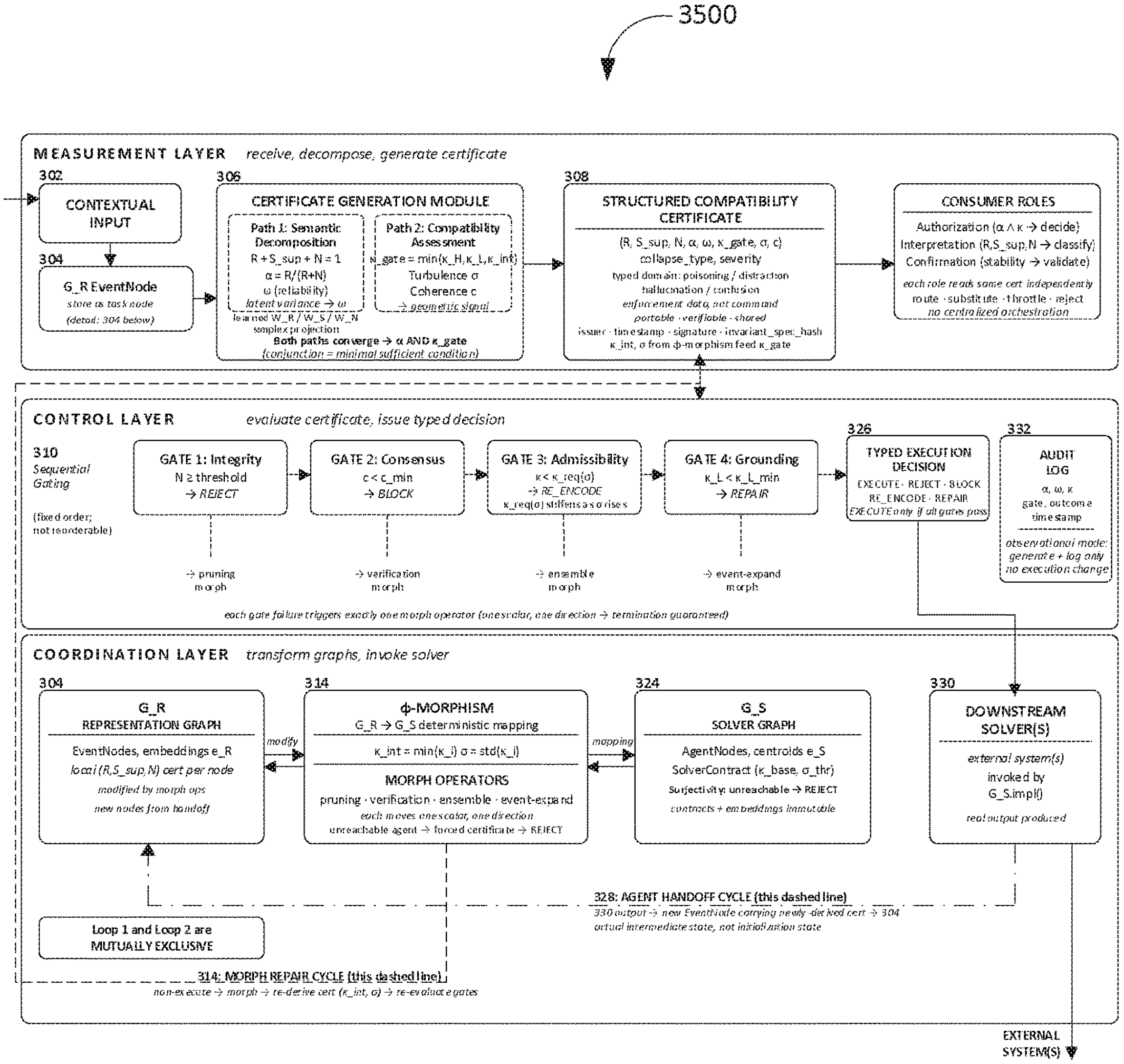
FIG. 35 illustrates a detailed view of the certificate-governed execution control architecture 300 of FIG. 3, in accordance with some embodiments.

FIG. 34 illustrates a memristive compatibility evaluation and control architecture 3400 implementing the hardware-accelerated computational system within a memristive crossbar substrate. Architecture 3400 is organized into two parallel columns: a compatibility certification flow 3412 on the left corresponding to the software pipeline described in connection with FIG. 3 and FIG. 35, and a set of memristor roles 3414 on the right implementing each certification step in analog hardware. The same structured compatibility certificate governs both digital and analog execution; the certificate semantics are substrate-agnostic. The certification flow 3412 proceeds through five stages. Contextual input 3402—comprising documents, sensor readings, prompts, or telemetry—is received and encoded as task-bearing EventNodes in the representation graph G_R(T) 3404, each node carrying a local structured compatibility certificate with the three mutually exclusive semantically-distinct components (R, S_sup, N) constrained by the normalization invariant R+S_sup+N=1. A geometric compatibility morphism (Phi-Morphism) 3406 computes pairwise dot-products in the shared latent space, producing the interface compatibility score kappa_int and the turbulence metric sigma. The resulting structured compatibility certificate 3408 carries the quality metric alpha, the execution compatibility score kappa_gate, the turbulence metric sigma, and cryptographically signed metadata. A gatekeeper and morph operator stage 3410 evaluates the certificate through the sequential four-gate gatekeeper and determines the typed execution decision (reject, block, re-encode, repair, or execute). Each certification stage maps to one or more memristor roles 3414 in the right column. An R/S_sup/N Projector 3420 implements the semantic decomposition of element 3402 using three parallel memristor crossbar arrays, one per certificate component, performing the matrix-vector multiplication that projects the contextual input into the three components in a single analog pass. An Adaptive Weight Store 3422 stores the learned projection weights as conductance values (G=1/R), physically encoding the weight matrices of FIG. 17 in the resistive state of the crossbar elements. A Plasticity Gate 3424 modulates the temperature parameter tau to control write dynamics during offline training; no plasticity modulation occurs during runtime execution. A Memory Protector 3426 implements elastic weight consolidation (EWC) and Fisher information constraints to prevent catastrophic forgetting of previously calibrated projection weights during sequential training phases. An Endurance Optimizer 3428 implements a genetic algorithm with sparse write scheduling to maximize device longevity by minimizing unnecessary write cycles to the analog medium. A Threshold and Certificate State store 3436 stores the structured compatibility certificate comprising the three mutually exclusive semantically-distinct components constrained by the normalization invariant enforcing that the sum of the three components equals a fixed aggregate value, together with one or more threshold parameters governing the four-gate evaluation, on the memristor substrate. Element 3436 corresponds to the memory-resident certificate state and parameters 2904 of FIG. 29. The threshold parameters—including the noise threshold N_thr, the coherence minimum c_min, the compatibility base kappa_base, the turbulence sensitivity lambda, the hard turbulence barrier sigma_thr, and the grounding floor kappa_L_min—are fixed prior to deployment during the offline calibration phase described in connection with FIG. 31 and are not modified during the execution phase governed by the four-gate gatekeeper. A Gate Comparator 3438 is communicatively coupled to the Threshold and Certificate State store 3436 and is configured to evaluate one or more fields of the structured compatibility certificate against the threshold parameters stored in element 3436. Prior to task execution, the Gate Comparator 3438 conditionally enables or disables instruction issuance, memory access, solver invocation, execution pathway activation, or hardware resource allocation based at least in part on the evaluation of the structured compatibility certificate. Element 3438 corresponds to the silicon or memristor gate logic 2906 of FIG. 29 and implements the same four sequential gates in the same fixed order described in connection with FIG. 24: Gate 1 (Integrity Guard) checks the noise component against N_thr; Gate 2 (Consensus Gate) checks phasor coherence against c_min; Gate 3 (Admissibility Gate) checks kappa_gate against the dynamic threshold kappa_req(sigma); and Gate 4 (Grounding Gate) checks the low-level modal health score kappa_L against kappa_L_min. Each gate evaluation executes in constant time relative to certificate length. A CNN/MAC Accelerator 3430 implements quantized convolution and analog multiply-accumulate operations on the memristor crossbar, providing the computational substrate for the pairwise compatibility calculations performed by the Phi-Morphism 3406. Together, elements 3438 and 3430 constitute the gating circuit. A ZKMEM Privacy Layer 3432 generates zero-knowledge proofs over the R/S_sup/N certificate fields, enabling third-party verification that the certificate was derived from a valid substrate state without disclosing internal parameters, weight values, or crossbar configurations. An Audit and Trace module 3434 generates signed logs and cryptographic hashes for regulatory compliance documentation, implementing the structured audit log entry described in connection with FIG. 22. No weight updates, reinforcement learning, policy optimization, or synaptic plasticity occur during the execution phase governed by the sequential four-gate gatekeeper. All adaptation of the analog substrate-including projection weight calibration, threshold tuning, and endurance scheduling-occurs exclusively during the offline training phase described in connection with FIG. 31. The memristive architecture 3400 implements the same control semantics as the software architecture of FIG. 35; the structured compatibility certificate functions identically regardless of whether the underlying substrate is digital, analog, neuromorphic, or hybrid.

FIG. 35 illustrates a detailed view of the certificate-governed execution control architecture 300 introduced in connection with FIG. 3. The Measurement Layer elements 302, 304, 306, and 308 are described in connection with FIG. 9-FIG. 11 and FIG. 17; the Path 2 signal derivation is described in connection with FIG. 36. The Control Layer elements 310, 326, and 332 are described in connection with FIG. 24 and FIG. 22. The Coordination Layer elements 304, 314, 324, 328, and 330 are described in connection with FIG. 25. The consumer roles shown in FIG. 35 are further detailed in FIG. 37B.

FIG. 35 further illustrates three architectural constraints not individually called out in the foregoing figures. First, the conjunction of the signal quality metric $\alpha$ from Path 1 and the execution compatibility score κ_gate from Path 2 constitutes a minimal sufficient condition for execution authorization; neither metric alone is sufficient to satisfy the gatekeeper, and no additional metric beyond the conjunction is required for the authorization determination. Second, each gate failure in the sequential four-gate gatekeeper triggers exactly one graph transformation operator-pruning for Gate 1, verification for Gate 2, ensemble for Gate 3, and event-expansion for Gate 4—with each operator moving one scalar in one direction, guaranteeing termination of the morph repair cycle. Third, the morph repair cycle (Loop 1) and the agent handoff cycle (Loop 2) are mutually exclusive: at any given evaluation step, the system is either morphing the representation graph in response to a non-execute decision or handing off to the next downstream solver following an execute decision, but never both concurrently.

Figure 36:
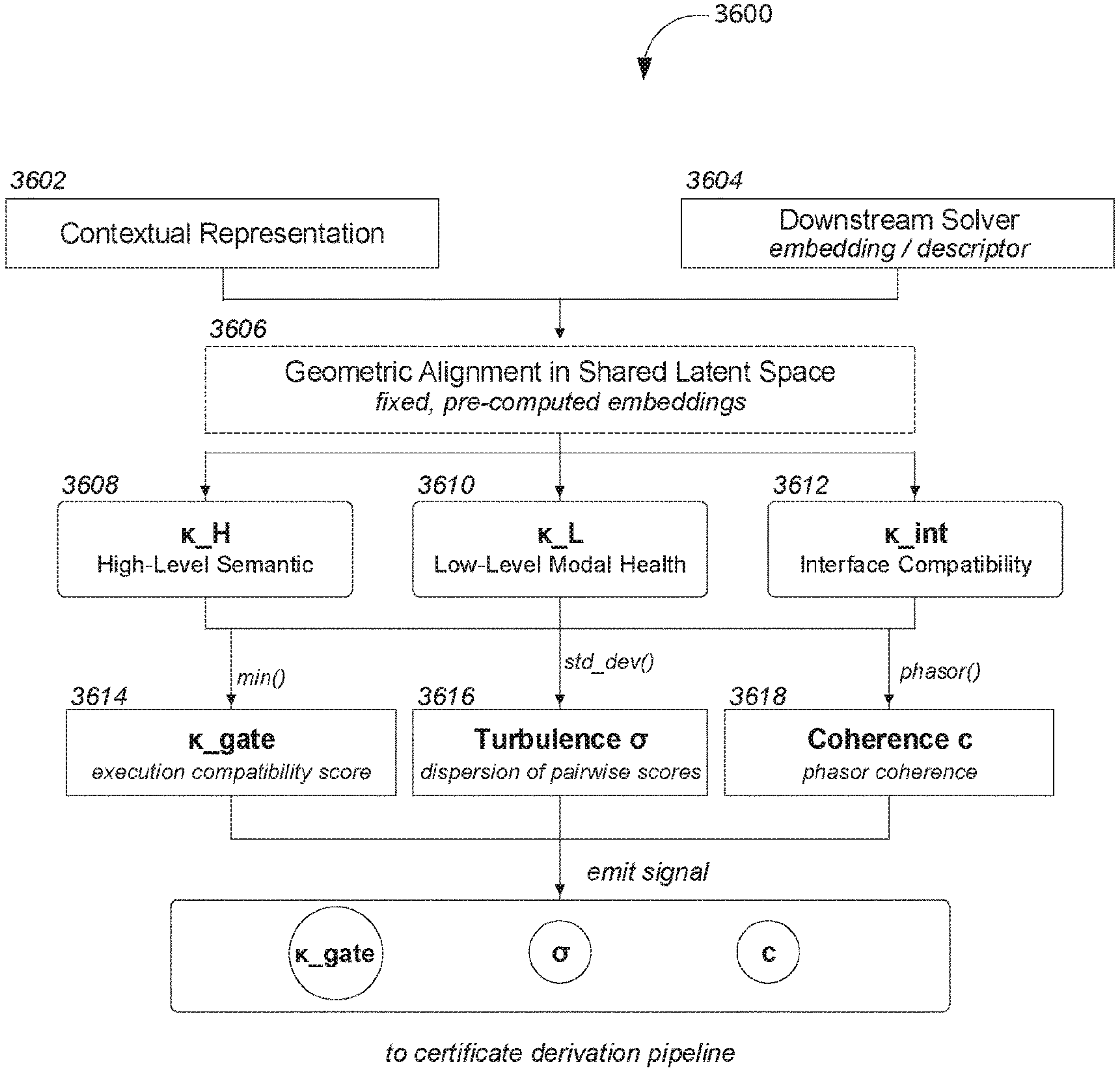
FIG. 36 illustrates compatibility assessment signal derivation 3600 for the geometric alignment path producing the execution compatibility score $\kappa$ gate, the turbulence metric $\sigma$, and the coherence coefficient c, in accordance with some embodiments.

FIG. 36 illustrates a signal derivation architecture 3600 for the compatibility assessment path (Path 2) of the dual-feedback certificate generation system described in connection with FIG. 10 and FIG. 35. Path 2 operates independently of, and in parallel with, the semantic decomposition path (Path 1) that produces the signal quality metric $\alpha$. The two paths converge at the structured compatibility certificate; neither path shares intermediate state with the other. A contextual representation 3602 and a downstream solver embedding or descriptor 3604 are received as inputs to a geometric alignment module 3606 operating in a shared latent space. The embeddings used by the geometric alignment module 3606 are fixed and pre-computed prior to deployment; no weight updates, gradient computations, or embedding modifications occur during the execution phase. The geometric alignment module 3606 computes pairwise compatibility scores across multiple representational levels, producing three intermediate compatibility signals: a high-level semantic compatibility score κ_H (3608), a low-level modal health score κ_L (3610), and an interface compatibility score κ_int (3612). The three intermediate compatibility signals are combined into three derived metrics that are emitted as certificate fields. The execution compatibility score κ_gate (3614) is computed as the minimum of the three intermediate scores: κ_gate=min (κ_H, κ_L, κ_int). The minimum operation ensures that κ_gate reflects the weakest link across all representational levels; a high score at one level cannot mask a low score at another. The turbulence metric $\sigma$ (3616) is computed as the standard deviation of the pairwise scores, capturing the dispersion or disagreement among the three compatibility assessments. The coherence coefficient c (3618) is computed using phasor coherence, which measures the phase-locked alignment among the intermediate compatibility signals treated as oscillatory components. The three derived metrics-κ_gate, $\sigma$, and c—are emitted to the certificate derivation pipeline for inclusion in the structured compatibility certificate alongside the Path 1 outputs (R, S, N, $\alpha$, $\omega$). Each of the three derived metrics serves as an operand for a distinct gate in the sequential four-gate gatekeeper described in connection with FIG. 24: κ_gate is evaluated by the Admissibility Gate (Gate 3), $\sigma$ modulates the dynamic admissibility threshold κ_req($\sigma$), and c is evaluated by the Consensus Gate (Gate 2). The low-level modal health score κ_L is additionally evaluated by the Grounding Gate (Gate 4). The architectural separation between Path 1 (semantic decomposition, producing $\alpha$) and Path 2 (geometric alignment, producing κ_gate, $\sigma$, and c) ensures that the certificate captures two independent assessments of the same representation-solver pairing: one measuring content quality and one measuring structural alignment. The conjunction of $\alpha$ and κ_gate-both of which must satisfy their respective gate conditions-constitutes a minimal sufficient condition for execution authorization, as described in connection with FIG. 19. Neither metric alone is sufficient; the dual-path architecture prevents scenarios in which a structurally aligned but content-degraded representation, or a content-healthy but structurally misaligned representation, passes the gatekeeper.

Figure 37:
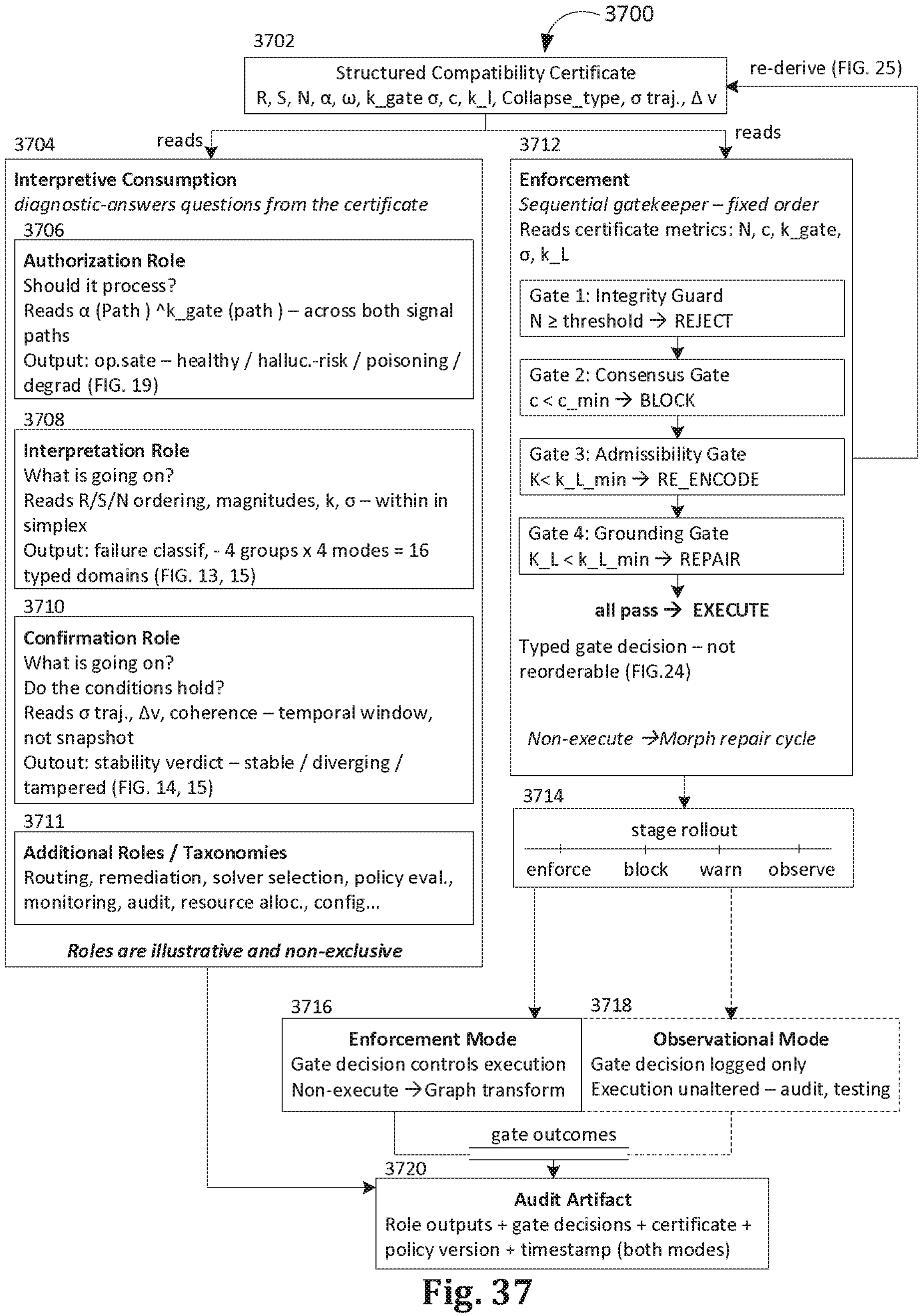
FIG. 37 illustrates consumer roles 3700 for the structured compatibility certificate, showing parallel interpretive and enforcement consumption tracks with a deployment-mode switch, in accordance with some embodiments.

FIG. 37 illustrates an execution-control architecture 3700 showing how a structured compatibility certificate 3702 may be consumed by a plurality of illustrative certificate consumers 3704 together with a sequential enforcement path 3712. The structured compatibility certificate 3702 may include, by way of non-limiting example, one or more of the certificate components R, S, and N, derived metrics including $\alpha$, $\omega$, κ_gate, $\sigma$, c, and κ_L, one or more collapse or diagnostic labels, and one or more stability or trust indicators. In various embodiments, the same structured compatibility certificate 3702 is emitted as machine-readable enforcement data and is consumable by multiple downstream functions that answer different operational questions from the same certificate without requiring that such functions be exclusive or mutually exhaustive.

The illustrative certificate consumers 3704 include, by way of example, an Authorization role 3706, an Interpretation role 3708, and a Confirmation role 3710. These named roles are illustrative and non-exclusive. A single consumer may perform one or more such functions, and a given function may be distributed across multiple consumers. In various embodiments, the Authorization role 3706 determines an authorization posture, including whether execution should proceed, be constrained, be deferred, or be rejected, based on one or more certificate conditions, including in some embodiments the conjunction of $\alpha$ and κ_gate. The Interpretation role 3708 classifies one or more operational conditions into typed domains, diagnostic labels, execution states, or other compatibility-governed classifications based on component relationships and one or more derived metrics. The Confirmation role 3710 determines whether the relevant conditions hold or remain admissible over a temporal window of one or more successive certificates, rather than from a single certificate snapshot, including through one or more stability, trust, coherence, or trajectory-based indicators, and may output a confirmation verdict such as, by way of non-limiting example, stable, diverging, inconsistent, or tampered.

In some embodiments, the Authorization role 3706 produces an operational-state classification including, by way of non-limiting example, healthy operation, hallucination-risk, poisoning, or degradation. Hallucination-risk refers to a condition in which the path-alignment coefficient $\alpha$ falls below $\alpha$ confidence threshold while the gate-level compatibility score κ_gate remains nominally acceptable, indicating that a solver output may be internally consistent yet misaligned with the ground-truth structure of the problem. Poisoning refers to anomalous elevation of the noise component N or the out-of-distribution indicator $\omega$ consistent with adversarial manipulation, as distinguished from naturally-occurring distributional drift. The operational-state taxonomy is illustrative; an implementation may refine, extend, or replace it provided that the authorization role produces a typed classification consumable by one or more downstream functions.

In various embodiments, additional certificate-consuming functions 3711 may also be present, including routing, remediation selection, solver selection, policy evaluation, monitoring, audit, logging, resource allocation, configuration, or other execution-related support functions. The additional functions 3711 are an open-ended extension point and illustrate that the named consumer roles 3706, 3708, and 3710 are not exhaustive of all ways in which the structured compatibility certificate 3702 may be consumed.

The enforcement path 3712 is shown separately from the illustrative certificate consumers 3704 and comprises a sequential gatekeeper operating in fixed order over certificate metrics read directly from the structured compatibility certificate 3702. In the illustrated embodiment, the gatekeeper evaluates integrity, consensus, admissibility, and grounding in sequence and produces a typed gate decision. A non-execute decision may initiate a morph repair cycle in which one or more graph transformations are applied, a revised certificate is derived, and the gates are re-evaluated. The certificate consumers 3704 and the enforcement path 3712 consume the same certificate 3702 in parallel. Neither track feeds the other: an interpretive misclassification cannot cause or suppress an enforcement action, an enforcement gate rejection cannot retroactively alter an interpretive classification, and both tracks may be independently tested, versioned, and deployed. This parallel-consumer constraint does not preclude a downstream orchestrator from reading outputs of both tracks and making a meta-decision; the constraint applies to the data-flow relationship between the two tracks themselves.

FIG. 37 further illustrates a deployment-mode switch 3714 governing how gate decisions from the enforcement path 3712 are applied to system execution. The deployment-mode switch 3714 is depicted as a staged-rollout spectrum with illustrative positions including observe, warn, block, and enforce. In enforcement mode 3716, the typed gate decision controls whether execution proceeds and whether remediation, rerouting, repair, or other action is invoked. In observational mode 3718, the gate decision is logged without altering execution behavior, thereby supporting shadow deployment, testing, regulatory review, threshold calibration, or continuous monitoring while the underlying execution path remains unaltered. As shown in FIG. 37, enforcement mode 3716 and observational mode 3718 share a common boundary, indicating that the two modes form a continuous spectrum rather than a binary choice. An operator may advance the switch from observe through warn and block to enforce as confidence in the gatekeeper accumulates, without changing the underlying certificate-production logic. The illustrated positions are non-limiting; an implementation may define additional positions or collapse positions without departing from the disclosed architecture.

An audit artifact 3720 may be generated in either mode and may capture one or more role outputs, one or more gate decisions, one or more certificate values or summaries, policy or threshold version identifiers, timestamps, and related execution metadata. The audit artifact 3720 is distinct from the structured compatibility certificate 3702 in that the certificate represents compatibility-governed state, while the audit artifact records how one or more consumers and enforcement functions used that state. In various embodiments, the audit artifact 3720 supports replay, compliance review, regulatory examination, forensic analysis, or post-event investigation across both the consumer track and the enforcement track.

Although the invention has been explained in relation to its preferred embodiment, it is to be understood that many other possible modifications and variations can be made without departing from the spirit and scope of the invention as hereinafter claimed.

What is claimed is:

1. A computer-implemented method for structured compatibility certification and execution control in one or more external systems, the method comprising:

receiving, using a communication device, a contextual input data comprising at least one representation of at least one contextual input;

identifying at least one of a downstream solver, a model, or an execution process configured to operate on the at least one representation;

computing, using a processing device, a representation-solver compatibility functional that quantifies a structural alignment between characteristics of the at least one representation and operational characteristics of the downstream solver, the model, or the execution process;

projecting the representation-solver compatibility functional into a machine-readable structured compatibility certificate comprising three components that are mutually exclusive and semantically-distinct: a relevance component representing an alignment between features of the at least one representation and an operational structure of the downstream solver, a superfluous component representing a structured information not contributing to solver alignment, and a noise component representing a destabilizing or an unstructured variance, constrained by a normalization invariant enforcing that a sum of the three components equals a fixed aggregate value;

computing at least one derived compatibility metric based on relationships among the three components;

evaluating the machine-readable structured compatibility certificate prior to invocation or execution of the downstream solver, model, or execution process; and determining and causing implementation of an execution control action based at least in part on the machine-readable structured compatibility certificate, the execution control action conditioning solver invocation, instruction issuance, resource allocation, routing, substitution, throttling, parameter configuration, deferral, or execution rejection within the one or more external systems.

2. The method of claim 1, wherein the machine-readable structured compatibility certificate further comprises signals produced by two architecturally distinct signal paths, wherein the method further comprising:

deriving, via a first signal path performing semantic decomposition, a quality metric from the three components;

independently computing, via a second signal path performing compatibility assessment, a compatibility score quantifying a geometric alignment between the at least one representation and the downstream solver based on at least one of a normalized similarity between embeddings of the at least one representation and embeddings of the downstream solver in a shared latent space, structural alignment measures, solver descriptor compatibility, or difficulty proxies associated with the at least one representation-solver pair; and determining the execution control action based on a conjunction of the quality metric and the compatibility score, wherein the quality metric is derived from decomposition of the representation and the compatibility score derived from a geometric alignment between the at least one representation and the downstream solver in a shared latent space, the two signals having architecturally distinct provenance, wherein the conjunction enables distinguishing a hallucination-risk condition in which the quality metric indicates high quality and the compatibility score indicates low structural alignment from a targeted-corruption condition in which the quality metric indicates low quality and the compatibility score indicates high structural alignment, and wherein the conjunction produces typed execution control that neither signal path alone provides.

3. The method of claim 1, wherein the machine-readable structured compatibility certificate is evaluated by a plurality of independent consumer roles from a single shared certificate, comprising:

an authorization role that reads a conjunction of a quality metric derived from the three components and a compatibility score independently computed for the downstream solver to determine execution decisions;

an interpretation role that reads relationships among the three components to classify operational states into typed collapse domains providing diagnostic labels without requiring a centralized command logic; and a confirmation role that reads stability metrics derived from a temporal trajectory analysis to validate that system dynamics remain within an admissible operating region, wherein each of the plurality of independent consumer roles independently determines execution actions according to its own domain requirements, safety policies, and operational constraints.

4. The method of claim 1, further comprising classifying the machine-readable structured compatibility certificate into one of a plurality of typed collapse domains based on comparative relationships among the three components, wherein each of the plurality of typed collapse domains correspond to a predefined enforcement policy, wherein at least a subset of the plurality of typed collapse domains is determined by component ordering and relative magnitudes, enabling automated classification of distinct failure modes without requiring exhaustive threshold tuning for each failure mode, and wherein each of the plurality of typed collapse domains maps to a distinct remediation action including at least re-encoding, routing to an alternative solver, requesting verification, or rejection.

5. The method of claim 1, wherein projecting the compatibility functional comprises projecting the at least one representation through a plurality of learned weight matrices to determine component magnitudes via differentiable simplex projection operators that enforce the normalization invariant at each computation of the three components, and further comprising computing a reliability coefficient from latent variance associated with the projection, wherein the reliability coefficient monotonically increases as the latent variance decreases, wherein the reliability coefficient monotonically decreases as the latent variance increases, thereby enabling detection of out-of-distribution inputs without requiring labeled validation data.

6. The method of claim 1, wherein the machine-readable structured compatibility certificate is architecturally configured as enforcement data rather than as a command, wherein downstream consumers independently interpret the machine-readable structured compatibility certificate and determine execution actions according to their own domain requirements without centralized orchestration, and wherein the method is operable in an observational mode wherein structured compatibility certificates are generated and logged without altering execution behavior of the downstream solver, model, or execution process, enabling audit trail construction, threshold sensitivity testing, and regulatory compliance documentation without operational risk.

7. The method of claim 1, wherein the machine-readable structured compatibility certificate is cryptographically bound to the contextual input and to an invariant specification defining domain constraints, quality thresholds, encoder configuration parameters, and validation rules, such that integrity and origin of the machine-readable structured compatibility certificate is independently verifiable by a third party without requiring disclosure of internal parameters, weights, or proprietary logic of the downstream solver, the model, or the execution process, wherein tamper detection is performed automatically upon certificate instantiation by re-computing a cryptographic hash of the serialized invariant specification and comparing it with a stored hash value.

8. The method of claim 1, wherein evaluating the machine-readable structured compatibility certificate comprises evaluating through four sequential gates in a fixed order, constituting a correctness guarantee under adversarial conditions:

a first gate issuing a reject decision when the noise component of the certificate meets or exceeds a noise threshold based on an information-theoretic condition, wherein noise dominance renders correct inference impossible regardless of solver capacity;

a second gate issuing a block decision when a phasor coherence metric derived from the machine-readable structured compatibility certificate falls below α coherence threshold, detecting a structural incoherence independent of average quality;

a third gate issuing a re-encode decision when a compatibility score fails to satisfy a dynamic admissibility threshold, wherein the dynamic admissibility threshold is computed as a monotonically increasing function of a turbulence metric derived from the machine-readable structured compatibility certificate such that the required threshold stiffens as turbulence increases, with a tolerance buffer below the threshold within which the turbulence metric serves as a tie-breaker between re-encoding and cautious execution; and a fourth gate issuing a repair decision when a low-level modal compatibility metric falls below α grounding threshold, detecting ungrounded physical signal quality for multimodal or sensor-derived inputs, wherein the gates are evaluated in fixed sequential order that may not be reordered or made optional, and each non-execute gate decision triggers exactly one graph transformation operator that modifies a representation graph, a solver graph, or both, wherein each operator moves exactly one certificate scalar in exactly one direction guaranteeing a repair loop termination.

9. The method of claim 1, wherein upon a non-execute gate decision, a graph transformation operator is executed on a representation graph comprising task-bearing event nodes, a solver graph comprising capability-bearing agent nodes, or both, a global structured compatibility certificate is re-derived from the modified graphs, and gate conditions are re-evaluated, wherein the cycle continues until all gate conditions are satisfied or no further graph transformation is possible, and a committed audit log entry is generated upon cycle termination, wherein upon an execute gate decision, an implementation function associated with the certified agent node is invoked, a real output is received from the invoked agent, wherein the real output is encoded as a new event node carrying a newly-derived structured compatibility certificate reflecting actual intermediate content rather than initialization state, wherein the new event node is added to the representation graph, and each subsequent agent invocation is governed using the updated representation graph, wherein the morph repair cycle triggered by a non-execute gate decision and the agent handoff cycle triggered by an execute gate decision are mutually exclusive in their triggering conditions, perform distinct functions, and operate on different certificate states, such that each agent in a multi-agent pipeline is certified against actual intermediate state rather than phantom initialization state.

10. A system for structured compatibility certification and execution control in one or more external systems, comprising:

a communication device configured to receive contextual input data comprising at least one representation of at least one contextual input and to transmit compatibility information; and a processing device communicatively coupled to the communication device, wherein the processing device is configured to:

identify at least one of a downstream solver, a model, or an execution process configured to operate on the at least one representation;

compute a representation-solver compatibility functional that quantifies structural alignment between characteristics of the at least one representation and operational characteristics of the downstream solver, the model, or the execution process;

project the representation-solver compatibility functional into a machine-readable structured compatibility certificate comprising three components that are mutually exclusive and semantically-distinct: a relevance component representing alignment between features of the representation and operational structure of the downstream solver, a superfluous component representing structured information not contributing to solver alignment, and a noise component representing destabilizing or unstructured variance, constrained by a normalization invariant enforcing that a sum of the three components equals a fixed aggregate value;

compute at least one derived compatibility metric based on relationships among the three components;

evaluate the machine-readable structured compatibility certificate prior to invocation or execution of the downstream solver, model, or execution process; and determine and cause implementation of an execution control action based at least in part on the machine-readable structured compatibility certificate.

11. The system of claim 10, wherein the processing device is further configured to:

derive, via a first signal path performing semantic decomposition, a quality metric from the three components;

independently compute, via a second signal path performing compatibility assessment, a compatibility score quantifying geometric alignment between the at least one representation and the downstream solver based on at least one of: normalized similarity between embeddings of the at least one representation and embeddings of the downstream solver in a shared latent space, structural alignment measures, solver descriptor compatibility, or difficulty proxies associated with the at least one representation-solver pair; and determine the execution control action based on a conjunction of the quality metric and the compatibility score, wherein the quality metric is derived from decomposition of the representation and the compatibility score derived from a geometric alignment between the at least one representation and the downstream solver in a shared latent space, the two signals having architecturally distinct provenance, wherein the conjunction enables distinguishing a hallucination-risk condition in which the quality metric indicates high quality and the compatibility score indicates low structural alignment from a targeted-corruption condition in which the quality metric indicates low quality and the compatibility score indicates high structural alignment, and wherein the conjunction produces typed execution control that neither signal path alone provides.

12. The system of claim 10, wherein the processing device is configured to emit the machine-readable structured compatibility certificate to a plurality of independent consumer roles from a single shared certificate, comprising:

an authorization role that reads a conjunction of a quality metric derived from the three components and a compatibility score independently computed for the downstream solver to determine execution decisions;

an interpretation role that reads relationships among the three components to classify operational states into typed collapse domains providing diagnostic labels without requiring centralized command logic; and a confirmation role that reads stability metrics derived from temporal trajectory analysis to validate that system dynamics remain within an admissible operating region, wherein each of the plurality of independent consumer roles independently determines execution actions according to its own domain requirements, safety policies, and operational constraints.

13. The system of claim 10, wherein the processing device is further configured to classify the machine-readable structured compatibility certificate into one of a plurality of typed collapse domains based on comparative relationships among the three components, wherein each of the plurality of typed collapse domains correspond to a predefined enforcement policy, wherein at least a subset of the typed collapse domains is determined by component ordering and relative magnitudes, enabling automated classification of distinct failure modes without requiring exhaustive threshold tuning for each failure mode, and wherein each of the plurality of typed collapse domain maps to a distinct remediation action including at least re-encoding, routing to an alternative solver, requesting verification, or rejection.

14. The system of claim 10, wherein projecting the compatibility functional comprises projecting the at least one representation through a plurality of learned weight matrices to determine component magnitudes via differentiable simplex projection operators that enforce the normalization invariant at each computation of the three components, and wherein the processing device is further configured to compute a reliability coefficient from latent variance associated with the projection, wherein the reliability coefficient monotonically increases as the latent variance decreases, wherein the reliability coefficient monotonically decreases as the latent variance increases, thereby enabling detection of out-of-distribution inputs without requiring labeled validation data.

15. The system of claim 10, wherein the machine-readable structured compatibility certificate is architecturally configured as enforcement data rather than as a command, wherein downstream consumers independently interpret the machine-readable structured compatibility certificate and determine execution actions according to their own domain requirements without centralized orchestration, and wherein the system is operable in an observational mode wherein structured compatibility certificates are generated and logged without altering execution behavior of the downstream solver, model, or execution process, enabling audit trail construction, threshold sensitivity testing, and regulatory compliance documentation without operational risk.

16. The system of claim 10, wherein the machine-readable structured compatibility certificate is cryptographically bound to the contextual input and to an invariant specification defining domain constraints, quality thresholds, encoder configuration parameters, and validation rules, such that integrity and origin of the machine-readable structured compatibility certificate is independently verifiable by a third party without requiring disclosure of internal parameters, weights, or proprietary logic of the downstream solver, the model, or the execution process, and wherein tamper detection is performed automatically upon certificate instantiation by re-computing a cryptographic hash of the serialized invariant specification and comparing it with a stored hash value.

17. The system of claim 10, wherein evaluating the machine-readable structured compatibility certificate comprises evaluating through four sequential gates in a fixed order constituting a correctness guarantee under adversarial conditions:

a first gate issuing a reject decision when the noise component of the certificate meets or exceeds a noise threshold, based on an information-theoretic condition wherein noise dominance renders correct inference impossible regardless of solver capacity;

a second gate issuing a block decision when a phasor coherence metric derived from the machine-readable structured compatibility certificate falls below α coherence threshold, detecting a structural incoherence independent of average quality;

a third gate issuing a re-encode decision when a compatibility score fails to satisfy a dynamic admissibility threshold, wherein the dynamic admissibility threshold is computed as a monotonically increasing function of a turbulence metric derived from the machine-readable structured compatibility certificate such that the required threshold stiffens as turbulence increases, with a tolerance buffer below the threshold within which the turbulence metric serves as a tie-breaker between re-encoding and cautious execution; and a fourth gate issuing a repair decision when a low-level modal compatibility metric falls below α grounding threshold, detecting ungrounded physical signal quality for multimodal or sensor-derived inputs, wherein the gates are evaluated in fixed sequential order that may not be reordered or made optional, and each non-execute gate decision triggers exactly one graph transformation operator that modifies a representation graph, a solver graph, or both, wherein each operator moves exactly one certificate scalar in exactly one direction guaranteeing a repair loop termination.

18. The system of claim 10, wherein upon a non-execute gate decision, a graph transformation operator is executed on a representation graph comprising task-bearing event nodes, a solver graph comprising capability-bearing agent nodes, or both, a global structured compatibility certificate is re-derived from the modified graphs, and gate conditions are re-evaluated, wherein the cycle continues until all gate conditions are satisfied or no further graph transformation is possible, and a committed audit log entry is generated upon cycle termination, wherein upon an execute gate decision, an implementation function associated with the certified agent node is invoked, a real output is received from the invoked agent, wherein the real output is encoded as a new event node carrying a newly-derived structured compatibility certificate reflecting actual intermediate content rather than initialization state, wherein the new event node is added to the representation graph, and each subsequent agent invocation is governed using the updated representation graph, wherein the morph repair cycle triggered by a non-execute gate decision and the agent handoff cycle triggered by an execute gate decision are mutually exclusive in their triggering conditions, perform distinct functions, and operate on different certificate states, such that each agent in a multi-agent pipeline is certified against actual intermediate state rather than phantom initialization state, wherein agent solver contracts and agent embeddings are maintained as immutable during runtime execution, all routing decisions, graph transformations, and execution control actions are computed algebraically from fixed embeddings without updating neural network weights, learning policies, or modifying solver contracts during live operation, and the processing device does not employ runtime policy optimization, test-time reinforcement learning, or credit assignment at any layer of the execution architecture.

19. The system of claim 10, wherein the processing device computes a geometric compatibility morphism mapping each of a plurality of task-bearing event nodes in a representation graph to the capability-bearing agent node in a solver graph exhibiting maximum compatibility in a shared latent space, wherein the compatibility is computed based on a structural alignment measure between a representation of the event node and a representation of the agent node, wherein an interface compatibility score being the minimum pairwise compatibility across all event-to-agent mappings, wherein a turbulence metric being a standard deviation of pairwise compatibility scores across all mappings, wherein surjectivity of the geometric compatibility morphism is enforced by assigning a forced certificate to any agent node unreachable by any event node such that the forced certificate triggers a reject gate decision, wherein a structural compatibility among certificates derived from respective agents is used to construct, modify, enable, restrict, or mediate communication, coordination, or task delegation among the agents, wherein the task delegation may operate deterministically via geometric structural alignment without requiring a runtime policy optimization or a centralized control.

20. A hardware-accelerated computational system for structured compatibility certification and execution control, comprising:

a memory storing a structured compatibility certificate comprising three components that are mutually exclusive and semantically-distinct, wherein the three components are constrained by a normalization invariant enforcing that a sum of the three components equals a fixed aggregate value, and one or more threshold parameters; and a gating circuit communicatively coupled to the memory, wherein the gating circuit is configured to evaluate one or more fields of the structured compatibility certificate against the threshold parameters and, prior to task execution, conditionally enable or disable instruction issuance, memory access, solver invocation, execution pathway activation, or hardware resource allocation based at least in part on the evaluation of the structured compatibility certificate.

* * * * *